(12) United States Patent
Su et al.

(10) Patent No.: US 11,736,213 B2
(45) Date of Patent: Aug. 22, 2023

(54) TRANSMISSION METHOD OF PHYSICAL SIGNAL, TERMINAL AND BASE STATION

(71) Applicant: Samsung Electronics Co., Ltd., Suwon-si (KR)

(72) Inventors: Di Su, Beijing (CN); Chen Qian, Beijing (CN); Peng Lin, Beijing (CN); Chuang Zhang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/601,367

(22) PCT Filed: Apr. 22, 2020

(86) PCT No.: PCT/KR2020/005316
§ 371 (c)(1),
(2) Date: Oct. 4, 2021

(87) PCT Pub. No.: WO2020/222458
PCT Pub. Date: Nov. 5, 2020

(65) Prior Publication Data
US 2022/0182160 A1 Jun. 9, 2022

(30) Foreign Application Priority Data

Apr. 29, 2019 (CN) .......................... 201910355772.X
Nov. 22, 2019 (CN) .......................... 201911159150.6
(Continued)

(51) Int. Cl.
*H04B 17/354* (2015.01)
*H04B 17/345* (2015.01)
(Continued)

(52) U.S. Cl.
CPC .......... *H04B 17/354* (2015.01); *H04B 1/525* (2013.01); *H04B 17/345* (2015.01); *H04L 5/14* (2013.01); *H04L 27/2691* (2013.01)

(58) Field of Classification Search
CPC .... H04B 17/354; H04B 1/525; H04B 17/345; H04B 17/24; H04B 17/309; H04B 17/318;
(Continued)

(56) References Cited

U.S. PATENT DOCUMENTS 11,140,695 B1 * 10/2021 Eyuboglu ........... H04W 72/535
2016/0127114 A1 * 5/2016 Kim ..................... H04B 17/345
370/252

(Continued)

FOREIGN PATENT DOCUMENTS

KR 10-2015-0133111 A 11/2015
WO 2019/052934 A1 3/2019

OTHER PUBLICATIONS

"Hybrid Duplex Wireless Peer Discovery With Imperfect Self-Interference Cancellation"; Kwon et al.; IEEE Communications Letters, vol. 22, No. 3, Mar. 2018 (Year: 2018).*

(Continued)

*Primary Examiner* — Benjamin H Elliott, IV

(57) ABSTRACT

A transmission method of a physical signal, a terminal, and a base station are provided. The transmission method may include receiving first configuration information, determining a measurement time-frequency resource for a residual self-interference measurement based on the first configuration information, performing the residual self-interference measurement on the measurement time-frequency resource to obtain a measurement result, transmitting feedback information determined according to the measurement result, receiving second configuration information determined according to the feedback information and determining a (Continued)

duplex mode of a terminal based on the second configuration information. According to the present disclosure, interference during a signal transmission procedure may be reduced.

15 Claims, 44 Drawing Sheets

(30) Foreign Application Priority Data

| | | |
|---|---|---|
| Nov. 27, 2019 | (CN) | 201911185380.X |
| Dec. 3, 2019 | (CN) | 201911220637.0 |
| Dec. 30, 2019 | (CN) | 201911399863.X |
| Feb. 18, 2020 | (CN) | 202010100054.0 |

(51) Int. Cl.
    *H04B 1/525*     (2015.01)
    *H04L 5/14*     (2006.01)
    *H04L 27/26*     (2006.01)

(58) Field of Classification Search
    CPC ........... H04B 17/336; H04B 1/54; H04L 5/14; H04L 27/2691; H04L 5/0007; H04L 5/0094; H04L 27/26025; H04L 27/2607; H04L 27/26134; H04L 27/2613; H04L 27/2646; H04L 5/00; H04L 27/26; H04W 24/08
    See application file for complete search history.

(56) References Cited

U.S. PATENT DOCUMENTS

| | | | | |
|---|---|---|---|---|
| 2017/0257177 | A1* | 9/2017 | Noh | H04J 11/003 |
| 2018/0159669 | A1* | 6/2018 | Chung | H04L 5/006 |
| 2018/0167832 | A1 | 6/2018 | Fang et al. | |
| 2018/0234230 | A1* | 8/2018 | Kalhan | H04L 5/0044 |
| 2018/0323887 | A1* | 11/2018 | Azarian Yazdi | H04L 5/0073 |
| 2020/0052775 | A1* | 2/2020 | Nam | H04B 17/336 |
| 2020/0266908 | A1* | 8/2020 | Qian | H04L 5/0007 |
| 2020/0322184 | A1* | 10/2020 | Kim | H04L 25/0228 |
| 2020/0337056 | A1* | 10/2020 | Abedini | H04B 17/24 |
| 2020/0337057 | A1* | 10/2020 | Abedini | H04W 72/53 |
| 2021/0281386 | A1* | 9/2021 | Xia | H04B 1/525 |
| 2022/0006501 | A1* | 1/2022 | Kim | H04B 7/0632 |
| 2022/0045714 | A1* | 2/2022 | Chen | H04L 5/14 |
| 2022/0159596 | A1* | 5/2022 | Kim | H04B 17/336 |
| 2022/0182160 | A1* | 6/2022 | Su | H04L 27/2691 |
| 2022/0239456 | A1* | 7/2022 | Khandani | H04B 1/123 |

OTHER PUBLICATIONS

"Resource Multiplexing between Backhaul and Access Links"; Samsung; 3GPP TSG RAN WG1 #96bis R1-1904417 Xi'an, China, Apr. 8-12, 2019 (Year: 2019).*

"Discussion on mechanisms for resource multiplexing among backhaul and access links"; Caict; 3GPP TSG RAN WG1 Meeting #96bis R1-1905131 Apr. 2019 Xi'an, China, Apr. 8-12, 2019 (Year: 2019).*

"X-Duplex Radios: Flexible Switching Between Full-Duplex and Half-Duplex"; Yao et al.; IEEE Wireless Communications Letters, vol. 7, No. 1, Feb. 2018 (Year: 2018).*

"X-Duplex Relay with Self-interference Signal Energy Harvesting and Its Hybrid Mode Selection Method"; Tang et al.; The 27th Wireless and Optical Communications Conference (WOCC2018) (Year: 2018).*

Chao Yao et al., "X-Duplex: Adapting of Full-Duplex and Half-Duplex", IEEE Infocom 2015 Poster Presentation, Aug. 6, 2015, 2 pages.

Weijun Tang et al., "Hybrid Duplex Switching in Heterogeneous Networks", Aug. 22, 2016, 13 pages.

Notification of Transmittal of the International Search Report and the Written Opinion of the International Searching Authority, or the Declaration dated Jul. 23, 2020 in connection with International Patent Application No. PCT/KR2020/005316, 10 pages.

European Patent Office, "Supplementary European Search Report" dated Jan. 7, 2022, in connection with European Patent Application No. 20798799.1, 9 pages.

* cited by examiner

[Fig. 1]
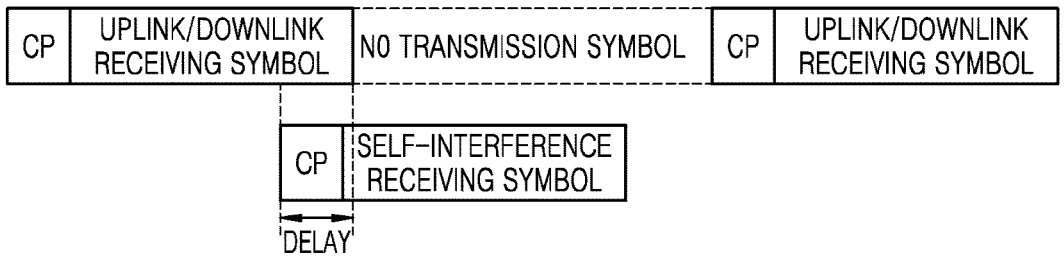
[Fig. 2]
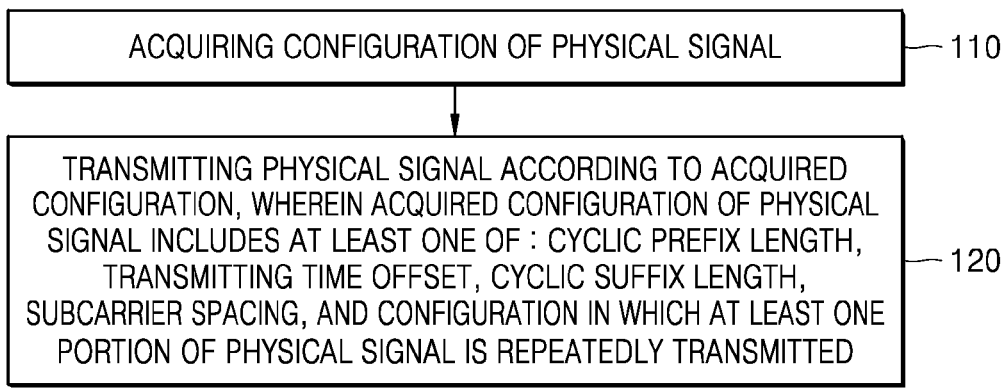
[Fig. 3]
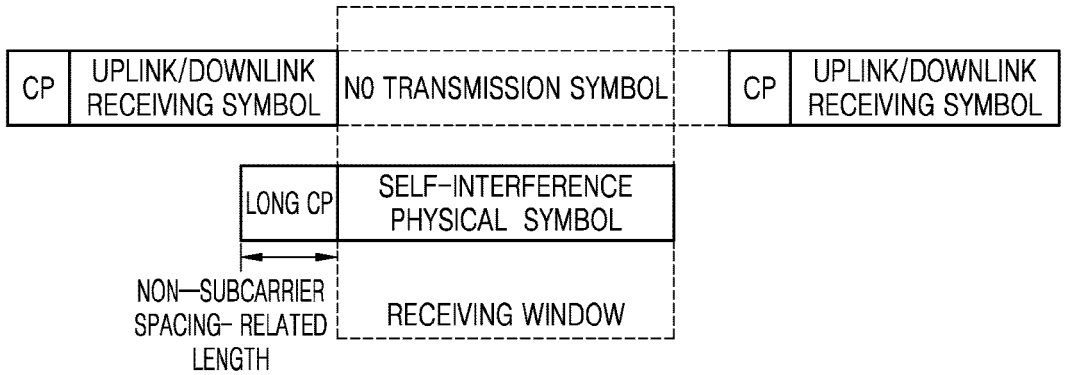
[Fig. 4]
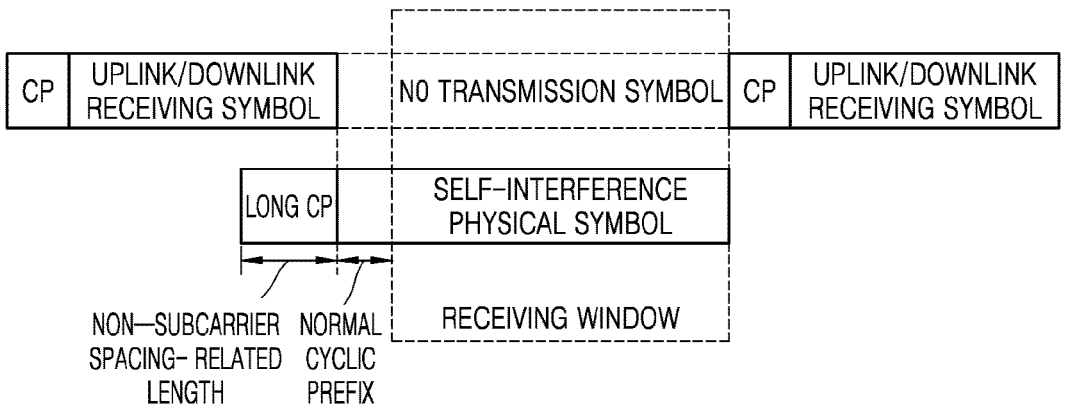

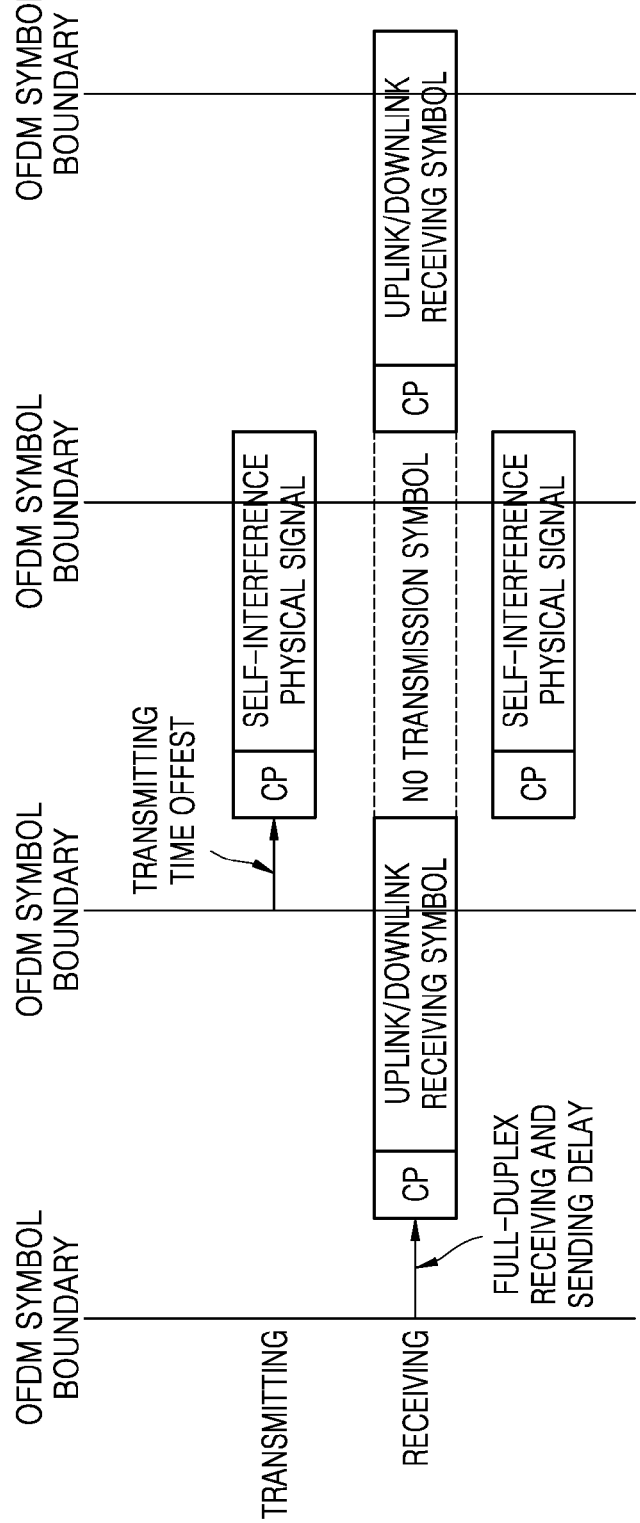

[Fig. 6]
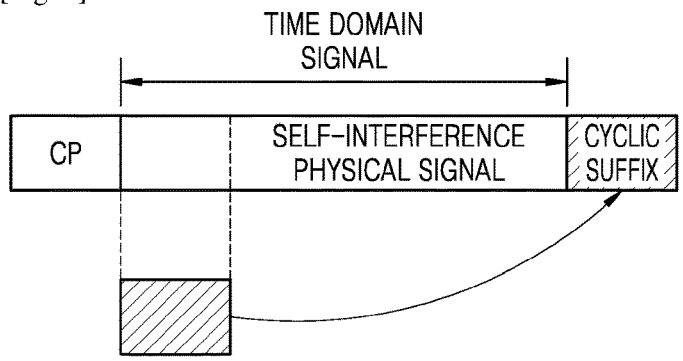
[Fig. 7]
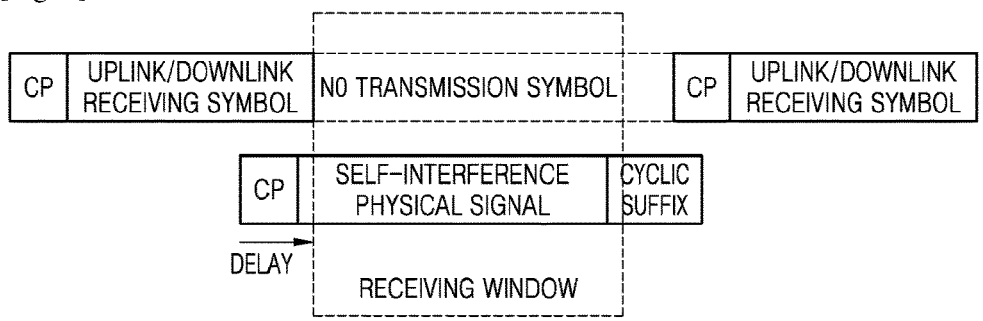
[Fig. 8]
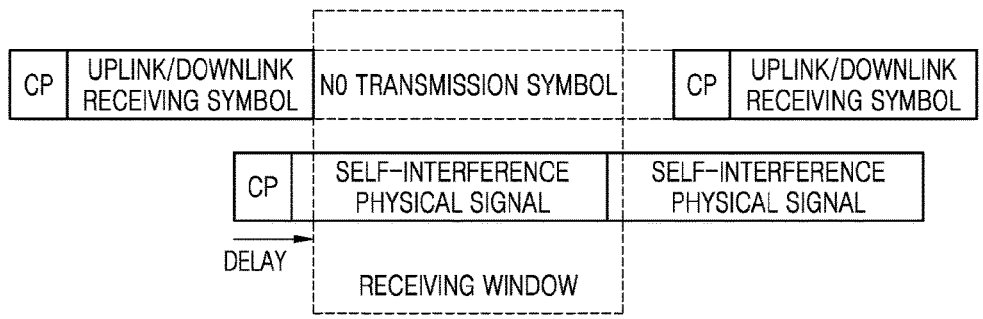
[Fig. 9]
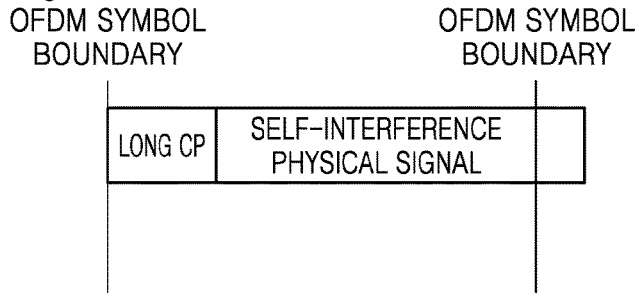
[Fig. 10]
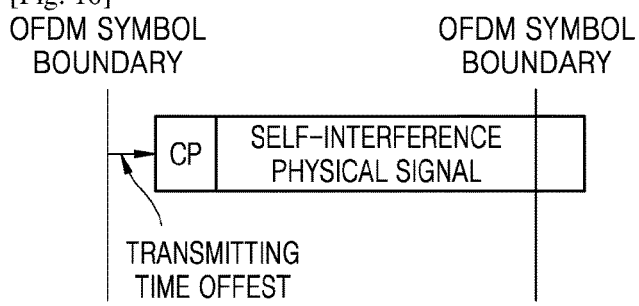

[Fig. 11]
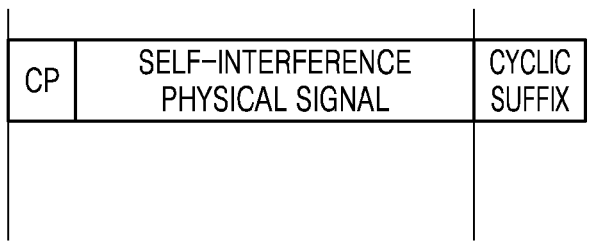
[Fig. 12]
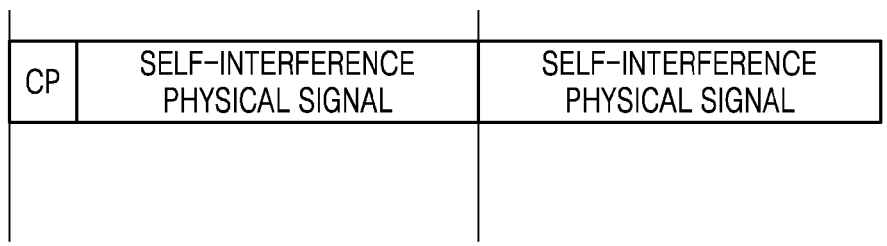

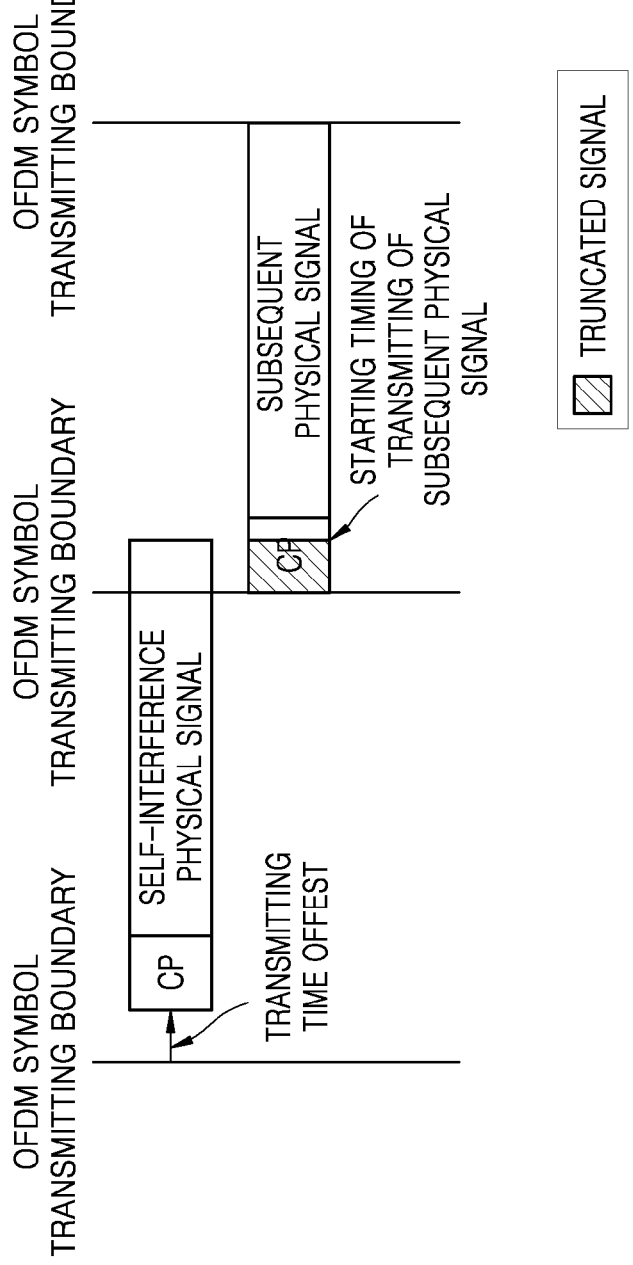
[Fig. 13]

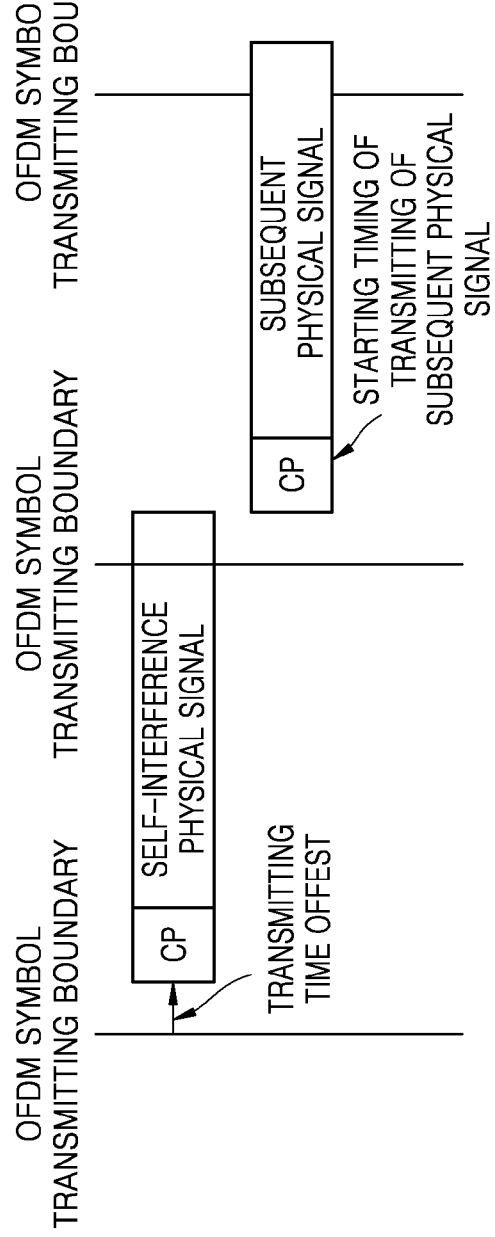
[Fig. 14]

[Fig. 15]
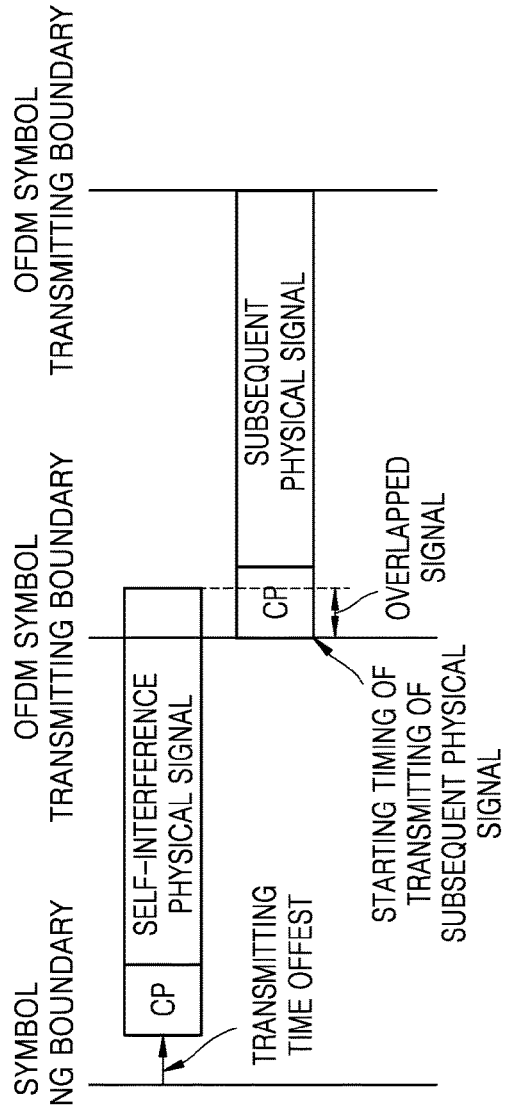
[Fig. 16]
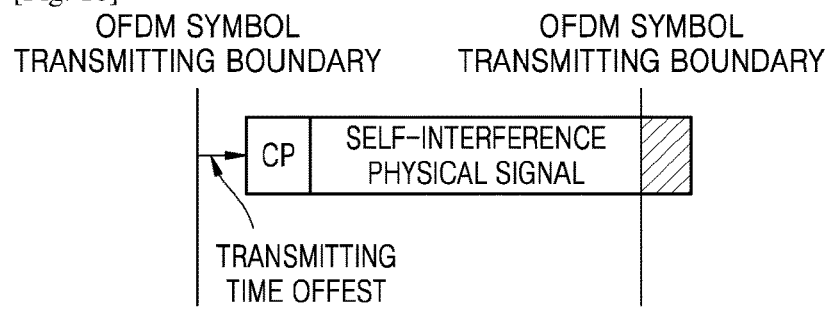

[Fig. 17]
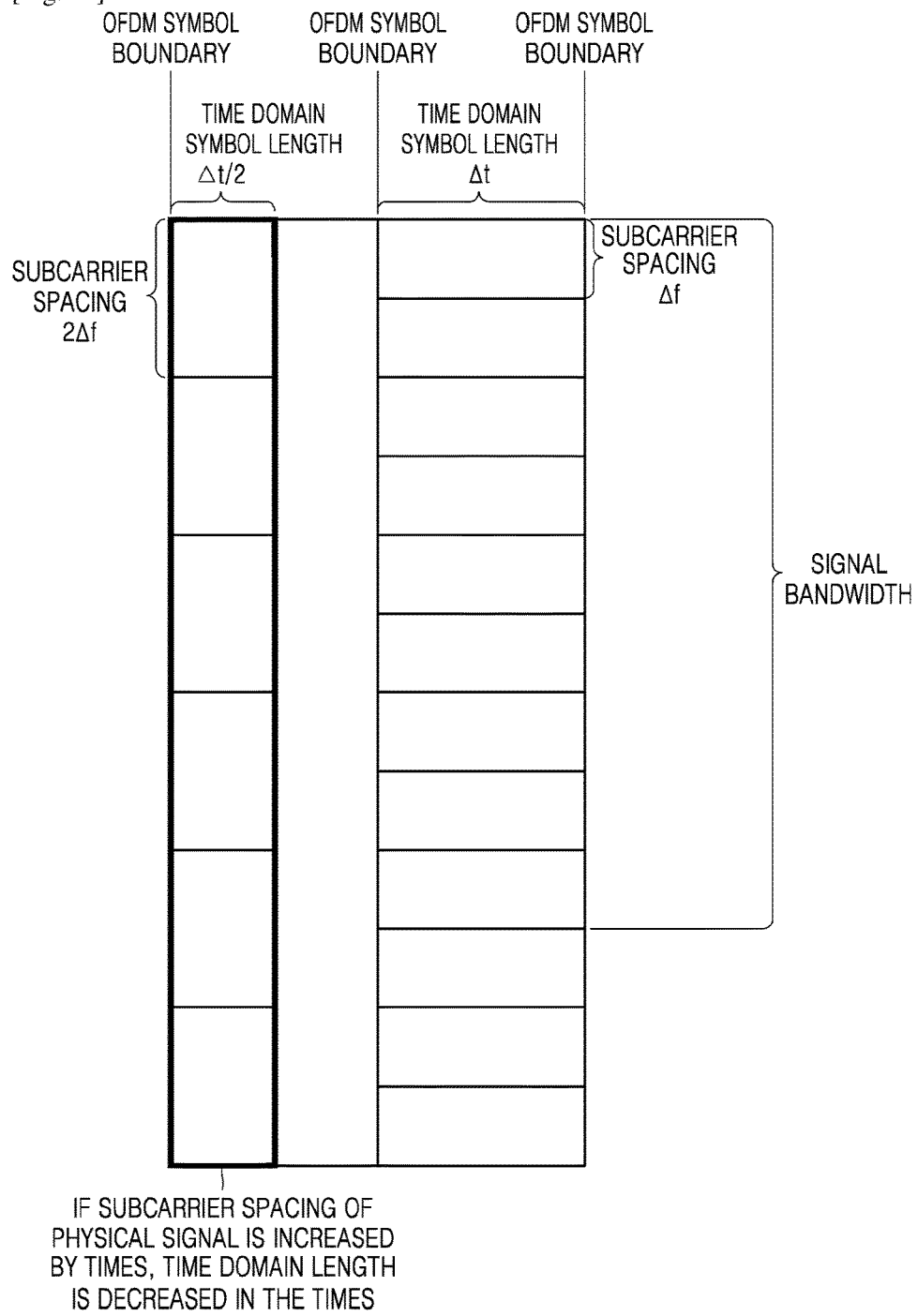
IF SUBCARRIER SPACING OF PHYSICAL SIGNAL IS INCREASED BY TIMES, TIME DOMAIN LENGTH IS DECREASED IN THE TIMES
[Fig. 18]
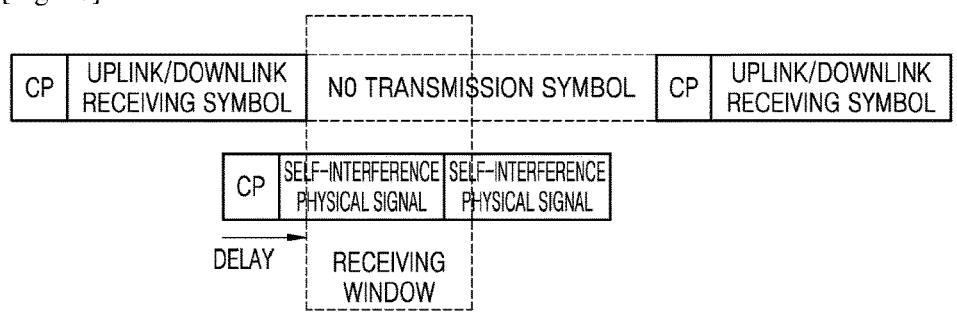

[Fig. 19]
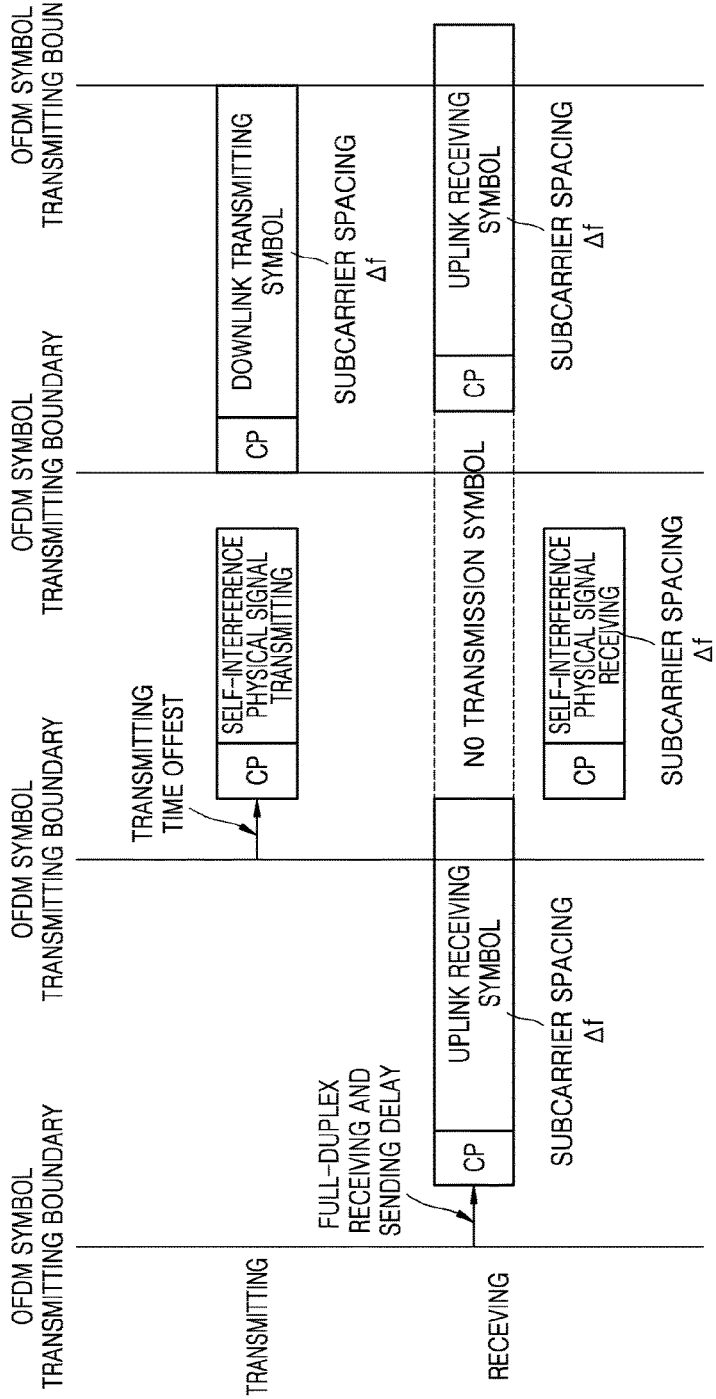
[Fig. 20]
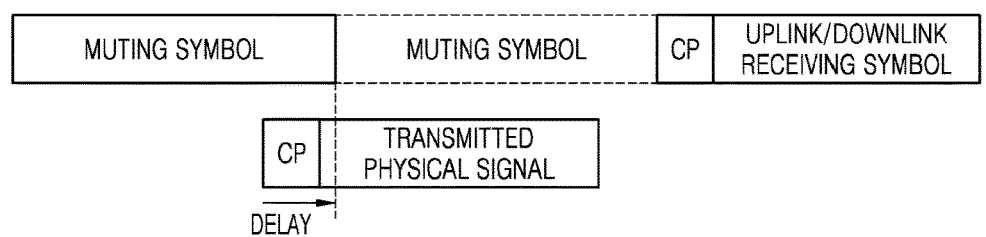

[Fig. 21]
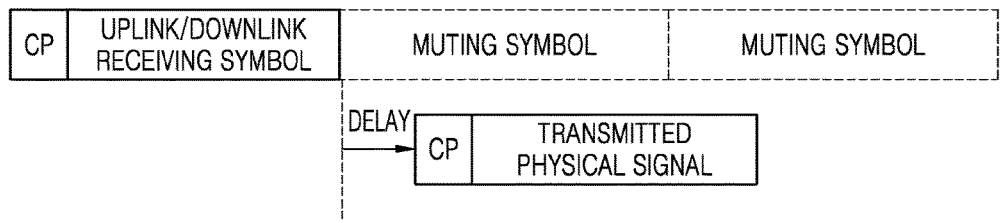
[Fig. 22]
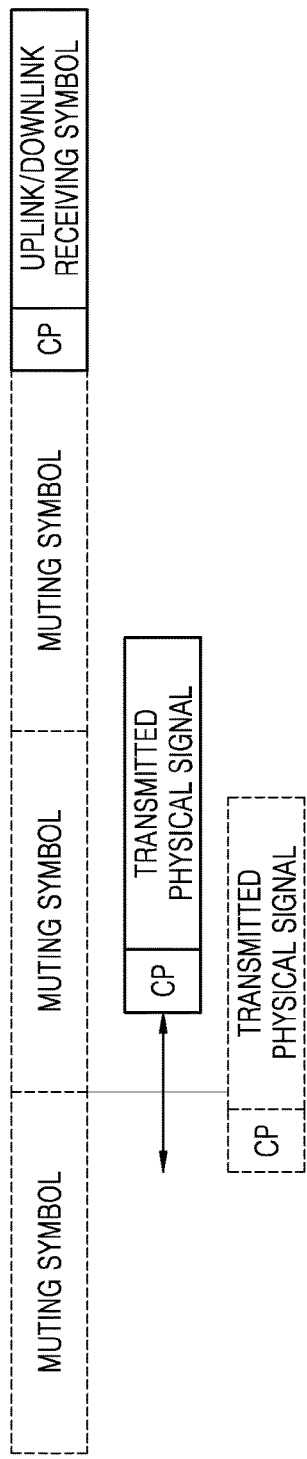

[Fig. 23]
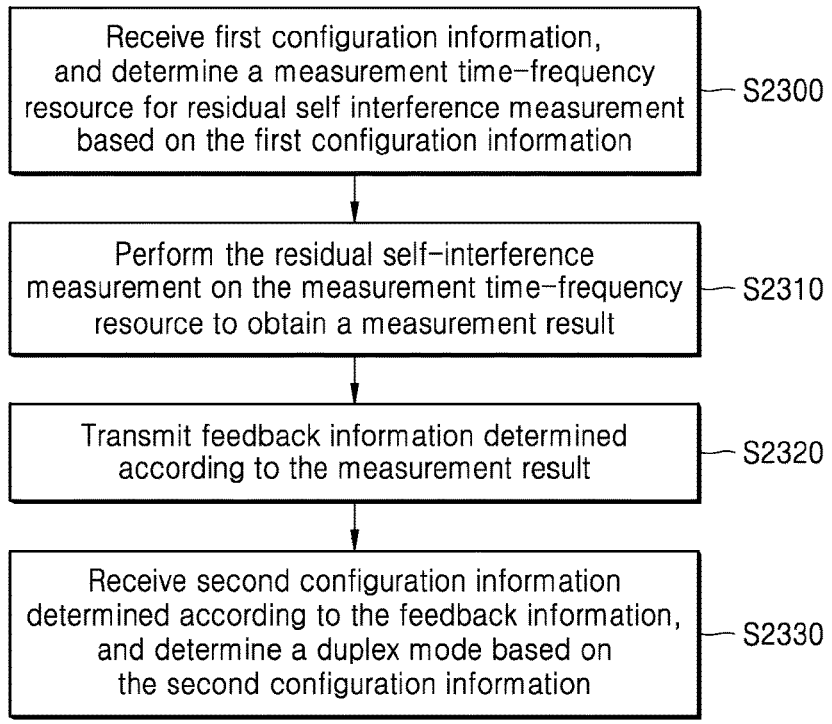
[Fig. 24]
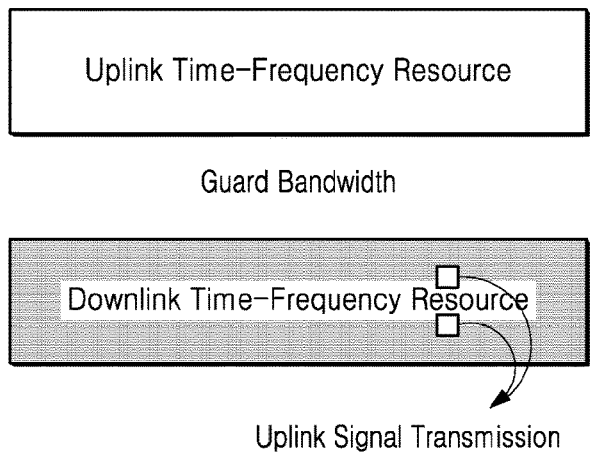
Guard Bandwidth
[Fig. 25]
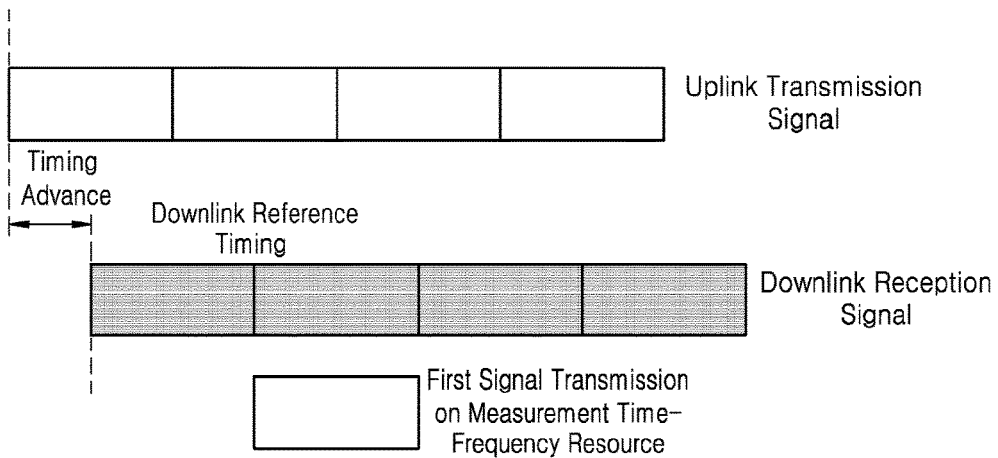

[Fig. 26]
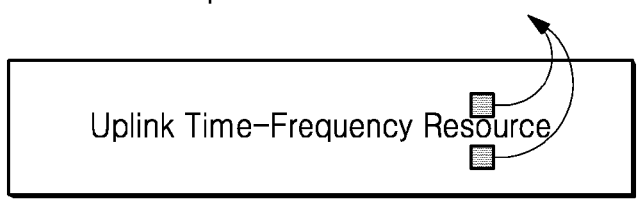
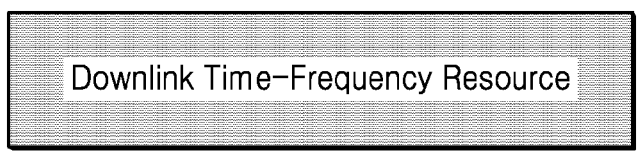
[Fig. 27]
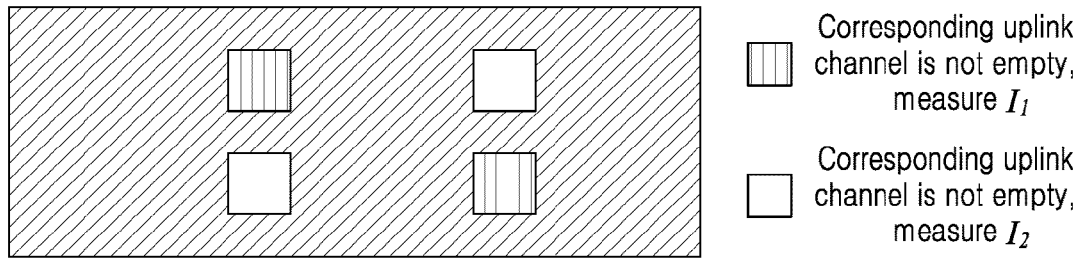
[Fig. 28]
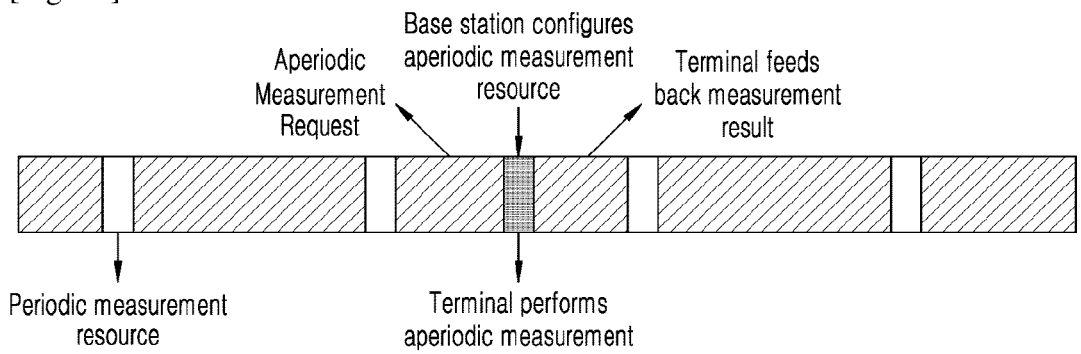

[Fig. 29]
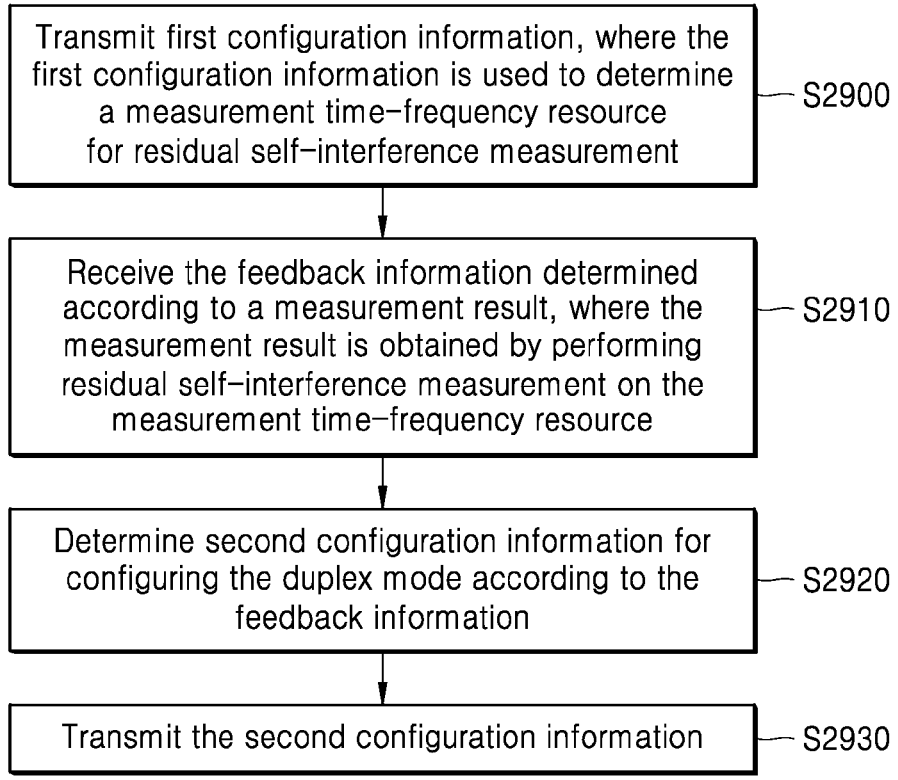
[Fig. 30]
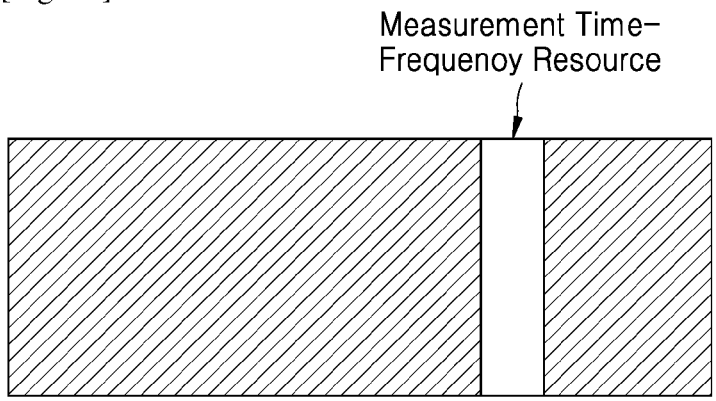
[Fig. 31]
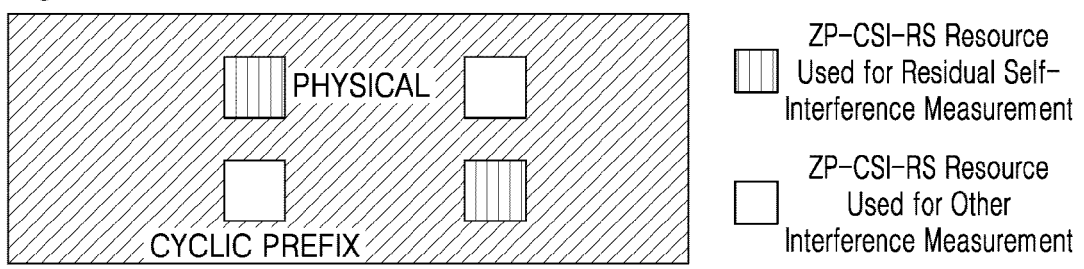

[Fig. 32]
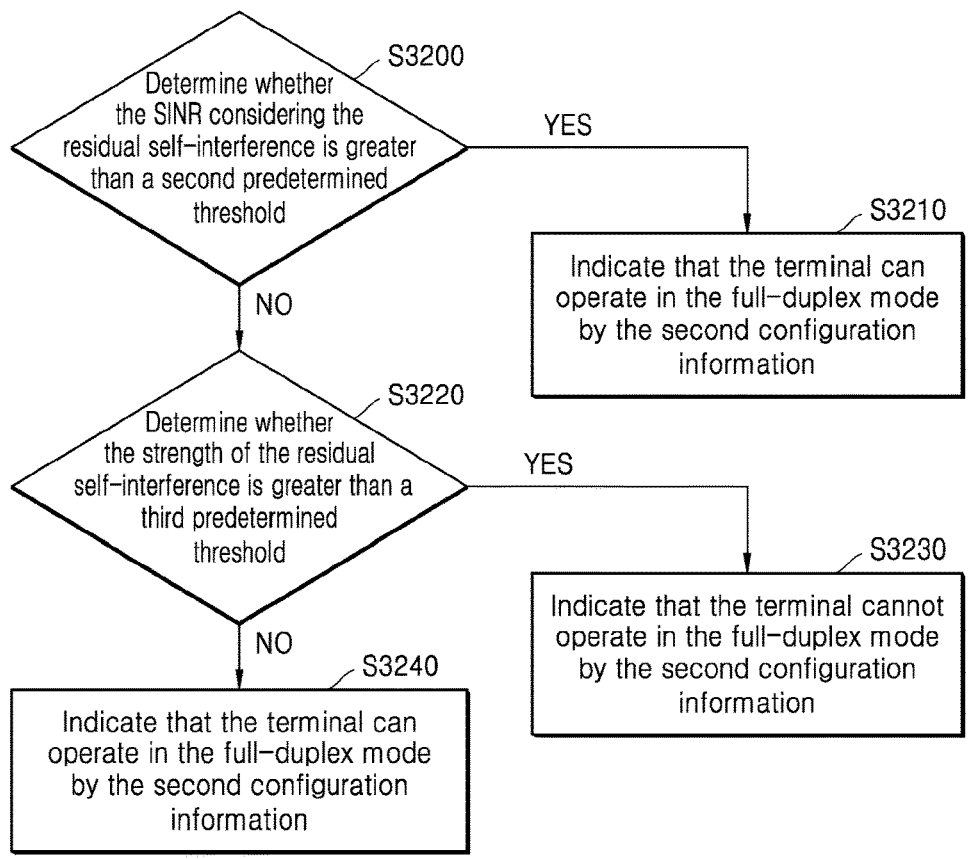
[Fig. 33]
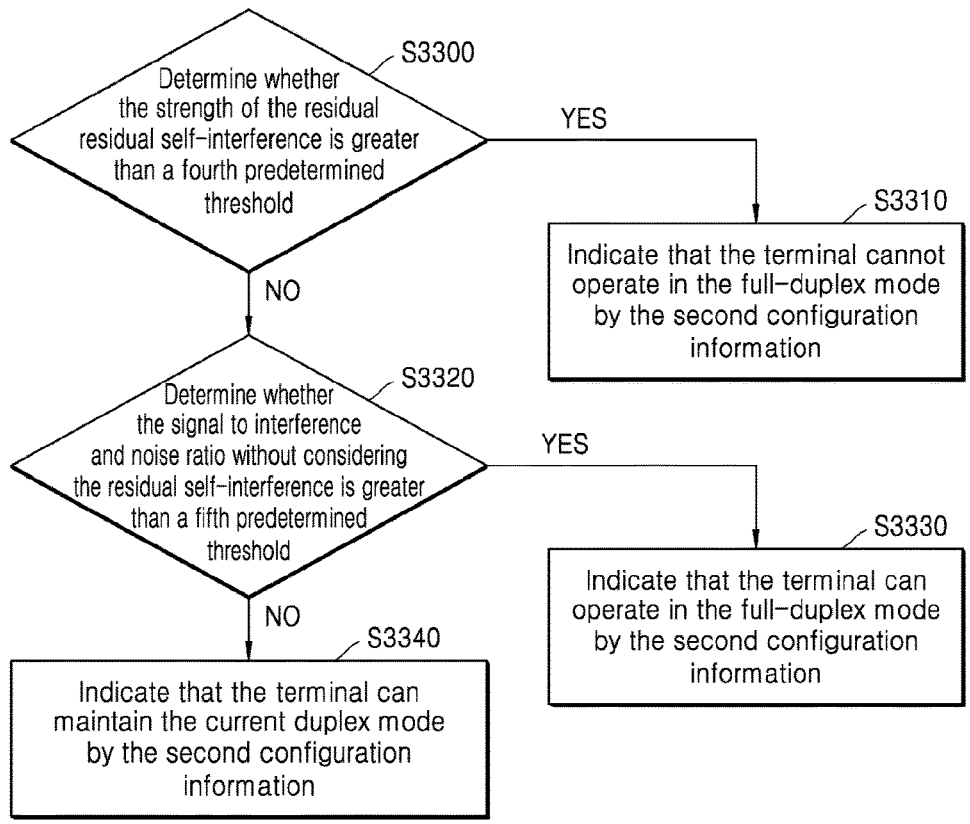

[Fig. 34]
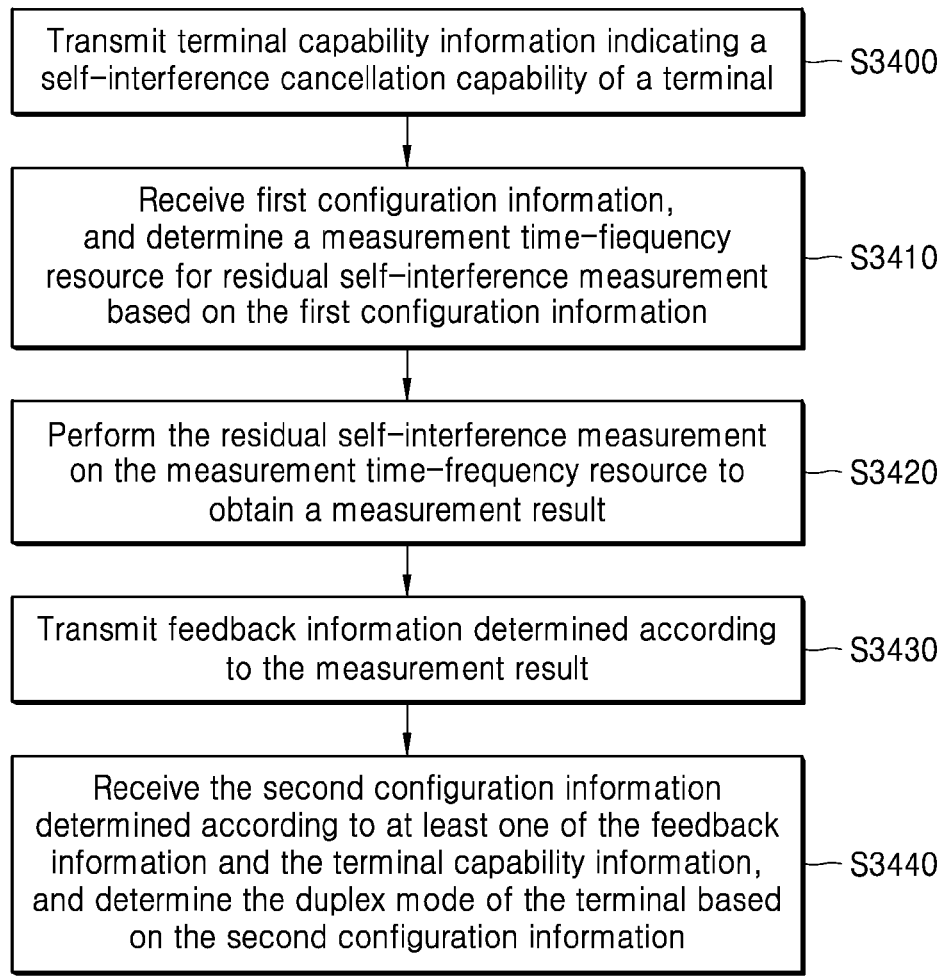

[Fig. 35]
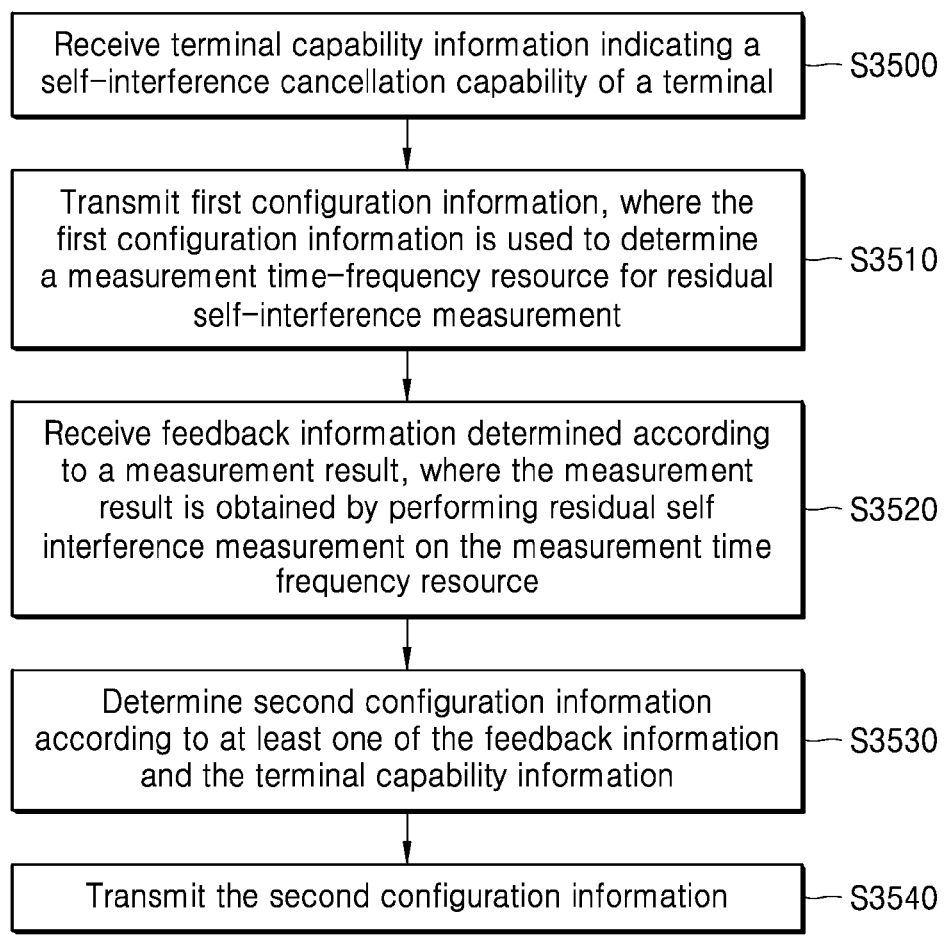

[Fig. 36]
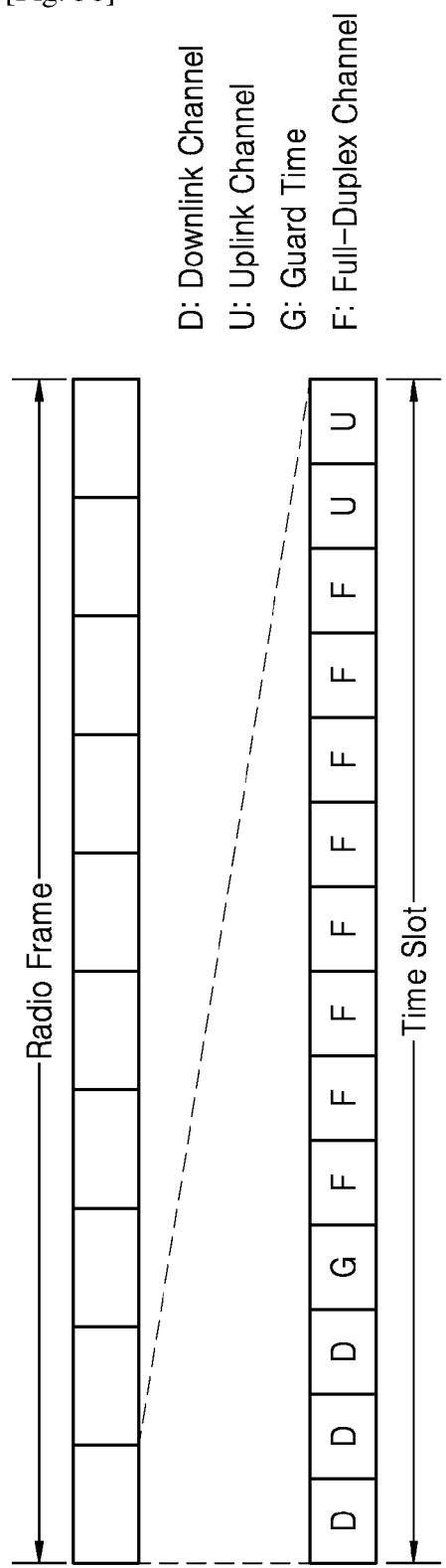

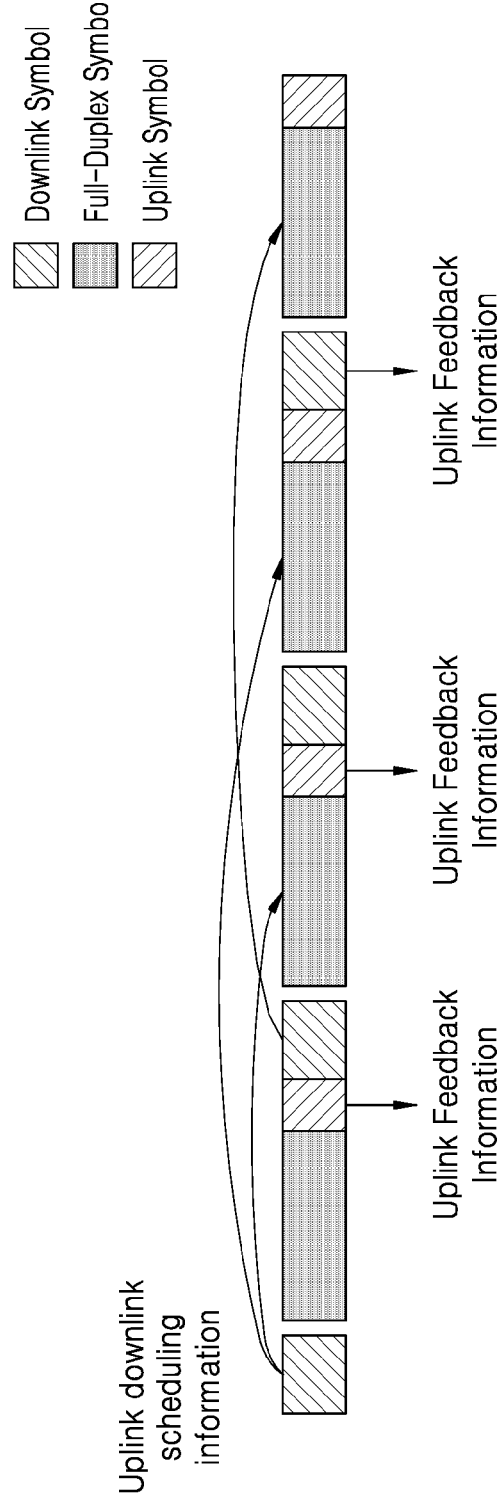

[Fig. 38]
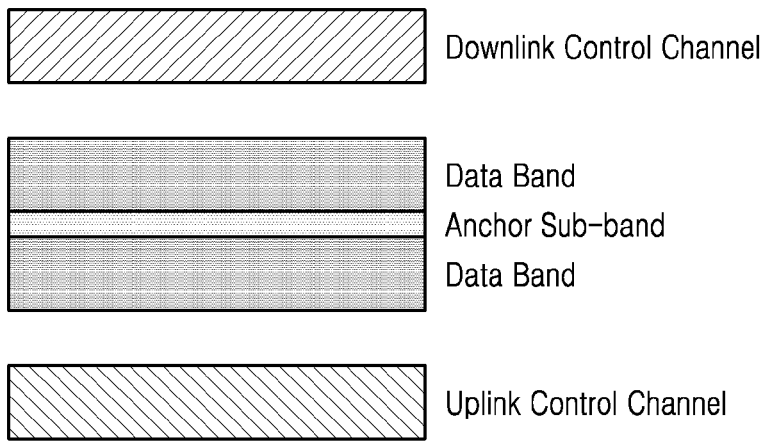
[Fig. 39]
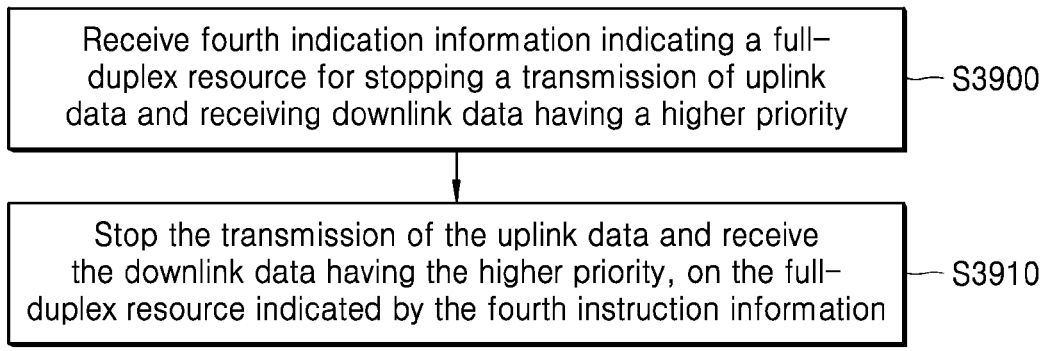
[Fig. 40]
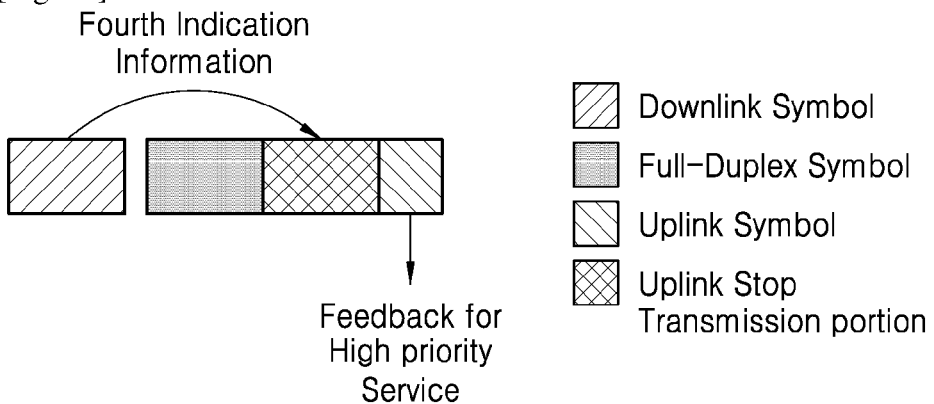

[Fig. 41]
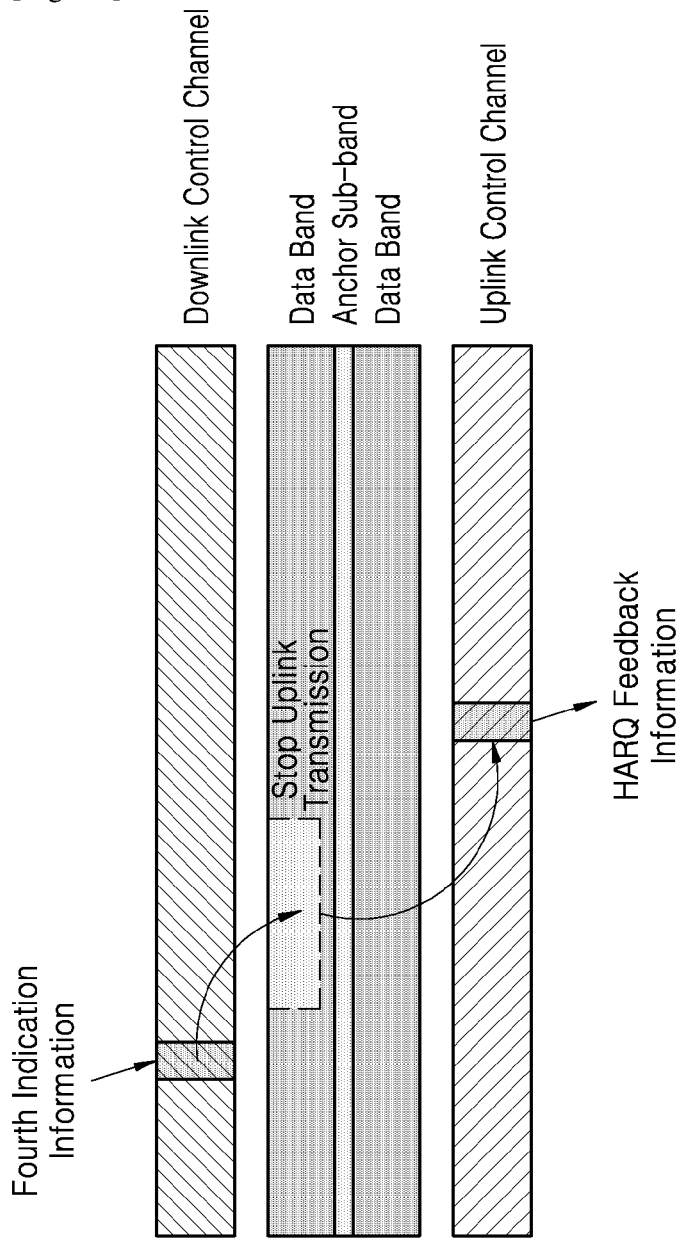
[Fig. 42]
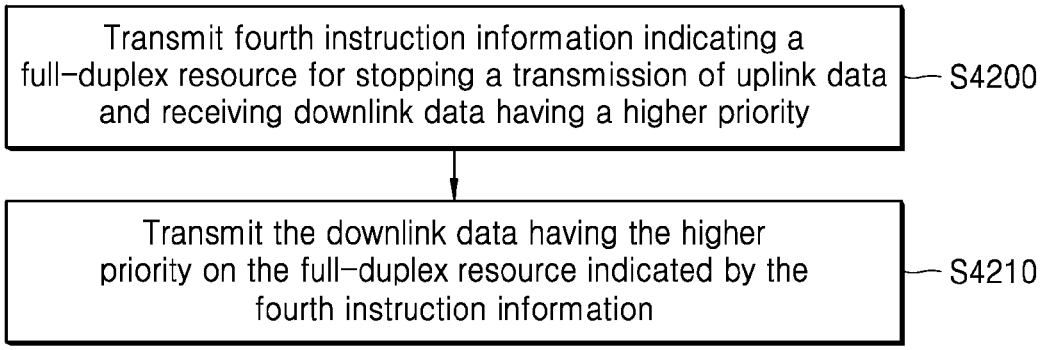

[Fig. 43]
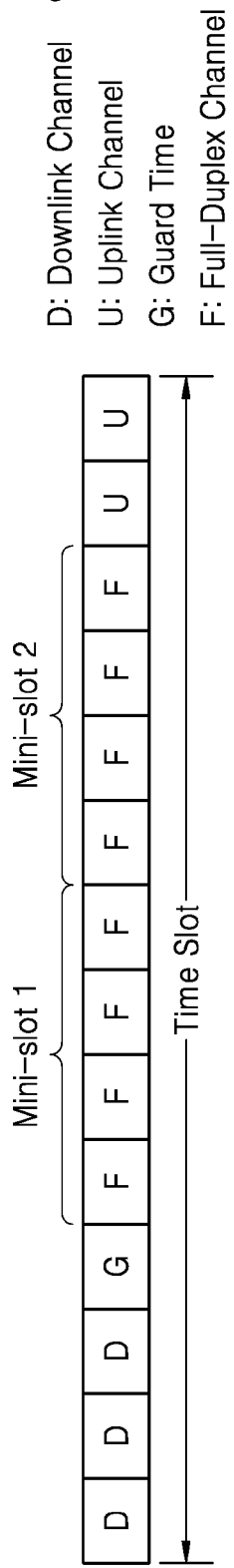

[Fig. 44]
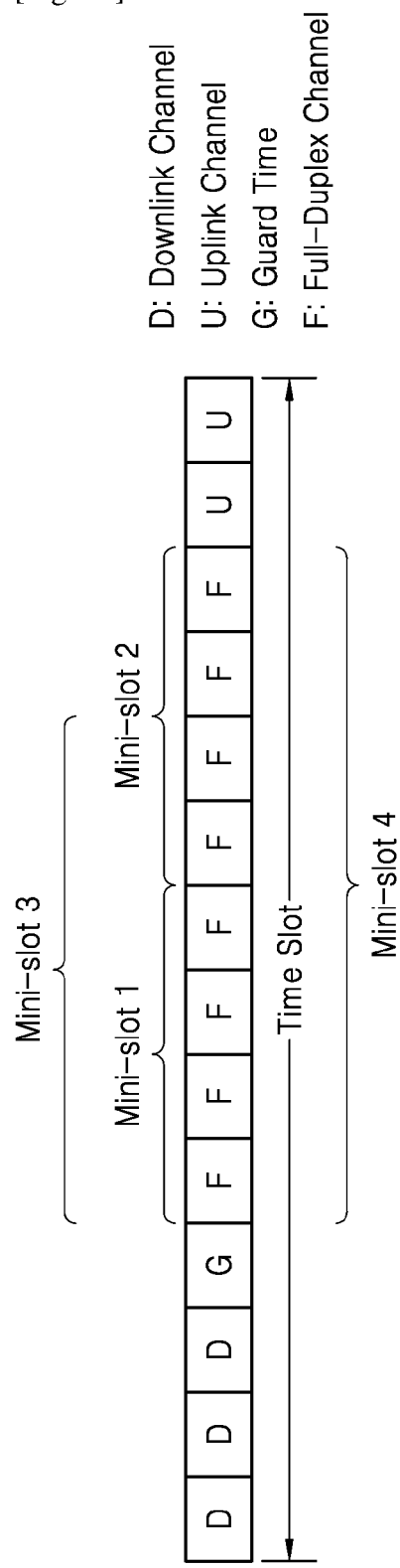

[Fig. 45]
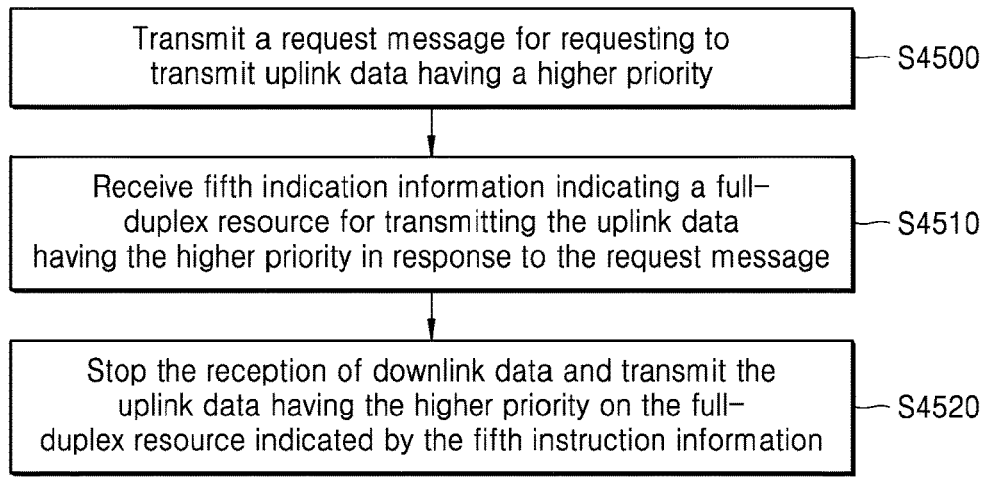
[Fig. 46]
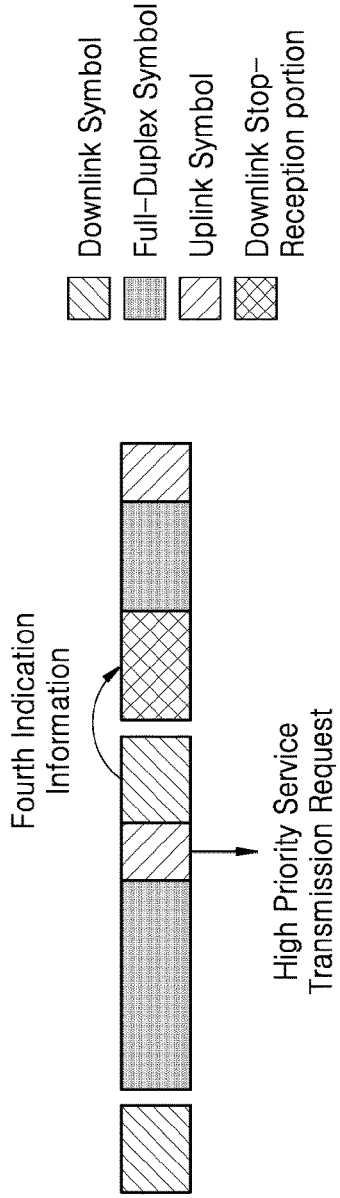

[Fig. 47]
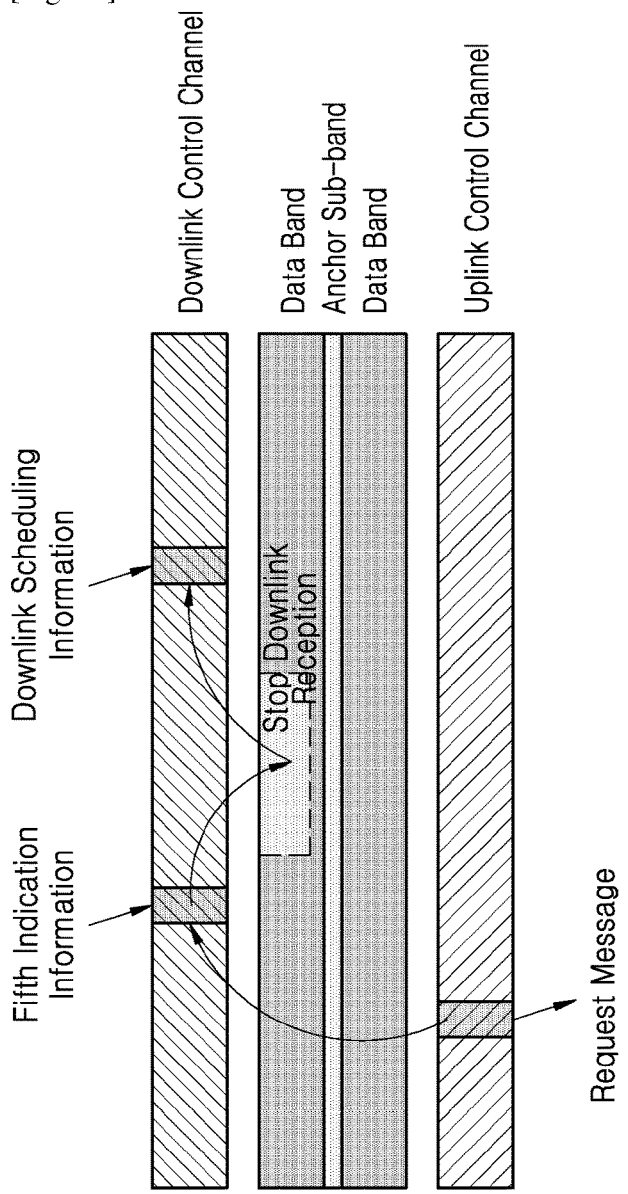
[Fig. 48]
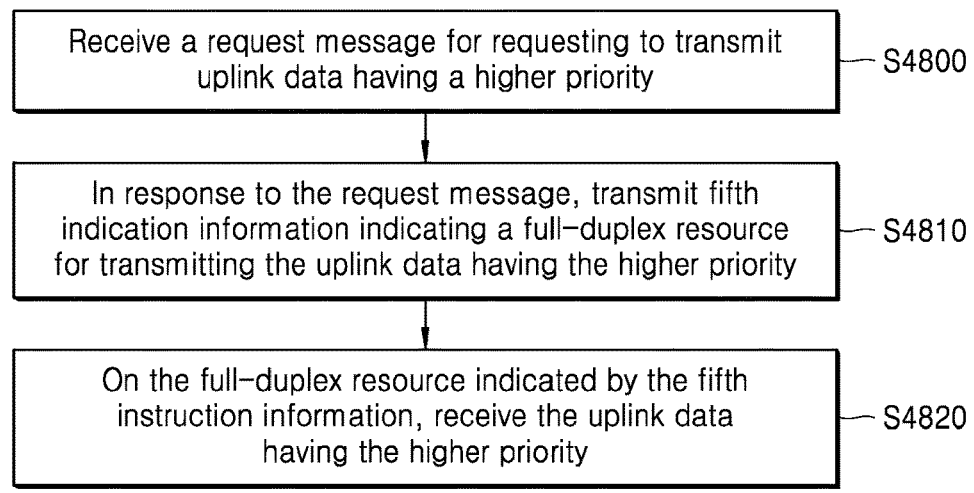

[Fig. 49]
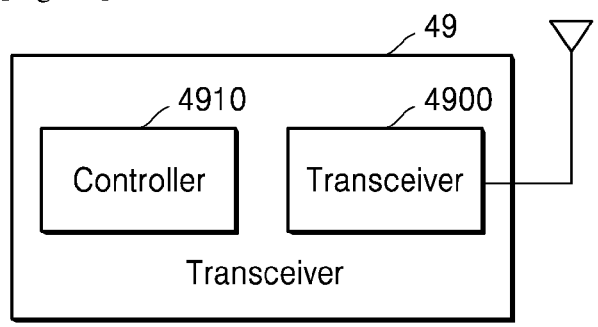
[Fig. 50]
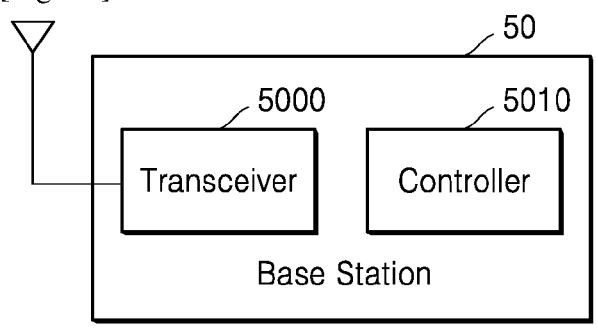

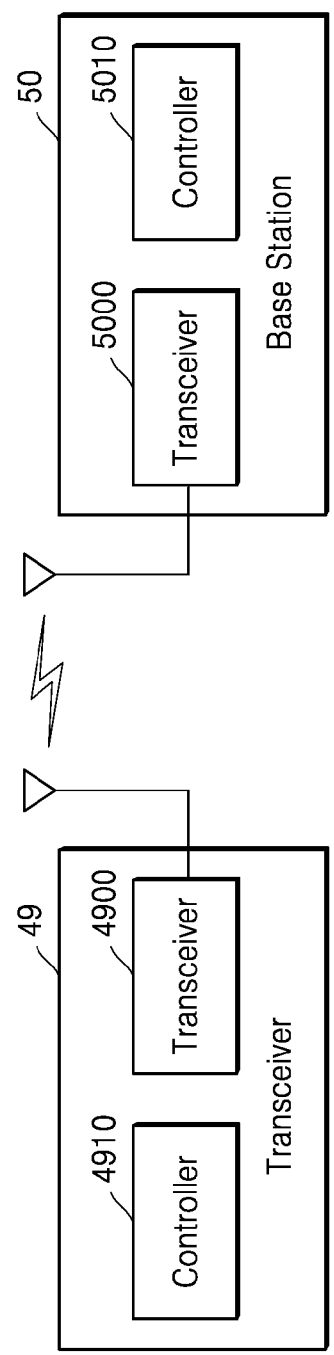
[Fig. 51]

[Fig. 52]
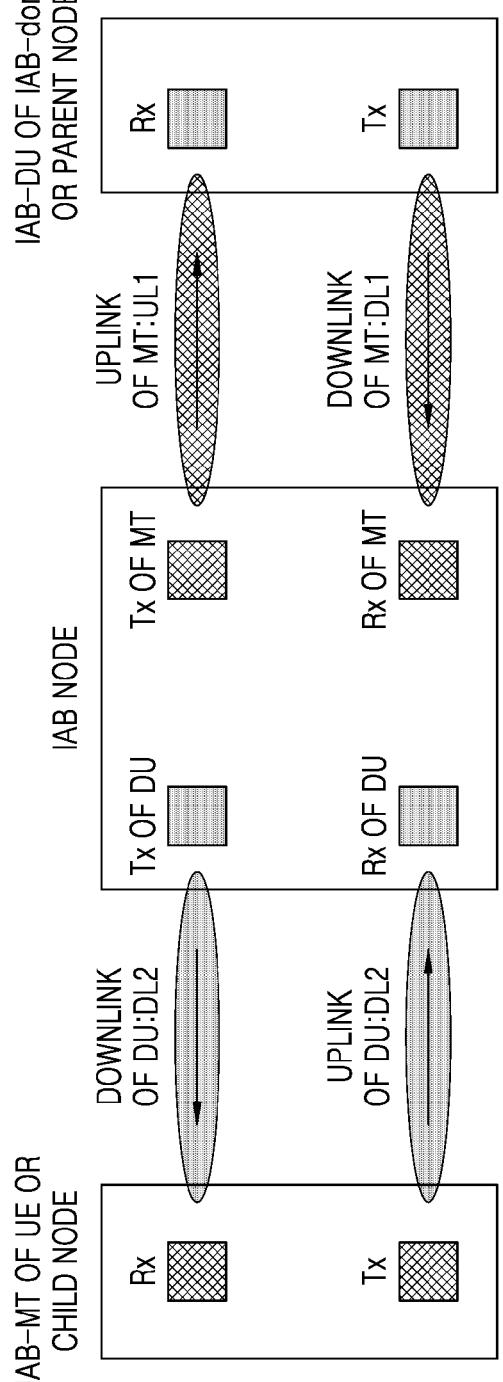

[Fig. 53]
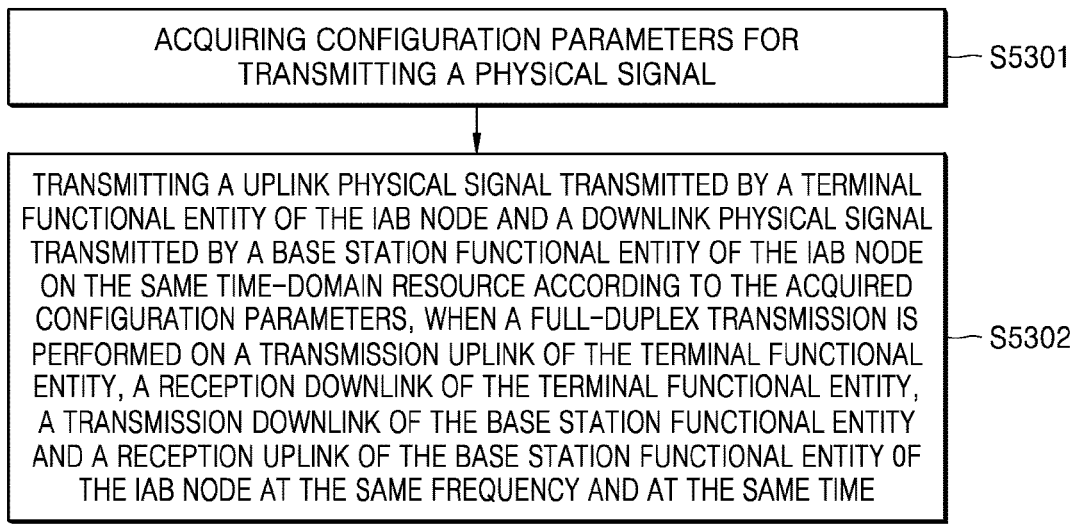

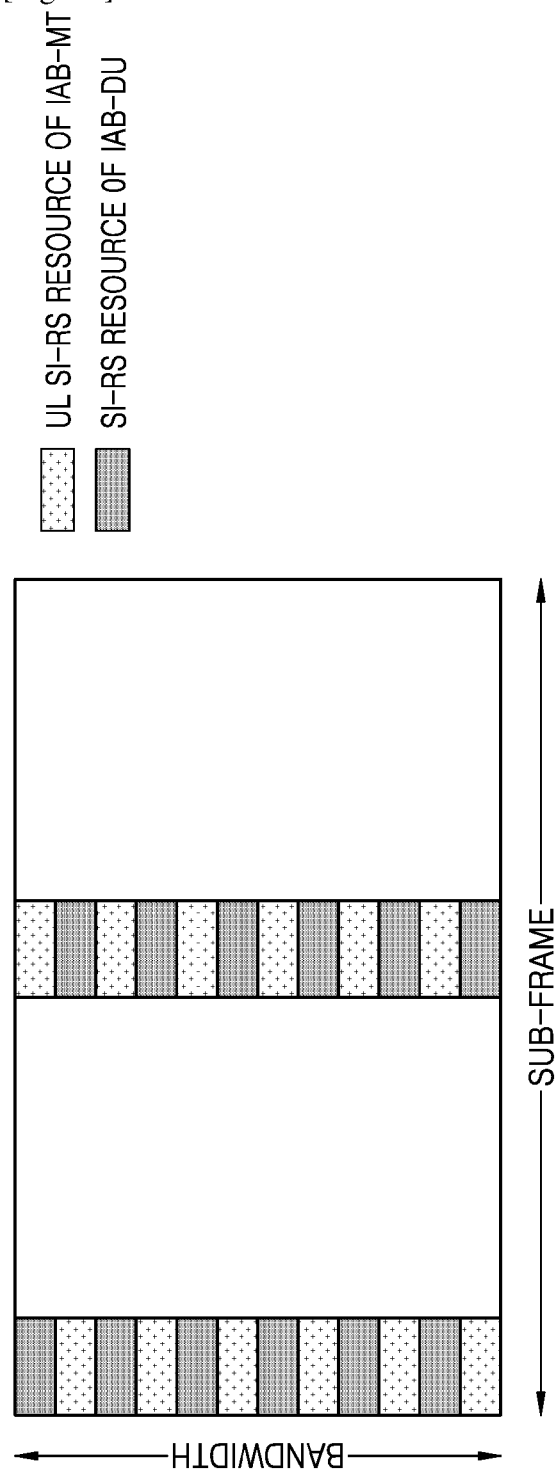
[Fig. 54]

[Fig. 55]
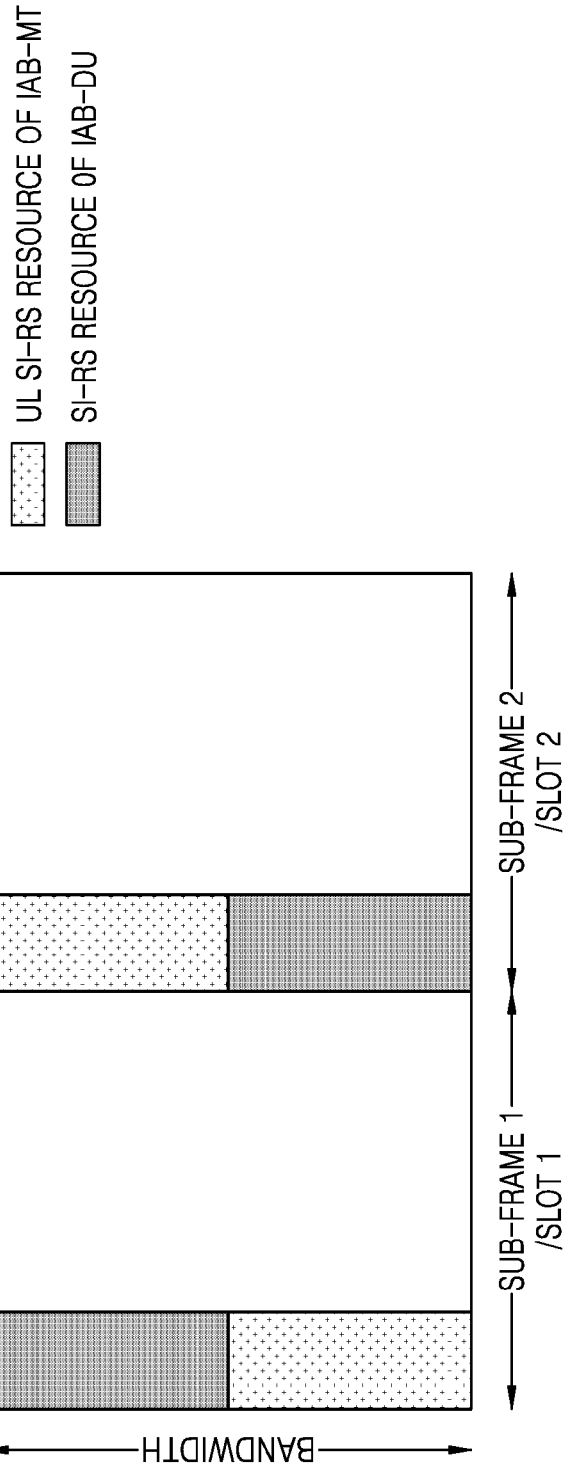

[Fig. 56]
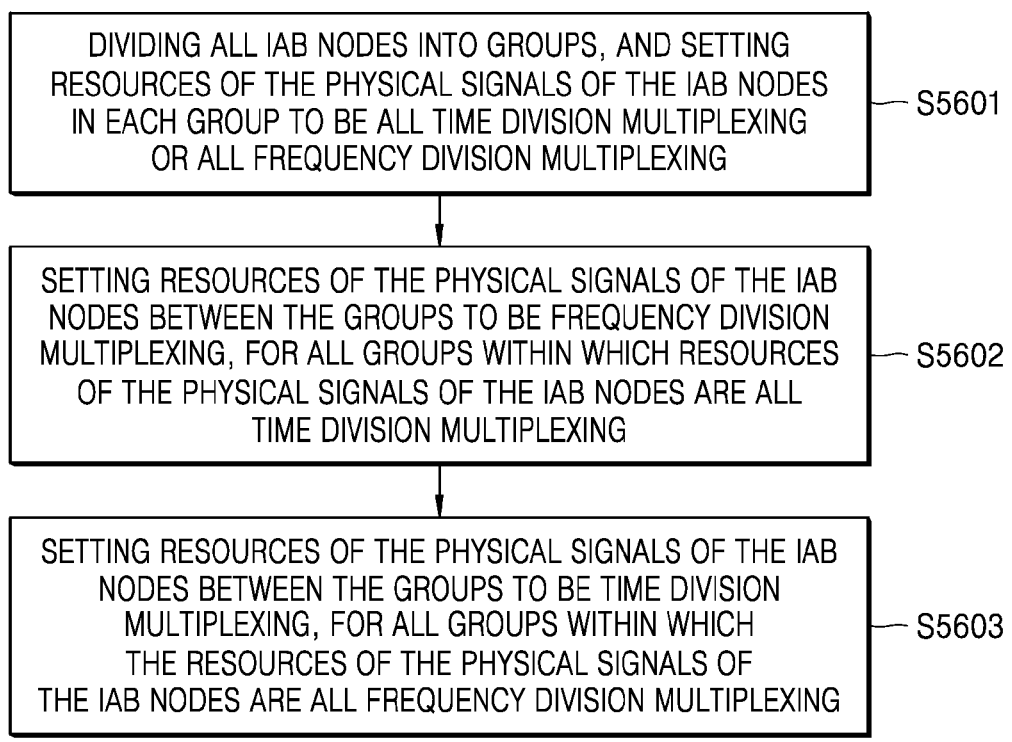

[Fig. 57]
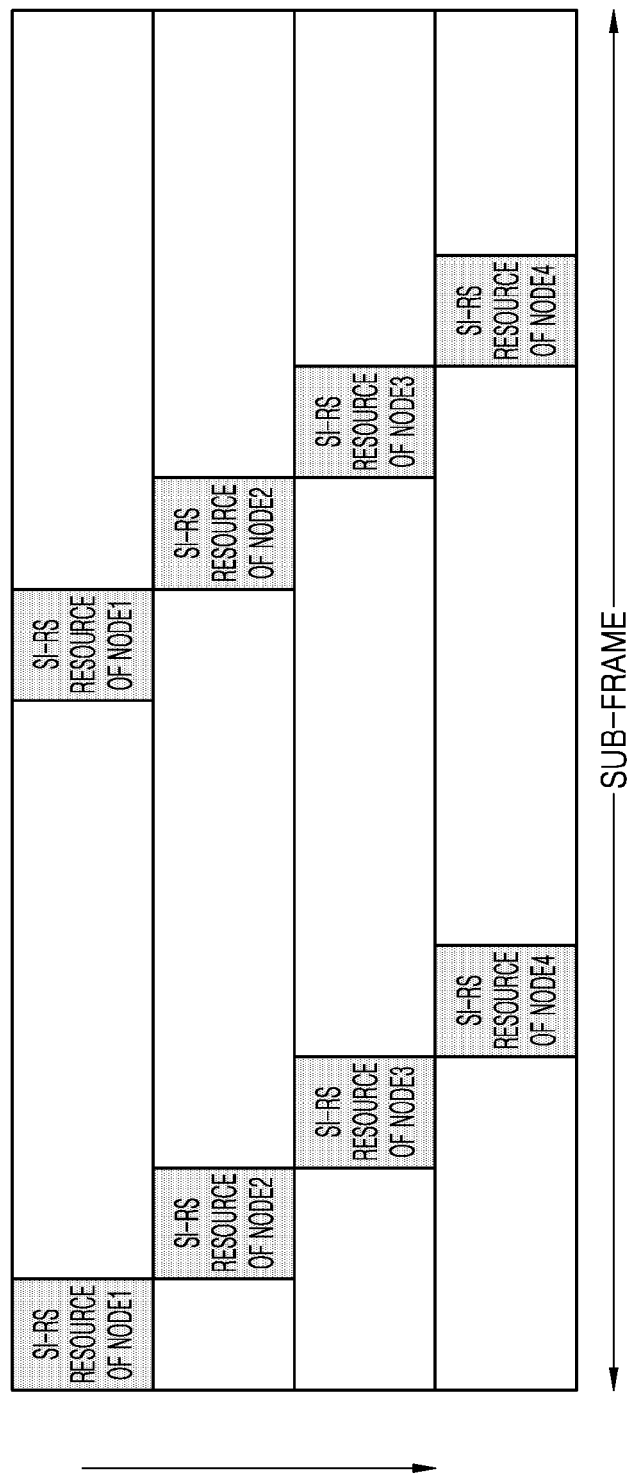

[Fig. 58]
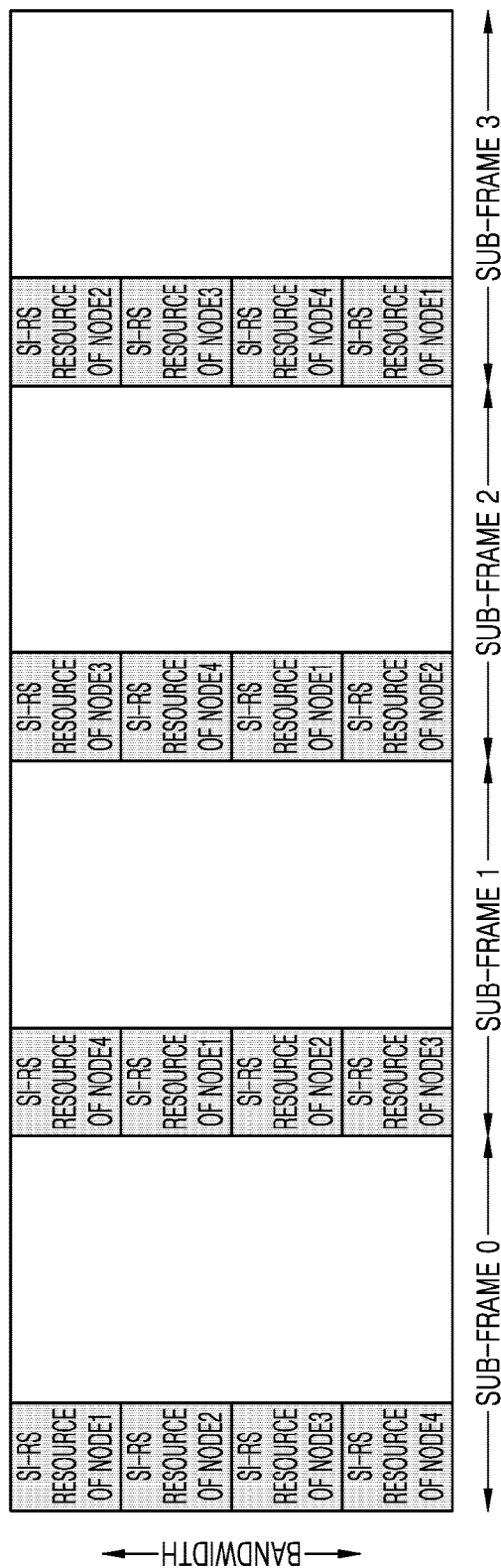

[Fig. 59]
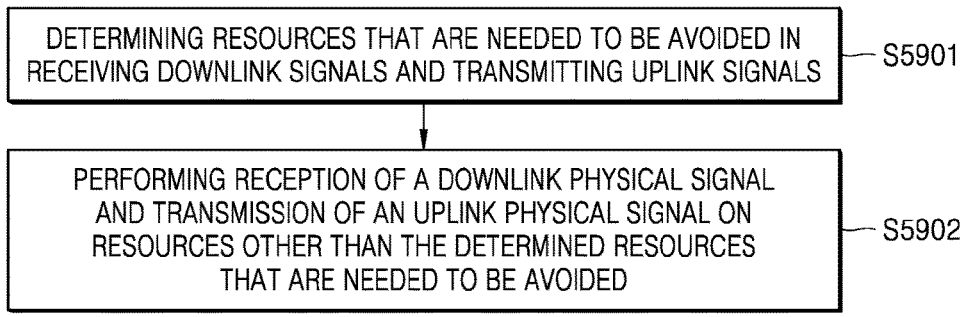
[Fig. 60]
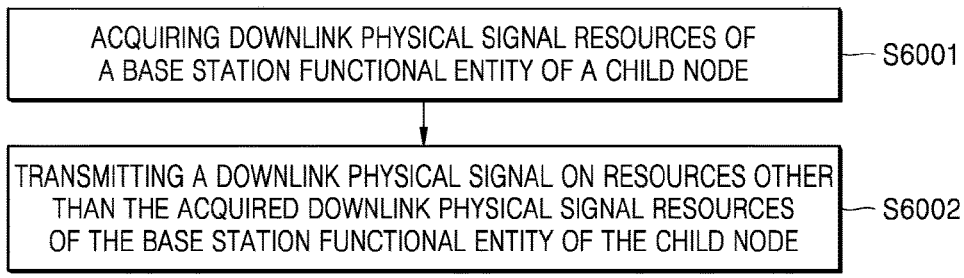
[Fig. 61]
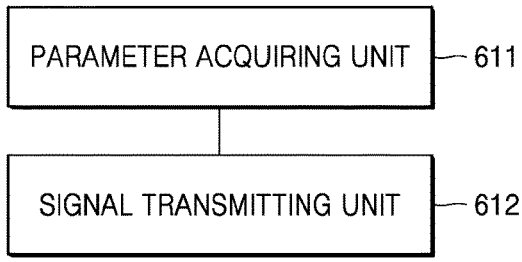
[Fig. 62]
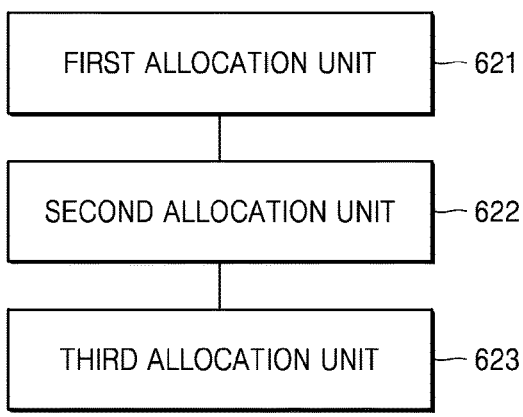
[Fig. 63]
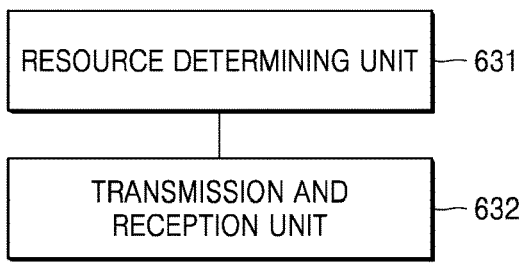

[Fig. 64]
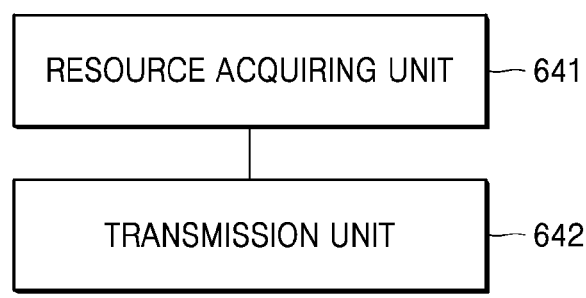
[Fig. 65]
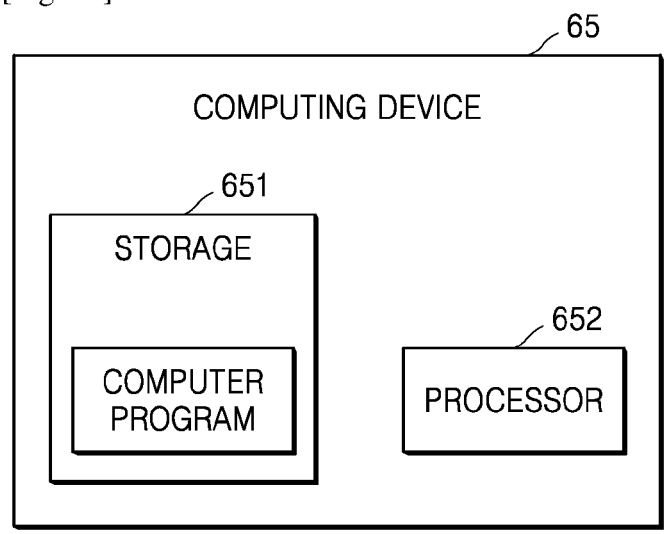

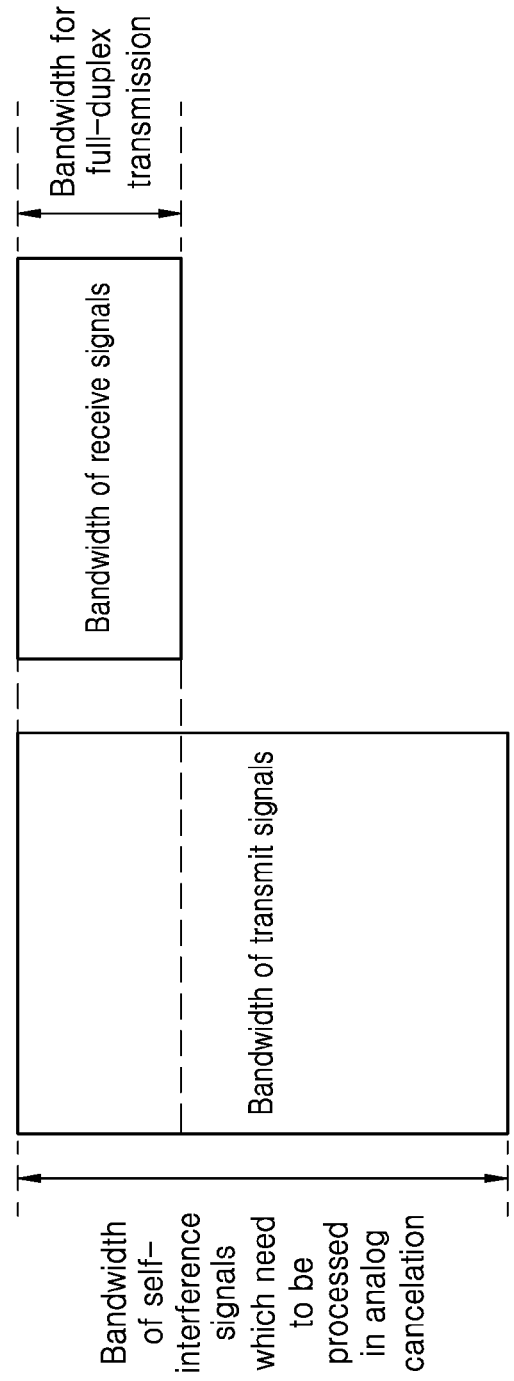
[Fig. 66]

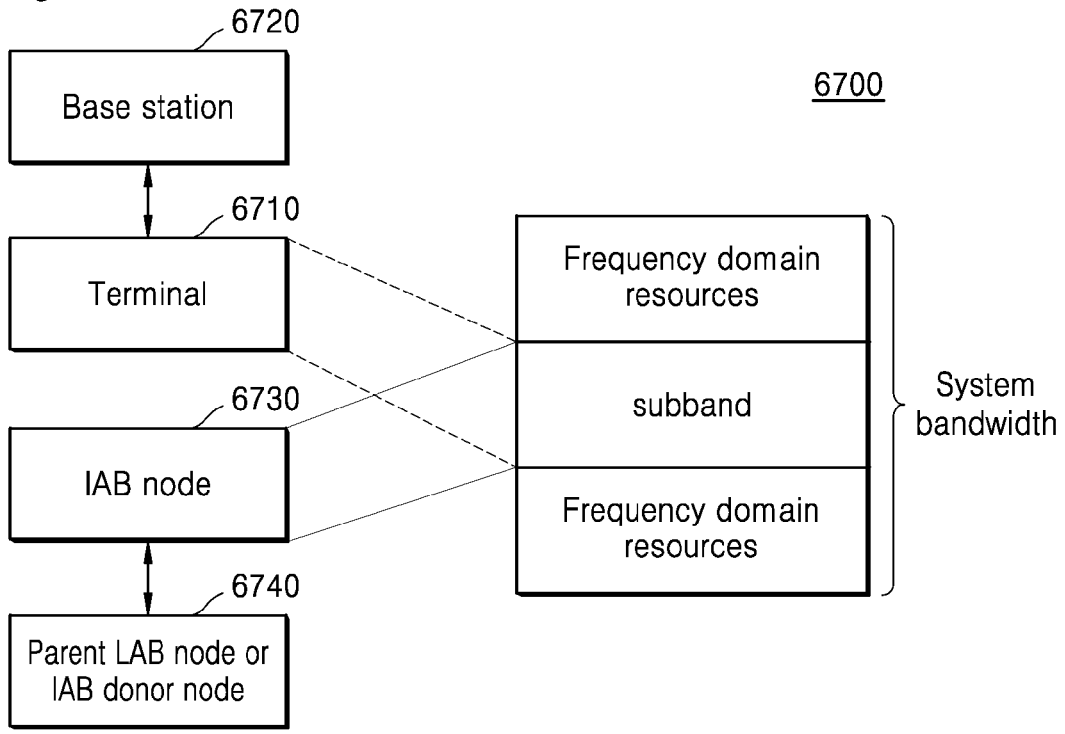

[Fig. 69]
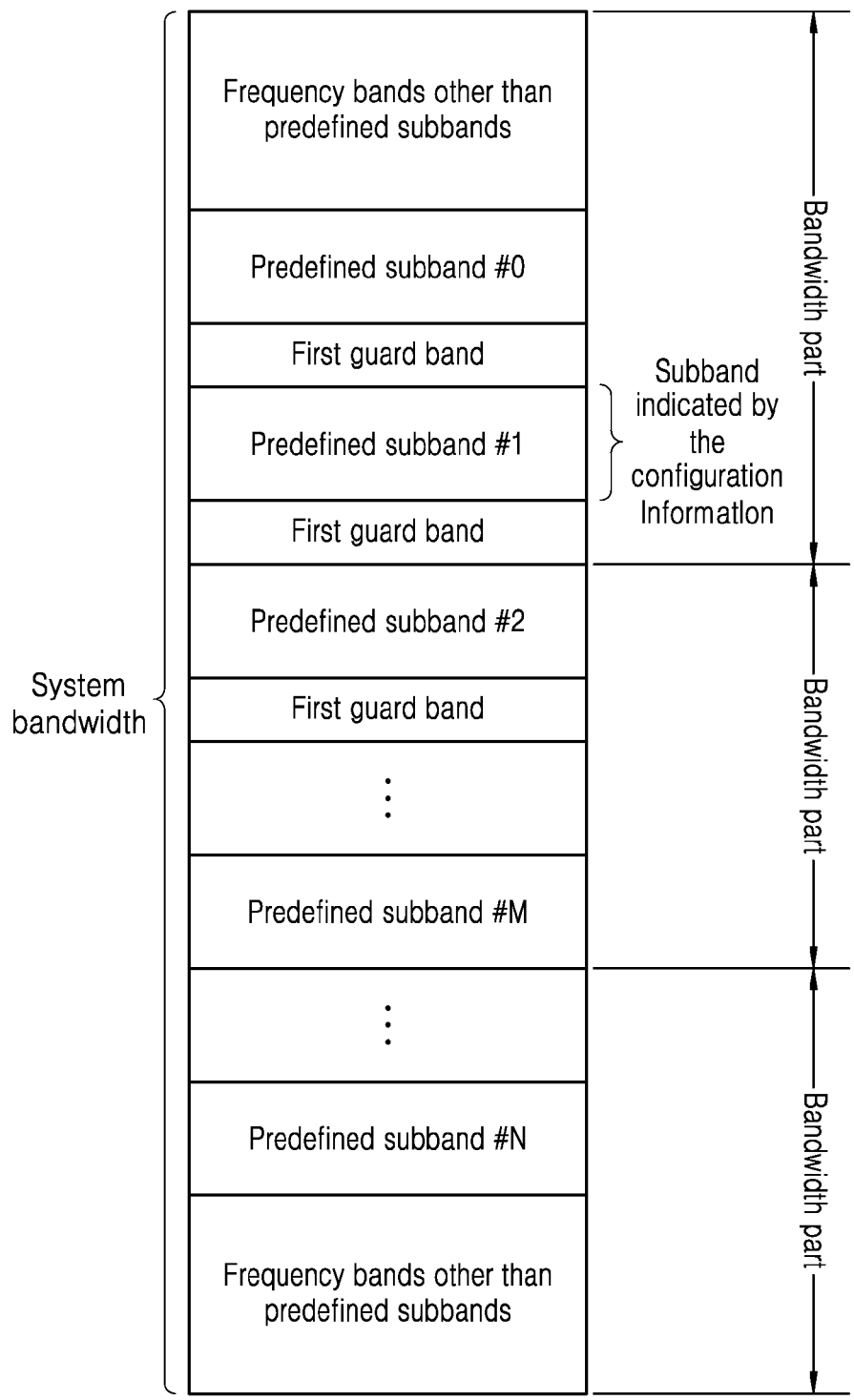

[Fig. 70]
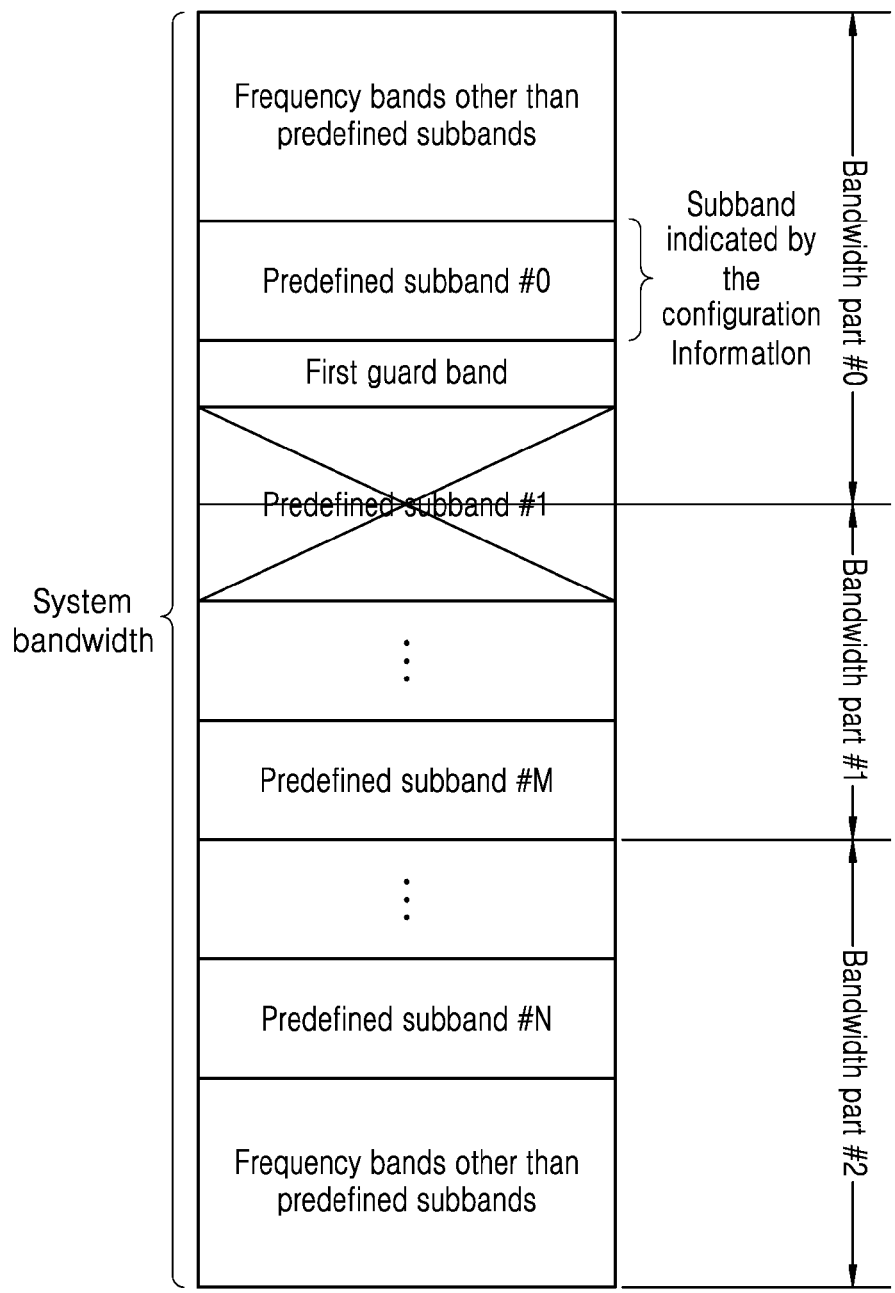

[Fig. 71]
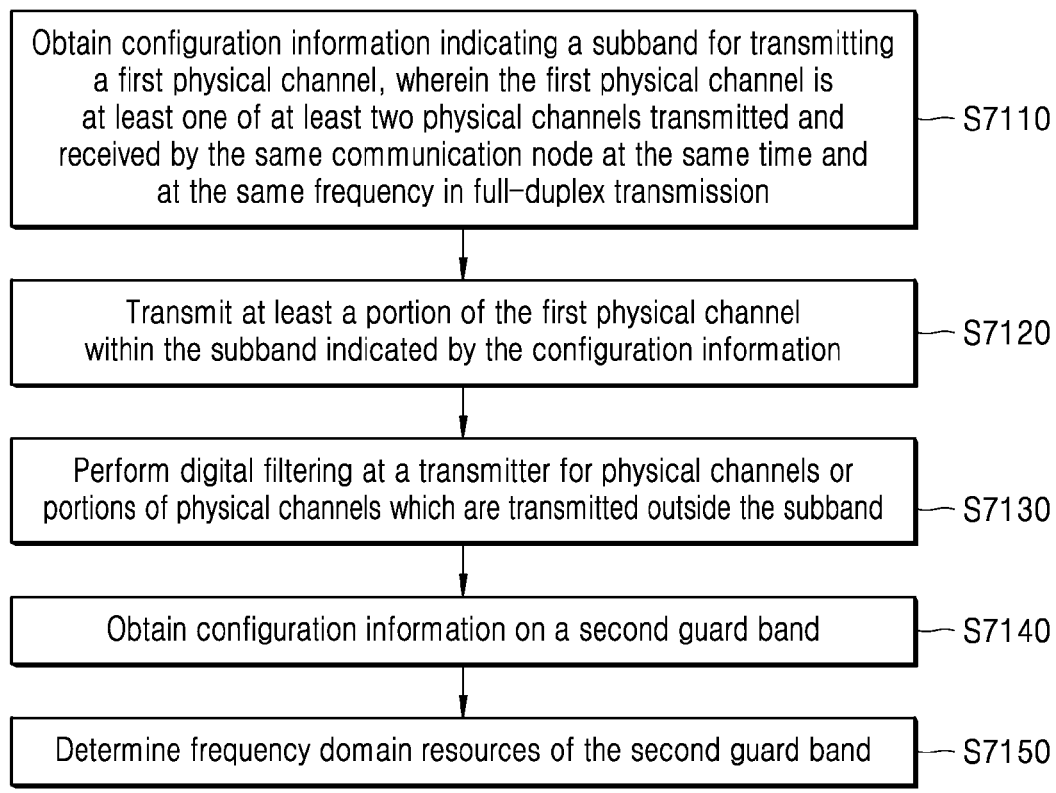
[Fig. 72]
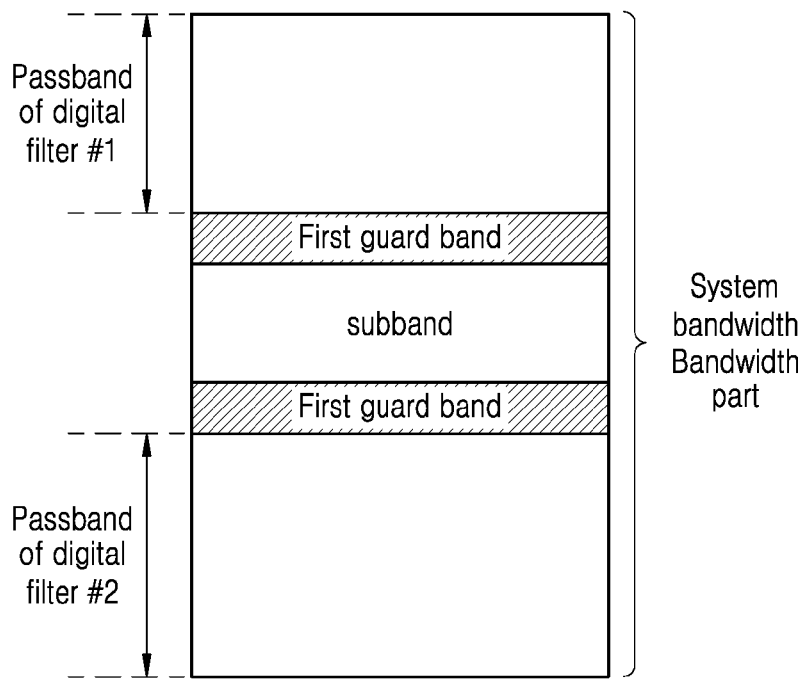

[Fig. 73]
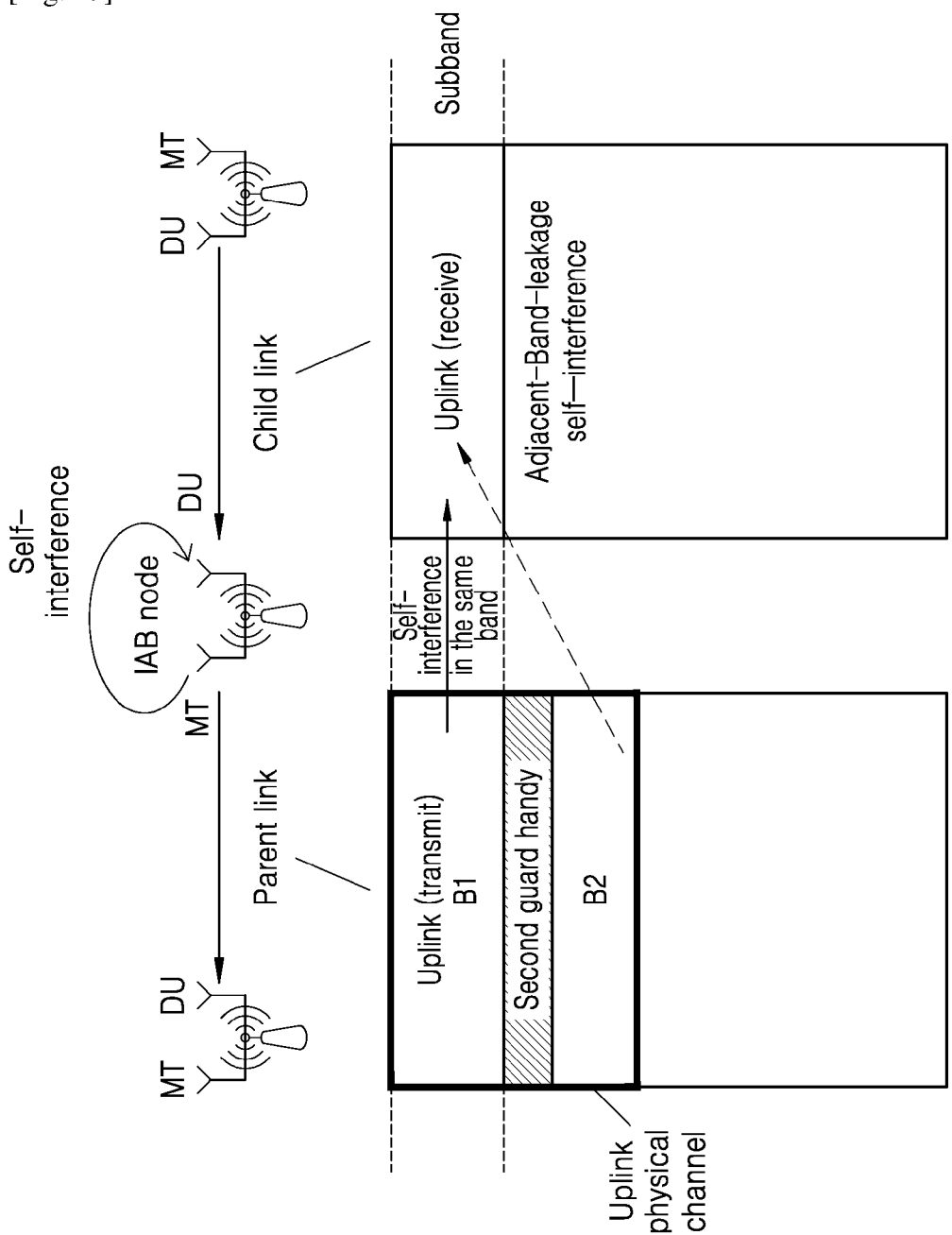
[Fig. 74]
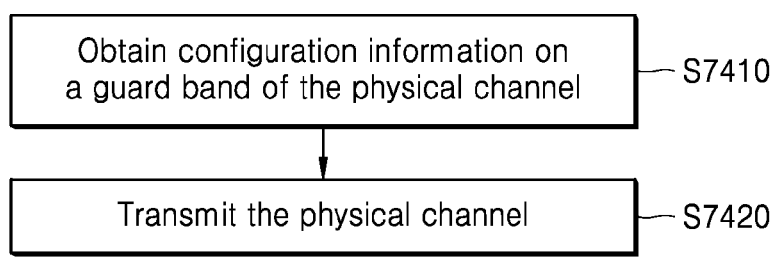

[Fig. 75]
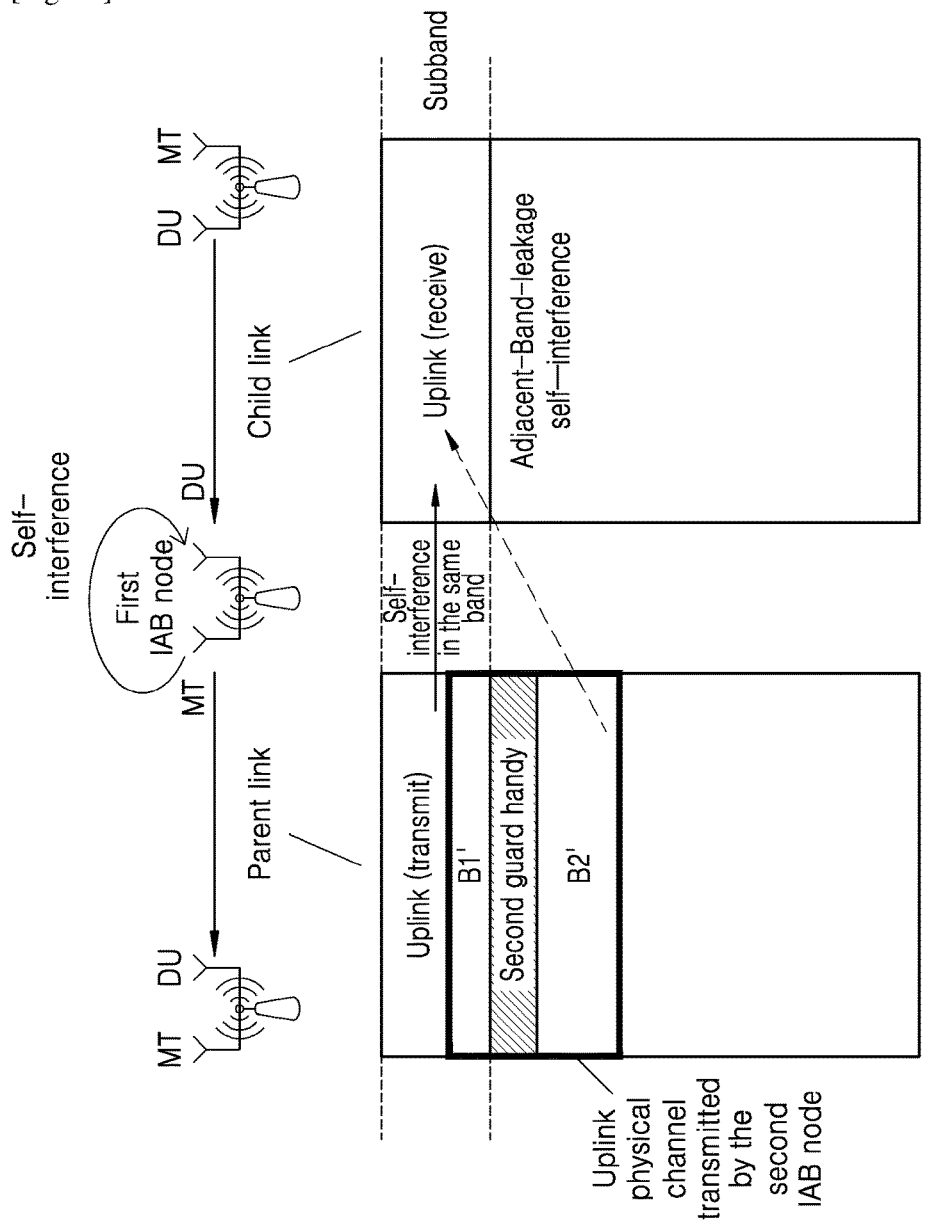
[Fig. 76]
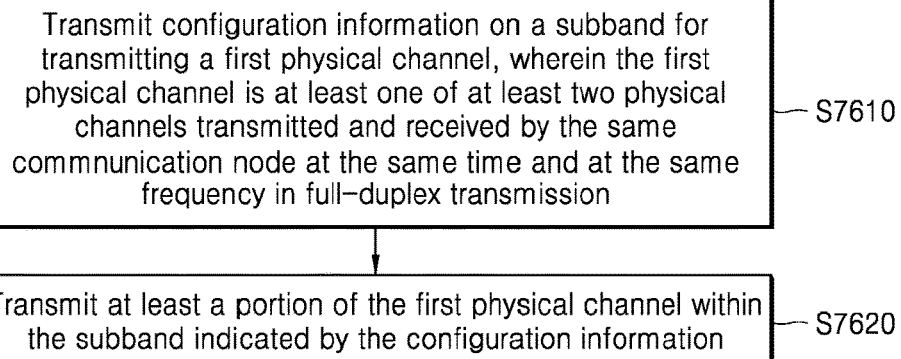

[Fig. 77]
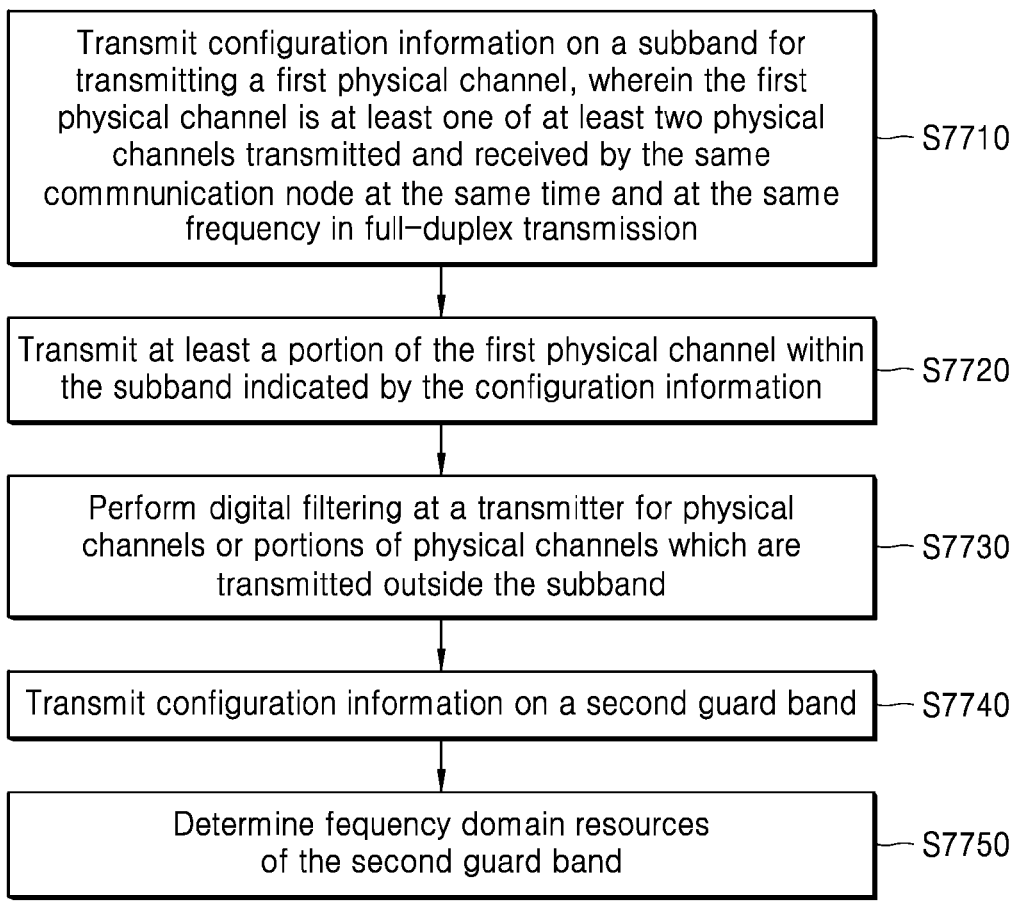
[Fig. 78]
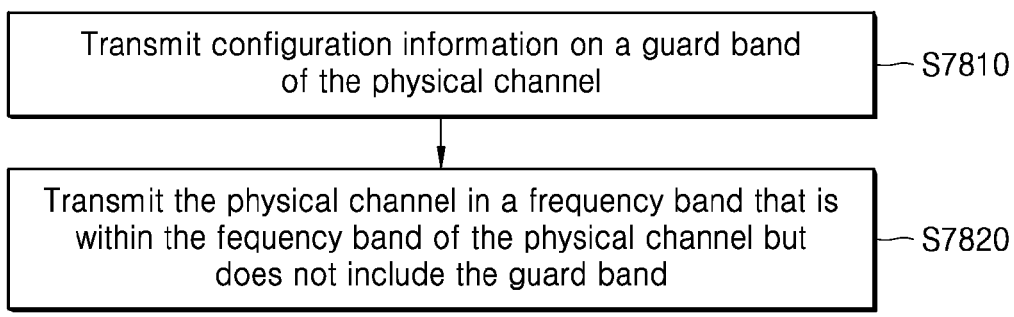

[Fig. 79]
7900
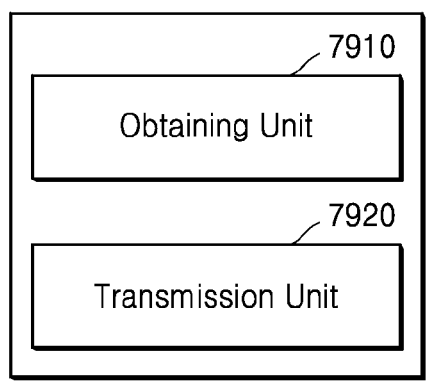
[Fig. 80]
8000
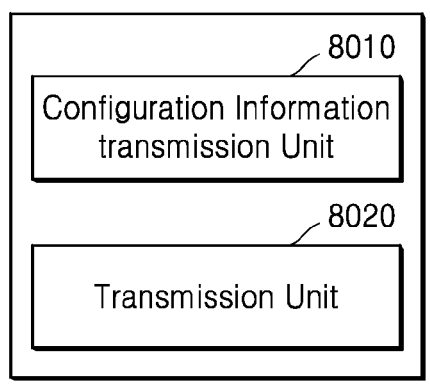
[Fig. 81]
8100
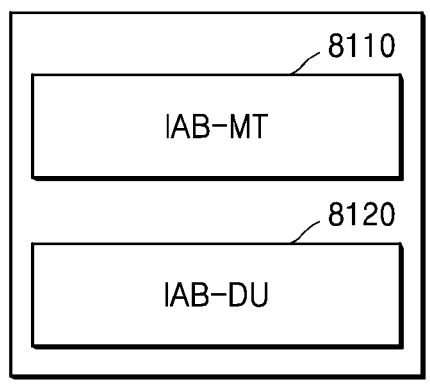

TRANSMISSION METHOD OF PHYSICAL SIGNAL, TERMINAL AND BASE STATION

CROSS-REFERENCE TO RELATED APPLICATIONS

This application is a 371 of International Application No. PCT/KR2020/005316 filed on Apr. 22, 2020, which claims priority to Chinese Patent Application No. 201910355772.X filed on Apr. 29, 2019, Chinese Patent Application No. 201911159150.6 filed on Nov. 22, 2019, Chinese Patent Application No. 201911185380.X filed on Nov. 27, 2019, Chinese Patent Application No. 201911220637.0 filed Dec. 3, 2019, Chinese Patent Application No. 201911399863.X filed on Dec. 30, 2019 and Chinese Patent Application No. 202010100054.0 filed on Feb. 18, 2020, the disclosures of which are herein incorporated by reference in their entirety.

BACKGROUND

1. Field

The present disclosure relates to a wireless communication technical field, and more particular, relates to a transmission method and device of a physical signal, a resource allocation method and device for physical signals, and an integrated access and backhaul node for transmitting a physical channel or a physical signal.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected car, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

A transmission method of a physical signal, a device, a terminal, and a base station are provided. The transmission method may include: obtaining a configuration of the physical signal; transmitting the physical signal according to the obtained configuration, wherein the obtained configuration of the physical signal includes at least one of: a cyclic prefix length, a transmitting time offset, a cyclic suffix length, a subcarrier spacing, and a configuration for at least one portion of the physical signal being repeatedly transmitted. According to the present disclosure, interference during a signal transmission procedure may be reduced.

The transmission method may include receiving first configuration information, determining a measurement time-frequency resource for a residual self-interference measurement based on the first configuration information, performing the residual self-interference measurement on the measurement time-frequency resource to obtain a measurement result, transmitting feedback information determined according to the measurement result, receiving second configuration information determined according to the feedback information and determining a duplex mode of a terminal based on the second configuration information. According to the present disclosure, interference during a signal transmission procedure may be reduced.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a timing chart of signal reception according to an exemplary embodiment of the present disclosure;

FIG. 2 illustrates a flow chart of a transmission method of a physical signal according to an exemplary embodiment of the present disclosure, FIG. 3 illustrates a timing chart of signal transmission according to an exemplary embodiment of the present disclosure;

FIG. 4 illustrates a timing chart of signal transmission according to an exemplary embodiment of the present disclosure;

FIG. 5 illustrates a timing chart of signal transmission according to an exemplary embodiment of the present disclosure;

FIG. 6 illustrates a timing chart of signal transmission according to an exemplary embodiment of the present disclosure;

FIG. 7 illustrates a timing chart of signal transmission according to an exemplary embodiment of the present disclosure;

FIG. 8 illustrates a timing chart of signal transmission according to an exemplary embodiment of the present disclosure;

FIGS. 9 to 12 illustrate timing charts of signal transmission according to an exemplary embodiment of the present disclosure, respectively;

FIGS. 13 to 15 illustrate timing charts of signal transmission according to an exemplary embodiment of the present disclosure, respectively;

FIG. 16 illustrates a timing chart of signal transmission according to an exemplary embodiment of the present disclosure;

FIG. 17 illustrates a diagram of a physical signal according to an exemplary embodiment of the present disclosure;

FIG. 18 illustrates a timing chart of signal transmission according to an exemplary embodiment of the present disclosure;

FIG. 19 illustrates a timing chart of signal transmission according to an exemplary embodiment of the present disclosure;

FIGS. 20 to 22 illustrate timing charts of signal transmission according to an exemplary embodiment of the present disclosure, respectively;

FIG. 23 illustrates a flowchart of operations of a terminal according to an exemplary embodiment of the present disclosure;

FIG. 24 illustrates a schematic diagram of residual self-interference measurement in a case where a current duplex mode of a terminal is a frequency division duplex (FDD) according to an exemplary embodiment of the present disclosure;

FIG. 25 illustrates a timing diagram of transmitting a first signal on a measurement time-frequency resource according to an exemplary embodiment of the present disclosure;

FIG. 26 illustrates a schematic diagram of residual self-interference measurement of a terminal whose current duplex mode is FDD according to an exemplary embodiment of the present disclosure;

FIG. 27 illustrates a schematic diagram of a measurement time-frequency resource for measuring a signal-to-interference-and-noise ratio (SINR) considering residual self-interference and a measurement time-frequency resource for measuring the SINR without considering residual self-interference according to an exemplary embodiment of the present disclosure;

FIG. 28 illustrates a schematic diagram of aperiodic feedback according to an exemplary embodiment of the present disclosure;

FIG. 29 illustrates a flowchart of operations of a base station according to an exemplary embodiment of the present disclosure;

FIG. 30 illustrates a configuration of a measurement time-frequency resource according to an exemplary embodiment of the present disclosure;

FIG. 31 illustrates a configuration of a zero power channel state information reference signal (ZP-CSI-RS) resource according to an exemplary embodiment of the present disclosure;

FIG. 32 illustrates a flowchart of a method for determining a duplex mode of a terminal according to the SINR considering the residual self-interference and the SINR without considering the residual self-interference according to an exemplary embodiment of the present disclosure;

FIG. 33 illustrates a flowchart of a method for determining a duplex mode of a terminal according to a strength of the residual self-interference and the SINR without considering the residual self-interference according to an exemplary embodiment of the present disclosure;

FIG. 34 illustrates a flowchart of operations of a terminal according an exemplary embodiment of the present disclosure;

FIG. 35 illustrates a flowchart of operations of a base station according to an exemplary embodiment of the present disclosure;

FIG. 36 illustrates a full-duplex frame structure according to an exemplary embodiment of the present disclosure;

FIG. 37 illustrates a schematic diagram of a full-duplex terminal scheduling method according to an exemplary embodiment of the present disclosure;

FIG. 38 illustrates a full-duplex frame structure according to an exemplary embodiment of the present disclosure;

FIG. 39 illustrates a flowchart of operations of a terminal according to an exemplary embodiment of the present disclosure;

FIG. 40 illustrates a schematic diagram of operations of a terminal according to an exemplary embodiment of the present disclosure;

FIG. 41 is a schematic diagram illustrating operations of a terminal according to an exemplary embodiment of the present disclosure;

FIG. 42 illustrates a flowchart of operations of a base station according to an exemplary embodiment of the present disclosure;

FIG. 43 illustrates an example of a division of mini-slots according to an exemplary embodiment of the present disclosure;

FIG. 44 illustrates another example of the division of mini-slots according to an exemplary embodiment of the present disclosure;

FIG. 45 illustrates a flowchart of operations of a terminal according to an exemplary embodiment of the present disclosure;

FIG. 46 is a schematic diagram illustrating operations of a terminal according to an exemplary embodiment of the present disclosure;

FIG. 47 illustrates a schematic diagram of operations of a terminal according to an exemplary embodiment of the present disclosure;

FIG. 48 illustrates a flowchart of operations of a base station according to an exemplary embodiment of the present disclosure FIG. 49 is a block diagram illustrating a configuration of a terminal according to an exemplary embodiment of the present disclosure;

FIG. 50 is a block diagram illustrating a configuration of a base station according to an exemplary embodiment of the present disclosure;

FIG. 51 is a block diagram illustrating a configuration of a wireless communication system according to an exemplary embodiment of the present disclosure;

FIG. 52 illustrates a schematic diagram of an air interface link in an IAB scenario according to an exemplary embodiment of the present disclosure;

FIG. 53 illustrates a flowchart of a physical signal transmission method for an IAB node according to an exemplary embodiment of the present disclosure;

FIG. 54 illustrates a schematic diagram of a mapping pattern in a comb-shaped structure of a self-interference reference signal within an IAB node in an IAB scenario according to an exemplary embodiment of the present disclosure;

FIG. 55 illustrates a schematic diagram of a frequency-hopping pattern of a self-interference reference signal within an IAB node in an IAB scenario according to an exemplary embodiment of the present disclosure;

FIG. 56 illustrates a flowchart of a resource allocation method for physical signals between IAB nodes according to an exemplary embodiment of the present disclosure;

FIG. 57 illustrates a schematic diagram of an example of resource allocation of physical signals between time division multiplexing IAB nodes according to an exemplary embodiment of the present disclosure;

FIG. 58 illustrates a schematic diagram of an example of resource allocation of physical signals between frequency division multiplexing (frequency-hopping) IAB nodes according to an exemplary embodiment of the present disclosure;

FIG. 59 illustrates a flowchart of a physical signal transmission method for a terminal functional entity of an IAB node according to an exemplary embodiment of the present disclosure;

FIG. 60 illustrates a flowchart of a physical signal transmission method for a base station functional entity of an IAB node according to an exemplary embodiment of the present disclosure;

FIG. 61 illustrates a block diagram of a physical signal transmission device for an IAB node according to an exemplary embodiment of the present disclosure;

FIG. 62 illustrates a block diagram of a resource allocation device for physical signals between IAB nodes according to an exemplary embodiment of the present disclosure;

FIG. 63 illustrates a block diagram of a physical signal transmission device for a terminal functional entity of an IAB node according to an exemplary embodiment of the present disclosure;

FIG. 64 illustrates a block diagram of a physical signal transmission device for a base station functional entity of an IAB node according to an exemplary embodiment of the present disclosure;

FIG. 65 illustrates a schematic diagram of a computing device according to an exemplary embodiment of the present disclosure;

FIG. 66 is a schematic diagram illustrating a relationship among a frequency band of self-interference signals which need to be processed in analog cancelation, a frequency band of transmit signals, a frequency band of receive signals, and a frequency band for full-duplex transmission according to an exemplary embodiment of the present disclosure;

FIG. 67 is a schematic diagram illustrating an application scenario according to an embodiment of the present disclosure;

FIG. 68 illustrates a method for transmitting a physical channel according to an embodiment of the present disclosure;

FIG. 69 s a schematic diagram illustrating a relationship among a system bandwidth, a subband, predefined subbands, and bandwidth parts according to an embodiment of the present disclosure;

FIG. 70 is a schematic diagram illustrating a relationship among a system bandwidth, a subband, predefined subbands, and bandwidth parts according to an embodiment of the present disclosure;

FIG. 71 illustrates a method for transmitting a physical channel according to an embodiment of the present disclosure;

FIG. 72 is a schematic diagram illustrating a relationship among passbands of digital filters, a subband, first guard bands, and a system bandwidth/bandwidth part according to an embodiment of the present disclosure;

FIG. 73 is a schematic diagram illustrating full-duplex communication according to an embodiment of the present disclosure;

FIG. 74 illustrates a method for transmitting a physical channel according to an embodiment of the present disclosure;

FIG. 75 is a schematic diagram illustrating full-duplex communication according to an embodiment of the present disclosure;

FIG. 76 illustrates a method for transmitting a physical channel according to an embodiment of the present disclosure;

FIG. 77 illustrates a method for transmitting a physical channel according to an embodiment of the present disclosure;

FIG. 78 illustrates a method for transmitting a physical channel according to an embodiment of the present disclosure;

FIG. 79 is a schematic block diagram illustrating a terminal for full-duplex communication according to an embodiment of the present disclosure;

FIG. 80 is a schematic block diagram illustrating a base station for full-duplex communication according to an embodiment of the present disclosure; and FIG. 81 is a schematic block diagram illustrating an IAB node for full-duplex communication according to an embodiment of the present disclosure.

DETAILED DESCRIPTION

An exemplary embodiment of the present disclosure provides a transmission method of a physical signal, a terminal, and a base station, which may reduce or avoid interference in a signal transmission procedure, especially in the signal transmission procedure of a full-duplex system.

According to the exemplary embodiment of the present disclosure, a transmission method of a physical signal is provided. The transmission method may include acquiring a configuration of the physical signal; transmitting the physical signal according to the acquired configuration, wherein the acquired configuration of the physical signal includes at least one of: a cyclic prefix length, a transmitting time offset, a cyclic suffix length, a subcarrier spacing, or a configuration for at least one portion of the physical signal being repeatedly transmitted.

Alternatively, the physical signal may be an uplink or downlink physical signal, and include at least one of: a reference signal for self-interference channel estimation, a demodulation reference signal (DMRS), a cell-specific reference signal (CRS), a channel state information reference signal (CSI-RS), a synchronization signal, a sounding reference signal (SRS), or a phase-tracking reference signal (PTRS), and/or the cyclic prefix length may be greater or less than another cyclic prefix length, and the other cyclic prefix length may include one of: a cyclic prefix length configured by a system information, an extended cyclic prefix length, a cyclic prefix length of the synchronization signal, and a cyclic prefix length of a physical random access channel, and/or for any possible subcarrier spacing configuration of the physical signal, the cyclic prefix length may be configured as a same value, or the cyclic prefix length may be a length obtained by adding a fixed configuration value to a cyclic prefix configured by the system information or to an extended cyclic prefix, wherein the same or the added configuration value may be configured by one of: a value written in specification, a high-layer signaling, and an uplink or downlink control information, and/or a time length of a baseband time-domain signal of the physical signal may be greater than the time length of an orthogonal frequency division multiplexing (OFDM) symbol, wherein the baseband time-domain signal may contain the cyclic prefix and a time-domain signal, and the time-domain signal may refer to a signal obtained after performing a Fourier transformation on a frequency-domain sequence of the physical signal, and/or the transmitting time offset may include a time offset of a starting time, at which the baseband time-domain signal of the physical signal is transmitted in a time-domain, with respect to a starting time boundary of a downlink OFDM symbol, and/or the transmitting time offset may have a positive value, a negative value, or zero, and may be configured by one of: the high-layer signaling, and the uplink or downlink control information, and/or the transmitting time offset may be associated with at least one of: a cell radius, a distance between integrated access and backhaul (IAB) nodes, or the cyclic prefix length of the physical random access channel. A cyclic suffix of the physical signal may include first several sampling points of the time-domain signal obtained after performing the Fourier transformation on the frequency-domain sequence of the physical signal and a number of the sampling points may be one of: a number of sampling points corresponding to the cyclic prefix length of the physical signal, a value configured by the high-layer signaling, and a value configured by a physical-layer signal. The subcarrier spacing may be greater or less than another subcarrier spacing, the other subcarrier spacing may include a subcarrier spacing of a downlink physical channel or the signal transmitted from a base station to a terminal, the downlink physical channel or signal being different from the physical signal, or include a subcarrier spacing of an uplink physical channel or signal transmitted from the terminal to the base station, the uplink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols is larger than or equal to the number of the OFDM symbols of the physical signal, and no transmission on the muting OFDM symbol in the uplink or downlink direction shall be performed.

Alternatively, the cyclic prefix length configured by the system information or the added configuration value may be associated with at least one of: a cell radius, a distance between the IAB nodes, or the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is later than the starting time boundary of the downlink OFDM symbol, the transmitting time offset may have the positive value, wherein the downlink OFDM symbol is the OFDM symbol to transmit the downlink physical signal. When the physical signal is transmitted, there may be no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset may be not configured with the cyclic prefix. The subcarrier spacing of the physical signal configured with the transmitting time offset may be greater than the subcarrier spacing of other uplink or downlink physical channels or other uplink or downlink physical signals different from the physical signal. The cyclic suffix length of the physical signal configured with the transmitting time offset may be not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols may be configured, and indices of the N+N' configured muting OFDM symbols may include indices of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols depends on specification or is configured by the high-layer signaling or the physical-layer signaling. The relative location relationship includes at least one of: the N' indices less than any of the N indices; the N' indices larger than any of the N indices; or a portion of the N' indices less than any of the N indices and another portion of the N indices larger than any of the N indices.

Alternatively, the signal transmission unit may transmit the physical signal, wherein the transmitted physical signal may include one time-domain signal or a plurality of consecutive repetitions of time-domain signals, and the time-domain signal may refer to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, the signal transmission unit may perform at least one of: truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM symbol of the at least two OFDM symbols, at least one portion of the physical signal without a cyclic prefix, the at least one portion being the portion of the physical signal not transmitted on the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted in the former OFDM symbol(s) of the at least two OFDM symbols, truncating symbol(s) of the physical signal on the later OFDM symbol which are overlapped with the portion not transmitted on the former OFDM symbol; or when transmitting the physical signal across at least two OFDM symbols, on the later OFDM symbol of the at least two OFDM symbols, transmitting, after a transmission completion time of the physical signal, another physical signal different from the physical signal.

Alternatively, the physical signal may have no cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

According to another exemplary embodiment of the present disclosure, a terminal is provided. The terminal may include a signal configuration acquisition unit acquiring a configuration of a physical signal, a signal transmission unit transmitting the physical signal according to the acquired configuration, wherein the acquired configuration of the physical signal includes at least one of: a cyclic prefix length, a transmitting time offset, a cyclic suffix length, a subcarrier spacing, or a configuration for at least one portion of the physical signal being repeatedly transmitted.

Alternatively, the physical signal may be an uplink or downlink physical signal, and include at least one of: a reference signal for self-interference channel estimation, a demodulation reference signal (DMRS), a cell-specific reference signal (CRS), a channel state information reference signal (CSI-RS), a synchronization signal, a sounding reference signal (SRS), or a phase-tracking reference signal (PTRS). The cyclic prefix length may be greater or less than another cyclic prefix length, and the other cyclic prefix length may include one of: a cyclic prefix length configured by a system information, an extended cyclic prefix length, a cyclic prefix length of the synchronization signal, or a cyclic prefix length of a physical random access channel. For any possible subcarrier spacing configuration of the physical signal, the cyclic prefix length may be configured as a same value, or the cyclic prefix length may be a length obtained by adding a fixed configuration value to a cyclic prefix configured by the system information or to an extended cyclic prefix, wherein the same or the added configuration value is configured by one of: a value written in specification, a high-layer signaling, and an uplink or downlink control information. A time length of a baseband time-domain signal of the physical signal may be greater than the time length of an orthogonal frequency division multiplexing (OFDM) symbol, wherein the baseband time-domain signal contains the cyclic prefix and a time-domain signal, and the time-domain signal refers to a signal obtained after performing a Fourier transformation on a frequency-domain sequence of the physical signal. The transmitting time offset may include a time offset of a starting time, at which the baseband time-domain signal of the physical signal is transmitted in a time-domain, with respect to a starting time boundary of a downlink OFDM symbol. The transmitting time offset may have a positive value, a negative value, or zero, and may be configured by one of: the high-layer signaling, and the uplink or downlink control information. The transmitting time offset may be associated with at least one of: a cell radius, a distance between integrated access and backhaul (IAB) nodes, and the cyclic prefix length of the physical random access channel. A cyclic suffix of the physical signal may include first several sampling points of the time-domain signal obtained after performing the Fourier transformation on the frequency-domain sequence of the physical signal and a number of the sampling points may be one of: a number of sampling points corresponding to the cyclic prefix length of the physical signal, a value configured by the high-layer signaling, and a value configured by a physical-layer signal. The subcarrier spacing may be greater or less than another subcarrier spacing, the other subcarrier spacing may include a subcarrier spacing of a downlink physical channel or the signal transmitted from a base station to a terminal, the downlink physical channel or signal being different from the physical signal, or include a subcarrier spacing of an uplink physical channel or signal transmitted from the terminal to the base station, the uplink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols is larger than or equal to the number of the OFDM symbols of the physical signal, and no transmission on the muting OFDM symbol in the uplink or downlink direction shall be performed.

Alternatively, the cyclic prefix length configured by the system information or the added configuration value may be associated with at least one of: a cell radius, a distance between the IAB nodes, and the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is delayed in comparison to the starting time boundary of the downlink OFDM symbol, the transmitting time offset may have the positive value, wherein the downlink OFDM symbol is the OFDM symbol to transmit the downlink physical signal. When the physical signal is transmitted, there may be no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset may be not configured with the cyclic prefix, and/or the subcarrier spacing of the physical signal configured with the transmitting time offset may be greater than the subcarrier spacing of other uplink or downlink physical channels or other uplink or downlink physical signals different from the physical signal. The cyclic suffix length of the physical signal configured with the transmitting time offset may be not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols may be configured, and indices of the N+N' configured muting OFDM symbols may include indices of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols depends on specification or is configured by the high-layer signaling or the physical-layer signaling. The relative location relationship may include at least one of: the N' indices less than any of the N indices; the N' indices larger than any of the N indices; and a portion of the N' indices less than any of the N indices and another portion of the N' indices larger than any of the N indices.

Alternatively, the signal transmission unit may transmit the physical signal, wherein the transmitted physical signal includes one time-domain signal or a plurality of consecutive repetitions of time-domain signals, and the time-domain signal may refer to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, the signal transmission unit may perform at least one of: truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM symbol of the at least two OFDM symbols, at least one portion of the physical signal without a cyclic prefix, the at least one portion being the portion of the physical signal not transmitted in the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted in the former OFDM symbol(s) of the at least two OFDM symbols, truncating symbol(s) of the physical signal on the later OFDM symbol which are overlapped with the portion not transmitted on the former OFDM symbol; and when transmitting the physical signal across at least two OFDM symbols, on the later OFDM symbol of the at least two OFDM symbols, transmitting, after a transmission completion time of the physical signal, another physical signal different from the physical signal.

Alternatively, the physical signal may have no cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

According to an exemplary embodiment of the present disclosure, a base station is provided, the base station may include a signal configuration unit configuring a physical signal, a signal transmission unit, transmitting the configured physical signal, wherein a configuration of the physical signal includes at least one of: a cyclic prefix length, a transmitting time offset, a cyclic suffix length, a subcarrier spacing, or a configuration for at least one portion of the physical signal being repeatedly transmitted.

Alternatively, the physical signal is an uplink or downlink physical signal, and may include at least one of: a reference signal for self-interference channel estimation, a demodulation reference signal (DMRS), a cell-specific reference signal (CRS), a channel state information reference signal (CSI-RS), a synchronization signal, a sounding reference signal (SRS), or a phase-tracking reference signal (PTRS). The cyclic prefix length may be greater or less than another cyclic prefix length, and the other cyclic prefix length may include one of: a cyclic prefix length configured by a system information, an extended cyclic prefix length, a cyclic prefix length of the synchronization signal, and a cyclic prefix length of a physical random access channel. For any possible subcarrier spacing configuration of the physical signal, the cyclic prefix length is configured as a same value, or the cyclic prefix length is a length obtained by adding a fixed configuration value to a cyclic prefix configured by the system information or to an extended cyclic prefix, wherein the same or the added configuration value is configured by one of: a value written in specification, a high-layer signaling, and an uplink or downlink control information, and/or a time length of a baseband time-domain signal of the physical signal is greater than the time length of an orthogonal frequency division multiplexing (OFDM) symbol, wherein the baseband time-domain signal contains the cyclic prefix and a time-domain signal, and the time-domain signal refers to a signal obtained after performing a Fourier transformation on a frequency-domain sequence of the physical signal. The transmitting time offset may include a time offset of a starting time, at which the baseband time-domain signal of the physical signal is transmitted in a time-domain, with respect to a starting time boundary of a downlink OFDM symbol. The transmitting time offset has a positive value, a negative value, or zero, and is configured by one of: the high-layer signaling, and the uplink or downlink control information. The transmitting time offset is associated with at least one of: a cell radius, a distance between integrated access and backhaul (IAB) nodes, or the cyclic prefix length of the physical random access channel. A cyclic suffix of the physical signal may include first several sampling points of the time-domain signal obtained after performing the Fourier transformation on the frequency-domain sequence of the physical signal and a number of the sampling points may be one of: a number of sampling points corresponding to the cyclic prefix length of the physical signal, a value configured by the high-layer signaling, and a value configured by a physical-layer signal. The subcarrier spacing may be greater or less than another subcarrier spacing, the other subcarrier spacing may include a subcarrier spacing of a downlink physical channel or the signal transmitted from a base station to a terminal, the downlink physical channel or signal being different from the physical signal, or include a subcarrier spacing of an uplink physical channel or signal transmitted from the terminal to the base station, the uplink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols is larger than or equal to the number of the OFDM symbols of the physical signal, and no transmission on the muting OFDM symbol in the uplink or downlink direction shall be performed.

Alternatively, the cyclic prefix length configured by the system information or the added configuration value may be associated with at least one of: a cell radius, a distance between the IAB nodes, or the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is later than the starting time boundary of the downlink OFDM symbol, the transmitting time offset may have the positive value, wherein the downlink OFDM symbol is the OFDM symbol to transmit the downlink physical signal. When the physical signal is transmitted, there is no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset is not configured with the cyclic prefix, and/or the subcarrier spacing of the physical signal configured with the transmitting time offset is greater than the subcarrier spacing of other uplink or downlink physical channels or other uplink or downlink physical signals different from the physical signal, and/or the cyclic suffix length of the physical signal configured with the transmitting time offset is not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols are configured, and indices of the N+N' configured muting OFDM symbols include indices of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols depends on specification or is configured by the high-layer signaling or the physical-layer signaling. The relative location relationship may include at least one of: the N' indices less than any of the N indices; the N' indices larger than any of the N indices; or a portion of the N' indices less than any of the N indices and another portion of the N' indices larger than any of the N indices.

Alternatively, the signal transmission unit may transmit the physical signal, wherein the transmitted physical signal may include one time-domain signal or a plurality of consecutive repetitions of time-domain signals, and the time-domain signal may refer to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, the signal transmission unit may perform at least one of: truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM of among the at least two OFDM symbols, at least one portion of the physical signal without a cyclic prefix, the at least one portion being the portion of the physical signal not transmitted on the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted on the former OFDM symbol from among the at least two OFDM symbols, truncating symbol(s) of the physical signal, the symbol on the later OFDM symbol which are overlapped with the portion being not transmitted on the former OFDM symbol; and when transmitting the physical signal across at least two OFDM symbols, on the later OFDM symbol of the at least two OFDM symbols, transmitting, after a transmission completion time of the physical signal, another physical signal different from the physical signal.

Alternatively, the physical signal may not have the cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

According to an exemplary embodiment of the present disclosure, a computer readable storage medium storing an instruction is provided, and the instruction, when executed by at least one computing device, causes the at least one computer device to perform the transmission method described above.

According to an exemplary embodiment of the present disclosure, a physical signal is provided, a configuration of the physical signal may include at least one of: a cyclic prefix length, a transmitting time offset, a cyclic suffix length, a subcarrier spacing, or a configuration for at least one portion of the physical signal being repeatedly transmitted.

According to the present disclosure, a physical signal may be configured or a configuration of the physical signal may be obtained, and the physical signal may be transmitted. The transmission or reception of the configured physical signal may be not affected by the transmission or reception of other physical signals, nor does it have influence on the transmission or reception of the other physical signals. For example, when the configured physical signal is a reference signal for self-interference channel estimation (e.g., a self-interference elimination special reference signal), the reference signal may be received, so that the self-interference channel estimation may be performed based on the reference signal to eliminate the self-interference signal.

At least one embodiment of the disclosure provides a method of a user equipment (UE) for duplex mode switching. The method for duplex mode switching may include: receiving first configuration information; determining a measurement time-frequency resource for a residual self-interference measurement based on the first configuration information; performing the residual self-interference measurement on the measurement time-frequency resource to obtain a measurement result, transmitting feedback information determined according to the measurement result; receiving second configuration information determined according to the feedback information; and determining a duplex mode of a terminal based on the second configuration information.

For example, in the method for duplex mode switching provided according to an embodiment of the disclosure, the first configuration information may include first indication information indicating the measurement time-frequency resource on a downlink channel for the residual self-interference measurement, and the step of determining a measurement time-frequency resource for the residual self-interference measurement based on the first configuration information may include determining the measurement time-frequency resource based on the first indication information.

For example, in the method for duplex mode switching provided according to an embodiment of the disclosure, the measurement time-frequency resource may be a time-frequency resource with zero power, and it may be assumed that a base station does not transmit a signal on the time-frequency resource with zero power.

For example, in the method for duplex mode switching provided according to an embodiment of the disclosure, the first configuration information may include second indication information indicating a measurement time-frequency resource on an uplink channel for the residual self-interference measurement, and the step of determining a measurement time-frequency resource for the residual self-interference measurement based on the first configuration information may include: determining the measurement time-frequency resource based on the second indication information.

For example, in the method for duplex mode switching provided according to an embodiment of the disclosure, the downlink time-frequency resource corresponding to the measurement time-frequency resource on the uplink channel for the residual self-interference measurement is a time-frequency resource with zero power, and it may be assumed that the base station does not transmit signals on the time-frequency resource with zero power.

For example, in the method for duplex mode switching provided according to an embodiment of the disclosure, the step of performing the residual self-interference measurement on the measurement time-frequency resource to obtain a measurement result may include: in a case where the current duplex mode of the terminal is full-duplex mode, performing the residual self-interference measurement on the measurement time-frequency resource or the downlink time-frequency resource corresponding to the measurement time-frequency resource, and in a case where the current duplex mode of the terminal is the half-duplex mode, performing self-interference cancellation on the measurement time-frequency resource to perform the residual self-interference measurement.

For example, in the method for the duplex mode switching according to an embodiment of the disclosure, in a case where the current duplex mode of the terminal is the full-duplex mode, based on whether the terminal can obtain the corresponding downlink time-frequency resource position from the uplink time-frequency resource position, it can be determined whether to perform the residual self-interference measurement on the measurement time-frequency resource or on the downlink time-frequency resource corresponding to the measurement time-frequency resource.

For example, in the method for duplex mode switching provided according to an embodiment of the disclosure, in a case where the current duplex mode of the terminal is a full-duplex mode, the first configuration information may include information for indicating the measurement time-frequency resource on the downlink channel for the residual self-interference measurement, and the step of performing the residual self-interference measurement on the measurement time-frequency resource to obtain the measurement result may include: performing the residual self-measurement on the measurement time-frequency resource on the downlink channel for the residual self-interference measurement, and in a case where the current duplex mode of the terminal is the half-duplex mode, the first configuration information may include information indicating the measurement time-frequency resource on the uplink channel for the residual self-interference measurement, and the step of performing the residual self-interference measurement on the measurement time-frequency resource to obtain the measurement result may include: performing the residual self-interference measurement on the measurement time-frequency resource on the uplink channel for the residual self-interference measurement.

For example, the method for duplex mode switching provided according to an embodiment of the disclosure may further include: transmitting terminal capability information including an indication of a self-interference cancellation capability of the terminal.

For example, in the method for duplex mode switching provided according to an embodiment of the disclosure, the terminal capability information may include one or more of the following: an indicator indicating whether the terminal has a self-interference cancellation capability, a self-interference cancellation bandwidth supported by the terminal in the full-duplex mode, a maximum modulation order supported by the terminal in the full-duplex mode, a maximum number of multi-antenna layers supported by the terminal in the full-duplex mode, a size of the self-interference cancellation capability of the terminal in the full-duplex mode, and a subcarrier spacing supported by the terminal in the full-duplex mode.

For example, in the method for duplex mode switching provided according to an embodiment of the disclosure, the size of the indicator indicating whether the terminal has a self-interference cancellation capability may be 1 bit. For example, in the method for duplex mode switching provided according to an embodiment of the disclosure, the steps of performing the residual self-interference measurement on the measurement time-frequency resource to obtain the measurement result may include at least one of measuring a strength of the residual self-interference or measuring the signal-to-interference-and-noise ratio considering the residual self-interference, and the step of transmitting feedback information determined according to the measurement result may include determining at least one of the strength of the residual self-interference, the signal-to-interference-and-noise ratio considering the residual self-interference, or the signal-to-interference-and-noise ratio without considering the residual self-interference as the feedback information.

For example, in the method for duplex mode switching provided according to an embodiment of the disclosure, transmitting the feedback information determined according to the measurement result may further include determining the feedback information according to the current duplex mode of the terminal and transmitting the feedback information.

For example, in the method for duplex mode switching provided according to an embodiment of the disclosure, the signal-to-interference-and-noise ratio without considering residual self-interference may be determined according to the strength of residual self-interference, or may be obtained by measuring, using a specific measurement time-frequency resource for measuring without considering the residual self-interference, included in the measurement time-frequency resource.

For example, in the method for duplex mode switching provided according to an embodiment of the disclosure, the first configuration information may be periodic first configuration information, and the feedback information may be periodic feedback information, or the first configuration information may transmitted by the base station in response to a residual self-interference measurement request transmitted by the terminal, and the feedback information may be aperiodic feedback information.

For example, in the method for duplex mode switching provided according to an embodiment of the disclosure, in a case where the current duplex mode of the terminal is the full-duplex mode, the method may further include: receiving third indication information for indicating a full-duplex resource for receiving downlink data having a higher priority than the currently transmitted data; and on the full-duplex resource, stopping the transmission of uplink data and receiving the downlink data having the higher priority.

For example, in the method for duplex mode switching provided according to an embodiment of the disclosure, in a case where the current duplex mode of the terminal is the full-duplex mode, the method may further include: transmitting a request message for requesting to transmit uplink data having a higher priority than the currently transmitted data; receiving fourth indication information in response to the request message, the fourth indication information indicating a full-duplex resource for the terminal to transmit the uplink data having the higher priority; and on the full-duplex resource, stopping the reception of downlink data and transmitting the uplink data having the higher priority.

At least one embodiment of the disclosure further provides a user equipment (UE). The UE may include a transceiver and at least one processor. The transceiver may be configured to transmit and receive signals. The at least one processor may be configured to receive first configuration information, and determine a measurement time-frequency resource for residual self-interference measurement based on the first configuration information. The at least one processor may perform the residual self-interference measurement on the measurement time-frequency resource to obtain a measurement result, transmit feedback information determined according to the measurement result, and receive second configuration information determined according to the feedback information, and configure a duplex mode of a terminal based on the second configuration information.

For example, in a terminal provided according to an embodiment of the disclosure, the at least one processor may be further configured to perform one or more of the above-described methods of duplex mode switching.

At least one embodiment of the disclosure further provides a method of a base station (BS) for duplex mode switching. The method for duplex mode switching may include: transmitting first configuration information, the first configuration information being used to determine a measurement time-frequency resource for residual self-interference measurement; receiving feedback information determined according to a measurement result, the measurement result being obtained by a terminal performing the residual self-interference measurement on the measurement time-frequency resource; determining second configuration information for configuring a duplex mode of the terminal according to the feedback information; and transmitting the second configuration information.

For example, in the method for duplex mode switching provided according to an embodiment of the disclosure, the first configuration information may include first indication information indicating the measurement time-frequency resource on a downlink channel for the residual self-interference measurement, and the measurement time-frequency resource is determined based on the first indication information.

For example, in the method for duplex mode switching provided according to an embodiment of the disclosure, the measurement time-frequency resource is a time-frequency resource with zero power (i.e. empty time-frequency resource), and the base station does not transmit a signal on the time-frequency resource with zero power.

For example, in a method for duplex mode switching according to an embodiment of the disclosure, the first configuration information may include second indication information indicating the measurement time-frequency resource on an uplink channel for the residual self-interference measurement, and the measurement time-frequency resource may be determined based on the second indication information.

For example, in the method for duplex mode switching provided according to an embodiment of the disclosure, the downlink time-frequency resource corresponding to the measurement time-frequency resource on the uplink channel for the residual self-interference measurement may be a time-frequency resource with zero power, and the base station does not transmit a signal on the time-frequency resource with zero power.

For example, the method for duplex mode switching provided according to an embodiment of the disclosure may further include: receiving terminal capability information including an indication of a self-interference cancellation capability of the terminal, and the step of determining the second configuration information for configuring the duplex mode of the terminal according to the feedback information includes: determining the second configuration information according to at least one of the feedback information and the terminal capability information.

For example, in the method for duplex mode switching provided according to an embodiment of the disclosure, the feedback information may include at least one of a strength of the residual self-interference, the signal-to-interference-and-noise ratio considering the residual self-interference, and the signal-to-interference-and-noise ratio without considering the residual self-interference.

For example, in the method for duplex mode switching provided according to an embodiment of the disclosure, the step of determining the second configuration information for configuring the duplex mode of the terminal according to the feedback information comprises one of the following: determining the second configuration information according to at least one of the strength of the residual self-interference and the signal-to-interference-and-noise ratio considering the residual self-interference; in a case where the feedback information includes a signal-to-interference-and-noise ratio without considering residual self-interference, determining the second configuration information according to one of the strength of the residual self-interference and the signal-to-interference-and-noise ratio considering residual self-interference, and the signal-to-interference-and-noise ratio without considering residual self-interference; and in a case where the feedback information does not include a signal-to-interference-and-noise ratio without considering residual self-interference, determining the second configuration information according to one of the strength of the residual self-interference and the signal-to-interference-and-noise ratio considering residual self-interference, and the latest signal-to-interference-and-noise ratio considering residual self-interference fed back by the terminal.

For example, in the method for duplex mode switching provided according to an embodiment of the disclosure, the step of determining the second configuration information according to at least one of the strength of the residual self-interference and a signal-to-interference-and-noise ratio considering the residual self-interference may include: determining whether the signal-to-interference-and-noise ratio considering residual self-interference is greater than a first predetermined threshold; and in a case where the signal-to-interference-and-noise ratio considering residual self-interference is greater than the first predetermined threshold, determining the second configuration information as the second configuration information indicating that the terminal can be configured in the full-duplex mode; in a case where the signal-to-interference-and-noise ratio considering the residual self-interference is less than or equal to the first predetermined threshold, determining whether the strength of the residual self-interference is greater than a second predetermined threshold; in a case where the strength of the residual self-interference is greater than the second predetermined threshold, determining the second configuration information as the second configuration information indicating that the terminal can be configured in the half-duplex mode; and in a case where the strength of the residual self-interference is less than or equal to the second predetermined threshold, determining the second configuration information as the second configuration information indicating that the terminal can be configured in the full-duplex mode.

For example, in the method for duplex mode switching provided according to an embodiment of the disclosure, in a case where the feedback information includes a signal-to-interference-and-noise ratio without considering the residual self-interference, the step of determining the second configuration information according to one of the strength of residual self-interference and the signal-to-interference-noise ratio, and the signal-to-interference-and-noise ratio without considering the residual self-interference may include: determining whether the intensity of the residual self-interference is greater than a third predetermined threshold; in a case where the intensity of the residual self-interference is greater than the third predetermined threshold, determining the second configuration information as information indicating that the terminal can be configured in the half-duplex mode; in a case where the strength of the residual self-interference is less than or equal to the third predetermined threshold, determining whether the signal-to-interference-and-noise ratio without considering the residual self-interference is greater than a fourth predetermined threshold; in a case where the signal-to-interference-and-noise ratio without considering the residual self-interference is greater than the fourth predetermined threshold, determining the second configuration information as information indicating that the terminal can be configured in the full-duplex mode; and in a case where the signal-to-interference-and-noise ratio without considering the residual self-interference is less than or equal to the fourth predetermined threshold, determining the second configuration information as information indicating that the terminal can maintain in the current duplex mode.

For example, in the method for duplex mode switching provided according to an embodiment of the disclosure, in a case where the current duplex mode of the terminal is the full-duplex mode, the method may further include: transmitting third indication information indicating a full-duplex resource for receiving downlink data having a higher priority than the currently transmitted data; and transmitting the downlink data having the higher priority on the full-duplex resource.

For example, in the method for duplex mode switching provided according to an embodiment of the disclosure, in a case where the current duplex mode of the terminal is the full-duplex mode, the method may further include: receiving a request message for requesting to transmit uplink data having a higher priority than the currently transmitted data; transmitting fourth indication information in response to the request message, the fourth indication information indicating a full-duplex resource for the terminal to transmit the uplink data having the higher priority; and on the full-duplex resource indicated by the fourth indication information, receiving the uplink data having the higher priority.

For example, in the method for duplex mode switching provided according to an embodiment of the disclosure, a radio frame includes N subframes, N is a positive integer, and each subframe of the N subframes includes uplink symbols, downlink symbols, and full-duplex symbols, and the third indication information or the fourth indication information indicates that one or more full-duplex symbols of the full-duplex symbols are the full-duplex resource.

For example, in the method for duplex mode switching provided according to an embodiment of the disclosure, the communication channel comprises uplink control channel, a downlink control channel, and a data band, and wherein the uplink control channel and the downlink control channel are separated by the data band in a frequency-domain. The third indication information or the fourth indication information indicates that a part of a data band time-frequency resource of the data band is the full-duplex resource.

At least one embodiment of the disclosure further provides abase station (BS). The base station may include a transceiver and at least one processor. The transceiver may be configured to transmit and receive signals. The at least one processor may be configured to: transmit first configuration information, the first configuration information being used to determine a measurement time-frequency resource for residual self-interference measurement; receive feedback information determined according to a measurement result, the measurement result being obtained by a terminal performing the residual self-interference measurement on the measurement time-frequency resource; determine second configuration information according to the feedback information; and transmit the second configuration information to configure a duplex mode of the terminal.

For example, in a base station provided according to an embodiment of the disclosure, the at least one processor may be further configured to perform one or more of the above-described methods of duplex mode switching.

At least one embodiment of the disclosure further provides a method for duplex mode switching. The method for duplex mode switching may include: receiving third indication information indicating a full-duplex resource for receiving downlink data having a higher priority than the currently transmitted data; and on the full-duplex resource, stopping the transmission of the uplink data, and receiving the downlink data having the higher priority from the base station.

At least one embodiment of the disclosure further provides a terminal. The terminal may include a transceiver and at least one processor. The transceiver may be configured to transmit and receive signals. The at least one processor may be configured to: receive third indication information indicating a full-duplex resource for receiving downlink data having a higher priority than the currently transmitted data; and on the full-duplex resource indicated by the third indication information, stopping the transmission of the uplink data, and receiving the downlink data having the higher priority from the base station.

At least one embodiment of the disclosure further provides a method for duplex mode switching. The method for duplex mode switching may include: transmitting third indication information indicating a full-duplex resource for receiving downlink data having a higher priority than the currently transmitted data; and on the full-duplex resource indicated by the third indication information, transmitting the downlink data having the higher priority.

At least one embodiment of the disclosure further provides a base station. The base station may include a transceiver and at least one processor. The transceiver may be configured to transmit and receive signals. The at least one processor may be configured to: transmit third indication information indicating a full-duplex resource for receiving downlink data having a higher priority than the currently transmitted data; and on the full-duplex resource indicated by the third indication information, transmitting the downlink data having the higher priority.

At least one embodiment of the disclosure further provides a method for duplex mode switching. The method for duplex mode switching may include: transmitting a request message for requesting to transmit uplink data having a higher priority than the currently transmitted data; receiving fourth indication information in response to the request message, the fourth indication information indicating a full-duplex resource for the terminal to transmit the uplink data having the higher priority; and on the full-duplex resource indicated by the fourth indication information, stopping the reception of downlink data, and transmitting the uplink data having the higher priority.

At least one embodiment of the disclosure further provides a terminal. The terminal may include a transceiver and at least one processor. The transceiver may be configured to transmit and receive signals. The at least one processor may be configured to: transmit a request message for requesting to transmit uplink data having a higher priority than the currently transmitted data; receive fourth indication information in response to the request message, the fourth indication information indicating a full-duplex resource for the terminal to transmit the uplink data having the higher priority; and on the full-duplex resource indicated by the fourth indication information, stop the reception of downlink data, and transmit the uplink data having the higher priority.

At least one embodiment of the disclosure further provides a method for duplex mode switching. The method for duplex mode switching may include: receiving a request message for requesting to transmit uplink data having a higher priority than the currently transmitted data; in response to the request message, transmitting fourth indication information indicating a full-duplex resource for the terminal to transmit the uplink data having the higher priority; and on the full-duplex resource indicated by the fourth indication information, receiving the uplink data having the higher priority.

At least one embodiment of the disclosure further provides a base station. The base station may include a transceiver and at least one processor. The transceiver may be configured to transmit and receive signals. The at least one processor may be configured to: receive a request message for requesting to transmit uplink data having a higher priority than the currently transmitted data; in response to the request message, transmit fourth indication information indicating a full-duplex resource for the terminal to transmit the uplink data having the higher priority; and on the full-duplex resource indicated by the fourth indication information, receive the uplink data having the higher priority.

At least one embodiment of the disclosure further provides a wireless communication system. The wireless communication system may include any one of the base stations described above and any one of the terminals described above.

An exemplary embodiment of the present disclosure is to provide a physical signal transmission method and device for an IAB node, a resource allocation method and device for physical signals between IAB nodes, a physical signal transmission method and device for a terminal functional entity of an IAB node, and a physical signal transmission method and device for a base station functional entity of an IAB node, to effectively improve the spectrum utilization and data throughput of network.

According to an exemplary embodiment of the present disclosure, there is provided a physical signal transmission method for an IAB node comprising: obtaining configuration parameters for transmitting a physical signal; transmitting a uplink physical signal transmitted by a terminal functional entity of the IAB node and a downlink physical signal transmitted by a base station functional entity of the IAB node on the same time-domain resource according to the obtained configuration parameters, when a full-duplex transmission is performed on a transmission uplink of the terminal functional entity, a reception downlink of the terminal functional entity, a transmission downlink of the base station functional entity and a reception uplink of the base station functional entity of the IAB node at the same frequency and at the same time.

Alternatively, the physical signal may comprise at least one of a reference signal for self-interference channel estimation, a demodulation reference signal, a phase tracking reference signal, or a sounding reference signal.

Alternatively, the configuration parameters for transmitting the physical signal may include uplink physical signal parameters and downlink physical signal parameters.

Alternatively, the uplink physical signal parameters may include at least one of information on cyclic shift of the uplink physical signal, information on comb-shaped frequency-domain resource structure and information on switching period of the comb-shaped frequency-domain resource structure of the uplink physical signal, information on frequency-hopping pattern and information on frequency-hopping switching interval of the uplink physical signal, or information on frequency-domain and time-domain orthogonal cover code of the uplink physical signal.

Alternatively, the downlink physical signal parameters may include at least one of information on cyclic shift of the downlink physical signal, information on comb-shaped frequency-domain resource structure and information on switching period of the comb-shaped frequency-domain resource structure of the downlink physical signal, information on frequency-hopping pattern and information on frequency-hopping switching interval of the downlink physical signal, or information on frequency-domain and time-domain orthogonal cover code of the downlink physical signal.

Alternatively, the downlink physical signal parameters may further include a physical root number of the uplink physical signal transmitted by the terminal functional entity of the IAB node.

Alternatively, the transmitting the uplink physical signal transmitted by the terminal functional entity of the IAB node and the downlink physical signal transmitted by the base station functional entity of the IAB node on the same time-domain resource according to the acquired configuration parameters may include configuring different cyclic shifts for the uplink physical signal and the downlink physical signal according to the acquired configuration parameters, when waveforms of the uplink physical signal and the downlink physical signal are the same, and transmitting the uplink physical signal and the downlink physical signal that are configured with different cyclic shifts on the same time-domain resource.

Alternatively, the transmitting the uplink physical signal transmitted by the terminal functional entity of the IAB node and the downlink physical signal transmitted by the base station functional entity of the IAB node on the same time-domain resource according to the acquired configuration parameters may include configuring comb-shaped frequency-domain resource structures for the uplink physical signal and the downlink physical signal according to the acquired configuration parameters when waveforms of the uplink physical signal and the downlink physical signal are the same, and transmitting the uplink physical signal and the downlink physical signal that are configured with different comb-shaped frequency-domain resource structures on the same time-domain resource.

Alternatively, the transmitting the uplink physical signal transmitted by the terminal functional entity of the IAB node and the downlink physical signal transmitted by the base station functional entity of the IAB node on the same time-domain resource according to the acquired configuration parameters may include configuring frequency-hopping patterns for the uplink physical signal and the downlink physical signal according to the acquired configuration parameters, and transmitting the uplink physical signal and the downlink physical signal that are configured with different frequency-hopping patterns on the same time-domain resource.

Alternatively, the transmitting the uplink physical signal transmitted by the terminal functional entity of the IAB node and the downlink physical signal transmitted by the base station functional entity of the IAB node on the same time-domain resource according to the acquired configuration parameters may include configuring frequency-domain and time-domain orthogonal cover codes for the uplink physical signal and the downlink physical signal according to the obtained configuration parameters when waveforms of the uplink physical signal and the downlink physical signal are the same, and transmitting the uplink physical signal and the downlink physical signal that are configured with different frequency-domain and time-domain orthogonal cover codes on the same time-domain resource.

According to an exemplary embodiment of the present disclosure, there is provided a resource allocation method for physical signals between IAB nodes. The resource allocation method may include: dividing all IAB nodes into groups, and setting resources of the physical signals of the IAB nodes in each group to be all time division multiplexing or all frequency division multiplexing; setting resources of the physical signals of the IAB nodes between the groups to be frequency division multiplexing, for all groups within which resources of the physical signals of the IAB nodes are all time division multiplexing; and setting resources of the physical signals of the IAB nodes between groups to be time division multiplexing, for all groups within which the resources of the physical signals of the IAB nodes are all frequency division multiplexing, wherein the physical signals comprises at least an uplink physical signal.

Alternatively, the setting resources of the physical signals of the IAB nodes in each group to be all time division multiplexing or all frequency division multiplexing may include allocating a first number of time-domain resources that are different from other IAB nodes for each IAB node when the resources of the physical signals of the IAB nodes within a group are set to be all time division multiplexing, and dividing a bandwidth into a second number of segments of frequency-domain resources that do not overlap with each other on a time-domain resource where the resources of the physical signals are located, and allocating one of the second number of segments of frequency-domain resources to each IAB node, when the resources of the physical signals of the IAB nodes within a group are set to be all frequency division multiplexing.

Alternatively, the time-domain resources of the uplink physical signal may be in a form of an absolute frame number, an absolute subframe number, an absolute slot number, and an absolute OFDM symbol number of the uplink physical signal resources, or in the form of a repetition period of the uplink physical signal resource and a relative frame number, a relative subframe number, a relative slot number, and a relative OFDM symbol number in the repetition period.

Alternatively, the frequency-domain resource of the uplink physical signal may be in a form of at least one of all physical resource block numbers of the uplink physical signal resource for each frequency-hopping or equivalent parameters that are able to uniquely calculate all the physical resource block numbers, all physical resource block numbers of the uplink physical signal resource for an initial frequency-hopping or equivalent parameters that are able to uniquely calculate all the physical resource block numbers, wherein the initial frequency-hopping refers to a starting point of a frequency-hopping within one frequency-hopping cycle.

According to an exemplary embodiment of the present disclosure, there is provided a physical signal transmission method for a terminal functional entity of an IAB node. The physical signal transmission method may include: determining resources that are needed to be avoided in receiving downlink signals and transmitting uplink signals; performing reception of a downlink physical signal and transmission of an uplink physical signal on resources other than the determined resources that are needed to be avoided.

Alternatively, the resources that are needed to be avoided may at least include time-domain resources and frequency-domain resources, the time-domain resources include at least one of a frame number, a subframe number, a slot number, an OFDM symbol number, a location of a starting OFDM symbol, or a number of OFDM symbols, and the frequency-domain resources may include at least one of a physical resource block number, a starting physical resource block number, or a number of physical resource blocks of a resource.

Alternatively, physical signal transmission method for a terminal functional entity of an IAB node may further include feeding the resources of the downlink physical signal of the terminal functional entity of the IAB node back to the parent node.

Alternatively, the determined resources that are needed to be avoided may include uplink physical signal resources of a terminal functional entity of a parent node and downlink physical signal resources of a base station functional entity of the parent node, or the determined resources that are needed to be avoided comprise the uplink physical signal resources of the terminal functional entity of the parent node and the downlink physical signal resources of the base station functional entity of the parent node, and downlink physical signal resources of a base station functional entity of the IAB node.

According to an exemplary embodiment of the present disclosure, there is provided a physical signal transmission method for a base station functional entity of an TAB node comprising: obtaining downlink physical signal resources of a base station functional entity of a child node; transmitting a downlink physical signal on resources other than the obtained downlink physical signal resources of the base station functional entity of the child node.

According to an exemplary embodiment of the present disclosure, there is provided a physical signal transmission device for an IAB node. The device may include: a parameter acquiring unit configured to acquire configuration parameters for transmitting a physical signal; and a signal transmitting unit configured to transmit a uplink physical signal transmitted by a terminal functional entity of the IAB node and a downlink physical signal transmitted by a base station functional entity of the TAB node on the same time-domain resource according to the acquired configuration parameters, when a full-duplex transmission is performed on a transmission uplink of the terminal functional entity, a reception downlink of the terminal functional entity, a transmission downlink of the base station functional entity and a reception uplink of the base station functional entity of the TAB node at the same frequency and at the same time.

Alternatively, the physical signal may include at least one of a reference signal for self-interference channel estimation, a demodulation reference signal, a phase tracking reference signal, or a sounding reference signal.

Alternatively, the configuration parameters for transmitting the physical signal may include uplink physical signal parameters and downlink physical signal parameters.

Alternatively, the uplink physical signal parameters may include at least one of information on cyclic shift of the uplink physical signal, information on comb-shaped frequency-domain resource structure and information on switching period of the comb-shaped frequency-domain resource structure of the uplink physical signal, information on frequency-hopping pattern and information on frequency-hopping switching interval of the uplink physical signal, or information on frequency-domain and time-domain orthogonal cover code of the uplink physical signal.

Alternatively, the downlink physical signal parameters may include at least one of information on cyclic shift of the downlink physical signal, information on comb-shaped frequency-domain resource structure and information on switching period of the comb-shaped frequency-domain resource structure of the downlink physical signal, information on frequency-hopping pattern and information on frequency-hopping switching interval of the downlink physical signal, or information on frequency-domain and time-domain orthogonal code of the downlink physical signal.

Alternatively, the downlink physical signal parameters may further include a physical root number of the uplink physical signal transmitted by the terminal functional entity of the IAB node.

Alternatively, the signal transmitting unit may be configured to configure different cyclic shifts for the uplink physical signal and the downlink physical signal according to the acquired configuration parameters, when waveforms of the uplink physical signal and the downlink physical signal are the same, and to transmit the uplink physical signal and the downlink physical signal that are configured with different cyclic shifts on the same time-domain resource.

Alternatively, the signal transmitting unit may be configured to configure comb-shaped frequency-domain resource structures for the uplink physical signal and the downlink physical signal according to the acquired configuration parameters, when waveforms of the uplink physical signal and the downlink physical signal are the same, and to transmit the uplink physical signal and the downlink physical signal that are configured with different comb-shaped frequency-domain resource structures on the same time-domain resource.

Alternatively, the signal transmitting unit may be configured to configure frequency-hopping patterns for the uplink physical signal and the downlink physical signal according to the acquired configuration parameters, and to transmit the uplink physical signal and the downlink physical signal that are configured with different frequency-hopping patterns on the same time-domain resource.

Alternatively, the signal transmitting unit may be configured to configure frequency-domain and time-domain orthogonal cover codes for the uplink physical signal and the downlink physical signal according to the acquired configuration parameters when waveforms of the uplink physical signal and the downlink physical signal are the same, and to transmit the uplink physical signal and the downlink physical signal that are configured with different frequency-domain and time-domain orthogonal cover codes on the same time-domain resource.

According to an exemplary embodiment of the present disclosure, there is provided a resource allocation device for physical signals between IAB nodes. The resource allocation device may include: a first allocation unit configured to divide all IAB nodes into groups, and to set resources of the physical signals of the IAB nodes in each group to be all time division multiplexing or all frequency division multiplexing; a second allocation unit configured to set resources of the physical signals of the IAB nodes between the groups to be frequency division multiplexing, for all groups within which resources of the physical signals of the IAB nodes are all time division multiplexing; and a third allocation unit configured to set the resources of the physical signals of the IAB nodes between the groups to be time division multiplexing, for all groups within which resources of the physical signals of the IAB nodes are all frequency division multiplexing, wherein the physical signals comprises at least an uplink physical signal.

Alternatively, the first allocation unit may be configured to allocate a first number of time-domain resources that are different from other IAB nodes for each IAB node when the resources of the physical signals of the IAB nodes within a group are set to be all time division multiplexing, to divide a bandwidth into a second number of segments of frequency-domain resources that do not overlap with each other on a time-domain resource where the resources of the physical signals are located, and allocate one of the second number of segments of frequency-domain resources to each IAB node, when the resources of the physical signals of the IAB nodes within a group are set to be all frequency division multiplexing.

Alternatively, the time-domain resources of the uplink physical signal may be in a form of an absolute frame number, an absolute subframe number, an absolute slot number, and an absolute OFDM symbol number of the uplink physical signal resources, or in the form of a repetition period of the uplink physical signal resource and a relative frame number, a relative subframe number, a relative slot number, and a relative OFDM symbol number in the repetition period.

Alternatively, the frequency-domain resource of the uplink physical signal may be in a form of at least one of all physical resource block numbers of the uplink physical signal resource for each frequency-hopping or equivalent parameters that are able to uniquely calculate all the physical resource block numbers, all physical resource block numbers of the uplink physical signal resource for an initial frequency-hopping or equivalent parameters that are able to uniquely calculate all the physical resource block numbers, wherein the initial frequency-hopping refers to a starting point of a frequency-hopping within one frequency-hopping cycle.

According to an exemplary embodiment of the present disclosure, there is provide a physical signal transmission device for a terminal functional entity of an IAB node. The physical signal transmission device may include: a resource determining unit configured to determine resources that are needed to be avoided in receiving downlink signals and transmitting uplink signals; and a transmission and reception unit configured to perform reception of a downlink physical signal and transmission of an uplink physical signal on resources other than the acquired resources that are needed to be avoided.

Alternatively, the resources that are needed to be avoided may at least include time-domain resources and frequency-domain resources, the time-domain resources comprise at least one of a frame number, a subframe number, a slot number, an OFDM symbol number, a location of a starting OFDM symbol, and a number of OFDM symbols, and the frequency-domain resources comprise at least one of a physical resource block number, a starting physical resource block number, and a number of physical resource blocks of a resource.

Alternatively, physical signal transmission device for a terminal functional entity of an IAB node may further include a resources feedback unit configured to feed the resources of the downlink physical signal of the terminal functional entity of the IAB node back to parent node.

Alternatively, the determined resources that are needed to be avoided may include uplink physical signal resources of a terminal functional entity of a parent node and downlink physical signal resources of a base station functional entity of the parent node, or the determined resources that are needed to be avoided comprise the uplink physical signal resources of the terminal functional entity of the parent node and the downlink physical signal resources of the base station functional entity of the parent node, and downlink physical signal resources of a base station functional entity of the IAB node.

According to an exemplary embodiment of the present disclosure, there is provided a physical signal transmission device for a base station functional entity of an IAB node. The physical signal transmission device may include a resource acquiring unit configured to obtain downlink physical signal resources of a base station functional entity of a child node, and a transmission unit configured to transmit a downlink physical signal on resources other than the obtained downlink physical signal resources of the base station functional entity of the child node.

According to an exemplary embodiment of the present disclosure, there is provided a computer-readable storage medium storing a computer program thereon, and when the computer program is executed by a processor, the physical signal transmission method for the IAB node, the resource allocation method for physical signals between IAB nodes, the physical signal transmission method for the terminal functional entity of the IAB node, or the physical signal transmission method for the base station functional entity of the IAB node according to the exemplary embodiment of the present disclosure is implemented.

According to an exemplary embodiment of the present disclosure, there is provide an electronic apparatus, including: at least one processor; and a storage storing a computer program, wherein when the computer program is executed by the at least one processor, the physical signal transmission method for the IAB node, the resource allocation method for physical signals between IAB nodes, the physical signal transmission method for the terminal functional entity of the IAB node, or the physical signal transmission method for the base station functional entity of the IAB node according to the exemplary embodiment of the present disclosure is implemented.

The physical signal transmission method and device for the IAB node according to the exemplary embodiment of the present disclosure, by orthogonal resource division, it is achieved that the uplink physical signal transmitted by the terminal functional entity of the IAB node and the downlink physical signal transmitted by the base station functional entity of the IAB node are transmitted on the same time-domain resource according to the acquired configuration parameters, when the full-duplex transmission is performed on the transmission uplink of the terminal functional entity, the reception downlink of the terminal functional entity, the transmission downlink of the base station functional entity and the reception uplink of the base station functional entity of the IAB node at the same frequency and at the same time. Thus time-domain resources are saved and it is beneficial to improve the throughput of the IAB system.

The resource allocation method and device for physical signals between IAB nodes according to the exemplary embodiment of the present disclosure, orthogonal resources allocation to each IAB node is achieved by dividing all IAB nodes into groups, setting resources of the physical signals of the IAB nodes in each group to be all time division multiplexing or all frequency division multiplexing, setting resources of the physical signals of the IAB nodes between the groups to be frequency division multiplexing, for all groups within which resources of the physical signals of the IAB nodes are all time division multiplexing, setting resources of the physical signals of the IAB nodes between the groups to be time division multiplexing, for all groups within which the resources of the physical signals of the IAB nodes are all frequency division multiplexing, and accordingly signal interference is avoided.

The physical signal transmission method for a terminal functional entity of an IAB node according to the exemplary embodiment of the present disclosure performs resource avoidance and achieves self-interference elimination by acquiring uplink physical signal resources and downlink physical signal resources of a parent node, and performing reception of a downlink physical signal and transmission of an uplink physical signal on resources other than the acquired uplink physical signal resources and downlink physical signal resources of the parent node.

The physical signal transmission method for a base station functional entity of an IAB node according to the exemplary embodiment of the present disclosure may perform resource avoidance and achieve self-interference elimination by acquiring downlink physical signal resources of a base station functional entity of a child node and transmitting downlink physical signals on resources other than the acquired downlink physical signal resources of the base station functional entity of the child node.

At least one embodiment of the present disclosure provides a method, a terminal, abase station, and an integrated access and backhaul node for transmitting a physical channel or a physical signal, which facilitate the cancelation of self-interference signals through bandpass filtering for full-duplex communication by bandpass radio frequency (RF) filters. Specifically, according to the embodiments of the present application, by dividing subbands that can be used for full-duplex transmission in a system bandwidth or a bandwidth part (BWP), bandwidth requirements for bandpass filters can be reduced, it is easier to use bandpass filtering to make the self-interference signals within the range that can be processed by a self-interference cancelation module, the mutual interference between full-duplex transmission and non-full-duplex transmission in the same system bandwidth can be reduced, and system throughput can be improved.

According to a first aspect of the present disclosure, a method for transmitting a physical channel or a physical signal is provided. The method may include: obtaining configuration information indicating a subband for transmitting a first physical channel or a first physical signal, wherein the first physical channel or the first physical signal is at least one of at least two physical channels or physical signals transmitted and received by the same communication node at the same time and at the same frequency in full-duplex transmission; and transmitting at least a portion of the first physical channel or the first physical signal within the subband indicated by the configuration information.

With reference to the first aspect, in an implementation of the first aspect, the communication node is an IAB node, an IAB-DU, an IAB-MT, a base station, or a terminal.

With reference to the first aspect and the foregoing implementation, in another implementation of the first aspect, the at least two physical channels or physical signals are physical channels or physical signals with different transmission directions in the same cell, or physical channels or physical signals with the same transmission direction on an parent link and a child link of the same communication node, and the transmission direction includes uplink and/or downlink.

With reference to the first aspect and the foregoing implementation, in another implementation of the first aspect, the same communication node is an IAB node.

With reference to the first aspect and the foregoing implementation, in another implementation of the first aspect, the configuration information indicates at least one of the following: the transmission direction of the first physical channel or the first physical signal being uplink and/or downlink, the type of the first physical channel or the first physical signal and whether the subband is enabled to be used for full-duplex transmission.

With reference to the first aspect and the foregoing implementation, in another implementation of the first aspect, the method may further include obtaining frequency-domain resource allocation information of the first physical channel or the first physical signal, and transmitting at least a portion of the first physical channel or the first physical signal within the subband indicated by the configuration information comprises: transmitting the first physical channel or the first physical signal on frequency-domain resources allocated by the frequency-domain resource allocation information, wherein the allocated frequency-domain resources are within the subband.

With reference to the first aspect and the foregoing implementation, in another implementation of the first aspect, the subband indicated by the configuration information is one selected from one or more predefined subbands each with a fixed bandwidth respectively in a system bandwidth.

With reference to the first aspect and the foregoing implementation, in another implementation of the first aspect, a first guard band may be set between at least two adjacent predefined subbands.

With reference to the first aspect and the foregoing implementation, in another implementation of the first aspect, each of the predefined subbands may be only within a frequency range of one bandwidth part (BWP).

With reference to the first aspect and the foregoing implementation, in another implementation of the first aspect, if a physical resource block in one predefined subband belongs to two or more bandwidth parts (BWPs), the one predefined subband may be not used for full-duplex transmission.

With reference to the first aspect and the foregoing implementation, in another implementation of the first aspect, the configuration information may be obtained via high-layer signaling or downlink control information, and the high-layer signaling or the downlink control information indicates an index of the subband.

With reference to the first aspect and the foregoing implementation, in another implementation of the first aspect, the subband indicated by the configuration information may be determined based on a frequency-domain relationship between an active bandwidth part and one or more predefined subbands each with a fixed bandwidth respectively in a system bandwidth.

With reference to the first aspect and the foregoing implementation, in another implementation of the first aspect, the method may further include performing digital filtering at a transmitter for physical channels or physical signals or portions of physical channels or physical signals which are transmitted outside the subband.

With reference to the first aspect and the foregoing implementation, in another implementation of the first aspect, a frequency band of the first physical channel or the first physical signal may be within the subband.

With reference to the first aspect and the foregoing implementation, in another implementation of the first aspect, a frequency band of the first physical channel or the first physical signal includes at least a portion outside the subband, and the method may further include: obtaining configuration information on a second guard band, wherein the second guard band is not used for transmitting the first physical channel or the first physical signal, the configuration information on the second guard band indicates at least one of the following: a bandwidth of the second guard band, whether the second guard band exists, and a start position of the second guard band in the frequency-domain; and determining frequency-domain resources of the second guard band according to a frequency-domain relationship between the frequency band of the first physical channel or the first physical signal and the subband, and the configuration information on the second guard band, or according to the configuration information on the second guard band.

According to a second aspect of the present disclosure, a method for transmitting a physical channel or a physical signal is provided. The method may include: obtaining configuration information on a guard band of the physical channel or the physical signal, wherein the guard band is located in a frequency band of the physical channel or the physical signal, and the configuration information on the guard band of the physical channel or the physical signal is indicated in high-layer signaling and/or downlink control information; and transmitting the physical channel or the physical signal in a frequency band that is within the frequency band of the physical channel or the physical signal but does not include the guard band.

According to a third aspect of the present disclosure, a method for transmitting a physical channel or a physical signal is provided. The method may include: transmitting configuration information on a subband for transmitting a first physical channel or a first physical signal, wherein the first physical channel or the first physical signal is at least one of at least two physical channels or physical signals transmitted and received by the same communication node at the same time and at the same frequency in full-duplex transmission; and transmitting at least a portion of the first physical channel or the first physical signal within the subband indicated by the configuration information.

With reference to the third aspect, in an implementation of the third aspect, the communication node may be an IAB node, an IAB-DU, an IAB-MT, a base station, or a terminal.

With reference to the third aspect and the foregoing implementation, in another implementation of the third aspect, the at least two physical channels or physical signals may be physical channels or physical signals with different transmission directions in the same cell, or physical channels or physical signals with the same transmission direction on an parent link and a child link of the same communication node, and the transmission direction includes uplink and/or downlink.

With reference to the third aspect and the foregoing implementation, in another implementation of the third aspect, the same communication node may be an IAB node.

With reference to the third aspect and the foregoing implementation, in another implementation of the third aspect, the configuration information may indicate at least one of the following: the transmission direction of the first physical channel or the first physical signal being uplink and/or downlink, the type of the first physical channel or the first physical signal and whether the subband is enabled to be used for full-duplex transmission.

With reference to the third aspect and the foregoing implementation, in another implementation of the third aspect, the method may further include transmitting frequency-domain resource allocation information of the first physical channel or the first physical signal, and transmitting at least a portion of the first physical channel or the first physical signal within the subband indicated by the configuration information comprises: transmitting the first physical channel or the first physical signal on frequency-domain resources allocated by the frequency-domain resource allocation information, wherein the allocated frequency-domain resources are within the subband.

With reference to the third aspect and the foregoing implementation, in another implementation of the third aspect, the subband indicated by the configuration information may be one selected from one or more predefined subbands each with a fixed bandwidth respectively in a system bandwidth.

With reference to the third aspect and the foregoing implementation, in another implementation of the third aspect, a first guard band may be set between at least two adjacent predefined subbands.

With reference to the third aspect and the foregoing implementation, in another implementation of the third aspect, each of the predefined subbands may be only within a frequency range of one bandwidth part (BWP).

With reference to the third aspect and the foregoing implementation, in another implementation of the third aspect, if a physical resource block in one predefined subband belongs to two or more bandwidth parts (BWPs), the one predefined subband may be not used for full-duplex transmission.

With reference to the third aspect and the foregoing implementation, in another implementation of the third aspect, the configuration information may be transmitted via high-layer signaling or downlink control information, and the high-layer signaling or the downlink control information indicates an index of the subband.

With reference to the third aspect and the foregoing implementation, in another implementation of the third aspect, the subband indicated by the configuration information may be determined based on a frequency-domain relationship between an active bandwidth part and one or more predefined subbands each with a fixed bandwidth respectively in a system bandwidth.

With reference to the third aspect and the foregoing implementation, in another implementation of the third aspect, the method may further include performing digital filtering at a transmitter for physical channels or physical signals or portions of physical channels or physical signals which are transmitted outside the subband.

With reference to the third aspect and the foregoing implementation, in another implementation of the third aspect, a frequency band of the first physical channel or the first physical signal may be within the subband.

With reference to the third aspect and the foregoing implementation, in another implementation of the third aspect, a frequency band of the first physical channel or the first physical signal may include at least a portion outside the subband, and the method may further include: transmitting configuration information on a second guard band, wherein the second guard band is not used for transmitting the first physical channel or the first physical signal, the configuration information on the second guard band indicates at least one of the following: a bandwidth of the second guard band, whether the second guard band exists, and a start position of the second guard band in the frequency-domain; and determining frequency-domain resources of the second guard band according to a frequency-domain relationship between the frequency band of the first physical channel or the first physical signal and the subband, and the configuration information on the second guard band, or according to the configuration information on the second guard band.

According to a fourth aspect of the present disclosure, a method for transmitting a physical channel or a physical signal is provided. A frequency band of the physical channel or the physical signal may include a first portion located in a subband used for full-duplex transmission and a second portion located outside the subband. The method may include: transmitting configuration information on a guard band of the physical channel or the physical signal, the guard band being located in the frequency band of the physical channel or the physical signal; and transmitting the physical channel or the physical signal in a frequency band that is within the frequency band of the physical channel or the physical signal but does not include the guard band, wherein the configuration information on the guard band of the physical channel or the physical signal is transmitted in high-layer signaling and/or downlink control information.

With reference to the fourth aspect, in an implementation of the fourth aspect, a start position or an end position of the guard band in the frequency-domain is aligned with a start position or an end position of a specific subband in the frequency-domain, and the specific subband is one of the following: a subband for full-duplex transmission configured for a terminal related to transmission of the physical channel or the physical signal or configured for one link of an integrated access and backhaul (IAB) node related to transmission of the physical channel or the physical signal; a subband for full-duplex transmission configured for other links not used for transmitting the physical channel or the physical signal of an IAB node related to transmission of the physical channel or the physical signal; and a subband for full-duplex transmission configured for other terminals or other IAB nodes not related to transmission of the physical channel or the physical signal.

According to a fifth aspect of the present disclosure, a terminal for full-duplex communication is provided. The terminal may include: an obtaining unit, configured to obtain configuration information indicating a subband for transmitting a first physical channel or a first physical signal, wherein the first physical channel or the first physical signal is at least one of at least two physical channels or physical signals transmitted and received by the same communication node at the same time and at the same frequency in full-duplex transmission; and a transmission unit, configured to transmit at least a portion of the first physical channel or the first physical signal within the subband indicated by the configuration information.

With reference to the fifth aspect, in an implementation of the fifth aspect, the communication node is an IAB node, an IAB-DU, an IAB-MT, a base station, or a terminal.

With reference to the fifth aspect and the foregoing implementation, in another implementation of the fifth aspect, the at least two physical channels or physical signals are physical channels or physical signals with different transmission directions in the same cell, or physical channels or physical signals with the same transmission direction on an parent link and a child link of the same communication node, and the transmission direction includes uplink and/or downlink.

With reference to the fifth aspect and the foregoing implementation, in another implementation of the fifth aspect, the same communication node may be an IAB node.

With reference to the fifth aspect and the foregoing implementation, in another implementation of the fifth aspect, the configuration information may indicate at least one of the following: the transmission direction of the first physical channel or the first physical signal being uplink and/or downlink, the type of the first physical channel or the first physical signal and whether the subband is enabled to be used for full-duplex transmission.

With reference to the fifth aspect and the foregoing implementation, in another implementation of the fifth aspect, the method may further include obtaining frequency-domain resource allocation information of the first physical channel or the first physical signal, and transmitting at least a portion of the first physical channel or the first physical signal within the subband indicated by the configuration information comprises: transmitting the first physical channel or the first physical signal on frequency-domain resources allocated by the frequency-domain resource allocation information, wherein the allocated frequency-domain resources are within the subband.

With reference to the fifth aspect and the foregoing implementation, in another implementation of the fifth aspect, the subband indicated by the configuration information is one selected from one or more predefined subbands each with a fixed bandwidth respectively in a system bandwidth.

With reference to the fifth aspect and the foregoing implementation, in another implementation of the fifth aspect, a first guard band may be set between at least two adjacent predefined subbands.

With reference to the fifth aspect and the foregoing implementation, in another implementation of the fifth aspect, each of the predefined subbands may be only within a frequency range of one bandwidth part (BWP).

With reference to the fifth aspect and the foregoing implementation, in another implementation of the fifth aspect, if a physical resource block in one predefined subband belongs to two or more bandwidth parts (BWPs), the one predefined subband may be not used for full-duplex transmission.

With reference to the fifth aspect and the foregoing implementation, in another implementation of the fifth aspect, the configuration information may be obtained via high-layer signaling or downlink control information, and the high-layer signaling or the downlink control information indicates an index of the subband.

With reference to the fifth aspect and the foregoing implementation, in another implementation of the fifth aspect, the subband indicated by the configuration information may be determined based on a frequency-domain relationship between an active bandwidth part and one or more predefined subbands each with a fixed bandwidth respectively in a system bandwidth.

With reference to the fifth aspect and the foregoing implementation, in another implementation of the fifth aspect, the transmission unit may further perform digital filtering at a transmitter for physical channels or physical signals or portions of physical channels or physical signals which are transmitted outside the subband.

With reference to the fifth aspect and the foregoing implementation, in another implementation of the fifth aspect, a frequency band of the first physical channel or the first physical signal may be within the subband.

With reference to the fifth aspect and the foregoing implementation, in another implementation of the fifth aspect, a frequency band of the first physical channel or the first physical signal may include at least a portion outside the subband, and the terminal may further include a determination unit and the obtaining unit may be further configured to obtain configuration information on a second guard band, wherein the second guard band is not used for transmitting the first physical channel or the first physical signal, the configuration information on the second guard band indicates at least one of the following: a bandwidth of the second guard band, whether the second guard band exists, and a start position of the second guard band in the frequency-domain; and the determination unit is configured to determine frequency-domain resources of the second guard band according to a frequency-domain relationship between the frequency band of the first physical channel or the first physical signal and the subband, and the configuration information on the second guard band, or according to the configuration information on the second guard band.

According to a sixth aspect of the present disclosure, a base station for full-duplex transmission is provided. The base station may include: a configuration information transmission unit, configured to transmit configuration information on a subband for transmitting a first physical channel or a first physical signal, wherein the first physical channel or the first physical signal is at least one of at least two physical channels or physical signals transmitted and received by the same communication node at the same time and at the same frequency in full-duplex transmission; and a transmission unit, configured to transmit at least a portion of the first physical channel or the first physical signal within the subband indicated by the configuration information.

With reference to the sixth aspect, in an implementation of the sixth aspect, the communication node is an IAB node, an IAB-DU, an IAB-MT, a base station, or a terminal.

With reference to the sixth aspect and the foregoing implementation, in another implementation of the sixth aspect, the at least two physical channels or physical signals are physical channels or physical signals with different transmission directions in the same cell, or physical channels or physical signals with the same transmission direction on an parent link and a child link of the same communication node, and the transmission direction includes uplink and/or downlink.

With reference to the sixth aspect and the foregoing implementation, in another implementation of the sixth aspect, the same communication node is an IAB node.

With reference to the sixth aspect and the foregoing implementation, in another implementation of the sixth aspect, the configuration information may indicate at least one of the following: the transmission direction of the first physical channel or the first physical signal being uplink and/or downlink, the type of the first physical channel or the first physical signal and whether the subband is enabled to be used for full-duplex transmission.

With reference to the sixth aspect and the foregoing implementation, in another implementation of the sixth aspect, the configuration information transmission unit may be further configured to transmit frequency-domain resource allocation information of the first physical channel or the first physical signal, and the transmission unit may be configured to transmit the first physical channel or the first physical signal on frequency-domain resources allocated by the frequency-domain resource allocation information, wherein the allocated frequency-domain resources are within the subband.

With reference to the sixth aspect and the foregoing implementation, in another implementation of the sixth aspect, the subband indicated by the configuration information may be one selected from one or more predefined subbands each with a fixed bandwidth respectively in a system bandwidth.

With reference to the sixth aspect and the foregoing implementation, in another implementation of the sixth aspect, a first guard band may be set between at least two adjacent predefined subbands.

With reference to the sixth aspect and the foregoing implementation, in another implementation of the sixth aspect, each of the predefined subbands is only within a frequency range of one bandwidth part (BWP).

With reference to the sixth aspect and the foregoing implementation, in another implementation of the sixth aspect, if a physical resource block in one predefined subband belongs to two or more bandwidth parts (BWPs), the one predefined subband may be not used for full-duplex transmission.

With reference to the sixth aspect and the foregoing implementation, in another implementation of the sixth aspect, the configuration information may be transmitted via high-layer signaling or downlink control information, and the high-layer signaling or the downlink control information may indicate an index of the subband.

With reference to the sixth aspect and the foregoing implementation, in another implementation of the sixth aspect, the subband indicated by the configuration information may be determined based on a frequency-domain relationship between an active bandwidth part and one or more predefined subbands each with a fixed bandwidth respectively in a system bandwidth.

With reference to the sixth aspect and the foregoing implementation, in another implementation of the sixth aspect, the transmission unit may be further configured to perform digital filtering at a transmitter for physical channels or physical signals or portions of physical channels or physical signals which are transmitted outside the subband.

With reference to the sixth aspect and the foregoing implementation, in another implementation of the sixth aspect, a frequency band of the first physical channel or the first physical signal is within the subband.

With reference to the sixth aspect and the foregoing implementation, in another implementation of the sixth aspect, a frequency band of the first physical channel or the first physical signal may include at least a portion outside the subband, and the base station may further include a determination unit, the configuration information transmission unit may be further configured to transmit configuration information on a second guard band, wherein the second guard band is not used for transmitting the first physical channel or the first physical signal, the configuration information on the second guard band indicates at least one of the following: a bandwidth of the second guard band, whether the second guard band exists, and a start position of the second guard band in the frequency-domain; and the determination unit is configured to determine frequency-domain resources of the second guard band according to a frequency-domain relationship between the frequency band of the first physical channel or the first physical signal and the subband, and the configuration information on the second guard band, or according to the configuration information on the second guard band.

According to a seventh aspect of the present disclosure, an integrated access and backhaul (IAB) node for full-duplex transmission is provided. The IAB node may include an integrated access and backhaul-mobile terminal (IAB-MT), configured to obtain configuration information indicating a subband for transmitting a first physical channel or a first physical signal and transmit at least a portion of the first physical channel or the first physical signal within the subband indicated by the configuration information; and an integrated access and backhaul-distribute unit (IAB-DU), configured to transmit configuration information indicating a subband for transmitting a second physical channel or a second physical signal and transmit at least a portion of the second physical channel or the second physical signal within the subband indicated by the configuration information, wherein the first physical channel or the first physical signal and the second physical channel or the second physical signal are respectively at least one of at least two physical channels or physical signals transmitted and received by the same communication node at the same time and at the same frequency in full-duplex transmission.

According to an eighth aspect of the present disclosure, a terminal for full-duplex transmission is provided. The terminal may include: an obtaining unit, configured to obtain configuration information on a guard band of the physical channel or the physical signal, wherein the guard band is located in a frequency band of the physical channel or the physical signal, and the configuration information on the guard band of the physical channel or the physical signal is indicated in high-layer signaling and/or downlink control information; and a transmission unit, configured to transmit the physical channel or the physical signal in a frequency band that is within the frequency band of the physical channel or the physical signal but does not include the guard band.

According to a ninth aspect of the present disclosure, a base station for full-duplex transmission is provided. The base station may include: a configuration information transmission unit, configured to transmit configuration information on a guard band of the physical channel or the physical signal, wherein a frequency band of the physical channel or the physical signal comprises a first portion located in a subband used for full-duplex transmission and a second portion located outside the subband, and the guard band is located in the frequency band of the physical channel or the physical signal; and a transmission unit, configured to transmit the physical channel or the physical signal in a frequency band that is within the frequency band of the physical channel or the physical signal but does not include the guard band, wherein the configuration information on the guard band of the physical channel or the physical signal is transmitted in high-layer signaling and/or downlink control information.

With reference to the ninth aspect, in an implementation of the ninth aspect, a start position or an end position of the guard band in the frequency-domain is aligned with a start position or an end position of a specific subband in the frequency-domain, and the specific subband is one of the following: a subband for full-duplex transmission configured for a terminal related to transmission of the physical channel or the physical signal or configured for one link of an integrated access and backhaul (IAB) node related to transmission of the physical channel or the physical signal; a subband for full-duplex transmission configured for other links not used for transmitting the physical channel or the physical signal of an IAB node related to transmission of the physical channel or the physical signal; and a subband for full-duplex transmission configured for other terminals or other IAB nodes not related to transmission of the physical channel or the physical signal.

Additional aspects and/or advantages of the general concept of the present disclosure will be partly explained in the following descriptions, and in part, will be clear through the description, or may be learned through the practice of the general concept of the present disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system. The embodiment of the present disclosure, an example of which is illustrated in the accompany drawings will now be referred to in detail, and throughout which the same reference numeral indicates the same part. The embodiment will be illustrated below with reference to the accompanying drawings, so as to explain the present disclosure.

The following description with reference to the accompanying drawings is provided to assist in a comprehensive understanding of various embodiments of the disclosure as defined by the claims and their equivalents. The following description includes various specific details to assist understanding, but these are merely exemplary. Accordingly, those skilled in the art will recognize that various changes and modifications may be made to the various embodiments described herein without departing from the scope of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Therefore, it will be apparent to those skilled in the art that the following descriptions of the various embodiments of the disclosure are provided for illustrative purposes only and are not intended to limit the disclosure as defined by the appended claims and their equivalents.

Unless otherwise defined, the technical or scientific terms used in the disclosure shall have the ordinary meanings understood by those having ordinary skills in the field to which the invention belongs. The terms "first", "second", and the like used in this disclosure do not indicate any order, quantity, or importance, but are only used to distinguish different components. Similarly, "a", "an", or "the" and the like do not indicate a limit on quantity, but rather indicate that there is at least one. Words such as "connected" or "interconnected" are not limited to physical or mechanical connections, but may include electrical connections, whether direct or indirect. "Upper", "lower", "left", "right", etc. are only used to indicate the relative positional relationship, and in a case where the absolute position of the object to be described is changed, the relative positional relationship may also be changed accordingly.

The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" or "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

The advantages and features of one or more embodiments of the disclosure and implementation methods thereof can be more easily understood by referring to the following detailed description of the embodiments and the accompanying drawings. In this regard, the embodiment may have different forms and should not be construed as being limited to the descriptions set forth herein. Rather, these embodiments are provided so that this disclosure will be thorough and complete, and will fully convey the concept of the embodiments to those skilled in the art, and the scope of protection of this disclosure will be limited only by the appended claims.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In addition, each block may represent module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" in an embodiment of the disclosure means a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components such as software components, object-oriented software components, class components, and task components, and may include procedures, functions, properties, programs, subroutines, program code segments, drivers, firmware, microcode, circuits, data, databases, data structures, tables, arrays, or variables. The functions provided by components and "units" can be associated with fewer components and "units", or can be divided into additional components and "units". In addition, components and "units" may be embodied as reproducing one or more central processing units (CPUs) in a device or a secure multimedia card. Furthermore, in embodiments, a "unit" may include at least one processor.

Definitions for other certain words and phrases are provided throughout this disclosure. Those of ordinary skill in the art should understand that in many if not most instances, such definitions apply to prior as well as future uses of such defined words and phrases.

Wireless communication systems have evolved from providing initial voice-oriented services to, for example, broadband wireless communication systems that provide high-speed and high-quality packet data services, such as High-Speed Packet Access (HSPA), Long-Term Evolution (LTE) of the 3rd Generation Partnership (3GPP)) Or Evolved Universal Terrestrial Radio Access (E-UTRA) and LTE-advanced (LTE-A)), 3GPP2 High-Speed Packet Data (HRPD) and Ultra Mobile Broadband (UMB), and the Institute of Electrical and Electronics Engineers (IEEE) 802.16e communication standard. 5th generation (5G) or new radio (NR) communication standards are being developed with 5G wireless communication systems.

According to estimation of an international telecommunication union (ITU), by 2020, global monthly mobile data traffic will reach 62 exabytes (referred to as EB for short, 1 $EB=2^{30}$ GB), and from 2020 to 2030, global mobile data services will grow at an annual growth rate of about 55%; in addition, a proportion of video services and machine-to-machine communication services in the mobile data services will gradually increase; by 2030, video services will be 6 times more than non-video services, and the machine-to-machine communication services will account for about 12% of the mobile data services (referring to *IMT traffic estimates for the years* 2020 to 2030, Report ITU-R M.2370-0).

A rapid growth of the mobile data services, especially exponential growth of high-definition video services and ultra-high-definition video services, puts forward higher requirements for a transmission rate of wireless communication. In order to meet growing requirements for mobile services, people need to propose a new technology based on 4G or 5G to further improve a transmission rate and throughput of a wireless communication system. A full-duplex technology may further improve spectrum efficiency based on an existing wireless communication system, and unlike a traditional half-duplex system adopting time-domain orthogonal division (e.g., time division duplexing (TDD)) or frequency-domain orthogonal division (e.g., frequency division duplexing (FDD)) for uplink and downlink, a full-duplex system allows a user's uplink and downlink to perform transmission simultaneously in a time-domain and a frequency-domain. Therefore, throughput of the full-duplex system may theoretically achieve twice of that of the half-duplex system.

When performing a wireless communication procedure, especially a procedure of signal transmission based on the full-duplex system, interference will occur and a normal progress of the signal transmission is affected.

In a traditional cellular network, a base station directly communicates with terminals located within its coverage area. Since 5G NR (New Radio) supports millimeter wave frequency bands of higher frequency, and the 5G NR supports multiple subcarrier spacings greater than 15 kHz in consideration of service flexibility, which result in a smaller coverage area of a single 5G base station. When the base station communicates with a UE that is farther away, relay from other equipment is often required. Therefore, the 5G NR supports the Integrated Access and Backhaul (IAB) technology. There are two types of nodes in an IAB network, and one type is an IAB-donor and the other type is an IAB-node. The former functions as a base station in traditional cellular communication, and directly performs data communication with other base stations or terminals within its coverage area. The IAB-node has two functions, and one of them is to function as a terminal to communicate with other base stations, and the other one is to function as a base station to provide services to other base stations or terminals within its coverage. Therefore, in the TAB network, there may be a data link that starts from the IAB-donor and passes through at least one IAB-node to the terminal. So far, the IAB technology only supports a half-duplex communication. The shortage of resources for half-duplex communication is an important reason for limiting system capacity. In addition, the 5G NR stipulates that the terminal function and base station function of one IAB-node will be implemented by two sets of transceiver devices. That is, one IAB-node has two sets of entity devices, which respectively implement the terminal function and base station function of the IAB-node. The IAB-node terminal function is referred to as Mobile-Termination (IAB-MT), and the base station function is referred to as Donor Unit (IAB-DU). For the sake of Over-The-Air (OTA) synchronization, the IAB-DU downlink timing of each IAB-node in the IAB network is completely aligned, that is, each IAB-DU starts one downlink subframe at the same time.

A full-duplex device can transmit and receive data on the same time-frequency resource at the same time. Therefore, a full-duplex device has a unique interference-self-interference, that is, the downlink signals transmitted by a device will be received by the device's own receiving antenna, causing strong interference to uplink signals received at the same time and the same frequency. Since the self-interference signal is directly received without spatial attenuation, the power of self-interference will be much higher than the power of the uplink signal to be received. If self-interference is not canceled, the uplink signal will not be received correctly. Therefore, a reference signal is needed to estimate a self-interference channel from a transmitting antenna to a receiving antenna.

The spectrum utilization and network data throughput can be effectively improved by combining the full-duplex technology and the IAB technology, which is an important option for the 6G technology in future.

However, because the uplink and downlink use the same time and frequency resources, a transmit signal of the full-duplex system will generate strong self-interference to a receive signal, and a self-interference signal will even be more than 120 dB higher than the background noise. Therefore, in order for the full-duplex system to work properly, the main problem is to design a scheme to cancel self-interference, so that the strength of the self-interference signal is at least reduced to the same level as the background noise.

At present, there are many self-interference cancelation methods, which are roughly divided into passive cancelation methods, analog cancelation methods and digital cancelation methods. The analog cancelation method is to cancel self-interference signals in an analog domain of the receiver link (that is, before the analog-to-digital conversion). The reason for self-interference signal cancelation before analog-to-digital conversion is to ensure that a signal inputted to an analog-to-digital converter has a reasonable dynamic range. When an energy of a residual self-interference signal is much higher than an expected signal energy, or even higher than a maximum input signal energy of the analog-to-digital converter, the analog-to-digital conversion operation may introduce great quantization noises and other non-linear distortions. In most cases, the analog cancelation techniques are often necessary.

In order to meet the growing demand for mobile services, new wireless communication technologies need to be proposed on the basis of 4G or 5G wireless communication systems to further improve the transmission rate and throughput of wireless communication systems. The improvement of duplex technology is an important means to further improve the transmission rate and throughput of wireless communication systems. The duplex technologies used in existing systems and protocols include Frequency division Multiplexing (FDM) and Time division Multiplexing (TDM). However, both FDM and TDM cannot fully utilize the available time-frequency resource, and their resource utilization efficiency is less than 50%.

In order to improve resource utilization efficiency, flexible (or dynamic) time division duplex (Dynamic TDD) technology can be adopted, that is, the transmission direction (uplink or downlink) of each slot is flexibly changed according to factors such as service data or demand. By configuring the transmission direction of the slot in a semi-static or dynamic manner, the flexibility of time-frequency resource configuration can be improved, thereby improving system performance.

In addition, a full-duplex technology can be used to improve resource utilization efficiency. Unlike traditional half-duplex systems that use time-domain (e.g., time division duplex (TDD)) or frequency-domain (e.g., frequency division duplex (FDD)) orthogonal dividing for uplink and downlink, full-duplex systems may allow users to simultaneously transmit uplink the link (UL) and the downlink (DL) in the time and frequency-domains. Therefore, a full-duplex system can theoretically reach twice the throughput of a half-duplex system. However, in a case where the uplink and downlink are at the same frequency at the same time (Co-time Co-frequency), the transmitted signal of the full-duplex system will cause strong self-interference to the received signal. In some cases, the self-interference signal may even be about 120 dB higher than the noise floor. Therefore, in order for the full-duplex system to work, the self-interference needs to be cancelled so that the strength of the self-interference signal is at least reduced to the same level as the noise floor.

Due to the high cost of self-interference cancellation, in future communication networks, there will be situations where terminals supporting full-duplex and terminals supporting only half-duplex coexist. When a terminal operates in a full-duplex mode, it needs to deal with the issue of self-interference. In a case where the self-interference is strong or the self-interference channel changes significantly and therefore exceeds the ability of the terminal, the terminal currently in a full-duplex mode should operate in the half-duplex mode. Therefore, the handover of the terminal between full-duplex mode and half-duplex mode needs to be considered.

Hereinafter, one or more embodiments will be described with reference to the drawings. In addition, in the description of the disclosure, when it is considered that certain detailed explanations regarding functions or configurations may unnecessarily obscure the essence of the disclosure, these detailed explanations will be omitted. All terms (including descriptive or technical terms) used herein should be construed to have meanings obvious to one of ordinary skill in the art. However, these terms may have different meanings according to the intention of a person of ordinary skill in the art, jurisprudence, or the emergence of new technology, and therefore, the terms used herein must be defined based on the meaning of these terms together with the description throughout the specification. Hereinafter, a base station may be a subject that performs resource allocation to a terminal. For example, the base station may be at least one of: a gNode B (gNB), an eNode B (eNB), a Node B (NB), a radio access unit, a base station controller, access point, and a node on a network. The terminal may include a user equipment (UE), a mobile station (MS), a mobile phone, a smart phone, a computer, or a multimedia system capable of performing a communication function. In various embodiments of the disclosure, the duplex mode of the terminal may include a full-duplex mode and a half duplex mode. For example, in the full-duplex mode, the terminal can simultaneously perform the transmission and reception of data signals on the same time-frequency resource. For example, in the half-duplex mode, the terminal performs only transmission of data signals and does not perform reception of data signals on the same time-frequency resource, or performs only reception of data signals and does not perform transmission of data signals on the same time-frequency resource. In various embodiments of the disclosure, the half-duplex mode may include a Time division Duplex (TDD) mode and a Frequency division Duplex (FDD) mode. In various embodiments of the disclosure, the time-frequency resource may be at least one of one or more symbols, one or more resource elements (REs), one or more resource blocks (RBs), one or more resource element groups (REGs), and one or more resource block groups (RBGs). In various embodiments of the disclosure, residual self-interference may refer to residual self-interference after self-interference isolation and/or self-interference cancellation. In various embodiments of the disclosure, a downlink (DL) is a wireless transmission path through which signals are transmitted from a base station to a terminal, and an uplink (UL) is a wireless transmission path through which signals are transmitted from a terminal to a base station. In addition, one or more embodiments of the disclosure can be applied to 5G wireless communication technologies (5G, new radio, and NR) developed after LTE-A, or to new wireless communication technologies proposed on the basis of 4G or 5G.

In the present disclosure, it may be illustrated by taking a full-duplex system as an example. However, it is only exemplary and is not used to limit the protection scope of the present disclosure. Therefore, the present disclosure is also applicable to a non-full-duplex system.

In the full-duplex system, since an uplink or downlink are in the same time and frequency, a transmitted signal of a identical full-duplex apparatus will generate, during full-duplex transmission, a strong self-interference signal on a receiving signal, and an intensity of the self-interference signal will even be 120 dB higher than a bottom noise, or the intensity is even higher. Therefore, in order to make the full-duplex system work stably, it is required to design a scheme to eliminate the self-interference signal, such that the intensity of the self-interference signal is reduced at least to a level identical to that of the bottom noise.

A variety of methods may be adopted to eliminate the self-interference signal, for example, the adopted methods may include, but may be not limited to, an antenna elimination method, an analog elimination method, and a digital elimination method. The antenna elimination method may include designing a circuit of a transmitting and receiving antenna to reduce the intensity of the self-interference signal at least to the intensity of a receiving antenna in a manner of physical isolation, transceiver signal countervailing, or the like. The analog elimination method may include performing elimination on the self-interference signal in an analog domain of a receiving link (i.e., before an analog-to-digital conversion). The antenna elimination method and the analog elimination method may be adopted at the same time, and the signal after antenna elimination and analog elimination, which has a required dynamic range, is input to an analog-to-digital converter. In general, digital elimination may be performed after analog elimination to further process a residual self-interference signal after the analog elimination.

The digital elimination method may include a method of eliminating the self-interference signal in a digital domain of a receiving end (i.e., after analog-to-digital conversion). The principle of digital elimination may include that a full-duplex apparatus transmits a known modulation symbol or reference signal on a specific physical resource (hereinafter, the symbol or signal is referred to as a self-interference elimination special reference signal or a reference signal for self-interference channel estimation, or a self-interference reference signal for short), and receives the self-interference signal at the same time. According to the self-interference elimination special reference signal, the full-duplex apparatus may estimate a self-interference channel. On other physical resources other than the physical resource which transmits the self-interference elimination special reference signal, the full-duplex apparatus may perform reception and transmission at the same time, and the transmitted signal may interfere with a receiving end through the self-interference channel. The full-duplex apparatus may reconstruct the self-interference signal on the other physical resources based on the estimated self-interference channel and delete the reconstructed self-interference signal in a received digital domain signal.

In order to ensure accuracy of self-interference channel estimation, on the physical resource for self-interference channel estimation (the physical resource for transmitting the self-interference elimination special reference signal), in addition to transmitting the interference elimination special reference signal, the other modulation symbols or reference signals may be not transmitted or received. This means that on the allocated physical resource of a full-duplex bidirectional transmission, a unidirectional transmission resource may be configured to transmit a unidirectional signal for self-interference channel estimation (the self-interference elimination special reference signal). Unidirectional transmission means that there is only transmission in one uplink or downlink direction on the same time-frequency resource. The processing method of ensuring the unidirectional transmission may include: assuming that the time-domain symbol transmitted by the full-duplex apparatus for self-interference channel estimation is #i and the occupied physical resource block (PRB) is #k, the PRB #k on the time-domain symbol #i in a receiving direction of the full-duplex apparatus is not transmitted (e.g., there is no transmitting symbol). In particular, when the full-duplex apparatus is a full-duplex base station or a full-duplex integrated access and backhaul-distribution unit (IAB-DU), a physical resource without transmission may be configured in the uplink direction; when the full-duplex apparatus is a full-duplex terminal or a full-duplex integrated access and backhaul-mobile termination (IAB-MT), the physical resource without transmission is configured in the downlink direction.

Considering that uplink transmission and downlink reception of the full-duplex apparatus or downlink transmission and uplink reception thereof are not synchronous, for example, when the full-duplex terminal (or the full-duplex IAB-MT) multiplexes an uplink reference signal to perform self-interference channel estimation, the advance transmission in the uplink direction makes the time when the terminal receives the self-interference reference signal earlier than signal reception time in the downlink direction. When the full-duplex IAB performs transmission as a relay node, and when downlink transmission of a parent-link and downlink transmission of a sublink use the physical resource of the same time and frequency, a downlink reference signal (a self-interference reference signal) transmitted by the IAB-DU may be used for the self-interference estimation of the IAB-MT which is taken as a downlink reference signal receiving end and corresponds to the IAB-DU. Since all the downlink transmission times in the same IAB-based network need to be the same, and the time when the IAB-MT receives the self-interference reference signal (i.e., the downlink reference signal transmitted by the IAB-DU) is earlier than the signal reception time in the downlink direction, there may be no synchronization, which may be referred as to non-ideal synchronization, resulting in that uplink or downlink symbol reception time is later than the reception time of the self-interference symbol corresponding to the self-interference reference signal.

FIG. 1 illustrates a timing chart of signal reception according to an exemplary embodiment of the present disclosure.

As shown in FIG. 1, an uplink or downlink receiving symbol with a cyclic prefix (CP) and a self-interference receiving symbol with CP (a modulation symbol of a self-interference reference signal) may be transmitted in the same time-domain or in the same time-domain and frequency-domain, wherein the symbol corresponding to the self-interference receiving symbol of the uplink or downlink receiving symbol is a no transmission symbol. There may be a delay between the reception of the uplink or downlink receiving symbol and the reception of the self-interference receiving symbol, that is, the self-interference receiving symbol is received earlier. In this case, there may be interference between the uplink or downlink receiving symbol and the self-interference receiving symbol, resulting in that the self-interference receiving symbol may not be accurately identified. Accordingly, the self-interference channel estimation and self-interference signal elimination may not be performed effectively.

Therefore, it is required to reduce or even avoid the interference between different signals transmitted in the same time-domain, to ensure that the required signal are transmitted normally and accurately identified. In the exemplary embodiment of the present disclosure, the different signals may be signals which are signals of different types and/or signals having different functions. In the exemplary embodiment of the present disclosure, the signal being transmitted unidirectionally is only exemplary, and the signal transmitted on a unidirectional transmission resource or a bidirectional transmission resource (e.g., a self-interference elimination special reference signal) is also exemplary and is not used to limit the protection scope of the present disclosure.

According to the exemplary embodiments of the present disclosure, an improved uplink and/or downlink physical signal, a signal pattern, a signal configuration, a transmission mode, and a corresponding terminal and base station may be provided to reduce the influence on signal transmission due to non-ideal synchronization or the like, or to accurately receive the signal such as physical signals or the like in the case of the presence of a factor such as non-ideal synchronization or the like, to accurately perform a function such as the self-interference channel estimation.

In the exemplary embodiment of the present disclosure, a full-duplex apparatus may include at least one of: a full-duplex terminal, an IAB-MT, a full-duplex base station, and an IAB-DU, wherein the terminal may include a terminal (a terminal apparatus) in an access link, which may include an IAB-MT; the base station may include a base station (a base station apparatus) in the access link, for example, an evolved NodeB (eNB) and a next generation NodeB (referred to as gNB for short), and may further include the IAB-DU. The exemplary embodiment of the present disclosure is illustrated by taking the full-duplex as an example, which is not used to limit the protection scope of this disclosure, and it is also applicable to a non-full-duplex apparatus.

In the exemplary embodiment of the present disclosure, the transmission may represent sending and may also represent receiving, and the feature described for the sending is also applicable to the description for the receiving, and vice versa.

FIG. 2 illustrates a flow chart of a transmission method of a physical signal according to an exemplary embodiment of the present disclosure.

As shown in FIG. 2, the transmission method of the physical signal according to the exemplary embodiment of the present disclosure may include: at step 110, acquiring a configuration of the physical signal; at step 120, transmitting the physical signal according to the acquired configuration, wherein the acquired configuration of the physical signal includes at least one of: a cyclic prefix length, a transmitting time offset, a cyclic suffix length, a subcarrier spacing, and a configuration for at least one portion of the physical signal being repeatedly transmitted.

In one embodiment, the method may include obtaining a configuration of the physical signal, and transmitting the physical signal according to the obtained configuration. The obtained configuration may include at least one of: a cyclic prefix length, a transmitting time offset, a cyclic suffix length, a subcarrier spacing, and a configuration for at least one portion of the physical signal being repeatedly transmitted.

As an example, the physical signal may be an uplink or downlink physical signal and may include at least one of: a reference signal for self-interference channel estimation (a self-interference elimination special reference signal), a demodulation reference signal (DMRS), a cell-specific reference signal (CRS), a channel state information reference signal (CSI-RS), a synchronization signal, a sounding reference signal (SRS), and a phase-tracking reference signal (PTRS).

In the exemplary embodiment of the present disclosure, the configured physical signal may or may not have a specified utility, for example, it may be or may not be used for self-interference signal elimination; the configuration of the physical signal may be different from that of at least one of the CSI-RS, the synchronization signal, the SRS, and the PTRS.

In the exemplary embodiment of the present disclosure, the configured physical signal may or may not have a special purpose, for example, self-interference signal cancellation; the configuration of the physical signal may be different from that of at least one of the CSI-RS, the synchronization signal, the SRS, and the PTRS.

As an example, the cyclic prefix length may be greater or less than another cyclic prefix length. In addition, the other cyclic prefix length may include one of: a cyclic prefix length configured by the system information, an extended cyclic prefix length, a cyclic prefix length of the synchronization signal, and a cyclic prefix length of a physical random access channel. For any possible subcarrier spacing configuration of the physical signal, the cyclic prefix length may be configured as a same value (in other words, the cyclic prefix length is configured as a value regardless of the subcarrier spacing of the physical signal), or the cyclic prefix length may be a length obtained by adding a fixed configuration value to a cyclic prefix configured by the system information or to an extended cyclic prefix, wherein the same and added configuration value may be configured by one of a value written in specification, a high-layer signaling, and an uplink or downlink control information. A time length of a baseband time-domain signal of the physical signal may be greater than the a time length of an orthogonal frequency division multiplexing (OFDM) symbol, wherein the baseband time-domain may contain the cyclic prefix and a time-domain signal, and the time-domain signal may refer to a signal obtained after performing a Fourier transformation on a frequency-domain sequence of the physical signal. In addition, the transmitting time offset may include a time offset of a starting time, at which the baseband time-domain signal of the physical signal is transmitted in time-domain, with respect to a starting time boundary of a downlink OFDM symbol. The transmitting time offset may have a positive value or a negative value or zero, and be configured by one of: the high-layer signaling, and the uplink or downlink control information configuration. The transmitting time offset may be associated with at least one of: a cell radius, a distance between integrated access and backhaul (IAB) nodes, and the cyclic prefix length of the physical random access channel. A cyclic suffix of the physical signal may include first several sampling points of the time-domain signal obtained after performing the Fourier transformation on the frequency-domain sequence of the physical signal. In addition, a number of the sampling points may be one of: a number of sampling points corresponding to the cyclic prefix length of the physical signal, a value configured by the high-layer signaling, or a value configured by a physical-layer signaling. The subcarrier spacing may be greater or less than another subcarrier spacing, the other subcarrier spacing may include a subcarrier spacing of a downlink physical channel or signal transmitted from a base station to a terminal, the downlink physical channel or signal being different from the physical signal, or include a subcarrier spacing of an uplink physical channel or signal transmitted from the terminal to the base station, the downlink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols is larger than or equal to the number of the OFDM symbols of the physical signal, and the transmission on the muting OFDM symbol in the uplink or downlink direction may be not performed.

As an example, the cyclic prefix length configured by the system information or the added configuration value may be associated with at least one of: a cell radius, a distance between the TAB nodes, and the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is later than the starting time boundary of the downlink OFDM symbol, the transmitting time offset may have the positive value, wherein the downlink OFDM symbol is the OFDM symbol to transmit the downlink physical signal. When the physical signal is transmitted, there may be no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset may be not configured with the cyclic prefix. The subcarrier spacing of the physical signal configured with the transmitting time offset may be greater than the subcarrier spacing of other uplink or downlink physical channels or other uplink or downlink physical signals different from the physical signal. The cyclic suffix length of the physical signal configured with the transmitting time offset may be not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols may be configured, and indices of the N+N' configured muting OFDM symbols may include indices of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols depends on specification or may be configured by the high-layer signaling or the physical-layer signaling. The relative location relationship may include at least one of: the N' indices less than any of the N indices; the N' indices larger than any of the N indices; and a portion of the N' indices less than any of the N indices and another portion of the N' indices larger than any of the N indices.

As an example, the transmitting the physical signal according to the acquired configuration may include transmitting the physical signal, wherein the transmitted physical signal includes one time-domain signal or includes a plurality of repetitions of time-domain signals, and the time-domain signal refers to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, performing at least one of truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM symbol of the at least two OFDM symbols, at least one portion of the physical signal without a cyclic prefix, which is not transmitted on the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted in the former OFDM symbol(s) of the at least two OFDM symbols, truncating symbol(s) of the physical signal, the symbol being transmitted on the later OFDM symbol which are overlapped with the portion being not transmitted on the former OFDM symbol; and when transmitting the physical signal across at least two OFDM symbols, in the later OFDM symbol from among the at least two OFDM symbols, transmitting, after a transmission completion time of the physical signal, another physical signal different from the physical signal.

As an example, the physical signal may not have the cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

More detail descriptions are performed below in with reference to a plurality of embodiments.

In embodiment 1, the configured cyclic prefix length of the physical signal may be different from that of other physical signals and physical channels, wherein the cyclic prefix of the other physical signals and physical channels may include at least one of a cyclic prefix configured by a system information (the cyclic prefix may be referred to as a normal CP), an extended cyclic prefix, a cyclic prefix of a synchronization signal, and a cyclic prefix of a physical random access channel.

Specifically, a terminal or a base station may obtain a cyclic prefix of an uplink or downlink physical signal by at least one of: being configured based on a value written in specification, being indicated by a high-layer signaling, and being indicated by a downlink control information, wherein the high-layer signaling or downlink control information may be indication information received by the terminal from the base station, or may be indicative information received by an IAB (including IAB-DU and IAB-MT) from an IAB-Donor. In the case of obtaining the cyclic prefix of the uplink or downlink physical signal, a cyclic prefix of the physical signal to be transmitted may be configured to be different from the acquired cyclic prefix in length.

Preferably, the configured cyclic prefix length may be greater than the cyclic prefix length of the other physical signals and physical channels; for example, the other physical signals and physical channels herein may include another physical signal transmitted in the same time-domain as the physical signal in which the cyclic prefix length is increased or shortened; and for another example, the other physical signals herein may include at least one of a CRS, a CSI-RS, a synchronization signal, an SRS, and a PTRS. In this way, the transmitted physical signal (e.g., the physical signal for the self-interference channel estimation) may be more effective for dealing with the case of non-ideal synchronization between the transmission and reception of the full-duplex apparatus, and a larger cyclic prefix ensures that even when an end time boundary of a OFDM symbol used for reception or transmission has a large delay relative to the starting time of transmitting the physical signal (namely the physical signal with a larger cyclic prefix), a complete sequence of the physical signal, which is not interfered by the reception or sending of the uplink or downlink channel or signal (e.g., the other physical channels or signals herein), may also be intercepted within a receiving window of the physical signal, so that accuracy of the received physical signal is improved.

More specifically, a value of the configured cyclic prefix length of the physical signal may be the configured value or fixed value regardless of a subcarrier spacing (e.g., the subcarrier spacing of at least one of the configured physical signal, the CRS, the CSI-RS, the synchronization signal, the SRS, and the PTRS), for another example, regardless of a subcarrier spacing of another physical signal transmitted in the same time-domain as that of the configured physical signal; or may be the value obtained by adding the configured value or a fixed value, which is regardless of the subcarrier spacing (e.g., the above subcarrier spacing), to a cyclic prefix configured by a system or an extended cyclic prefix. The configured value or fixed value regardless of the subcarrier spacing may be a value associated with a cell radius or a distance between the IAB nodes or the cyclic prefix length of the physical random access channel.

FIGS. 3 and 4 illustrates timing charts of signal transmission according to an exemplary embodiment of the present disclosure, respectively.

As shown in FIGS. 3 and 4, while receiving an uplink or downlink receiving symbol with CP, a self-interference physical signal (a symbol of the self-interference physical signal) may be received, and the symbol corresponding to the self-interference physical signal in the sequence of the uplink or downlink receiving symbol may be a no transmission symbol. In FIG. 3, an increased length of a cyclic prefix may be irrelevant to a subcarrier spacing; through the cyclic prefix of which the length is increased, a starting timing of a receiving window for the self-interference channel estimation may be aligned with a starting time boundary of a no transmission symbol; and when a self-interference channel (a channel corresponding to the self-interference physical signal) is a multipath channel, the interference of a time delay spread of the self-interference physical signal on the uplink or downlink receiving symbol may be reduced.

In FIG. 4, an increased length of a cyclic prefix may include a length irrelevant to the subcarrier spacing, and a normal or extended cyclic prefix length. Through the cyclic prefix of which the length is increased, an end location of the receiving window for the self-interference channel estimation may be aligned with an end time boundary of the no transmission symbol, and when an uplink or downlink propagation channel (a channel corresponding to an uplink or downlink reception signal) is a multipath channel, the interference of a time delay spread of the uplink or downlink receiving signal on the reception of a self-interference physical signal may be reduced. The manner of increasing the cyclic prefix in FIG. 3 or 4 may be chosen according to an actual situation, and a multipath characteristic of a propagation channel and the self-interference channel may be taken into account in the selection. In an exemplary embodiment of the present disclosure, the cyclic prefix length may be determined in a manner similar to that of FIG. 3 or 4, but this is only exemplary and is not used to limit the protection scope of the present disclosure; and it may be also feasible to design the cyclic prefix length, so that the receiving window is located between the starting time boundary and the end time boundary of the no transmission symbol.

In embodiment 2, the configured physical signal may have a transmitting time offset, which may represent the time offset of a starting time of transmitting a time-domain baseband signal of a physical signal relative to a starting time boundary of an OFDM symbol in a time-domain of the physical signal.

FIG. 5 illustrates a timing chart of signal transmission according to an exemplary embodiment of the present disclosure.

Referring to FIG. 5, a signal such as a self-interference elimination special reference signal (a self-interference physical signal) may be illustrated as an example, and an OFDM symbol may be a symbol in a time-domain defined by a value written in specification, wherein each OFDM symbol may have a starting time boundary and an end time boundary; and the self-interference physical signal may have a starting time (a starting timing) and an end time (an end timing), and a relevant system may be a full-duplex system. In the case of the full-duplex system, a symbol of the self-interference physical signal the uplink or downlink receiving symbol may be transmitted in the same time-domain; and with respect to the same terminal or base station, the self-interference physical signal may be received, and the uplink or downlink receiving symbol may be transmitted, or the self-interference physical signal may be transmitted, and the uplink or downlink receiving symbol may be received.

In one embodiment, a self-interference physical signal which is taken as a downlink physical signal (a signal transmitted by a base station to a terminal) is taken as an example. It is noted that a transmitting time offset may have a positive value, a negative value or zero. For example, when a full-duplex terminal transmits an uplink physical signal (a signal transmitted by the terminal to the base station) for self-interference channel estimation, if the starting time boundary of a downlink OFDM symbol corresponding to the uplink physical signal is taken as a starting time (transmission starting time) for transmission, the transmitting time offset may be zero, and the full-duplex terminal may not transmit the uplink physical signal for self-interference channel estimation in advance at this time, but the uplink physical channel and physical signal other than the uplink physical signal used for the self-interference channel estimation may be transmitted in advance, and the time length of transmission in advance may be the configured amount used to compensate a propagation delay between the terminal and the base station. Since the above compensation is not needed in the self-interference channel estimation, the uplink physical signal for self-interference channel estimation may not be transmitted in advance.

For another example, when a full-duplex base station transmits (e.g., to the terminal) a downlink physical signal for the self-interference channel estimation, transmitting time of the downlink physical signal for the self-interference channel estimation may be later than the starting time boundary of the downlink OFDM symbol, and at this time, the transmission of the downlink physical signal for the self-interference channel estimation from the full-duplex base station may be delayed, that is, the transmitting time offset may have the positive value; however, when a downlink physical channel and signal other than the downlink physical signal for the self-interference channel estimation are transmitted, no transmitting time offset may be performed, that is, the starting time boundary of the downlink OFDM symbol may be taken as the transmitting starting time (the starting timing); and the time offset of delayed transmission may be used to compensate the delay of the reception of the full-duplex base station relative to the transmission of the full-duplex base station, to ensure the normal reception of the downlink physical signal for the self-interference channel estimation.

When the transmitting time offset is configured, the self-interference physical signal may be transmitted at a time (location) with the transmitting time offset relative to the OFDM symbol, which may compensate for the non-synchronization (delay) between the reception and transmission of a full-duplex apparatus, and at this time, the full-duplex apparatus may not be interfered by the uplink or downlink receiving symbol when receiving the self-interference physical signal for self-interference channel estimation. For example, the transmitting time offset may be a preset value of a value written in specification or indicated by a high-layer signaling or a downlink control information, wherein the high-layer signaling or the downlink control information may be indication information received by the terminal from the base station, or indication information received by the IAB (including the IAB-DU and the IAB-MT) from the IAB-Donor. For another example, the transmitting time offset may be a value associated with a cell radius or a distance between IAB nodes or associated with a cyclic prefix length of a physical random access channel. Specific embodiments of the physical signal with a transmitting time offset may include a physical signal having a cyclic prefix length of zero, and such a physical signal without the cyclic prefix may reduce the influence of the self-interference physical signal transmission on a subsequent OFDM symbol transmission, that is, reducing a number of sampling points in a time-domain symbol of the self-interference physical signal that overlaps with a subsequent OFDM symbol including a next OFDM symbol due to delay. For another example, a value of the cyclic suffix length of the physical signal may be the configured value or the fixed value regardless of the subcarrier spacing, such as a value associated with the cell radius, or associated with the distance between the IAB nodes, or associated with the cyclic prefix length of the physical random access channel.

In embodiment 3, the configured physical signal may have a cyclic suffix. When the transmission (e.g., sending) of the physical signal with the cyclic suffix, the first N sampling points of a time-domain signal of the physical signal may be transmitted again after the transmission of the time-domain signal of the physical signal, wherein the time-domain signal of the physical signal refers to a signal (e.g., the time-domain signal in FIG. 6) after performing the inverse Fourier transformation and before adding the cyclic suffix on a frequency-domain physical signal (e.g., a frequency sequence of the physical signal).

FIGS. 6 and 7 illustrate timing charts of signal transmission according to an exemplary embodiment of the present disclosure, respectively.

Referring to FIG. 6, a cyclic suffix may be taken from a predetermined number of sampling points of a self-interference physical signal, the time of the sampling points being a front portion of the time of the self-interference physical signal as shown by an one-way arrow. A value of the cyclic suffix $N_{SP}$ may be preset by a system, for example, the value of $N_{SP}$ may be the same as a number of standard sampling points included in a cyclic prefix of the physical signal; or the cyclic suffix $N_{SP}$ may be configured by a high-layer signaling or a physical-layer signaling, wherein the high-layer signaling or physical-layer signaling may be a signaling transmitted by a base station and received by a terminal, or a signaling transmitted by an IAB-Donor and received by an IAB-DU or IAB-MT. When the reception and transmission of a full-duplex apparatus are not synchronous, especially when the reception delay of a preorder OFDM symbol of the full-duplex apparatus (for example, an uplink/downlink receiving symbol whose time is in front among the two uplink/downlink receiving symbols in FIG. 7) is greater than the cyclic prefix length of the configured physical signal, it may be endured, by transmitting the physical signal with the cyclic suffix, that a complete and interference-free time-domain signal of the physical signal may still be acquired in the receiving window of the self-interference physical signal or the like, thereby ensuring the performance of the self-interference channel estimation. As shown in FIG. 7, although the portion of the self-interference physical signal of which time is in front is interfered by a symbol in front of a no transmission symbol, the cyclic suffix may include, depending on the acquisition manner of the cyclic suffix, the interfered portion, so that a complete self-interference physical signal may be acquired.

In embodiment 4, the configured physical signal may have a characteristic of repeatedly transmitting a time-domain signal, that is, the time-domain signal may be transmitted consecutively in time and repeatedly by the same time-domain signal, wherein the time-domain signal refers to a time-domain signal without adding any cyclic prefix, cyclic suffix, guard spacing or the like, which may be a time-domain sequence or also may be a signal on a time-domain which is obtained by performing the inverse Fourier transformation on the frequency-domain sequence. For example, the time-domain signal may be transmitted twice repeatedly and consecutively without a spacing, that is, there may be no structure of the guard spacing, the cyclic prefix, the cyclic suffix, a time-domain zero-padding or the like between the time-domain signals transmitted twice repeatedly.

When the reception and transmission of the full-duplex apparatus are not synchronous, that is, the end location of the received OFDM symbol may have a delay relative to the starting timing of the transmitted physical signal for self-interference channel estimation (e.g., the self-interference physical signal), through transmission (e.g., the transmission of a physical signal with a repetitive time-domain signal), the signal intercepted by a receiving window may be the rear half of a first time-domain signal of the self-interference physical signal and the front half of a second time-domain signal of the self-interference physical signal; and since the first time-domain signal and the second time-domain signal may be repeatedly transmitted time-domain signals, the second time-domain signal may be taken as a cyclic suffix of the first time-domain signal, to ensure that a complete sequence of the self-interference physical signal is intercepted by the reception window, thereby ensuring the performance of the self-interference channel estimation.

FIG. 8 illustrates a timing chart of signal transmission according to an exemplary embodiment of the present disclosure.

Referring to FIG. 8, a self-interference physical signal (that is, a time-domain signal of the self-interference physical signal) may be repeatedly transmitted at least twice, and the complete self-interference physical signal may be guaranteed to be received by repeated transmission.

In embodiment 5, the transmitted signal such as a self-interference physical signal may be transmitted across two or more OFDM symbols. That is, a total time length of a baseband time-domain signal of the transmitted single physical signal may exceed the time length of one OFDM symbol in a frame structure, thereby transmitting the single physical signal on at least two OFDM symbols. For example, the time length of the one OFDM symbol in the frame structure may be the time length of an OFDM symbol in a frame structure defined in the fifth generation (5G) new radio (NR) or the fourth generation (4G) LTE-advance (LTE-A) or the third generation (3G) LTE protocol. Specifically, the total time length of the baseband time-domain signal of the single physical signal may be a total time length containing the time length of the time-domain signal, the cyclic prefix length, the transmitting time offset, the cyclic suffix length, and the repeated transmitted signal of the physical signal (e.g., a self-interference physical signal), wherein the time-domain signal of the physical signal may referred to as the time-domain transformation signal.

FIGS. 9 to 12 illustrate timing charts of signal transmission according to an exemplary embodiment of the present disclosure, respectively.

As shown in FIG. 9, a physical signal transmitted across an OFDM symbol may have an increased cyclic prefix, that is, the cyclic prefix length may be greater than a normal cyclic prefix length or an extended cyclic prefix length configured by the system; and in this case, a time-domain signal of a self-interference physical signal may be transmitted across two OFDM symbols.

As shown in FIG. 10, the transmission of the self-interference physical signal may have a time offset which is greater than 0, such that a time-domain signal of the self-interference physical signal is transmitted across two OFDM symbols.

As shown in FIG. 11, a self-interference physical signal may have a cyclic suffix, such that a time-domain signal of the self-interference physical signal is transmitted across two OFDM symbols.

As shown in FIG. 12, a time-domain signal of the self-interference physical signal may be repeatedly transmitted, so that the time-domain signal of the self-interference physical signal is transmitted across two OFDM symbols, for example, a second time-domain signal may be transmitted on a second OFDM symbol.

According to an exemplary embodiment of the present disclosure, when the transmission of a baseband time-domain signal of a physical signal is completed before an end time boundary of an OFDM symbol, no transmission may be performed, or a zero padding operation may be performed and the padded zero may be transmitted in the remaining portion of the symbol (a modulation symbol of which the power is zero is transmitted), in the remaining portion of the symbol after the completion of the transmission of the baseband time-domain signal of the physical signal and before the end time boundary of the OFDM symbol.

As an example, assuming that a cyclic prefix of the physical signal and a time-domain signal of the physical signal are transmitted on the same OFDM symbol (marked as an OFDM symbol #i), and a cyclic suffix of the physical signal is transmitted on a latter OFDM symbol (marked as the OFDM symbol #(i+1)). When the physical signal is transmitted at a subcarrier spacing configuration μ on an index l of the OFDM symbol and on an antenna port p, the time-domain signal $s_l^{(p,\mu)}(t)$ of the physical signal with respect to the time t may be defined as:

$$s_l^{(p,\mu)}(t) = \sum_{k=0}^{N_{grid}^{size,\mu} N_{sc}^{RB}-1} a_{k,l}^{(p,\mu)} \cdot e^{j2\pi \left(k+k_0^\mu - N_{grid}^{start,\mu} N_{grid}^{size,\mu}/2\right)\Delta f \left(t-N_{CP,l}^\mu t_c - t_{start,l}^\mu\right)}$$

wherein, $a_{k,l}^{(p,\mu)}$ represents a frequency-domain complex value symbol of the physical signal on a subcarrier k of the OFDM symbol l, $e^{j(*)}$ represents a complex exponential function and $j=\sqrt{-1}$, and $N_{grid}^{size,\mu}$ represents a carrier bandwidth, that is, a number of physical resource blocks within the carrier bandwidth under the current subcarrier spacing μ, and $N_{grid}^{start,\mu}$ represents a frequency-domain offset between the lowest available subcarrier within the carrier under the current subcarrier spacing μ and the reference Point A (representing a frequency-domain location of the lowest subcarrier of a common physical resource block #0); $N_{sc}^{RB}$ represents a number of subcarriers within a single physical resource block; $\Delta f = 2^\mu \cdot 15$ represents a subcarrier spacing of the physical signal, the unit thereof is kHz; $t_{start,l}^\mu \leq t < t_{start,l}^\mu + (N_u^\mu + N_{CP,l}^\mu + N_{SP,l}^\mu) \cdot T_c$ is the duration of the time-domain signal of the physical signal on the time-domain; $t_{start,l}^\mu$ represents a starting time when the time-domain signal of the physical signal is transmitted in the time-domain, and a starting time of a time-domain signal of a next physical signal of the physical signal in the time-domain is:

$$t_{start,l+1}^\mu = t_{start,l}^\mu + \lceil (N_u^\mu + N_{CP,l}^\mu + N_{SP,l}^\mu)/N_u^\mu + N_{CP,l}^\mu \rceil \cdot T_c$$

when $t_{start,l}^\mu + (N_u^\mu + N_{CP,l}^\mu + N_{SP,l}^\mu) T_c \leq t < t_{start,l+1}^\mu$, $s_l^{(p,\mu)}(t)=0$, that is, padding zeros behind the cyclic suffix makes the starting timing of the next symbol in the time-domain align with the boundary of the OFDM symbol.

$T_c = 1/(\Delta f_{max} \cdot N_f)$ represents a duration of each sampling unit, $\Delta f_{max} = 480 \cdot 10^3$ Hz and $N_f = 4096$ represents; $\mu_0$ represents the maximum of all subcarrier spacing configurations on the acquired carrier; $N_u^\mu$, $N_{CP,l}^\mu$ and $N_{SP,l}^\mu$ represent a number of sampling points, a cyclic prefix length, and a cyclic suffix length of a time-domain symbol of the physical signal, respectively, wherein, $$N_u^\mu = 2048\kappa \cdot 2^{-\mu}$$

$$N_{CP,l}^\mu = \begin{cases} 512\kappa \cdot 2^{-\mu}, \text{ an extended cyclic prefix} \\ 144\kappa \cdot 2^{-\mu} + 16\kappa, \text{ a normal cyclic prefix}, l = 0 \text{ or } l = 7 \cdot 2^\mu \\ 144\kappa \cdot 2^{-\mu}, \text{ a normal cyclic prefix}, l \neq 0 \text{ or } l \neq 7 \cdot 2^\mu \end{cases}$$

The constant $\kappa = T_s/T_c$, wherein $T_s = 1/(\Delta f_{ref} \cdot N_{f,ref})$, $\Delta f_{ref} = 15 \neq 10^3$ Hz Hz and $N_{f,ref} = 2048$, and $N_{SP,l}^\mu$ is the configured value regardless of the subcarrier spacing.

FIG. 13 illustrates a timing chart of signal transmission according to exemplary embodiments of the present disclosure.

Referring to FIG. 13, in a procedure of transmitting a self-interference physical signal (e.g., transmitting a physical signal with a transmitting time offset), when a baseband time-domain signal of the self-interference physical signal does not end before an end time boundary of a OFDM symbol where the self-interference physical signal is located, and when any physical signal or channel (e.g., a subsequent physical signal) with the same transmission direction as that of the self-interference physical signal continues to be transmitted on a subsequent OFDM symbol of the OFDM symbol where the self-interference physical signal is located, the starting transmitting signal of the subsequent physical signal or channel is truncated according to a transmission time length of the baseband time-domain signal of the self-interference physical signal. In FIG. 13, one portion of a CP of the subsequent physical signal may be truncated (as shown in the slashed portion of the figure).

FIG. 14 illustrates a timing chart of signal transmission according to exemplary embodiments of the present disclosure.

Referring to FIG. 14, in a procedure of transmitting a self-interference physical signal across two OFDM symbols (e.g., transmitting a physical signal with a transmitting time offset), an end location of a baseband time-domain signal transmitting the self-interference physical signal may be taken as a transmitting starting timing of a subsequent physical signal or channel.

FIG. 15 illustrates a timing chart of signal transmission according to exemplary embodiments of the present disclosure.

Referring to FIG. 15, in a procedure of transmitting a self-interference physical signal (e.g., a physical signal with a transmitting time offset) across two OFDM symbols, the latter portion of the self-interference physical signal may be transmitted with overlapping with a header baseband time-domain signal (one portion of a CP) of a subsequent physical signal or channel.

According to an exemplary embodiment of the present disclosure, when the configured physical signal is transmitted, if it is transmitted across two OFDM symbols, the truncation of a physical signal itself may be performed.

FIG. 16 illustrates a timing chart of signal transmission according to an exemplary embodiment of the present disclosure.

Referring to FIG. 16, if the sum of a transmitting time offset length, a CP length, and a time-domain signal length is greater than a time length of one OFDM symbol, then when the physical signal is transmitted, the portion of a baseband time-domain signal of the physical signal beyond an end time boundary of the OFDM symbol may be truncated, referring to the truncated signal shown in FIG. 16.

According to an exemplary embodiment of the present disclosure, a subcarrier spacing of the configured physical signal may be different from a subcarrier spacing of other downlink physical channels or signals received by a terminal transmitted from a base station, or a subcarrier spacing of other uplink physical channels or signals received by the base station and transmitted from the terminal. Preferably, the subcarrier spacing of the physical signal may be greater than the subcarrier spacing of the other downlink physical channels or signals received by the terminal transmitted from the base station, or greater than the subcarrier spacing of the other uplink physical channels or signals received by the base station and transmitted from the terminal.

By increasing the subcarrier spacing of the physical signal, a length of the time-domain symbol of the physical signal may be reduced.

FIG. 17 illustrates a diagram of a physical signal according to an exemplary embodiment of the present disclosure.

Referring to FIG. 17, a horizontal direction may represent a time-domain and a vertical direction may represent a frequency-domain. When a subcarrier spacing is increased from $\Delta f$ to 2 $\Delta f$, a time-domain symbol length may be reduced from $\Delta t$ to 2 $\Delta t$. In this case, the transmission of the physical signal across OFDM symbols may be avoided, especially the across transmitting may be avoid when the physical signal is configured with at least one of a transmitting time offset, a cyclic suffix, a longer cyclic prefix, and a time-domain signal that is repeatedly transmitted, such that the influence of adjacent OFDM symbols may be reduced or avoided. Specifically, a manner of changing the subcarrier spacing of the physical signal may include at least one of being configured according to a system configured value, being configured by a high-layer signaling, and being configured by downlink control information.

According to an exemplary embodiment of the present disclosure, when the configured physical signal has a repetitive time-domain signal, a subcarrier spacing, which is different from a subcarrier spacing of other downlink or uplink physical channels or signals other than the physical signal, may be configured for the physical signal. For example, for a full-duplex base station, the full-duplex base station may transmit the configured physical signal with time-domain signal repetition, without uplink reception on an OFDM symbol transmitting the physical signal (that is, a corresponding symbol is the no transmission symbol), thereby realizing the estimation of a self-interference channel. Assuming that the subcarrier spacing of the physical channel or signal received in the uplink is $\Delta f$, the subcarrier spacing of the physical signal for self-interference channel estimation may be configured as 2 $\Delta f$, such that the physical signal is repeatedly transmitted at a larger subcarrier spacing. In this case, the base station may receive the self-interference physical signal through a receiving window with a shorter length (up to a half of an original length); and when the transmission and reception delay of the full-duplex base station is large, a smaller receiving window may ensure that a received physical signal sequence for self-interference channel estimation is complete and is not interfered by an uplink receiving symbol. On the other hand, by selecting an appropriate subcarrier spacing and cyclic prefix length, the time-domain transmission of the physical signal may be completed in one OFDM symbol, and there may be no influence on the downlink transmission on a subsequent OFDM symbol.

FIG. 18 illustrates a timing chart of signal transmission according to an exemplary embodiment of the present disclosure.

Referring to FIG. 18, a self-interference physical signal may have a delay relative to a no transmission symbol, and a time-domain signal of the self-interference physical signal may be repeatedly transmitted. By increasing a subcarrier spacing of the self-interference physical signal, a length of a time-domain symbol of the self-interference physical signal may be reduced, so that a complete self-interference physical signal may be received through a receiving window falling into the no transmission symbol, and the self-interference physical signal will not affect a transmitting symbol behind the no transmission symbol.

According to an exemplary embodiment of the present disclosure, when a physical signal is configured with a transmitting time offset, a subcarrier spacing of the physical signal may be configured to be greater than a subcarrier spacing of other downlink or uplink physical channels or signals other than the physical signal. For example, for a full-duplex base station, the full-duplex base station may transmit a physical signal with a time offset characteristic, without uplink reception on an OFDM symbol transmitting the physical signal (the OFDM symbol is configured to be the no transmission symbol), thereby realizing the estimation of a self-interference channel. Assuming that the subcarrier spacing of other physical channels or signals through uplink reception and downlink transmission is $\Delta f$, the subcarrier spacing of the physical signal for the self-interference channel estimation may be configured as 2 $\Delta f$. The physical signal may be transmitted at a larger subcarrier spacing, which may halve a time-domain length of the signal. When the transmission and reception delay of the full-duplex base station is large, the physical signal may be transmitted with a delay depending on the configured transmitting time offset, to ensure the reception of the self-interference physical signal. By adopting a physical signal with a short time-domain, it may be ensured that the transmission of the physical signal does not across a boundary of a downlink transmitting symbol in a normal state, and has no influence on a downlink transmission on a subsequent symbol, the symbol herein may be an OFDM symbol.

FIG. 19 illustrates a timing chart of signal transmission according to an exemplary embodiment of the present disclosure.

Referring to FIG. 19, in a transmitting direction, a symbol of a self-interference physical signal and a downlink transmitting symbol may be transmitted in sequence; in a receiving direction, an uplink receiving symbol, a self-interference physical signal, and an uplink receiving symbol may be received in sequence. According to a full-duplex transmission and reception delay, there may be a certain delay between the uplink receiving symbol and a boundary of a corresponding OFDM symbol, and according to a transmitting time offset, there may be a certain offset between the self-interference physical signal and the boundary of the corresponding OFDM symbol. A subcarrier spacing of the uplink transmitting symbol may be $\Delta f$, and a subcarrier spacing of the self-interference physical signal may be $2 \Delta f$, thereby reducing a symbol length of the self-interference physical signal, and ensuring that the self-interference physical signal is transmitted within one OFDM symbol, and has no influence on the transmission of an uplink transmitting signal or an uplink receiving signal.

According to another exemplary embodiment of the present disclosure, at least one muting OFDM symbol (referred to as a muting symbol for short) may be configured in another transmission direction different from a transmission direction of a physical signal; or the at least one muting OFDM symbol may be configured in the same transmission node as that of the physical signal, in a different link from that of the physical signal, and in the same transmission direction as that of the physical signal (a direction different from the transmission direction of the physical signal, or in the same direction as the transmission direction of the physical signal but on another link different from the link (the link is used for the transmission of the physical signal) of the transmission node of the physical signal, may be referred to as a specific direction or a specific transmission direction), wherein the transmission direction may be uplink or downlink; the different link of the same transmission node may include, but may not be limited to, an upper level link and a lower level link of an IAB node. The meaning of the muting OFDM symbol (or no transmission symbol) may include that after a terminal acquires an indication for configuring a specific OFDM symbol in a specific transmission direction as the muting symbol, no transmission of the specific transmission direction may be performed on the specific OFDM symbol; for example, if the specific transmission direction is downlink, the terminal may not perform downlink reception on a configured muting downlink OFDM symbol, and if the specific transmission direction is uplink, the terminal may not perform uplink transmission on a configured muting uplink OFDM symbol; and the physical signal may be a physical signal in an exemplary embodiment of the present disclosure, an existing physical signal, or any physical channel (e.g., an uplink shared channel, a downlink shared channel or the like). The present exemplary embodiment may ensure that the physical signal is not interfered by a receiving signal in another transmission direction when the physical signal is used for the self-interference channel estimation by configuring an appropriate muting OFDM symbol.

According to an exemplary embodiment of the present disclosure, when a physical signal is transmitted on N consecutive OFDM symbols (N is a positive integer and N≥1), a number of the configured muting OFDM symbols may be greater than N and is recorded as N+N' (N' is a positive integer and N'≥1), and indices of the configured N+N' muting OFDM symbols may contain at least indices of N OFDM symbols for transmission of the physical signal. Further, in the configured muting OFDM symbols, for the muting OFDM symbols whose indices are different from that of the N OFDM symbols of the physical signal, the number N' and/or a relative location relationship between the indices thereof and the indices of the OFDM symbols of the physical signal may be fixed by a value written in specification or acquired by a terminal according to a high-layer signaling/physical-layer signaling configuration, and/or the relative location relationship may include at least one of the followings: N' consecutive OFDM symbols are configured in front of the OFDM symbol with the lowest index of the OFDM symbols for the physical signal transmission, that is, the indices of the configured N+N' muting OFDM symbols is $\{i_{RS,1}-N', \ldots, i_{RS,1}-1, i_{RS,1}, \ldots, i_{RS,N}\}$, $i_{RS,k}$ represents an index value of the k-th OFDM symbol in the OFDM symbols of the physical signal; there are N' consecutive OFDM symbols behind an OFDM symbol with the largest index of the OFDM symbols for the physical signal transmission, that is, the indices of the configured N+N' muting OFDM symbols is $\{i_{RS,1}, \ldots, i_{RS,N}, i_{RS,N}+1, \ldots, i_{RS,N}+N'\}$, $i_{RS,k}$ represents an index value of the k-th OFDM symbol in the OFDM symbols of the physical signal; $N'_1$ consecutive symbols are configured in front of an OFDM symbol with the lowest index of the OFDM symbols for the physical signal transmission, and consecutive symbols are configured behind the OFDM symbol with the largest index of the OFDM symbols for the physical signal transmission, and $N'_1+N'_2=N'$ (the values of $N'_1$ and $N'_2$ may be fixed by the value written in specification, acquired by the terminal according to the high-layer signaling or physical-layer signaling configuration or acquired by the terminal according to the configuration value of N', for example, $N'_1=N'_2=N'/2$), that is, the indices of configured N+N' muting OFDM symbols are $\{i_{RS,1}-N'_1, \ldots i_{RS,1}-1, i_{RS,1}, \ldots, i_{RS,N}+1, \ldots, i_{RS,N}+N'_2\}$, $i_{RS,k}$ represents the index value of the k-th OFDM symbol in the OFDM symbols of the physical signal. The above three designs of the relative location relationship between the muting OFDM symbols and the OFDM symbols of the physical signal may ensure that when the transmitting time of the full-duplex apparatus and the receiving time of full-duplex apparatus are non-synchronous, a time length of silence may cover a time length of the physical signal transmission, so that the physical signal is not interfered by the receiving signal when used for the self-interference channel estimation, and for example, the muting OFDM symbols in the first design may include several consecutive OFDM symbols in front of the symbol with the lowest index in the OFDM symbols of the physical signal, which may be used in the scene where the sending time of the full-duplex apparatus is earlier than the receiving time, and several OFDM symbols should be silenced in advance at this time, as shown in FIG. 20; the muting OFDM symbol in the second design include several consecutive OFDM symbols behind the symbol with the largest index in the OFDM symbols of the physical signal, which may be used in the scene where the receiving time of the full-duplex apparatus is earlier than the sending time, and at this time several OFDM symbols should be silenced with a delay, as shown in FIG. 21; the muting OFDM symbols in the third design may include not only several consecutive OFDM symbols in front of the symbol with the lowest index in the OFDM symbols of the physical signal but also several consecutive OFDM symbols behind the symbol with the largest index in the OFDM symbols of the physical signal, which may be used in the scene where the receiving time of the full-duplex apparatus may be earlier or later than the sending time, as shown in FIG. 22. Preferably, the number of the muting OFDM symbols configured in the above method may be N+1, that is, $N'=1$.

According to an exemplary embodiment of the present disclosure, a terminal may be provided, the terminal may include a signal configuration acquisition unit acquiring a configuration of a physical signal, a signal transmission unit transmitting the physical signal according to the acquired configuration, wherein the acquired configuration of the physical signal includes at least one of: a cyclic prefix length, a transmitting time offset, a cyclic suffix length, a subcarrier spacing, and a configuration for at least one portion of the physical signal being repeatedly transmitted.

As an example, the physical signal may be an uplink or downlink physical signal, and may include at least one of: a reference signal for self-interference channel estimation, a demodulation reference signal (DMRS), a cell-specific reference signal (CRS), a channel state information reference signal (CSI-RS), a synchronization signal, a sounding reference signal (SRS), and a phase-tracking reference signal (PTRS), and/or the cyclic prefix length may be greater or less than another cyclic prefix length, and the other cyclic prefix length may include one of: a cyclic prefix length configured by a system information, an extended cyclic prefix length, a cyclic prefix length of the synchronization signal, and a cyclic prefix length of a physical random access channel. For any possible subcarrier spacing configuration of the physical signal, the cyclic prefix length may be configured as a same value, or the cyclic prefix length may be a length obtained by adding a fixed configuration value to a cyclic prefix configured by the system information or to an extended cyclic prefix, wherein the same or the added configuration value may be configured by one of: a value written in specification, a high-layer signaling, and an uplink or downlink control information. A time length of a baseband time-domain signal of the physical signal may be greater than the time length of an orthogonal frequency division multiplexing (OFDM) symbol, wherein the baseband time-domain signal may contain the cyclic prefix and a time-domain signal, and the time-domain signal may refer to a signal obtained after performing a Fourier transformation on a frequency-domain sequence of the physical signal. The transmitting time offset may include a time offset of a starting time, at which the baseband time-domain signal of the physical signal is transmitted in a time-domain, with respect to a starting time boundary of a downlink OFDM symbol. The transmitting time offset may have a positive value, a negative value, or zero, and may be configured by one of: the high-layer signaling, and the uplink or downlink control information. The transmitting time offset may be associated with at least one of: a cell radius, a distance between integrated access and backhaul (IAB) nodes, and the cyclic prefix length of the physical random access channel. A cyclic suffix of the physical signal may include first several sampling points of the time-domain signal obtained after performing the Fourier transformation on the frequency-domain sequence of the physical signal and a number of the sampling points may be one of: a number of sampling points corresponding to the cyclic prefix length of the physical signal, a value configured by the high-layer signaling, and a value configured by a physical-layer signal. The subcarrier spacing may be greater or less than another subcarrier spacing, the other subcarrier spacing may include a subcarrier spacing of a downlink physical channel or the signal transmitted from a base station to a terminal, the downlink physical channel or signal being different from the physical signal, or include a subcarrier spacing of an uplink physical channel or signal transmitted from the terminal to the base station, the uplink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols may be larger than or equal to the number of the OFDM symbols of the physical signal, and no transmission on the muting OFDM symbol in the uplink or downlink direction shall be performed.

As an example, the cyclic prefix length configured by the system information or the added configuration value may be associated with at least one of: a cell radius, a distance between the IAB nodes, and the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is later than the starting time boundary of the downlink OFDM symbol, the transmitting time offset may have the positive value, wherein the downlink OFDM symbol is the OFDM symbol to transmit the downlink physical signal. When the physical signal is transmitted, there may be no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset may be not configured with the cyclic prefix. The subcarrier spacing of the physical signal configured with the transmitting time offset may be greater than the subcarrier spacing of other uplink or downlink physical channels or other uplink or downlink physical signals different from the physical signal. The cyclic suffix length of the physical signal configured with the transmitting time offset may be not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols may be configured, and an index of the N+N' configured muting OFDM symbols may include an index of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols may depend on specification or may be configured by the high-layer signaling or the physical-layer signaling. The relative location relationship may include at least one of: the N' indices less than any of the N indices; the N' indices larger than any of the N indices; and a portion of the N' indices less than any of the N indices and another portion of the N' indices larger than any of the N indices.

As an example, the signal transmission unit may transmit the physical signal, wherein the transmitted physical signal may include one time-domain signal or a plurality of consecutive repetitions of time-domain signals, and the time-domain signal may refer to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, the signal transmission unit may perform at least one of: starting truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM symbol of the at least two OFDM symbols, at least one portion of the physical signal without a cyclic prefix, which is not transmitted on the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted on the former OFDM symbol from among the at least two OFDM symbols, truncating symbol(s) of the physical signal on the later OFDM symbol which are overlapped with the portion not transmitted on the former OFDM symbol; and when transmitting the physical signal across at least two OFDM symbols, on the later OFDM symbol of the at least two OFDM symbols, transmitting, after a transmission completion time of the physical signal, another physical signal different from the physical signal.

As an example, the physical signal may have no cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

According to an exemplary embodiment of the present disclosure, a base station is provided, the base station may include a signal configuration unit configuring a physical signal, a signal transmission unit, transmitting the configured physical signal, wherein a configuration of the physical signal includes at least one of: a cyclic prefix length, a transmitting time offset, a cyclic suffix length, a subcarrier spacing, and a configuration for at least one portion of the physical signal being repeatedly transmitted.

As an example, the physical signal may be an uplink or downlink physical signal, and may include at least one of: a reference signal for self-interference channel estimation, a demodulation reference signal (DMRS), a cell-specific reference signal (CRS), a channel state information reference signal (CSI-RS), a synchronization signal, a sounding reference signal (SRS), and a phase-tracking reference signal (PTRS). The cyclic prefix length may be greater or less than another cyclic prefix length, and the other cyclic prefix length may include one of: a cyclic prefix length configured by a system information, an extended cyclic prefix length, a cyclic prefix length of the synchronization signal, and a cyclic prefix length of a physical random access channel For any possible subcarrier spacing configuration of the physical signal, the cyclic prefix length may be configured as a same value, or the cyclic prefix length may be a length obtained by adding a fixed configuration value to a cyclic prefix configured by the system information or to an extended cyclic prefix, wherein the same or the added configuration value may be configured by one of: a value written in specification, a high-layer signaling, and an uplink or downlink control information. A time length of a baseband time-domain signal of the physical signal may be greater than the time length of an orthogonal frequency division multiplexing (OFDM) symbol, wherein the baseband time-domain signal contains the cyclic prefix and a time-domain signal, and the time-domain signal refers to a signal obtained after performing a Fourier transformation on a frequency-domain sequence of the physical signal. The transmitting time offset may include a time offset of a starting time, at which the baseband time-domain signal of the physical signal is transmitted in a time-domain, with respect to a starting time boundary of a downlink OFDM symbol. The transmitting time offset may have a positive value, a negative value, or zero, and may be configured by one of: the high-layer signaling, and the uplink or downlink control information. The transmitting time offset may be associated with at least one of: a cell radius, a distance between integrated access and backhaul (IAB) nodes, and the cyclic prefix length of the physical random access channel. A cyclic suffix of the physical signal may include first several sampling points of the time-domain signal obtained after performing the Fourier transformation on the frequency-domain sequence of the physical signal and a number of the sampling points may be one of: a number of sampling points corresponding to the cyclic prefix length of the physical signal, a value configured by the high-layer signaling, and a value configured by a physical-layer signal. The subcarrier spacing may be greater or less than another subcarrier spacing, the other subcarrier spacing may include a subcarrier spacing of a downlink physical channel or the signal transmitted from a base station to a terminal, the downlink physical channel or signal being different from the physical signal, or may include a subcarrier spacing of an uplink physical channel or signal transmitted from the terminal to the base station, the uplink physical channel or signal being different from the physical signal. The repeatedly transmitted portion of the physical signal may include the time-domain signal obtained after performing the Fourier transformation on the frequency-domain sequence of the physical signal. A number of muting OFDM symbols may be configured in uplink or downlink direction, wherein the number of the muting OFDM symbols is larger than or equal to the number of the OFDM symbols of the physical signal, and no transmission on the muting OFDM symbol in the uplink or downlink direction shall be performed.

As an example, the cyclic prefix length configured by the system information or the added configuration value may be associated with at least one of: a cell radius, a distance between the IAB nodes, and the cyclic prefix length of the physical random access channel. For the uplink physical signal for the self-interference channel estimation transmitted by a full-duplex terminal, when the uplink physical signal is transmitted by taking the starting time boundary of the downlink OFDM symbol corresponding to the uplink physical signal as a starting time, the transmitting time offset may be zero. For the downlink physical signal for the self-interference channel estimation transmitted by a full-duplex base station, when a transmitting time of the downlink physical signal is later than the starting time boundary of the downlink OFDM symbol, the transmitting time offset may have the positive value, wherein the downlink OFDM symbol is the OFDM symbol to transmit the downlink physical signal. When the physical signal is transmitted, there may be no transmission in a receiving direction on the OFDM symbol(s) corresponding to the physical signal. When the physical signal is received, there may be no transmission in a transmitting direction on the OFDM symbol(s) corresponding to the physical signal. The uplink direction or the downlink direction may refer to a direction different from a transmission direction of the physical signal, or the uplink direction or the downlink direction may refer to a direction identical to the transmission direction of the physical signal on another link, the other link being a link different from the link of the transmission node to transmit the physical signal but still being a link of the transmission node. The physical signal configured with the transmitting time offset may be not configured with the cyclic prefix. The subcarrier spacing of the physical signal configured with the transmitting time offset may be greater than the subcarrier spacing of other uplink or downlink physical channels or other uplink or downlink physical signals different from the physical signal. The cyclic suffix length of the physical signal configured with the transmitting time offset may be not determined by the subcarrier spacing of the physical signal, or the subcarrier spacing of other physical channels or other physical signals different from the physical signal. When the physical signal is configured with the transmitting time offset or the at least one portion of the physical signal is configured to be transmitted repeatedly, the subcarrier spacing of the physical signal may be configured to be greater than the subcarrier spacing of other uplink or downlink physical channels or other uplink or downlink physical signals different from the physical signal. When the physical signal is configured with the transmitting time offset or the at least one portion of the physical signal is configured to be transmitted repeatedly, the cyclic prefix length of the physical signal may be configured to be 0. When the physical signal is transmitted on N consecutive OFDM symbols, N+N' muting OFDM symbols may be configured, and an index of the N+N' configured muting OFDM symbols may include an index of the N OFDM symbols, wherein N or N' is a positive integer greater than or equal to 1, and for N' indices of the muting OFDM symbols which are different from the indices of the N consecutive OFDM symbols, a value of N' or a relative relationship between the N' indices and N indices of the N consecutive OFDM symbols depends on specification or is configured by the high-layer signaling or the physical-layer signaling. The relative location relationship may include at least one of: the N' indices less than any of the N indices; the N' indices larger than any of the N indices; and a portion of the N' indices less than any of the N indices and another portion of the N' indices larger than any of the N indices.

As an example, the signal transmission unit may transmit the physical signal, wherein the transmitted physical signal includes one time-domain signal or a plurality of consecutive repetitions of time-domain signals, and the time-domain signal refers to the signal obtained after performing the Fourier transformation on the frequency-domain sequence of the physical signal. When the baseband time-domain signal of the physical signal is transmitted across at least two OFDM symbols, and the baseband time-domain signal includes the one time-domain signal of the physical signal or includes the plurality of repetitions of time-domain signals of the physical signal, the signal transmission unit or a transceiver may perform at least one of: starting truncating the physical signal after an end time boundary of a first OFDM symbol in the at least two OFDM symbols; after completing the transmission of the baseband time-domain signal of the physical signal, not transmitting the symbol or transmitting a modulation symbol of which a power is zero until the end of the last OFDM symbol of the physical signal; after completing the transmission of the cyclic prefix and the time-domain signal of the physical signal, transmitting the cyclic suffix of the physical signal in an OFDM symbol subsequent to the OFDM symbol which transmits the cyclic prefix and the time-domain signal of the physical signal; when transmitting the physical signal across at least two OFDM symbols, transmitting, on the later OFDM symbol of the at least two OFDM symbols, at least one portion of the physical signal without a cyclic prefix, which is not transmitted on the former OFDM symbol(s) of the at least two OFDM symbols; when transmitting the physical signal across at least two OFDM symbols, and transmitting, on the later OFDM symbol of the at least two OFDM symbols, a portion of the physical signal which is not transmitted on the former OFDM symbol(s) of the at least two OFDM symbols, truncating symbol(s) of the physical signal on the later OFDM symbol which are overlapped with the portion not transmitted on the former OFDM symbol; and when transmitting the physical signal across at least two OFDM symbols, on the later OFDM symbol of the at least two OFDM symbols, transmitting, after a transmission completion time of the physical signal, another physical signal different from the physical signal.

As an example, the physical signal may have no cyclic prefix, and/or the physical signal may have the cyclic suffix, and/or the physical signal may include a plurality of repetitions of identical time-domain signals or sequences, and there may be no time-domain spacing between the repeated time-domain signals or sequences, and/or the physical signal may have the transmitting time offset.

According to an exemplary embodiment of the present disclosure, a physical signal is provided, the configuration of the physical signal may include at least one of: a cyclic prefix length, a transmitting time offset, a cyclic suffix length, a subcarrier spacing, and a configuration for at least one portion of the physical signal being repeatedly transmitted. The configuration of the physical signal may be understood with reference to the above description and will not be repeated here.

According to an exemplary embodiment of the present disclosure, a computer readable storage medium storing an instruction is provided, the instruction when executed by at least one computing device causes the at least one computer device to perform the transmission method described above.

The embodiments according to the present disclosure is described above, the features in the various embodiments may be combined without departing from the protection scope of the present disclosure, and these combinations will also fall within the protection scope of the present disclosure.

A computer readable storage medium is an arbitrary data storage device that may store data read by a computer system. An example of the computer readable storage medium includes a read-only memory, a random access memory, a read-only optical disc, a magnetic tape, a floppy disk, a optical data storage device, and a carrier (such as data transmission through the Internet via a wired or wireless transmission path).

In addition, it should be understood that each unit of the terminal and the base station according to the exemplary embodiment of the present disclosure may be implemented as a hardware component and/or software component. Those skilled in the art may, for example, use a field programmable gate array (FPGA) or an application specific integrated circuit (ASIC) to implement each unit according to the processing performed by each defined unit.

In addition, the method according to the exemplary embodiment of the present disclosure may be implemented as computer code in a computer readable storage medium. Those skilled in the art may implement the computer code according to the description of the above method. The method of the present disclosure is realized when the computer code is executed in the computer.

The operation of the terminal according to various embodiments of the disclosure is described below with reference to FIGS. 23 to 28.

FIG. 23 illustrates a flowchart of operations of a terminal according to an exemplary embodiment of the present disclosure.

Referring to FIG. 23, operations of a terminal according to at least one embodiment of the disclosure may include steps S2300, S2310, S2320, and S2330. The terminal may correspond to a UE (user equipment).

In step S2300, the terminal may receive first configuration information, and determine a measurement time-frequency resource for residual self-interference measurement based on the first configuration information.

In some embodiments, the first configuration information may be received from a base station to determine the measurement time-frequency resource for the residual self-interference measurement.

In some embodiments, the received first configuration information may be used to configure the measurement time-frequency resource and/or measurement reference signal(s) for the residual self-interference measurement.

In some embodiments, the first configuration information may include first indication information indicating the measurement time-frequency resource (which may be referred to as "downlink measurement time-frequency resource") on a downlink channel for the residual self-interference measurement. For example, the measurement time-frequency resource may be a time-frequency resource with zero power (i.e. empty time-frequency resource), where the terminal may assume that the base station does not transmit a signal on the time-frequency resource with zero power. For example, the measurement time-frequency resource may be one or more symbols, one or more physical resource elements (REs), or one or more physical resource blocks (PRBs).

For example, the first indication information may include information indicating a time-frequency resource position of the measurement time-frequency resource. For example, the time-frequency resource position may be one or more of a frequency-domain physical resource block index, a time-domain symbol index, and a physical resource element index of the measurement time-frequency resource.

For example, the first indication information may include information indicating offset information associated with the measurement time-frequency resource of a set of measurement time-frequency resources used for the residual self-interference measurement. For example, the offset information may include one or more of a symbol offset, a physical resource element offset, a physical resource block offset, and the like. In this case, based on the offset information indicated by the first configuration information and the position of the set of measurement time-frequency resources determined according to a predetermined method, the measurement time-frequency resource for the residual self-interference measurement may be determined.

For example, in a case where the terminal is configured with a Zero Power-Channel State Information-Reference Signal (ZP-CSI-RS) resource, the first indication information may include an index or index sets of ZP-CSI-RS indicating the position of the ZP-CSI-RS resource for the residual self-interference measurement. That is, in this case, the ZP-CSI-RS resource used for the residual self-interference measurement may be used as the measurement time-frequency resource.

In one embodiment, the first configuration information may include second indication information indicating the measurement time-frequency resource (which may be referred to as "uplink measurement time-frequency resource") on an uplink channel for the residual self-interference measurement.

For example, the second indication information may include information indicating the time-frequency resource position of the measurement time-frequency resource. For example, the time-frequency resource position may be one or more of a frequency-domain physical resource block index, a time-domain symbol index, and a physical resource element index of the measurement time-frequency resource.

For example, the second indication information may include information indicating offset information associated with the measurement time-frequency resource of a set of measurement time-frequency resources used for the residual self-interference measurement. For example, the offset information may include one or more of a symbol offset, a physical resource element offset, a physical resource block offset, and the like. In this case, based on the offset information indicated by the second indication information and the position of the set of measurement time-frequency resources determined according to a predetermined method, the measurement time-frequency resource for the residual self-interference measurement may be determined.

For example, the uplink measurement time-frequency resource and the uplink sounding reference signal time-frequency resource may overlap with each other. In this case, the second indication information may include information indicating index of time-frequency resource or index of time-frequency resource group of the uplink sounding reference signal.

In some embodiments, for the terminals operating in different duplex modes, the first configuration information may be configuration information configured by the base station in a uniform configuration mode, so that the configuration signaling design can be simplified.

In some embodiments, for terminals operating in different duplex modes, the first configuration information may be configured by the base station in different configuration modes to optimize operations.

For example, in a case where the current duplex mode of the terminal is a full-duplex mode, the first configuration information may include information indicating the measurement time-frequency resource on the downlink channel for the residual self-interference measurement. In this case, the terminal can assume that the base station does not transmit any data and/or signaling on the downlink measurement time-frequency resource, and because the uplink time-frequency resource and the downlink time-frequency resource, configured for the terminal in a case where the current duplex mode of the terminal is the full-duplex mode, overlap with each other, the terminal can perform the residual self-interference measurement on the configured downlink measurement time-frequency resource.

For example, in a case where the current duplex mode of the terminal is a half-duplex mode, the first configuration information may include information indicating the measurement time-frequency resource on the uplink channel for the residual self-interference measurement.

In some embodiments, the first configuration information may further include information indicating a periodic measurement time-frequency resource. For example, the first configuration information may further include a period of the periodic measurement time-frequency resource. In this case, the terminal may determine the measurement time-frequency resource allocated to the terminal, based on the first indication information or the second indication information, and the period of the periodic measurement time-frequency resource.

In some embodiments, the first configuration information may be transmitted by the base station in response to a residual self-interference measurement request transmitted by the terminal. For example, the terminal may transmit an aperiodic residual self-interference measurement request outside the periodically configured measurement time-frequency resource, and the base station may transmit the first configuration information in response to the residual self-interference measurement request. For example, the terminal may transmit an aperiodic residual self-interference measurement through an uplink control channel, an uplink shared channel, or a random access procedure. In this case, the measurement time-frequency resource indicated by the first configuration information may be not periodic, and may be only used for aperiodic measurement of the terminal. In addition, the first configuration information may further include information indicating a feedback time-frequency resource for the terminal to feedback a result of the residual self-interference measurement.

Some embodiments of the first configuration information configured by the base station are described above. For various embodiments of the first configuration information configured by the base station, reference may be made to operations of the base station described below with reference to FIGS. 29 to 31.

In step S2310, the terminal may perform the residual self-interference measurement on the measurement time-frequency resource to obtain a measurement result.

For example, the residual self-interference measurement in the embodiments of the disclosure may refer to at least one of measuring strength of the residual self-interference and measuring a signal-to-noise-plus-interference ratio (SINR) considering the residual self-interference. In some embodiments, step S2310 may include at least one of measuring the strength of the residual self-interference and measuring the signal-to-interference-and-noise ratio of the residual self-interference.

In some embodiments, the method of residual self-interference measurement may be different according to the type of the first configuration information and/or the current duplex mode of the terminal. For example, depending on whether the first configuration information is configured on the downlink channel or the uplink channel, different methods of residual self-interference measurement may be used. For example, depending on whether the current duplex mode of the terminal is the full-duplex mode or the half-duplex mode, different methods of residual self-interference measurement may be used. For example, regardless of whether the current duplex mode of the terminal is the full-duplex mode or the half-duplex mode, the same residual self-interference measurement method may be used.

In some embodiments, in a case where the first configuration information includes first indication information indicating the measurement time-frequency resource on the downlink channel for the residual self-interference measurement (that is, in a case where the first configuration information is configured on the downlink channel), the method for the residual self-interference measurement may include: in a case where the current duplex mode of the terminal is the full-duplex mode, directly measuring the strength of the received signal on the measurement time-frequency resource; and in a case where the current duplex mode of the terminal is the half-duplex mode, transmitting an uplink signal on the measurement time-frequency resource to perform the residual self-interference measurement. For ease of description, the measurement time-frequency resource configured on the downlink channel may be referred to as downlink measurement time-frequency resource. Such method for the residual self-interference measurement will be exemplarily described below.

For example, in a case where the current duplex mode of the terminal is the full-duplex mode, the strength of the received signal may be directly measured on the measurement time-frequency resource. For the terminal operating in the full-duplex mode, the terminal may simultaneously transmit and receive data on the same time-frequency resource, that is, the uplink channel and the downlink channel of the terminal may overlap. In this case, after determining the position of the measurement time-frequency resource, the strength of the received signal on the measurement time-frequency resource can be directly measured. Since the base station does not transmit any signals on the measurement time-frequency resource, the measurement time-frequency resource may be referred to as a time-frequency resource with zero power (i.e. empty time-frequency resource). Because the terminal performs the measurement on the time-frequency resource with zero power, the received signal may include only residual self-interference and noise, so the strength of the residual self-interference can be determined according to the strength of the received signal. Therefore, the strength of the received signal measured by the terminal may include the strength of residual self-interference, inter-cell interference, and noise. Accordingly, the base station can use the strength of the received signal to determine the strength of the residual self-interference, thereby determining whether the terminal can continue to operate in the full-duplex mode.

For example, in a case where the current duplex mode of the terminal is the half-duplex mode, a first signal may be transmitted on the measurement time-frequency resource to perform the residual self-interference measurement. For the terminal operating in the half-duplex mode, the terminal may transmit and receive data on different time-frequency resource, that is, the time-frequency resources of the uplink channel and the downlink channel of the terminal may not overlap. After the terminal obtains the measurement time-frequency resource on the downlink channel for the residual self-interference measurement configured by the base station, the terminal may transmit a first signal on the corresponding downlink measurement time-frequency resource to measure the residual self-interference after the self-interference cancellation. An example of such a residual self-interference measurement method is described below with reference to FIG. 24.

FIG. 24 illustrates a schematic diagram of residual self-interference measurement in a case where a current duplex mode of a terminal is FDD according to an exemplary embodiment of the present disclosure.

Referring to FIG. 24, in a case where the current duplex mode of the terminal is FDD, the uplink channel and the downlink channel may be transmitted on different frequency resources. For the measurement time-frequency resource configured on the downlink channel, the terminal needs to transmit a first signal thereon. The content of the first signal may be determined by the terminal, or may be a known sequence such as a reference signal generated based on the content such as the terminal identity (ID).

FIG. 25 illustrates a timing diagram of transmitting a first signal on a measurement time-frequency resource according to an exemplary embodiment of the present disclosure.

Referring to FIG. 25, in a case where the first signal is transmitted on the measurement time-frequency resource, a downlink reference timing may be used instead of a timing advance configured by a base station. In other words, in a case where the terminal transmits uplink data and signals on the uplink channel, the terminal may transmit uplink data and signals according to the timing advance configured by the base station, and in a case where the terminal transmits the first signal on the measurement time-frequency resource of the downlink channel, the terminal may transmit the first signal according to the downlink reference timing, so as to avoid interference of the first signal on the uplink data and signals transmitted by the uplink channel. In addition, in order to reduce the interference of the first signal transmitted on the measurement time-frequency resource on other terminals, the maximum transmission power for transmitting the first signal may be limited. For example, the maximum transmission power for transmitting the first signal may be configured by the base station in a downlink control channel or system information. Alternatively, the maximum transmission power for transmitting the first signal may be determined by a preset method.

In some embodiments, in a case where the first configuration information includes second indication information indicating the measurement time-frequency resource on the uplink channel for the residual self-interference measurement (that is, in a case where the measurement time-frequency resource is configured on the uplink channel), the method for the residual self-interference measurement may include: in a case where the current duplex mode of the terminal is the full-duplex mode, performing the residual self-interference measurement on the measurement time-frequency resource or the downlink time-frequency resource corresponding to the measurement time-frequency resource; and in a case where the current duplex mode of the terminal is the half-duplex mode, performing self-interference cancellation on the measurement time-frequency resource to perform the residual self-interference measurement. For ease of description, the measurement time-frequency resource configured on the uplink channel may be referred to as uplink measurement time-frequency resource. Such method for the residual self-interference measurement will be exemplarily described below.

For example, in a case where the current duplex mode of the terminal is the full-duplex mode, residual self-interference measurement may be performed on the measurement time-frequency resource or the downlink time-frequency resource corresponding to the measurement time-frequency resource. For example, in a case where the current duplex mode of the terminal is the full-duplex mode, residual self-interference measurement may be performed on the measurement time-frequency resource. For the terminal operating in the full-duplex mode, after obtaining the configuration of uplink measurement time-frequency resource, the position of the measurement time-frequency resource can be determined, and residual self-interference measurement can be performed on the determined measurement time-frequency resource. Alternatively, since the uplink time-frequency resource and the downlink time-frequency resource allocated to the terminal in the full-duplex mode overlap each other, residual self-interference measurement may be performed on the downlink time-frequency resource corresponding to the measurement time-frequency resource. In some embodiments, whether to perform the residual self-interference measurement on the measurement time-frequency resource or on the downlink time-frequency resource corresponding to the measurement time-frequency resource may be determined based on whether the terminal can obtain the corresponding downlink time-frequency resource position from the uplink time-frequency resource position. For example, in a case where the terminal can obtain the corresponding downlink time-frequency resource position through the uplink time-frequency resource index (that is, the uplink/downlink time-frequency resource indexes are uniform), the terminal may determine that the base station does not transmit a signal on the downlink time-frequency resource corresponding to the uplink measurement time-frequency resource, and therefore the terminal may perform the residual self-interference measurement on the downlink time-frequency resource corresponding to the uplink measurement time-frequency resource. For example, in a case where the terminal cannot obtain the corresponding downlink time-frequency resource position through the uplink time-frequency resource index, the terminal can obtain the position of the downlink time-frequency resource configured as a time-frequency resource with zero power according to other configuration information of the base station, and can perform the residual self-interference measurement on the uplink measurement time-frequency resource. In some embodiments, the downlink time-frequency resource corresponding to the uplink measurement time-frequency resource may be configured by the base station as the time-frequency resource with zero power, that is, the base station may not transmit a signal on the downlink time-frequency resource corresponding to the uplink measurement time-frequency resource. Thereby, the result of the residual self-interference measurement can be prevented from being interfered by the downlink received signal.

For example, in a case where the current duplex mode of the terminal is the half-duplex mode, self-interference cancellation may be performed on the measurement time-frequency resource to perform the residual self-interference measurement.

FIG. 26 illustrates a schematic diagram of residual self-interference measurement of a terminal whose current duplex mode is FDD according to an exemplary embodiment of the present disclosure.

Referring to FIG. 26, in a case where the current duplex mode of the terminal is FDD, the uplink channel and the downlink channel may be transmitted on different frequency resources. In this case, self-interference cancellation may be performed on the uplink measurement time-frequency resource configured by the base station, and the residual self-interference measurement may be performed on the uplink measurement time-frequency.

A method of SINR measurement in step S2310 according to various embodiments of the disclosure will be described below.

In a case where the current duplex mode of the terminal is the full-duplex mode, the downlink measurement time-frequency resource may include two parts, where the first part is used to measure the sum of residual self-interference and noise power, and the second part is used to measure the sum of interference and noise power without the residual self-interference.

FIG. 27 illustrates a schematic diagram of measurement time-frequency resource used to measure SINR considering residual self-interference and SINR without considering residual self-interference according to an exemplary embodiment of the present disclosure.

Referring to FIG. 27, the uplink time-frequency resource corresponding to the measurement time-frequency resource of the first part is not configured as a time-frequency resource with zero power, and the uplink time-frequency resource corresponding to the measurement time-frequency resource of the second part is configured as a time-frequency resource with zero power. The received power of the downlink received signal, that is, the sum $I_1$ of the residual self-interference and the noise power, may be measured on the measurement time-frequency resource of the first part, and $I_1$=SI+N, where SI represents the stregth of the residual self-interference and N represents the noise power. The sum $I_2$ of the interference and noise power without residual self-interference may be measured on the measurement time-frequency resource of the second part, and $I_2$=I+N, where $I_2$ represents the power of other interferences without residual self-interference. In this case, the SINR considering residual self-interference can be calculated as $SINR_1$=S/$I_1$, and the SINR without considering residual self-interference can be calculated as $SINR_2$=S/$I_2$ where S is the power of the received signal obtained through the downlink channel measurement.

In a case where the current duplex mode of the terminal may be the half-duplex mode, SINR without considering residual self-interference can be measured on the downlink channel, the downlink received power may be measured on the downlink channel, and the sum of residual self-interference and noise power may be measured on the measurement time-frequency resource configured by the base station. According to the downlink received power and the sum of the residual self-interference and noise power, the SINR considering the residual self-interference can be calculated.

In step S2320, the terminal may transmit feedback information determined according to the measurement result.

In some embodiments, in step S2320, the terminal may feed back the feedback information determined according to the measurement result to the base station.

In some embodiments, in step S2320, the terminal may feed back at least one of the strength of the residual self-interference, the SINR considering the residual self-interference, and the SINR without considering the residual self-interference. For example, the terminal may determine at least one of the strength of the residual self-interference, the SINR considering the residual self-interference, and the SINR without considering the residual self-interference as the feedback information.

In some embodiments, the terminal may feedback the strength of the residual self-interference. For example, the terminal may determine the strength of the residual self-interference as the feedback information. For example, the terminal may directly feed back the quantized strength of the residual self-interference. For example, the terminal may select an appropriate index in a preset lookup table for reporting, according to the measured residual self-interference intensity. Table 1 illustrates an exemplary lookup table of residual self-interference. In Table 1, M is a positive integer greater than 3.

TABLE 1

Lookup table for residual self-interference

| Index | Residual Self-Interference (Unit: dBm) |
|---|---|
| 0 | ≤−50 |
| 1 | −50 < Self-Interference ≤−40 |
| 2 | −40 < Self-Interference ≤−30 |
| ... | ... |
| M-1 | >−10 |

In some embodiments, the terminal may feed back the SINR considering residual self-interference. For example, the terminal may use the SINR considering residual self-interference as the feedback information. For example, the terminal may measure the SINR considering the residual self-interference, and feed back the SINR considering the residual self-interference. For example, the terminal may directly feed back the quantized SINR considering the residual self-interference, or may use a lookup table for feedback.

In some embodiments, the terminal may feed back only one of the SINR considering residual self-interference and the SINR without considering residual self-interference at each time, and each feedback may be based on the scheduling of the base station.

In some embodiments, the terminal may feedback both the SINR considering the residual self-interference and the SINR without considering the residual self-interference. For example, the terminal may use both the SINR considering residual self-interference and the SINR without considering residual self-interference as the feedback information, where the SNR without considering residual self-interference is determined based on the strength of the residual self-interference. For example, when the terminal performs the residual self-interference measurement, in addition to obtaining the SINR considering the residual self-interference based on the residual self-interference measurement result, it can also calculate the SINR without considering the residual self-interference based on the residual self-interference and the received signal strength (i.e. SINR under unidirectional transmission). In this case, when the terminal performs feedback, both the SINR considering residual self-interference and the SINR without considering residual self-interference may be fed back to help the base station determine whether the self-interference cancellation of the terminal is effective and determine the duplex mode of the terminal.

In some embodiments, the terminal may use both the SINR considering residual self-interference and the SINR without considering residual self-interference as the feedback information, where the SINR without considering residual self-interference is obtained by measuring on a specific measurement time-frequency resource included in the measurement time-frequency resource for measuring the SINR without considering residual self-interference. For example, the measurement time-frequency resource received by the terminal from the base station may include a time-frequency resource used to measure the SINR considering residual self-interference (that is, SINR on the bidirectional channels), and a time-frequency resource used to measure the SINR without considering residual self-interference (that is, SINR under a unidirectional channel). In this case, after the terminal completes the measurement according to the measurement time-frequency resource configured by the base station, the SINR considering residual self-interference and the SINR without considering residual self-interference may be fed back to help the base station determine whether the self-interference cancellation of the terminal is effective and determine the duplex mode of the terminal.

In some embodiments, the first configuration information may include information indicating a periodic measurement time-frequency resource. That is, in some cases, the residual self-interference measurement may be periodic. In these cases, the terminal will periodically feed back the feedback information determined according to the measurement result.

In some embodiments, the first configuration information may be transmitted by the base station in response to the residual self-interference measurement request transmitted by the terminal. That is, in some cases, the residual self-interference measurement may be aperiodic. In this case, after receiving the aperiodic measurement time-frequency resource allocated by the base station, the terminal may perform the residual self-interference measurement and may feed back the feedback information determined according to the measurement result. An example of aperiodic feedback will be described below with reference to FIG. 28.

In some embodiments, the feedback information may be determined according to the current duplex mode of the terminal. For example, in a case where the terminal operates in different duplex modes, different feedback modes can be used for feedback. For example, in a case where the terminal operates in the full-duplex mode, it can feed back the strength of residual self-interference and the SINR considering residual self-interference; and in a case where the terminal operates in the half-duplex mode, it can feed back the strength of residual self-interference and the SINR without considering residual self-interference (i.e., SINR in a unidirectional channel). Alternatively, in some embodiments, the terminal in different duplex modes may use the same feedback mode.

FIG. 28 illustrates a schematic diagram of aperiodic feedback according to an exemplary embodiment of the present disclosure.

Referring to FIG. 28, in addition to the periodic measurement time-frequency resource, the terminal may transmit an aperiodic residual self-interference measurement request, and may perform the aperiodic residual self-interference measurement on an aperiodic residual self-interference measurement time-frequency resource configured and feed back the corresponding result. This method of aperiodic residual self-interference measurement and feedback requested by the terminal may be suitable for terminals in the full-duplex mode or the half-duplex mode.

In addition to the aperiodic feedback method described with reference to FIG. 28, in some embodiments, the aperiodic feedback may be transmitted together with feedback of a Hybrid Automatic Retransmission Request (HARQ). For example, the terminal may transmit the feedback information related to the residual self-interference measurement together with acknowledgement/non-acknowledgement (ACK/NACK) information in an uplink control channel or an uplink shared channel. Therefore, the feedback can be performed in a timely manner without occupying extra resources.

Some possible implementations of feeding back the feedback information related to the residual self-interference measurement together with the ACK/NACK information are described below.

For example, when the terminal finds that the detection of the downlink shared channel fails and needs to feed back the NACK through the uplink shared channel or the uplink control channel, the terminal may feed back the feedback information obtained by the terminal through the residual self-interference measurement together with the feedback NACK. It should be noted that in this way, when the base station allocates, to the terminal, the uplink shared channel resource for transmission of data, the base station may also configure the time-frequency resource for the residual self-interference measurement. Therefore, the terminal can perform the residual self-interference measurement while performing reception of downlink data. In a case where the terminal can successfully detect and demodulate the downlink data, when the ACK is fed back through the uplink shared channel or the uplink control channel, the feedback information related to the residual self-interference measurement may not be fed back. In this case, the terminal can determine that the current residual self-interference strength is acceptable to the terminal, that is, it will not affect the signal transmission at the terminal.

In some embodiments, in addition to feeding back information related to the residual self-interference measurement, the terminal may also feed back at least one of the maximum bandwidth of the self-interference cancellation that the terminal can support under the current interference conditions, and Modulation and Coding Scheme (MCS) information to assist the base station to better perform selection and scheduling of the duplex mode.

Next, examples of the terminal feeding back the maximum bandwidth of the self-interference cancellation that the terminal can support under the current interference conditions, and the terminal feeding back the MCS information will be described respectively.

In some embodiments, step S2320 may further include feeding back information related to the maximum bandwidth for self-interference cancellation that the terminal can support under the current interference condition (for convenience of description, referred to as "the maximum bandwidth for self-interference cancellation"). For example, for the terminal operating in the full-duplex mode, when the performance of the self-interference cancellation of the terminal decreases on the allocated bandwidth, by reducing the operating bandwidth of the full-duplex mode, that is, reducing the bandwidth for self-interference cancellation, the performance of the terminal in the full-duplex mode can be improved. For example, for the terminal operating in the full-duplex mode, when its demodulation performance is good, by increasing the operating bandwidth of its full-duplex mode, that is, increasing the bandwidth for self-interference cancellation, it may improve the efficiency of data transmission of the terminal without significantly affecting the performance in the full-duplex mode. For example, for the terminal operating in the half-duplex mode, even in a case where the feedback information related to the residual self-interference measurement indicates that the terminal can switch to the full-duplex mode, the base station can also select a suitable self-interference cancellation bandwidth, so that the terminal still obtain better detection performance after switching to the full-duplex mode. Therefore, the maximum bandwidth for self-interference cancellation can be carried when the feedback information related to the residual self-interference measurement is fed back. An exemplary feedback method of maximum bandwidth for self-interference cancellation will be described below.

In some examples, the maximum bandwidth for self-interference cancellation can be directly fed back through a lookup table. For example, the maximum bandwidth for self-interference cancellation can be fed back through the lookup table. Specifically, according to the bandwidth value in the lookup table, an index corresponding to the maximum bandwidth value that is smaller than the maximum bandwidth for the self-interference cancellation that can be currently supported is selected for feedback. Table 2 illustrates an example of the lookup table in the full-duplex mode. A specific example is described below with reference to Table 2. For example, according to the measurement result, the terminal may obtain a bandwidth for self-interference cancellation that it can support is 35 MHz. According to the bandwidth values in Table 2, an index corresponding to the maximum bandwidth value smaller than 35 MHz (that is, the index '1' corresponding to 20 MHz) can be selected for feedback. Therefore, the maximum bandwidth for self-interference cancellation that the terminal can actually support can be fed back, and the amount of data that needs to be fed back and transmitted can be reduced.

TABLE 2

Lookup table for maximum bandwidth for self-interference cancellation in the full-duplex mode

| Index | Bandwidth value (MHz) |
|---|---|
| 0 | 10 |
| 1 | 20 |
| 2 | 40 |
| 3 | 80 |
| ... | ... |

In some examples, the maximum bandwidth for self-interference cancellation can be fed back by feeding back information related to a change value of the currently allocated bandwidth. For example, the change value of the currently allocated bandwidth can be fed back through a lookup table. Specifically, the terminal may select a desired bandwidth change value from the lookup table according to the measurement result, and feed back an index corresponding to the selected bandwidth change value to the base station. Table 3 illustrates an example of the lookup table for bandwidth changes in the full-duplex mode. In Table 3, a plus sign '+' indicates an increase in bandwidth, a minus sign '−' indicates a decrease in bandwidth, a specific number indicates a change level, and '0' indicates unchanged of bandwidth. For example, the bandwidth change value '−2' in Table 3 indicates that the bandwidth that can be supported is reduced by two levels compared to the current bandwidth. A specific example is described below with reference to Table 3. For example, the bandwidth for self-interference cancellation that the terminal can support is shown in Table 2. In a case where the currently allocated bandwidth is 40 MHz, the change value '+1' of the currently allocated bandwidth indicates that the supported bandwidth is increased by one level (that is, increased to 80 MHz), and the change value '−1' of the currently allocated bandwidth indicates that the bandwidth that can be supported is reduced by one level (that is, reduced to 20 MHz). Therefore, the amount of data that needs to be fed back and transmitted can be reduced. The feedback method described above is only an example, and the maximum bandwidth for self-interference cancellation can also be fed back in other ways.

TABLE 3

Look-up table for the change values of the currently allocated bandwidth in the full-duplex mode

| Index | Bandwidth Change Value |
|---|---|
| 0 | −2 |
| 1 | −1 |
| 2 | 0 |
| 3 | +1 |
| ... | ... |

In the example described above, the maximum bandwidth for self-interference cancellation can be fed back with the feedback information related to the residual self-interference measurement. For example, the periodic or aperiodic feedback manner can be used to feed back the maximum bandwidth for self-interference cancellation. For example, the maximum bandwidth for self-interference cancellation can be fed back with the HARQ information. For example, after receiving the maximum bandwidth for self-interference cancellation fed back by the terminal, the base station can obtain the maximum bandwidth of the terminal for self-interference cancellation under the current interference conditions, and select the duplex mode for the terminal or adjust the bandwidth or MCS of the terminal, etc.

In some embodiments, the step S2320 may further include feeding back MCS information to assist the base station in configuring the duplex mode of the terminal. In some examples, the feedback of the MCS information may be performed along with the HARQ feedback.

For the periodic residual self-interference measurement or the aperiodic residual self-interference measurement, the methods in the various embodiments described above can be used to perform the residual self-interference measurement and determine the feedback information.

In step S2330, the terminal may receive second configuration information determined according to the feedback information, and determine a duplex mode based on the second configuration information.

In some embodiments, in step S2330, the terminal may receive the second configuration information determined according to the feedback information from the base station, and determine the duplex mode of the terminal based on the second configuration information. For example, the terminal may switch the duplex mode from the half-duplex mode to the full-duplex mode, switch the duplex mode from the full-duplex mode to the half-duplex mode, or maintain the current duplex mode, based on the second configuration information.

In some embodiments, the second configuration information may include one of the following items: second configuration information determined by the base station according to at least one of the residual self-interference strength and the signal-to-interference-and-noise ratio of the residual self-interference; in a case where the feedback information includes the SINR without considering residual self-interference, second configuration information determined by the base station according to one of the strength of the residual self-interference and the SINR considering the residual self-interference, and the SINR without considering residual self-interference; and in a case where the feedback information does not include the SINR without considering residual self-interference, second configuration information determined by the base station according to one of the strength of the residual self-interference and the SINR considering the residual self-interference, and the SINR without considering the residual self-interference fed back by the terminal last time. Some embodiments of the second configuration information configured by the base station are described above. For various embodiments of the second configuration information configured by the base station, reference may be made to operations of the base station described below with reference to FIGS. 29 to 33.

The operation of the terminal according to various embodiments of the disclosure has been described above with reference to FIGS. 23 to 28. It should be noted that the embodiments of the disclosure are not limited thereto. For example, although the signaling between the terminal and the base station is described in some embodiments to implement the duplex mode of the terminal configuration, the base station may be replaced with other nodes or network entities in a wireless communication system without departing from the scope of the disclosure.

The operations of the base station according to various embodiments of the disclosure are described below with reference to FIGS. 29 to 33.

FIG. 29 illustrates a flowchart of operations of a base station according to an exemplary embodiment of the present disclosure.

Referring to FIG. 29, operations of the base station according to at least one embodiment of the disclosure may include steps S2900, S2910, S2920, and S2930.

In step S2900, the base station may transmit first configuration information, where the first configuration information is used to determine a measurement time-frequency resource for residual self-interference measurement.

In some embodiments, the base station may transmit the first configuration information to the terminal to schedule the measurement time-frequency resource used by the terminal for the residual self-interference measurement.

In some embodiments, the first configuration information may be used to configure the measurement time-frequency resource and/or measurement reference signal(s) for the residual self-interference measurement.

In some embodiments, the base station may configure the measurement time-frequency resource on the downlink channel. For example, the first configuration information may include first indication information indicating the measurement time-frequency resource measurement on the downlink channel for residual self-interference (which may be referred to as "downlink measurement time-frequency resource"). For example, as shown in FIG. 30, the measurement time-frequency resource may be a time-frequency resource with zero power (or may be referred as, empty time-frequency resource) on which the base station does not transmit a signal. For example, the measurement time-frequency resource may be at least one of one or more symbols, one or more physical resource elements (REs), or one or more physical resource blocks (PRBs).

In some embodiments, the base station may directly configure the time-frequency resource position of the downlink measurement time-frequency resource. For example, the first indication information may include information indicating a time-frequency resource position of the downlink measurement time-frequency resource. For example, the time-frequency resource position may be one or more of a frequency-domain physical resource block index, a time-domain symbol index, and a physical resource element index of the downlink measurement time-frequency resource.

In some implementations, the base station may configure offset information associated with the measurement time-frequency resource for the residual self-interference measurement in a set of measurement time-frequency resources. For example, the first indication information may include information indicating offset information associated with the measurement time-frequency resource of the set of measurement time-frequency resources for the residual self-interference measurement. For example, the offset information may include one or more of a symbol offset, a physical resource element offset, a physical resource block offset, and the like. In this case, the terminal may determine the measurement time-frequency resource for the residual self-interference measurement, based on the offset information indicated by the first configuration information, and the position of the set of measurement time-frequency resource determined according to a predetermined method.

In some implementations, in a case where the terminal is configured with a Zero Power-Channel State Information-Reference Signal (ZP-CSI-RS) resource, index of index sets of ZP-CSI-RS resource may be configured to inform the terminal of the ZP-CSI-RS resource position for the residual self-interference measurement. Referring to FIG. 31, a configuration of ZP-CSI-RS resource is shown, in which a part of the ZP-CSI-RS resource may be used for the residual self-interference measurement and another part of the ZP-CSI-RS resource may be used for other interference measurement. For example, the first indication information may include an index or index sets of the ZP-CSI-RS indicating the position of the ZP-CSI-RS resource for the residual self-interference measurement. That is, in this case, the ZP-CSI-RS resource for the residual self-interference measurement may be used as the measurement time-frequency resource.

In some embodiments, the base station may configure the measurement time-frequency resource on the uplink channel. For example, the first configuration information may include second indication information indicating the measurement time-frequency resource on the uplink channel for the residual self-interference measurement (which may be referred to as "uplink measurement time-frequency resource").

In some embodiments, the base station may directly configure the time-frequency resource position of the uplink measurement time-frequency resource. For example, the second indication information may include information indicating a time-frequency resource position of the uplink measurement time-frequency resource. For example, the time-frequency resource position may be one or more of frequency-domain physical resource block index, a time-domain symbol index, and a physical resource element index of the uplink measurement time-frequency resource.

In some embodiments, the base station may configure offset information associated with the measurement time-frequency resource of the set of measurement time-frequency resources for the residual self-interference measurement. For example, the second indication information may include information indicating offset information associated with the measurement time-frequency resource of the set of measurement time-frequency resources for the residual self-interference measurement. For example, the offset information may include one or more of a symbol offset, a physical resource element offset, a physical resource block offset, and the like. In this case, based on the offset information indicated by the second indication information and the position of the set of measurement time-frequency resources determined according to a predetermined method, the terminal may determine the measurement time-frequency resource for the residual self-interference measurement.

In some implementations, the base station may configure the uplink measurement time-frequency resource by configuring an index of a time-frequency resource or an index of a time-frequency resource group of the uplink sounding reference signal. For example, the uplink measurement time-frequency resource and the uplink sounding reference signal time-frequency resource may overlap each other. In this case, the second indication information may include information indicating an index of a time-frequency resource or an index of a time-frequency resource group of the uplink sounding reference signal.

In the above embodiments, for terminals operating in different duplex modes, the base station may use a unified configuration method to configure the measurement time-frequency resource(s), so the configuration signaling design can be simplified.

In some embodiments, for terminals operating in different duplex modes, the base station may use different configuration methods to configure the measurement time-frequency resource(s) to optimize operations.

For example, in a case where the current duplex mode of the terminal is the full-duplex mode, a downlink measurement time-frequency resource for the residual self-interference measurement is configured. For example, in a case where the current duplex mode of the terminal is the full-duplex mode, the first configuration information may include information indicating the measurement time-frequency resource on the downlink channel for the residual self-interference measurement. In this case, the base station may not transmit any data and/or signaling on the downlink measurement time-frequency resource, and since the uplink time-frequency resource and the downlink time-frequency resource configured for the terminal, in a case where the current duplex mode of the terminal is full-duplex mode, overlap each other, the terminal can perform the residual self-interference measurement on the configured downlink measurement time-frequency resource.

For example, in a case where the current duplex mode of the terminal is the half-duplex mode, the uplink measurement time-frequency resource for the residual self-interference measurement is configured. For example, in a case where the current duplex mode of the terminal is the half-duplex mode, the first configuration information may include information indicating the measurement time-frequency resource on the uplink channel for the residual self-interference measurement.

In some embodiments, the base station may configure the first configuration information for periodic residual self-interference measurement. For example, the first configuration information may further include information indicating a periodic measurement time-frequency resource. For example, the first configuration information may further include a period of the periodic measurement time-frequency resource. In this case, the terminal may determine the measurement time-frequency resource allocated to the terminal, based on the first indication information or the second indication information, and a period of the periodic measurement time-frequency resource.

In some implementations, the base station may transmit the first configuration information for the aperiodic residual self-interference measurement in response to the residual self-interference measurement request transmitted by the terminal. For example, the terminal may transmit the aperiodic residual self-interference measurement request outside the periodically configured measurement time-frequency resource, and the base station may transmit the first configuration information in response to the residual self-interference measurement request. In this case, the measurement time-frequency resource indicated by the first configuration information may be not periodic, and may be only used for aperiodic measurement of the terminal. In addition, while allocating the measurement time-frequency resource, the base station may also allocate a feedback time-frequency resource for feeding back the feedback information determined according to the measurement result. For example, the first configuration information may further include information indicating the feedback time-frequency resource for the terminal to feed back the feedback information determined according to the measurement result.

In step S2910, the base station may receive the feedback information determined according to a measurement result, where the measurement result is obtained by performing the residual self-interference measurement on the measurement time-frequency resource.

In some embodiments, the base station may receive the feedback information determined according to the measurement result from the terminal, where the measurement result is obtained by the terminal performing the residual self-interference measurement on the measurement time-frequency resource.

In some embodiments, the residual self-interference measurement may include at least one of measuring the strength of the residual self-interference and measuring the SINR considering the residual self-interference. For example, the received feedback information may include at least one of the strength of the residual self-interference, the SINR considering the residual self-interference, and the SINR without considering the residual self-interference.

In some embodiments, in addition to receiving the feedback information related to the residual self-interference measurement from the terminal, at least one of the maximum bandwidth of self-interference cancellation that can be supported under the current interference conditions and MCS information can also be received from the terminal, in order to perform better selection and scheduling of the duplex mode.

In step S2920, the base station may determine second configuration information for configuring the duplex mode according to the feedback information.

In some embodiments, the second configuration information may include information instructing the duplex mode of the terminal. For example, the second configuration information may include information indicating whether the terminal is capable of operating in the full-duplex mode.

In some embodiments, the base station may determine the second configuration information for configuring the duplex mode of the terminal according to the feedback information. For example, according to different types of feedback information, the base station may use different methods to determine the duplex mode of the terminal.

In some embodiments, the base station may determine the duplex mode of the terminal according to the strength of the residual self-interference fed back by the terminal. For example, in a case where the strength of the residual self-interference is less than a first predetermined threshold, it is determined that the terminal can operate in the full-duplex mode. In a case where the strength of the residual self-interference is greater than or equal to the first predetermined threshold, it is determined that the terminal can only operate in the half-duplex mode and cannot operate in the full-duplex mode. Further, after determining that the terminal can operate in the full-duplex mode, the base station may determine the duplex mode of the terminal according to factors such as the scheduling situation and interference situation of the terminal in a cell. For example, the first predetermined threshold may be determined according to a preset rule, or selected according to a system requirement.

In some embodiments, the base station may determine the duplex mode of the terminal according to the SINR considering the residual self-interference fed back by the terminal. However, the case that the SINR considering residual self-interference is lower may be caused by poor self-interference cancellation effect, or may be caused by poor channel conditions. For poor channel conditions and good self-interference cancellation effect, the MCS should be adjusted without adjusting the duplex mode. Therefore, it is impossible to directly determine whether the self-interference cancellation is effective only based on the SINR considering the residual self-interference, and therefore it may not be possible to determine the duplex mode of the terminal. In this case, the base station can determine the duplex mode of the terminal, according to the SINR without considering the residual self-interference, and the SINR considering the residual self-interference which is fed back by the terminal.

In some embodiments, in a case where the terminal does not feedback the SINR without considering the residual self-interference, the base station may determine the duplex mode of the terminal according to the SINR without considering the residual self-interference fed back by the terminal last time and the SINR considering residual self-interference fed back by the terminal. In this case, the terminal feeds back only one of the SINR considering residual self-interference and the SINR without considering residual self-interference each time, and each feedback is based on the scheduling of the base station, and the base station can determine the duplex mode of the terminal according to the historical information fed back by the terminal.

In some embodiments, in a case where the terminal feeds back both the SINR considering residual self-interference and the SINR without considering residual self-interference, the base station may determine the duplex mode of the terminal according to both the SINR considering residual self-interference and the SINR without considering residual self-interference. For example, the base station may determine whether the terminal can operate in the full-duplex mode according to both the SINR considering residual self-interference and the SINR without considering residual self-interference.

In some embodiments, in a case where the terminal feeds back the strength of the residual self-interference and the SINR considering the residual self-interference, the base station may determine the SINR without considering residual self-interference according to the strength of the residual self-interference and the SINR considering the residual self-interference SINR (i.e., SINR in a unidirectional channel), and then determine the duplex mode of the terminal according to the SINR considering residual self-interference and the determined SINR without considering residual self-interference. For example, the base station may determine whether the terminal can operate in the full-duplex mode according to the SINR considering residual self-interference and the determined SINR without considering residual self-interference.

FIG. 32 illustrates a flowchart of a method for determining a duplex mode of a terminal according to the SINR considering the residual self-interference and the SINR without considering the residual self-interference according to an exemplary embodiment of the present disclosure.

Referring to FIG. 32, the method for determining the duplex mode of the terminal according to the SINR considering residual self-interference and the SINR without considering residual self-interference may include steps S3200, S3210, S3220, S3230, and S3240. It should be noted that the steps shown in FIG. 32 may be performed as a part of step S2920.

At step S3200, the base station may determine whether the SINR considering the residual self-interference is greater than a second predetermined threshold. For example, the second predetermined threshold may be determined according to a preset rule, or selected according to a system requirement.

At step S3210, in a case where the SINR considering the residual self-interference is greater than the second predetermined threshold, the second configuration information may be used to indicate that the terminal can operate in the full-duplex mode. In this case, the base station can schedule the terminal to operate in the full-duplex mode.

At step S3220, in a case where the SINR considering the residual self-interference is less than or equal to the second predetermined threshold, it is determined whether the strength of the residual self-interference is greater than a third predetermined threshold. For example, the third predetermined threshold may be determined according to a preset rule, or selected according to a system requirement.

At step S3230, in a case where the strength of the residual self-interference is greater than the third predetermined threshold, the second configuration information may be used to indicate that the terminal cannot operate in the full-duplex mode. In this case, the base station determines that the terminal is not suitable to continue operating in the full-duplex mode, and therefore can schedule the terminal to operate in the half-duplex mode.

At step S3240, in a case where the strength of the residual self-interference is less than or equal to the third predetermined threshold, the second configuration information may be used to indicate that the terminal can operate in the full-duplex mode. In this case, the base station can determine that the degradation of the SINR (SINR) is caused by poor channel conditions, so the base station may handle the issue of SINR degradation by other methods such as changing the MCS or frequency band to improve system performance, and may schedule the terminal to operate in the full-duplex mode.

The method for determining a duplex mode of a terminal according to an SINR considering residual self-interference and an SINR without considering residual self-interference according to some embodiments of the disclosure is described above with reference to FIG. 32.

FIG. 33 illustrates a flowchart of a method for determining a duplex mode of a terminal according to a strength of the residual self-interference and the SINR without considering the residual self-interference according to an exemplary embodiment of the present disclosure.

Referring to FIG. 33, the method for determining the duplex mode of the terminal according to the strength of the residual self-interference and the SINR without considering the residual self-interference may include steps S3300, S3310, S3320, and S3330. For example, the steps shown in FIG. 33 may be performed as a part of step S3020.

In step S3300, the base station may determine whether the strength of the residual self-interference is greater than a fourth predetermined threshold. For example, the fourth predetermined threshold may be determined according to a preset rule, or selected according to a system requirement.

In step S3310, in a case where the strength of the residual self-interference is greater than the fourth predetermined threshold, the second configuration information may be used to indicate that the terminal cannot operate in the fill-duplex mode. In this case, the base station may determine that the terminal cannot operate in the full-duplex mode, and thus the base station may schedule the terminal to operate in the half duplex mode.

In step S3320, in a case where the strength of the residual self-interference is less than or equal to the fourth predetermined threshold, the base station may determine whether the SINR without considering the residual self-interference is greater than a fifth predetermined threshold. For example, the fifth predetermined threshold may be determined according to a preset rule, or selected according to a system requirement.

In step S3330, in a case where the SINR without considering the residual self-interference is greater than the fifth predetermined threshold, the second configuration information may be used to indicate that the terminal can operate in the full-duplex mode. In this case, the base station can schedule the terminal to operate in the full-duplex mode.

In step S3340, in a case where the SINR without considering the residual self-interference is less than or equal to the fifth predetermined threshold, the second configuration information may be used to indicate that the terminal can maintain the current duplex mode. In this case, the performance of the system can be improved by means such as changing the MCS or bandwidth, and the terminal can be scheduled to operate in the current duplex mode.

In some embodiments, step S2920 may further include configuring the duplex mode of the terminal according to at least one of the maximum bandwidth of self-interference cancellation that can be supported under the current interference condition and the MCS information fed back by the terminal. For example, after receiving information on the maximum bandwidth of self-interference cancellation that can be supported under the current interference conditions, the base station can select the duplex mode for the terminal based on the maximum bandwidth of self-interference cancellation that can be supported under the current interference conditions, or for example, adjust the bandwidth and MCS and the like of the terminal. For example, after receiving the MCS information fed back by the terminal, the base station may determine the duplex mode of the terminal based on the MCS information and the maximum modulation order that can be supported in the full-duplex mode reported by the terminal. For example, in a case where the modulation order included in the MCS reported by the terminal is greater than the maximum modulation order supported in the full-duplex mode reported by the terminal, it means that the terminal does not tend to use the full-duplex mode, then the base station, during subsequent scheduling, can schedule the terminal to operate in the half-duplex mode.

In step S2930, the base station may transmit the second configuration information.

In some embodiments, after the base station determines the second configuration information, the base station may transmit the second configuration information to the terminal to schedule the duplex mode of the terminal. Thus, the embodiments of the disclosure realize the configuration or scheduling of the duplex mode of the terminal, thereby optimizing performance and improving efficiency.

The operations of the terminal according to some embodiments of the disclosure are described below with reference to FIG. 34.

FIG. 34 illustrates a flowchart of operations of a terminal according to an exemplary embodiment of the present disclosure.

Referring to FIG. 34, operations of the terminal according to some embodiments of the disclosure may include steps S3400, S3410, S3420, S3430, and S3440. Since step S3410 is the same or similar to step S100 described above, step S3420 is the same or similar to step S330 described above, and step S3430 is the same or similar to step S340 described above, the description of steps S3410, S3420, and S3430 will be omitted. Some examples of steps S3400 and S3440 will be described below.

In step S3400, the terminal may transmit terminal capability information indicating a self-interference cancellation capability of the terminal.

In some embodiments, the terminal may report the terminal capability information indicating the self-interference cancellation capability of the terminal to the base station. For example, the terminal may report to a base station whether the terminal has self-interference cancellation capability or a size of self-interference that the terminal can eliminate or counteract in a full-duplex mode.

In some embodiments, the terminal capability information may include one or more of the following: third indication information indicating whether the terminal has self-interference cancellation capability, self-interference cancellation bandwidth supported by the terminal in the full-duplex mode, and a maximum modulation order supported by the terminal in full-duplex mode, a maximum number of multiple antenna layers supported by the terminal in the full-duplex mode, a size of the self-interference cancellation capability of the terminal, and a subcarrier spacing supported by the terminal in the full-duplex mode. Various examples of the terminal reporting the terminal capability information will be described below.

In some embodiments, the terminal may report to the base station the third indication information indicating whether the terminal has the self-interference cancellation capability. For example, the third indication information may be a 1-bit indicator used to indicate whether the terminal has the self-interference cancellation capability. For example, in a case where the third indication information indicates that the terminal does not have the self-interference cancellation capability, the terminal can only be scheduled or configured in the half-duplex mode. For example, in a case where the third indication information indicates that the terminal does not have the self-interference cancellation capability, other terminal capability information related to the full-duplex mode may not be reported to the base station. For example, in a case where the third indication information indicates that the terminal has the self-interference cancellation capability, other terminal capability information related to the full-duplex mode may be reported to the base station. For example, the other terminal capability information may be one or more of the self-interference cancellation bandwidth supported by the terminal in the full-duplex mode, the maximum modulation order supported by the terminal in the full-duplex mode, and the maximum number of multi-antenna layers supported by the terminal in the full-duplex mode, the size of the self-interference cancellation capability of the terminal, and the subcarrier spacing supported by the terminal in the full-duplex mode.

In some embodiments, the terminal may report to the base station the self-interference cancellation bandwidth supported by the terminal in the full-duplex mode (that is, the full-duplex bandwidth capability supported by the terminal) to indicate the maximum bandwidth that can be configured for the terminal in the full-duplex mode. For example, multiple possible full-duplex bandwidth values and respective indexes corresponding to each of the multiple possible full-duplex bandwidth values can be set in advance, and then the terminal may complete reporting of the full-duplex bandwidth capability by reporting a respective index. For example, in a case where the possible full-duplex bandwidth values are [10 MHz, 20 MHz, 40 MHz, 80 MHz, 100 MHz] and the corresponding indexes are [0, 1, 2, 3, 4], if the duplex bandwidth capability is 20 MHz, the index '1' may be reported; and in a case where the full-duplex bandwidth capability supported by the terminal is 80 MHz, the index '3' may be reported.

In some examples, the reporting of the self-interference cancellation bandwidth supported by the terminal in the full-duplex mode may be optional. For example, the self-interference cancellation bandwidth supported by the terminal in the full-duplex mode may not be reported in the following situations in which: the bandwidth capability supported by the terminal may be consistent with the self-interference cancellation bandwidth capability supported by the terminal (that is, the full-duplex bandwidth capability supported by the terminal); or it has been assumed that the bandwidth capability supported by the terminal is consistent with the self-interference cancellation capability supported by the terminal. In these cases, only the third indication information indicating whether the terminal has the self-interference cancellation capability may be reported, without reporting the self-interference cancellation bandwidth supported by the terminal. For example, in a case where the bandwidth capability supported by the terminal is inconsistent with the self-interference cancellation bandwidth capability supported by the terminal in the full-duplex mode (for example, the bandwidth capability supported by the terminal is greater than the self-interference cancellation bandwidth capability supported by the terminal in the full-duplex mode), in addition to reporting whether it has the self-interference cancellation capability, the terminal may also need to report the self-interference cancellation bandwidth capability. In other cases, if it has been assumed that the bandwidth capability supported by the terminal is consistent with the self-interference cancellation capability supported by the terminal, it is only necessary to report whether the terminal has the self-interference cancellation capability, instead of reporting the bandwidth for self-interference cancellation supported in the full-duplex mode. For example, if the terminal capability information reported by the terminal indicates that the terminal supports the full-duplex mode (that is, the terminal supports self-interference cancellation), the base station can determine the full-duplex bandwidth capability supported by the terminal according to the bandwidth capability reported by the terminal.

In some embodiments, the terminal may report the maximum modulation order supported by the terminal in the full-duplex mode to the base station. Generally, the maximum modulation order supported by the terminal in the full-duplex mode may be determined by the implementation of the device. For example, for the terminal that supports the full-duplex mode, the residual self-interference will cause an increase in the noise floor due to the imperfect self-interference cancellation. However, because the demodulation of constellation points is limited by the SINR, the maximum modulation order supported in the full-duplex mode may be lower than the maximum modulation order supported in the half-duplex mode. In this case, the terminal may need to report the maximum modulation order supported in the full-duplex mode.

In some examples, the reporting of the maximum modulation order supported by the terminal in the full-duplex mode may be optional. For example, if the maximum modulation order supported in the half-duplex mode is the same as the maximum modulation order supported in the full-duplex mode, it is only necessary to report the third indication information indicating whether the terminal supports self-interference cancellation, instead of reporting the maximum modulation order supported in the full-duplex mode. In this case, after receiving the indication of support for self-interference reported by the terminal, the base station can determine the maximum modulation order supported in the full-duplex mode by using the maximum modulation order supported by the terminal. For example, if the maximum modulation order supported in the half-duplex mode is different from the maximum modulation order supported in the full-duplex mode, in addition to reporting the third indication information of whether the terminal supports self-interference cancellation, it is also necessary to report the maximum modulation order supported in the full-duplex mode.

In some embodiments, the terminal may report to the base station the maximum number of multiple antenna layers that the terminal supports in the full-duplex mode. For example, the number of multi-antenna layers supported in the full-duplex mode may be related to the implementation of self-interference cancellation, and may be different from the number of multi-antenna layers supported in the half-duplex mode. In this case, the terminal may need to report the maximum number of multiple antenna layers supported in the full-duplex mode.

In some examples, the reporting of the maximum number of multiple antenna layers supported by the terminal in the full-duplex mode may be optional. For example, if the maximum number of multi-antenna layers supported in the half-duplex mode is the same as the maximum number of multi-antenna layers supported in the full-duplex mode, it is only necessary to report the indication of whether the terminal supports self-interference cancellation instead of reporting the maximum number of multiple antenna layers supported in the full-duplex mode. After receiving the indication of supporting self-interference reported by the terminal, the base station can infer the maximum number of multi-antenna layers supported in the full-duplex mode from the maximum number of multi-antenna layers supported by the terminal. For example, if the maximum number of multi-antenna layers supported in the half-duplex mode is different from the maximum number of multi-antenna layers supported in the full-duplex mode, in addition to reporting the indication of whether the terminal supports self-interference cancellation, it is also necessary to report the maximum number of multiple antenna layers supported in the full-duplex mode.

In some embodiments, the terminal may report the self-interference cancellation capability measured in decibels (dB) to the base station to help the base station determine a scenario in which the full-duplex mode can be used.

In some embodiments, the terminal may report the subcarrier spacing supported by the terminal in the full-duplex mode to the base station. For example, the reporting of the subcarrier spacing supported by the terminal in the full-duplex mode may be optional.

The terminal capability information according to various embodiments of the disclosure has been described above. Generally, since the self-interference cancellation of the terminal mainly affects the downlink received signal, the terminal capability information described in the foregoing various embodiments may indicate the downlink receiving capability of the terminal.

In some embodiments, the terminal may report the terminal capability information to the base station in the uplink shared channel after completing a random access procedure and establishing a connection with the base station.

In some embodiments, the terminal may transmit the terminal capability information in the uplink shared channel of Message A in the two-step random access procedure. In this case, if the terminal successfully accesses and completes the transmission of the information in Message A through the two-step random access procedure initiated by itself, the base station can obtain the terminal capability information related with the self-interference cancellation capability of the terminal when the terminal completes uplink access, so that full-duplex scheduling can be performed more quickly on the terminal with the self-interference cancellation capability.

Various embodiments of reporting the terminal capability information have been described above. However, the embodiments of the disclosure are not limited thereto, and various changes can be made based on this.

In step S3440, the terminal may receive the second configuration information determined according to at least one of the feedback information and the terminal capability information, and determine the duplex mode of the terminal based on the second configuration information.

In some embodiments, the terminal may receive the second configuration information determined according to the feedback information and the terminal capability information from the base station, and determine the duplex mode of the terminal based on the second configuration information. For example, the terminal may switch the duplex mode from the half-duplex mode to the full-duplex mode, switch the duplex mode from the full-duplex mode to the half-duplex mode, or maintain the current duplex mode based on the second configuration information.

The operations of the terminal according to some embodiments of the disclosure have been described above with reference to FIG. 34. It should be noted that the embodiments of the disclosure are not limited thereto. For example, although the signaling between the terminal and the base station is described in some embodiments to implement configuration of the duplex mode of the terminal, the base station may be replaced with other nodes or network entities in a wireless communication system without departing from the scope of the disclosure.

The operation of a base station according to some embodiments of the disclosure is described below with reference to FIG. 35.

FIG. 35 illustrates a flowchart of operations of a base station according to an exemplary embodiment of the present disclosure.

Referring to FIG. 35, operations of the base station according to some embodiments of the disclosure may include steps S3500, S3510, S3520, S3530, and S3540. Since step S3510 is the same as or similar to step S2900 described above, step S3520 is the same or similar to step S2910 described above, and step S3540 is the same or similar to step S2930 described above, descriptions of steps S3510, S3520, and S3540 will be omitted. Some examples of steps S3500 and S3530 will be described below.

In step S3500, the base station may receive terminal capability information indicating a self-interference cancellation capability of a terminal.

In some embodiments, the base station may receive from the terminal the terminal capability information indicating the self-interference cancellation capability of the terminal.

In some embodiments, the terminal capability information may include one or more of the following: third indication information indicating whether the terminal has the self-interference cancellation capability, a self-interference cancellation bandwidth supported by the terminal in a full-duplex mode, and a maximum modulation order supported by the terminal in the full-duplex mode, the maximum number of multiple antenna layers supported by the terminal in the full-duplex mode, a size of the self-interference cancellation capability of the terminal, and a subcarrier spacing supported by the terminal in the full-duplex mode. For various examples of the terminal reporting terminal capability information, reference may be made to the various embodiments described above.

It should be noted that, although FIG. 35 illustrates that step S3500 is performed before step S3510, embodiments of the disclosure are not limited thereto. For example, step S3500 may be performed after step S3510, step S3500 may be performed after S3510, or step S3500 may be performed after step S3520.

In step S3530, the base station may determine second configuration information according to at least one of the feedback information and the terminal capability information.

In some embodiments, the base station may determine the second configuration information according to at least one of the terminal capability information reported by the terminal and the feedback information related to the self-interference measurement fed back by the terminal to configure or schedule the duplex mode of the terminal.

In some embodiments, the base station may determine the second configuration information according to the terminal capability information reported by the terminal. For example, in a case where the terminal capability information indicates that the terminal has self-interference cancellation capability, it is determined that the terminal can be scheduled or configured in the full-duplex mode or a half-duplex mode. For example, in a case where the terminal capability information indicates that the terminal does not have self-interference cancellation capability, it is determined that the terminal can only be scheduled or configured in the half-duplex mode.

In some embodiments, the base station may determine the second configuration information according to the feedback information related to the self-interference measurement fed back by the terminal. For the examples of determining the second configuration information according to the feedback information related to the self-interference measurement fed back by the terminal, reference may be made to the various embodiments described above.

In some embodiments, the base station may determine the second configuration information according to both the terminal capability information reported by the terminal and the feedback information related to the self-interference measurement fed back by the terminal. For example, the base station may first determine whether the terminal can be configured in the full-duplex mode according to the terminal capability information reported by the terminal and the feedback information related to the self-interference measurement fed back by the terminal, and in a case where the terminal can be configured in the full-duplex mode, the duplex mode of the terminal is determined according to the terminal capability related to the full-duplex mode indicated by the terminal capability information.

The operation method of the terminal and the operation method of the base station according to various embodiments of the disclosure are described above. For example, some embodiments may be used to allow the terminal to set its duplex mode or the base station to configure or schedule the duplex mode of the terminal. In some embodiments, for the terminal operating in the full-duplex mode, when a high-reliability, low-latency service (uplink service or downlink service) with a higher priority occurs, it can be considered to switch the duplex mode of the terminal to improve overall efficiency of the system.

The operations of the terminal or the base station when a higher priority traffic occurs according to various embodiments of the disclosure will be described below.

For convenience of description, a full-duplex frame structure according to some embodiments of the disclosure will be described with reference to FIGS. 36 and 37.

FIG. 36 illustrates a full-duplex frame structure according to an exemplary embodiment of the present disclosure.

Referring to FIG. 36, the unidirectional uplink channel and the downlink channel and the full-duplex channel may be divided in a time division manner. For example, a slot may include uplink symbols (indicated by 'U'), downlink symbols (indicated by 'D'), a guard time (indicated by 'G'), and full-duplex symbols (indicated by 'F'). For example, downlink symbols may be used to transmit unidirectional downlink channels such as downlink control channels; uplink symbols may be used to transmit unidirectional uplink channels such as uplink control channels; full-duplex symbols may be used to transmit full-duplex channels; and a guard time may be used for a conversion time between downlink symbols and full-duplex symbols. Unidirectional uplink and downlink channels may be mainly used for control channels, etc., and full-duplex symbols may be used to transmit data (including downlink data channels and uplink data channels). It should be noted that the full-duplex frame structure may be cell-specific or terminal group-specific. For convenience of description, the full-duplex frame structure shown in FIG. 36 is referred to as a first full-duplex frame structure.

In some embodiments, the downlink control channel transmitted in the downlink symbol may be used to transmit scheduling information of the uplink\downlink channel of the full-duplex symbol; and the uplink control channel transmitted in the uplink symbol may be used to transmit uplink control information, such as HARQ feedback information, channel state information, etc. Due to the scheduling delay in the system, the scheduling information on the downlink control channel in the current subframe is gener-ally used to schedule data transmission on full-duplex symbols in subsequent subframes, as shown in FIG. 37.

FIG. 38 illustrates a full-duplex frame structure according to an exemplary embodiment of the present disclosure.

Referring to FIG. 38, the communication channel may include a downlink control channel, a data band, and a downlink control channel. For example, a unidirectional downlink control channel and an uplink control channel may be divided in a frequency division manner with a bidirectional data band. For example, the uplink control channel and the downlink control channel may be separated by a data band in the frequency-domain. In addition, a guard band can be set between the downlink control channel or the uplink control channel and the data band to reduce interference between adjacent bands. In some embodiments, an anchor subband may exist in the data band for transmission of downlink/uplink common information such as a synchronization signal block or a random access channel. For convenience of description, the full-duplex frame structure shown in FIG. 38 is referred to as a second full-duplex frame structure.

It should be noted that the data band in the frame structure shown in FIG. 38 may be full-duplex to the terminal (that is, the terminal supports the self-interference cancellation, and therefore can transmit downlink and uplink data on the data band using the same time and the same frequency (Co-time Co-frequency)), and may be half-duplex to the terminal (that is, the terminal does not support the self-interference cancellation, and therefore transmits downlink and uplink data on the data band by a time division or frequency division manner). For half-duplex terminals, a guard band or guard time may be set between frequency bands in different transmission directions, in order to reduce interference in different transmission directions.

It will be understood that the full-duplex frame structure described above is only an example, and various changes can be made on this basis.

FIG. 39 illustrates a flowchart of operations of a terminal according to an exemplary embodiment of the present disclosure.

Referring to FIG. 39, operations of the terminal according to some embodiments of the disclosure may include steps S3900 and S3910.

In step S3900, the terminal may receive fourth indication information indicating a full-duplex resource for stopping a transmission of uplink data and receiving downlink data having a higher priority.

In some embodiments, the terminal may receive fourth indication information from the base station indicating the full-duplex resource for stopping the transmission of the uplink data and receiving the downlink data having the higher priority. For example, when the base station needs to transmit downlink data having the higher priority after completing the scheduling of subsequent subframes, the base station may instruct the terminal to stop transmission of uplink data on some full-duplex resources, in order to avoid self-interference on the terminal side and eliminate interference on downlink reception. In this case, the terminal may receive the fourth indication information from the base station. For example, the downlink data having the higher priority may refer to the downlink data having the higher priority than data currently being transmitted.

In some embodiments, the fourth indication information may indicate a starting symbol index of full-duplex symbols used to stop transmission of the uplink data and receive the downlink data having the higher priority, and a number of the full-duplex symbols.

In some embodiments, the fourth indication information may indicate a starting symbol index and an ending symbol index of full-duplex symbols used to stop the transmission of the uplink data and receive the downlink data having the higher priority.

In some embodiments, the fourth indication information may indicate a mini-slot for stopping the transmission of the uplink data and receiving the downlink data having the higher priority. For example, the mini-slot may be a time unit that is divided in a predetermined manner and can be used to transmit a high-priority service.

In some embodiments, the fourth indication information may indicate a data band time-frequency resource for stopping the transmission of the uplink data and receiving the downlink data having the higher priority. For example, the fourth indication information may indicate a starting frequency-domain unit resource index and a frequency-domain unit resource amount, and a time-domain unit resource index and a time-domain unit resource amount. For example, the fourth indication information may indicate a starting frequency-domain unit resource index and an ending frequency-domain unit resource index, and a starting time-domain unit resource index and an ending time-domain unit resource index. For example, the frequency-domain unit resource may be at least one of one or more physical resource blocks, one or more subcarriers, or one or more preset subcarrier groups. For example, the time-domain unit resource may be at least one of one or more subframes, one or more slots, one or more mini-slots, one or more symbol sets, one or more symbols, or the like.

In some embodiments, the data band time-frequency resource available for high-priority service transmission may be divided in a predetermined manner, and the corresponding index is indicated by the fourth indication information.

For an example of the fourth indication information configured by the base station, reference may be made to the corresponding operation of the base station which will be described below.

In step S3910, the terminal may stop the transmission of the uplink data and receive the downlink data having the higher priority, on the full-duplex resource indicated by the fourth instruction information.

In some embodiments, after receiving the fourth indication information of a full-duplex resource configured by the base station for stopping transmission of the uplink data and receiving the downlink data having the higher priority, the terminal may determine full-duplex symbols for transmitting a high-priority service according to the fourth indication information, and stop transmission of the uplink data and receive the downlink data having the higher priority on the determined full-duplex symbols. For example, the reception of the downlink data having the higher priority may include separately detecting and demodulating the received downlink data having the higher priority. In addition, after the terminal completes the detection and demodulation of the higher priority service, it may transmit HARQ feedback information on the uplink symbol in the current subframe, as shown in FIG. 40.

In some embodiments, after receiving the fourth indication information of a full-duplex resource configured by the base station to stop transmission of the uplink data and receive the downlink data having the higher priority, the terminal may determine a data band time-frequency resource for transmitting a high-priority service according to the fourth indication information, and stop transmission of the uplink data and receive the downlink data having the higher priority on the determined data band time-frequency resource. For example, receiving the downlink data having the higher priority may include separately detecting and demodulating the received downlink data having the higher priority. After the terminal completes the reception of the downlink service having a high-priority, the terminal may transmit HARQ feedback information in the uplink control channel after a specified timing, as shown in FIG. 41.

In some embodiments, when receiving a downlink high-priority service, the terminal may stop transmission of some uplink data. Regarding the full-duplex symbols corresponding to the uplink data that have not been sent, the base station can transmit them in subsequent subframes according to the scheduling information of the base station.

FIG. 42 illustrates a flowchart of operations of a base station according to an exemplary embodiment of the present disclosure.

Referring to FIG. 42, operations of the base station according to some embodiments of the disclosure may include steps S4200 and S4210.

In step S4200, the base station may transmit fourth instruction information indicating a full-duplex resource for stopping a transmission of uplink data and receiving downlink data having a higher priority.

In some embodiments, the base station may transmit to the terminal the fourth indication information indicating the full-duplex resource for stopping transmission of the uplink data and receiving the downlink data having the higher priority. For example, when the base station needs to transmit the downlink data having the higher priority after completing the scheduling of subsequent subframes, the base station may instruct the terminal to stop transmission of the data on some full-duplex resources, in order to avoid self-interference on the terminal side and eliminate interference on downlink reception. Some examples of the fourth indication information configuration will be described below. For example, the downlink data having the higher priority may refer to the downlink data having the higher priority than data currently being transmitted.

In some embodiments, the frame structure type may be the first full-duplex frame structure as described above. In this case, the fourth indication information may indicate a starting symbol index of the full-duplex symbols used to stop the transmission of the uplink data and receive the downlink data having the higher priority, and a number of the full-duplex symbols.

In some embodiments, the frame structure type may be the first full-duplex frame structure. In this case, the fourth indication information may indicate a starting symbol index and an ending symbol index of the full-duplex symbols used to stop the transmission of the uplink data and receive the downlink data having the higher priority.

In some embodiments, the frame structure type may be the first full-duplex frame structure. In this case, the fourth indication information may indicate a mini-slot used to stop transmission of the uplink data and receive the downlink data having the higher priority. For example, the mini-slot may be a time unit divided in a predetermined manner that can be used to transmit a high-priority service. An example of the division of the mini-slot will be described below.

FIG. 43 illustrates an example of the division of the mini-slot according to an exemplary embodiment of the present disclosure.

Referring to FIG. 43, four consecutive full-duplex symbols may be divided as one mini-slot. Since there are 8 full-duplex symbols in the frame structure shown in FIG. 43, the frame structure may include two non-overlapping mini-slots (mini-slot 1 and mini-slot 2).

In some embodiments, different mini-slot division manners may be defined for different frame structures, and the terminal may be notified of mini-slot division through the configuration of the frame structure.

In some embodiments, the mini-slot division manner may be specified by a predetermined criterion. For example, a simple criterion may be that non-overlapping N consecutive full-duplex symbols form a mini-slot until the number of full-duplex symbols is less than N, and N is a positive integer. Therefore, for a frame structure containing N_F full-duplex symbols, N_F may be a positive integer, the number of mini-slots may be $\lfloor N\_F/N \rfloor$ ('$\lfloor \ \rfloor$' means round down). In this case, the terminal may determine the indexes of mini-slots according to the predetermined criterion. In this way, the base station can notify the terminal of the full-duplex symbols used to stop transmission of the uplink data and receive the downlink data having the higher priority by configuring the indexes of the mini-slots.

In some embodiments, for a manner of dividing mini-slots that can be used for transmitting a high-priority service in a predetermined manner, the mini-slots of different lengths may be divided. For example, for the mini-slots of different lengths, different mini-slots can overlap each other. For example, as shown in FIG. 44, 8 full-duplex symbols can be divided into two mini-slots (mini-slot 1 and mini-slot 2) when a mini-slot is of length 4; can be divided into one mini-slot (mini-slot 3) when a mini-slot is of length 6; and can be divided into one mini-slot (mini-slot 4) when a mini-slot is of length 8. For example, for mini-slots of the same length, multiple mini-slots may also be divided without overlapping.

The division manner of the mini-slot described above is only an example, and various changes can be made based on this.

In some embodiments, step S4200 may further include rewriting the data direction of the current slot by the base station through downlink control information in the unidirectional downlink control channel. In this way, even in a case where the base station has configured the frame structure on the time-frequency resource of the current subframe or slot through semi-static or static system information, the base station can still use the downlink control information in the downlink control channel to rewrite the full-duplex symbol transmission direction in the current slot as a unidirectional uplink data transmission direction or a downlink data transmission direction.

For example, rewriting the transmission direction of the symbol may include: rewriting the transmission direction of the entire slot. This method may require less signaling, and only may need to indicate the change of the transmission direction of the full-duplex symbol in the current slot. For example, the 1-bit information in the specific downlink control information format may indicate a change in transmission direction, where '0' indicates changing into a unidirectional downlink data transmission direction, and '1' indicates changing into a unidirectional uplink data transmission direction. In this case, after detecting the specific downlink information format, the terminal can obtain the transmission direction of the current slot that needs to be rewritten and continue to detect the signaling in the downlink control information. If the obtained 1-bit information is '0', the full-duplex symbol may be changed to a downlink symbol and the transmission of uplink data is stopped; and if the obtained 1-bit signaling is '1', the full-duplex symbol may be changed to an uplink symbol and the reception of downlink data may be stopped.

For example, rewriting the transmission direction of the symbol may include: rewriting the transmission direction of some symbols in the slot. In addition to notifying the specific transmission direction, this method may also need to notify indexes of the symbols that change the transmission direction.

In some examples, the signaling for rewriting the transmission direction may take effect only for the current slot or for consecutive M slots including the current slot, where M is indicated in the downlink control information and M may be a positive integer greater than 1.

In some embodiments, the frame structure type may be the second full-duplex frame structure as described above. In this case, the base station may indicate, on the downlink control channel, a part of a data band time-frequency resource that the terminal needs to stop uplink transmission. For example, the base station may indicate a starting frequency-domain unit resource index and a frequency-domain unit resource amount, and indicate a time-domain unit resource index and a time-domain unit resource amount. For example, the base station may indicate the starting frequency-domain unit resource index and the ending frequency-domain unit resource index, and indicate the starting time-domain unit resource index and the ending time-domain unit resource index. For example, the base station may divide the data band time-frequency resource available for high-priority service transmission in a predetermined manner, and indicate the corresponding indexes.

In step S4210, the base station may transmit the downlink data having the higher priority on the full-duplex resource indicated by the fourth instruction information.

In some embodiments, after the configuration of the full-duplex resource is completed, the base station may transmit the downlink data having the higher priority on the full-duplex resource.

The examples of the operations of the terminal and the operations of the base station when the base station needs to transmit a high-priority service have been described above. Examples of the operations of the terminal and the operations of the base station when the terminal needs to transmit a high-priority service will be described below.

FIG. 45 illustrates a flowchart of operations of a terminal according to an exemplary embodiment of the present disclosure.

Referring to FIG. 45, operations of the terminal according to some embodiments of the disclosure may include steps S4500, S4510, and S4520.

In step S4500, the terminal may transmit a request message for requesting to transmit uplink data having a higher priority.

In some embodiments, the terminal in the full-duplex mode may transmit the request message to the base station for requesting to transmit the uplink data having the higher priority. For example, after the base station completes full-duplex scheduling, when the terminal needs to transmit the uplink data having the higher priority, in order to prevent residual self-interference on the base station side from affecting the reception of high-priority uplink data services, the terminal may notify the base station that it is to transmit the uplink data having the higher priority, so that the base station stops the transmission of a part of downlink data. For example, the uplink data having the higher priority may refer to the uplink data having the higher priority than data currently being transmitted.

In some embodiments, the terminal may transmit the request message on an uplink control channel on uplink symbols.

In some embodiments, the request message transmitted by the terminal may include a request indication and a buffer status report (BSR) of the high-priority service to be transmitted, so as to notify the base station of the data size of the high-priority service to be transmitted, and assist the base station to allocate the time-frequency resource.

In step S4510, the terminal may receive fifth indication information indicating a full-duplex resource for transmitting the uplink data having the higher priority in response to the request message.

In some embodiments, the terminal may receive, from the base station, the fifth indication information indicating the full-duplex resource for transmitting the uplink data having the higher priority in response to the request message. For the examples of indicating the full-duplex resource, reference may be made to the various embodiments described previously, and details are not described herein again.

In step S4520, the terminal may stop the reception of the downlink data and transmit the uplink data having the higher priority on the full-duplex resource indicated by the fifth instruction information.

In some embodiments, the terminal may stop the reception of the downlink data and transmit the uplink data having the higher priority on the full-duplex resource indicated by the base station.

In some implementations, the frame structure type may be the first full-duplex frame structure as described above. In this case, the terminal may stop the reception of the downlink data and transmit the uplink data having the higher priority on full-duplex symbols indicated by the base station. For example, reference may be made to FIG. 46 for a series of operations regarding a terminal transmitting a high-priority service.

In some embodiments, the frame structure type may be the second full-duplex frame structure as described above. In this case, the terminal may stop the reception of the downlink data and transmit the uplink data having the higher priority on a data band time-frequency resource indicated by the base station. For example, after completing the transmission of the uplink data having the higher priority, the terminal may receive the scheduling information of the base station after a specified timing to confirm whether the transmission of the high priority service is successful. For example, reference may be made to FIG. 47 for a series of operations related to a terminal transmitting a high-priority service.

In some embodiments, when transmitting an uplink high-priority service, the terminal may stop the reception of a part of downlink data. Regarding full-duplex symbols corresponding to the downlink data that has not been received completely, the downlink data can be received in subsequent subframes according to the scheduling information of the base station.

FIG. 48 illustrates a flowchart of operations of a base station according to an exemplary embodiment of the present disclosure.

Referring to FIG. 48, operations of the terminal according to some embodiments of the disclosure may include steps S4800, S4810, and S4820.

In step S4800, the base station may receive a request message for requesting to transmit uplink data having a higher priority.

In some embodiments, the base station may receive a request message from a terminal for requesting transmission of the uplink data having the higher priority. For example, after the base station completes full-duplex scheduling, when the terminal needs to transmit the uplink data having the higher priority, in order to prevent residual self-interference on the base station side from affecting the reception of the high-priority uplink data services, the terminal may notify the base station that it is to transmit the uplink data having the higher priority, so that the base station stops transmission of a part of downlink data. For example, the uplink data having the higher priority may refer to the uplink data having the higher priority than data currently being transmitted.

In some embodiments, the base station may receive the request message on an uplink control channel on uplink symbols.

In some embodiments, the request message transmitted by the terminal may include a request indication and a buffer status report (BSR) of the high-priority service to be transmitted, so as to notify the base station of the data size of the high-priority service to be transmitted, and assist the base station to allocate the time-frequency resource.

In step S4810, in response to the request message, the base station may transmit fifth indication information indicating a full-duplex resource for transmitting the uplink data having the higher priority.

In some embodiments, after receiving the request message transmitted by the terminal, the base station may configure a full-duplex resource used by the terminal to transmit the uplink data having the higher priority. For the configuration of the full-duplex resource used for higher priority services, reference may be made to the above various embodiments, and details are not described herein again.

In step S4820, the base station may receive the uplink data having the higher priority, on the full-duplex resource indicated by the fifth instruction information.

In some embodiments, the base station may receive the uplink data having the higher priority from the terminal, on the full-duplex resource indicated by the fifth indication information.

In some embodiments, the base station may stop transmission of the downlink data and receive the uplink data having the higher priority from the terminal, on the full-duplex resource indicated by the fifth indication information.

In some embodiments, after receiving the high-priority service transmitted by the terminal, the base station may attempt to detect and decode the high-priority service, and may transmit scheduling information indicating whether the high-priority service is received correctly on the downlink symbols of the subsequent subframes, referring to FIG. 46.

In some embodiments, after the base station receives the high-priority service transmitted by the terminal, the base station may try to detect and decode the high-priority service, and may transmit scheduling information on the downlink control channel to indicate whether the high-priority service is received correctly, referring to FIG. 47.

The above describes examples of the operations of the terminal or the base station when the terminal needs to transmit a high-priority service or the base station needs to transmit a high-priority service. It should be noted that although some embodiments are described in a separate manner, some of these embodiments may be combined to be performed. For example, the operations of the terminal shown in FIGS. 23 to 29 may be performed in combination with the operations of the terminal shown in FIG. 34. In addition, it needs to be explained that the steps of the method in various embodiments are only described here by way of example. However, the embodiments of the disclosure are not limited thereto. For example, without departing from the scope of the disclosure, other steps may be added or some steps may be omitted.

The manner of performing duplex mode switching when a terminal has full-duplex capability is described in the above embodiments. An application of the above embodiments in some special scenarios (such as an Integrated Access and Backhaul (IAB) scenario) is described below.

In the IAB scenario, an IAB node may serve as a relay between an IAB-donor and a terminal. For the terminal, the IAB node may be equivalent to a base station, and the terminal may access the IAB node to obtain services; while for the IAB-donor, the IAB node may be equivalent to a terminal accessing a base station.

Considering that the processing capacity of IAB nodes is much stronger than that of general terminals, resources can be more effectively used by deploying full-duplex in the IAB scenario. Different IAB nodes may have different capabilities. For example, some IAB nodes may be fixed in location, and the installation costs may be high and their capabilities may be strong; while other IAB nodes can be moved and carried by mobile devices, and their capabilities are weak. Also, since the IAB nodes serve as relays, the channel conditions of some IAB nodes that are set up relatively low may be related to the conditions of the surrounding environment. In this case, even if an IAB node has a self-interference cancellation capability, the self-interference cancellation capability will change depending on the surrounding environment. Therefore, it is necessary to design a duplex mode switching method for the IAB scenario.

When an IAB node accesses an IAB-donor, the IAB node may be equivalent to a terminal. Therefore, the method in some embodiments described above may be used by the IAB node to report capability information of the IAB node related to self-interference cancellation to the IAB-donor. For example, for the IAB node, the capability information related to self-interference cancellation may include: indication information indicating whether the IAB node has the self-interference cancellation capability, and indication information related to a size of the self-interference cancellation capability, which is similar to the terminal capability information indicating the self-interference cancellation capability of the terminal described above.

For example, the indication information related to the size of the self-interference cancellation capability may include: a self-interference cancellation bandwidth supported in a full-duplex mode; a maximum modulation order supported in the full-duplex mode; a maximum number of multiple antenna layers supported in the full-duplex mode; and other possible indication information related to the self-interference cancellation capability in the full-duplex mode.

In some embodiments, the capability information related to self-interference cancellation may be reported together with other capability information. For example, after a random access procedure is completed, the capability information related to self-interference cancellation can be reported in an uplink shared channel. Alternatively, the capability information related to self-interference cancellation may be reported in the random access procedure. For example, the capability information related to self-interference cancellation may be reported in Message A in the two-step random access procedure, or may be reported in Message 3 in the random access procedure.

After a connection between an IAB node and an IAB-donor is established, for the IAB node having the self-interference cancellation capability, the backhaul link between the IAB node and the IAB-donor can be transmitted in full-duplex mode. Considering that the self-interference cancellation capability of the IAB node supporting full-duplex will still change depending on the channel condition, it is necessary to design a residual self-interference measurement and reporting process so that duplex mode switching becomes possible.

In some embodiments, the residual self-interference measurement and reporting process for the IAB node may include: the IAB node may report full-duplex capability; the IAB node may receive third configuration information from the IAB-donor, and determine a measurement time-frequency resource for the residual self-interference measurement according to the third configuration information; the IAB node may perform the residual self-interference measurement and feed back feedback information determined according to a measurement result; the IAB node may receive fourth configuration information based on the feedback information transmitted by the IAB-donor and determines a duplex mode of the IAB node.

For example, residual self-interference may refer to residual self-interference after self-interference isolation and/or self-interference cancellation. In addition, the residual self-interference measurement may include at least one of a measurement of a strength of the residual self-interference and a measurement of a SINR considering the residual self-interference.

In these embodiments, the third configuration information may be similar to the first configuration information in the above various embodiments. The fourth configuration information may be similar to the second configuration information in the above various embodiments.

For example, the third configuration information may be used to determine the measurement time-frequency resource for the IAB node to perform the residual self-interference measurement, and the fourth configuration information may be used to configure the duplex mode of the IAB node.

For example, the third configuration information may include indication information indicating the measurement time-frequency resource (which may be referred to as "downlink measurement time-frequency resource") for the residual self-interference measurement on the downlink channel. For example, the measurement time-frequency resource may be a time-frequency resource with zero power, where the IAB node may assume that the IAB-donor does not transmit a signal on the time-frequency resource with zero power. For example, the measurement time-frequency resource may be at least one of one or more symbols, one or more REs, or one or more PRBs.

For example, the third configuration information may include indication information indicating the measurement time-frequency resource (which may be referred to as "uplink measurement time-frequency resource") for residual self-interference measurement on the uplink channel.

For example, the third configuration information may include information indicating a periodic measurement time-frequency resource. That is, in some cases, the residual self-interference measurement may be periodic. In these cases, the IAB node may periodically feed back the feedback information determined according to the measurement result.

For example, the third configuration information may be transmitted by the IAB-donor in response to a residual self-interference measurement request transmitted by the tAB node. That is, in some cases, the residual self-interference measurement may be aperiodic. In these cases, after receiving the aperiodic measurement time-frequency resource allocated by the IAB-donor, the IAB node performs the residual self-interference measurement and feeds back feedback information determined according to the measurement result.

For example, for IAB nodes operating indifferent duplex modes, the IAB-donor may use a unified configuration method to configure the third configuration information, so that the configuration signaling design can be simplified. Alternatively, for IAB nodes operating in different duplex modes, the IAB-donor may use different configuration methods to configure the third configuration information to optimize operations.

For example, the fourth configuration information may include information indicating the duplex mode of the IAB node. For example, the fourth configuration information may include information indicating whether the IAB node is capable of operating in the full-duplex mode. For example, the IAB node may switch the duplex mode from the half-duplex mode to the full-duplex mode, switch the duplex mode from the full-duplex mode to the half-duplex mode, or maintain the current duplex mode based on the fourth configuration information.

For example, the IAB-donor may determine the fourth configuration information for configuring the duplex mode of the IAB node according to the feedback information.

For example, the feedback information may include at least one of the strength of the residual self-interference, the SINR considering the residual self-interference, and the SINR without considering the residual self-interference. According to different types of feedback information, the IAB-donor may use different methods to determine the duplex mode of the IAB node.

For example, the fourth configuration information may be determined according to at least one of the strength of the residual self-interference and the SINR considering the residual self-interference. In a case where the feedback information includes the SINR without considering the residual self-interference, the fourth configuration information may be determined according to one of the strength of the residual self-interference and the SINR considering the residual self-interference, and the SINR without considering the residual self-interference. In a case where the feedback information does not include the SINR without considering the residual self-interference, the fourth configuration information may be determined according to one of the strength of the residual self-interference and the SINR considering the residual self-interference, and the SINR without considering the residual self-interference fed back by the IAB node last time. The method for determining the fourth configuration information may refer to various embodiments described above regarding the base station determining the second configuration information based on the feedback information fed back by the terminal.

Those skilled in the art can understand that the information type and configuration method of the third configuration information for the IAB node may refer to the various embodiments of the first configuration information for the terminal described above, and the information type and configuration method of the fourth configuration information for the IAB node may refer to the various embodiments of the second configuration information for the terminal described above.

The allocation method of the measurement time-frequency resource for the residual self-interference measurement may refer to the various embodiments described above.

For example, a time-frequency resource with zero power may be allocated on the downlink channel as the measurement time-frequency resource, as described above. In this case, the IAB node may perform the residual self-interference measurement on the uplink channel corresponding to the time-frequency resource with zero power. Alternatively, the measurement time-frequency resource may be allocated on the uplink channel. In this case, the IAB node may not receive data on the downlink channel corresponding to the measurement time-frequency resource, and may perform residual self-interference measurement on the measurement time-frequency resource. Alternatively, the measurement time-frequency resource may be allocated on the uplink channel, while the time-frequency resource with zero power may be allocated on the downlink channel.

The feedback of the feedback information determined according to the measurement result for the residual self-interference measurement may refer to the various embodiments described above.

For example, the IAB node may periodically feedback the feedback information determined according to the measurement result, as described above. In this case, the IAB-donor may configure a periodic measurement time-frequency resource. That is, the third configuration information from the IAB-donor may carry period information for the measurement time-frequency resource. The IAB node may perform the residual self-interference measurement on the measurement time-frequency resource, and periodically feed back the feedback information determined according to the measurement result to the IAB-donor.

For example, the IAB node may aperiodically feed back the feedback information determined according to the measurement result, as described above. In this case, the IAB node may transmit an aperiodic residual self-interference measurement request. After receiving the residual self-interference measurement request, the IAB-donor may transmit the third configuration information indicating an aperiodic measurement time-frequency resource to the IAB node to allocate the aperiodic measurement time-frequency resource. After receiving the third configuration information, the IAB node may perform the residual self-interference measurement on the aperiodic measurement time-frequency resource, and feed back feedback information determined according to the measurement result on the uplink channel.

It should be noted that, although the method for the residual self-interference measurement and reporting in the IAB scenario has been exemplarily described above, embodiments of the present disclosure are not limited thereto. For example, those skilled in the art should understand that the method between the terminal and the base station described in the foregoing various embodiments may be used to implement the residual self-interference measurement and reporting in the IAB scenario.

FIG. 49 is a block diagram illustrating a configuration of a terminal according to an exemplary embodiment of the present disclosure.

Referring to FIG. 49, the terminal described above may correspond to the terminal 49. The terminal according to various embodiments of the disclosure may include a transceiver 4900 and a controller 4910. However, all of the illustrated components are not essential. The terminal 49 may be implemented by more or less components than those illustrated in FIG. 49. In addition, the controller 4910 and the transceiver 4900 may be implemented as a single chip according to another embodiment. The aforementioned components will now be described in detail.

The controller 4910 may include one or more processors or other processing devices that control the proposed function, process, and/or method. Operation of the terminal 49 may be implemented by the processor. For example, the controller 4910 may be coupled to the transceiver 4900. For example, the transceiver 4900 may be configured to transmit and receive signals. For example, the controller 4910 may be configured to execute a method according to some embodiments described above, such as the method of the embodiment corresponding to FIGS. 23 to 29, or the method of the embodiment corresponding to FIG. 34. The transceiver 4900 may include a RF transmitter for up-converting and amplifying a transmitted signal, and a RF receiver for down-converting a frequency of a received signal. However, according to another embodiment, the transceiver 4900 may be implemented by more or less components than those illustrated in components.

The transceiver 4900 may be connected to the controller 4910 and transmit and/or receive a signal. The signal may include control information and data. In addition, the transceiver 4900 may receive the signal through a wireless channel and output the signal to the controller 4910. The transceiver 4900 may transmit a signal output from the controller 4910 through the wireless channel.

The terminal may further include a memory. The memory may store the control information or the data included in a signal obtained by the terminal. The memory may be connected to the processor and store at least one instruction or a protocol or a parameter for the proposed function, process, and/or method. The memory may include read-only memory (ROM) and/or random access memory (RAM) and/or hard disk and/or CD-ROM and/or DVD and/or other storage devices.

Although the terminal is illustrated as having separate functional blocks for convenience of explanation, the configuration of the terminal is not limited thereto. For example, the terminal may include a communication unit including a transceiver and a processor. The terminal can communicate with at least one network node by means of the communication unit.

FIG. 50 is a block diagram illustrating a configuration of a base station according to an exemplary embodiment of the present disclosure.

Referring to FIG. 50, the gNBs, eNBs or BSs described above may correspond to the base station 50. A base station according to various embodiments of the disclosure may include a transceiver 5000 and a controller 5010. However, all of the illustrated components are not essential. The base station 50 may be implemented by more or less components than those illustrated in FIG. 50. In addition, the controller 5010 and the transceiver 5000 may be implemented as a single chip according to another embodiment. The aforementioned components will now be described in detail.

The controller 5010 may include one or more processors or other processing devices that control the proposed function, process, and/or method. Operation of the base station 50 may be implemented by the controller 5010. For example, the controller 5010 may be coupled to the transceiver 5000.

The transceiver 5000 may include a RF transmitter for up-converting and amplifying a transmitted signal, and a RF receiver for down-converting a frequency of a received signal. However, according to another embodiment, the transceiver 5000 may be implemented by more or less components than those illustrated in components. The transceiver 5000 may be connected to controller 5010 and transmit and/or receive a signal. The signal may include control information and data. In addition, the transceiver 5000 may receive the signal through a wireless channel and output the signal to the controller 5010. The transceiver 5000 may transmit a signal output from the controller 5010 through the wireless channel.

The memory may store the control information or the data included in a signal obtained by the base station 50. The memory may be connected to the controller 5010 and store at least one instruction or a protocol or a parameter for the proposed function, process, and/or method. The memory may include read-only memory (ROM) and/or random access memory (RAM) and/or hard disk and/or CD-ROM and/or DVD and/or other storage devices.

For example, the transceiver 5000 may be configured to transmit and receive signals. The controller 5010 may be configured to execute a method according to some embodiments described above, such as the method of the embodiment corresponding to FIGS. 29 to 33, or the method of the embodiment corresponding to FIG. 35.

Although the base station is illustrated as having separate functional blocks for convenience of explanation, the configuration of the base station is not limited thereto. For example, the base station may include a communication unit including a transceiver and a processor. The base station can communicate with at least one network node by means of the communication unit.

FIG. 51 is a block diagram showing a configuration of a wireless communication system according to an exemplary embodiment of the present disclosure.

Referring to FIG. 51, a wireless communication system 51 according to various embodiments of the disclosure may include the terminal 49 shown in FIG. 49 and the base station 50 shown in FIG. 50.

FIG. 52 illustrates a schematic diagram of an air interface link in an IAB scenario according to an exemplary embodiment of the present disclosure.

As shown in FIG. 52, among the full-duplex IAB nodes, there may be four air interface links, that is, a downlink (denoted as DL2) from a transmitting end of a TAB-DU to a terminal or a receiving end of the IAB-MT of a child node, an uplink (denoted as UL2) from a transmitting end of the IAB-MT of the child node to a receiving end of the IAB-DU, a downlink (denoted as DL1) from a transmitting end of an IAB-donor or a IAB-DU of the parent node to the receiving end of the IAB-MT, and an uplink from the IAB-MT to the IAB-donor or the receiving end of the IAB-DU of the parent node (denoted as UL1). The present disclosure is directed to a scenario in which full-duplex transmission of four air interface links is performed, that is, data transmission may be performed on the same time-frequency resource for the DL1, the DL2, the UL1, and the UL2. It should be noted that the content of the present disclosure is also applicable to two simplified scenarios, that is, the DL1 may perform full-duplex transmission with the DL2, and the UL1 may perform full-duplex transmission with the UL2.

Since cell-level parameters of the IAB-MT are given by the IAB-donor or the IAB-DU of the parent node to which it accesses, and IAB-DU parameters of all IAB nodes are given by the IAB-donor, different root numbers will be used for the uplink physical signal transmitted by the IAB-MT and the downlink physical signal transmitted by the IAB-DU in the TAB node, if the existing technology is used. According to the nature of the ZC sequence, if two reference signals are generated from different numbers of physical root sequences, no matter how cyclic shifts of the two reference signals are selected, their correlation values may be inversely proportional to the sequence lengths. Therefore, ZC sequences (or cyclically shifted signals) generated from different physical root numbers may have a certain degree of orthogonality. The longer the sequence length, the better the orthogonality. However, the orthogonality between ZC sequences with different root numbers may be limited by the sequence length, and the two reference signals cannot be completely orthogonalized, so the orthogonality provided by the different root numbers may be weaker than that provided by a cyclic shift. Extremely high self-interference channel estimation accuracy may be required by self-interference elimination, thus, the ability of self-interference elimination may be affected if this method is used.

FIG. 53 illustrates a flowchart of a physical signal transmission method for an IAB node according to an exemplary embodiment of the present disclosure.

Referring to FIG. 53, in step S5301, configuration parameters for transmitting a physical signal are acquired.

In an exemplary embodiment of the present disclosure, the physical signal may include at least one of a reference signal for self-interference channel estimation (SI-RS), a demodulation reference signal, a phase tracking reference signal, and a sounding reference signal. In an exemplary embodiment of the present disclosure, the reference signal for SI-RS may be used as an example for explanation.

In an exemplary embodiment of the present disclosure, the configuration parameters for transmitting the physical signal may include uplink physical signal parameters and downlink physical signal parameters.

In an exemplary embodiment of the present disclosure, the uplink physical signal parameters may include, without limitation, at least one of information on cyclic shift of the uplink physical signal, information on comb-shaped frequency-domain resource structure and information on switching period of the comb-shaped frequency-domain resource structure of the uplink physical signal, information on frequency-hopping pattern and information on frequency-hopping switching interval of the uplink physical signal, and information on frequency-domain and time-domain orthogonal cover code of the uplink physical signal.

In an exemplary embodiment of the present disclosure, the downlink physical signal parameters may include at least one of information on cyclic shift of the downlink physical signal, information on comb-shaped frequency-domain resource structure and information on switching period of the comb-shaped frequency-domain resource structure of the downlink physical signal, information on frequency-hopping pattern and information on frequency-hopping switching interval of the downlink physical signal, and information on frequency-domain and time-domain orthogonal cover code of the downlink physical signal.

In an exemplary embodiment of the present disclosure, the downlink physical signal parameters may further include a physical root number of the uplink physical signal transmitted by the terminal functional entity of the IAB node.

Specifically, an IAB-MT may obtain the configuration parameters for transmitting the uplink physical signal, and an IAB-DU of an IAB node may obtain the configuration parameters for the downlink physical signal. The uplink physical signal for self-interference channel estimation may be denoted as UL SI-RS, and the downlink physical signal for self-interference channel estimation may be denoted as DL SI-RS.

The uplink physical signal parameters should include at least one of information on cyclic shift of the UL SI-RS, information on comb-shaped frequency-domain resource structure and information on switching period of the comb-shaped frequency-domain resource structure of the UL SI-RS, information on frequency-hopping pattern and information on frequency-hopping switching interval of the UL SI-RS, and information on frequency-domain and time-domain orthogonal cover code (OCC sequence) used by the UL SI-RS.

The information on the cyclic shift of the UL SI-RS may indicate the cyclic shift used by the UL SI-RS. For example, information on the cyclic shift of the UL SI-RS may have two optional values of 0 and 1. 0 may indicate that the cyclic shift of the UL SI-RS is 0, and 1 may indicate that the cyclic shift used by the UL SI-RS is half of the length of the UL SI-RS.

The information on the comb-shaped frequency-domain resource structure may indicate that the UL SI-RS performs resource mapping on odd-numbered subcarriers within its bandwidth or perform resource mapping on even-numbered subcarriers within its bandwidth. The information on the switching period of the comb-shaped frequency-domain resource structure may indicate the switching period of the comb-shaped frequency-domain resource structure used by the UL SI-RS. For example, the information on the switching period of the comb-shaped frequency-domain resource structure may be 2 bits, "00" may indicate "no switching", "01" may indicate "switching at a period of a slot", "10" may indicate "switching at a period of a subframe", and "11" may indicate "switching at a period of a frame".

The information on the frequency-hopping pattern may indicate the frequency-hopping pattern used by the UL SI-RS, and the information on frequency-hopping switching interval may indicate a time interval between two frequency-hoppings of the UL SI-RS. For example, the information on the frequency-hopping switching interval may have four optional values, 0 may mean "no switching", 1 may mean "switching at a period of a slot", 2 may mean "switching at a period of a subframe", and 3 may mean "switching at a period of a frame".

The information on frequency-domain and time-domain orthogonal cover code may indicate the frequency-domain and time-domain orthogonal cover codes used by the UL SI-RS. The information on frequency-domain and time-domain orthogonal cover code may respectively indicate the OCC sequences used in the frequency-domain and time-domains by 2 bits, and "00" may indicate that no OCC sequence is used, "01" may indicate that the used OCC sequence is [1 1], and "10" may indicate that the used OCC sequence is [1 −1].

The IAB-MT may obtain the uplink physical signal parameters either explicitly or implicitly. The explicit acquisition of the uplink physical signal parameters may be implemented by at least one of the following two methods. The first explicit acquisition method may be to obtain the parameters from high-level signaling when establishing a Radio Resource Control (RRC) connection, and an Information Element (IE) indicating the uplink physical signal parameters is added to the command. The second explicit acquisition method may be to obtain the parameters from the downlink control information from the IAB-Donor or the IAB-DU of the parent node, and a field indicating the uplink physical signal parameters needs to be added to the downlink control information. The implicit acquisition of the uplink physical signal parameters may be implemented by using preset parameters.

The downlink physical signal parameters should include the physical root numbers of the IAB-MT of the same IAB node, and should also include at least one of the information on cyclic shift used by DL SI-RS, and the information on comb-shaped frequency-domain resource structure and the information on switching period of the comb-shaped frequency-domain resource structure of the DL SI-RS, the information on frequency-hopping pattern and the information on frequency-hopping switching interval of the DL SI-RS, and the information on frequency-domain and time-domain orthogonal cover code (OCC Sequence) used by the DL SI-RS.

The information on the cyclic shift may indicate the cyclic shift used by the DL SI-RS. For example, the information on the cyclic shift may have two optional values of 0 and 1. 0 may indicate that the cyclic shift used by the DL SI-RS is 0, 1 may indicate that the cyclic shift used by the DL SI-RS is half of the length of the DL SI-RS.

The information on the comb-shaped frequency-domain resource structure may indicate that the DL SI-RS performs resource mapping on odd-numbered subcarriers within its bandwidth or performs resource mapping on even-numbered subcarriers within its bandwidth. The information on the switching period of the comb-shaped frequency-domain resource structure may indicate the switching period of the comb-shaped frequency-domain resource structure used by the DL SI-RS. For example, the information on the switching period of the comb-shaped frequency-domain resource structure may be 2 bits, "00" may mean "no switching", "01" may mean "switching at a period of a slot", "10" may indicate "switching at a period of a subframe", and "11" may indicate "switching at a period of a frame".

The information on the frequency-hopping pattern may indicate the frequency-hopping pattern used by the DL SI-RS, and the information on frequency-hopping switching interval may indicate a time interval between two frequency-hoppings of the DL SI-RS. For example, the information on the frequency-hopping switching interval may have four optional values, 0 may mean "no switching", 1 may mean switching at a period of a slot", 2 may mean "switching at a period of a subframe", and 3 may mean "switching at a period of a frame".

The information on frequency-domain and time-domain orthogonal cover code may indicate the frequency-domain and time-domain orthogonal cover codes used by the DL SI-RS. The frequency-domain and time-domain orthogonal cover code information may respectively indicate the OCC sequence used in the frequency and time-domains by 2 bits, and "00" may indicate that no OCC sequence is used, "01" may indicate that the used OCC sequence is [1 1], and "10" may indicate that the used OCC sequence is [1 −1].

The IAB-DU of the IAB node may obtain the downlink physical signal parameters either explicitly or implicitly. The explicitly obtained uplink physical signal parameters may be obtained from the high-level signaling or downlink control information of the IAB-Donor or the IAB-DU of the parent node, or may also be obtained from the IAB-MT of the same IAB node. The implicit acquisition of the downlink physical signal parameters may be implemented by using preset parameters.

In step S5302, a uplink physical signal transmitted by a terminal functional entity of the IAB node and a downlink physical signal transmitted by a base station functional entity of the IAB node on the same time-domain resource may be transmitted according to the obtained configuration parameters, when a full-duplex transmission is performed on a transmission uplink of the terminal functional entity, a reception downlink of the terminal functional entity, a transmission downlink of the base station functional entity and a reception uplink of the base station functional entity of the IAB node at the same frequency and at the same time.

In an exemplary embodiment of the present disclosure, in transmitting the uplink physical signal transmitted by the terminal functional entity of the IAB node and the downlink physical signal transmitted by the base station functional entity of the IAB node on the same time-domain resource according to the obtained configuration parameters, different cyclic shifts may be firstly configured for the uplink physical signal and the downlink physical signal according to the obtained configuration parameters, when waveforms of the uplink physical signal and the downlink physical signal are the same, and then the uplink physical signal and the downlink physical signal that are configured with different cyclic shifts are transmitted on the same time-domain resource.

In an exemplary embodiment of the present disclosure, in transmitting the uplink physical signal transmitted by the terminal functional entity of the IAB node and the downlink physical signal transmitted by the base station functional entity of the IAB node on the same time-domain resource according to the acquired configuration parameters, different comb-shaped frequency-domain resource structures may be firstly configured for the uplink physical signal and the downlink physical signal according to the acquired configuration parameters, when waveforms of the uplink physical signal and the downlink physical signal are the same, and then the uplink physical signal and the downlink physical signal that are configured with different comb-shaped frequency-domain resource structures may be transmitted on the same time-domain resource.

In an exemplary embodiment of the present disclosure, in transmitting the uplink physical signal transmitted by the terminal functional entity of the IAB node and the downlink physical signal transmitted by the base station functional entity of the IAB node on the same time-domain resource according to the obtained configuration parameters, different frequency-hopping patterns may be firstly configured for the uplink physical signal and the downlink physical signal according to the obtained configuration parameters, and then the uplink physical signal and the downlink physical signal that are configured with different frequency-hopping patterns may be transmitted on the same time-domain resource.

In an exemplary embodiment of the present disclosure, in transmitting the uplink physical signal transmitted by the terminal functional entity of the IAB node and the downlink physical signal transmitted by the base station functional entity of the IAB node on the same time-domain resource according to the obtained configuration parameters, different frequency-domain and time-domain orthogonal cover codes may be firstly configured for the uplink physical signal and the downlink physical signal according to the obtained configuration parameters, when waveforms of the uplink physical signal and the downlink physical signal are the same, and then the uplink physical signal and the downlink physical signal that are configured with different frequency-domain and time-domain orthogonal cover codes may be transmitted on the same time-domain resource.

Specifically, the UL SI-RS transmitted by the TAB-MT and the DL SI-RS transmitted by the IAB-DU of the same IAB node may be on the same time-domain resource, and orthogonal resource division for the UL SI-RS and the DL SI-RS may be performed in a non-time-domain division manner. The implementation of non-time-domain orthogonal resource division is at least one of the following manners. The first manner may be to use a cyclic shift to perform the orthogonal resource division of the UL SI-RS and the DL SI-RS within the same IAB node, that is, the UL SI-RS and the DL SI-RS may be generated by the same basic sequence through different cyclic shifts, and in performing self-interference channel estimation, the self-interference channels experienced by the UL SI-RS and the DL SI-RS may be orthogonally distinguished in a transform domain. The second manner may be to perform orthogonal resource division of the UL SI-RS and the DL SI-RS in the same IAB node in the frequency-domain, which may be implemented by frequency-hopping or using a comb-shaped structure (that is, the UL SI-RS is transmitted on odd or even subcarriers within the bandwidth, and the DL SI-RS is transmitted on the remaining subcarriers). The third manner may be to use the code division manner to perform orthogonal resource division of the UL SI-RS and the DL SI-RS in the same IAB node, that is, the UL SI-RS of the IAB-MT and the DL SI-RS of the IAB-DU of the same IAB node may use different orthogonal codes.

(1) Use the Cyclic Shift to Enhance the Orthogonality Between the UL SI-RS and the DL SI-RS Within the same IAB node, the orthogonality between the UL SI-RS and the DL SI-RS may be enhanced, if the cyclic shift indicated by the information on cyclic shift of the UL SI-RS in the uplink physical signal parameters received by the IAB-MT is different from the cyclic shift indicated by the information on cyclic shift of the DL SI-RS in the downlink self-interference channel estimation reference signal parameters received by the IAB-DU.

If multiple reference signals are generated from the same base sequence and have different cyclic shifts, the cyclic shifts may provide a good orthogonality for the multiple reference signals. When the length of the reference signal is long enough and difference between the cyclic shifts of the reference signal is large enough, the orthogonality provided by the cyclic shift may reach a good degree, thus the cyclic shift may be often used to increase the capacity of the reference signals (that is, to transmit more reference signals on the same resource). In the 4G LTE and the 5G NR systems, the ZC sequence may be selected for the base sequences of the reference signals for channel estimation, so the present disclosure may also use the reference signals generated by the ZC sequence for illustration. In addition, the objects that scatter the self-interference signal may be often located adjacent to the antenna, so the number of multi-paths of the self-interference channel may be relatively small and fixed. There may be some measured data indicating that the delay spread of the self-interfering channel is small, and the energy corresponding to the time-domain impulse of the channel may be concentrated in a very small range around the main path. Therefore, if the cyclic shift is used for orthogonality between the reference signals, sufficient orthogonality can be provided, and the self-interference channels experienced by the UL SI-RS and the DL SI-RS can be separated without interference, and thus the accuracy of the self-interference channel estimation can be ensured.

When a full-duplex transmission is performed between the IAB-MT and the IAB-DU at the same time and the same frequency, that is, when the four links UL1, UL2, DL1, and DL2 in FIG. 52 exist at the same time and occupy the same frequency resource, the UL SI-RS transmitted by the IAB-MT and the DL SI-RS transmitted by the IAB-DU may have the same length and the same frequency-domain location. If the UL SI-RS and the DL SI-RS are generated from the same physical root number and have a sufficiently large time-domain cyclic shift compared to a delay spread of the self-interfering channel, the two reference signals can be separated in the time-domain (a domain in which the Fourier transform or inverse Fourier transform of the frequency-domain is located) after the least squares channel estimation of the self-interfering channel is performed in the frequency-domain, without affecting the accuracy of the respective self-interfering channel estimates. In order to implement the maximum cyclic shift interval, the cyclic shift of the UL SI-RS and the cyclic shift of the DL SI-RS should be different by L/2, wherein L is the length of the reference signal.

If cyclic shift discrimination is used to enhance the orthogonality between the UL SI-RS and the DL SI-RS, the waveforms of the IAB-MT and the IAB-DU must be the same, that is, both are Cyclic Prefix-OFDM (CP-OFDM), or both are Discrete Fourier Transform-OFDM (DFT-OFDM), or both are some other waveforms, otherwise the UL SI-RS and the DL SI-RS cannot be distinguished from each other. For example, if the UL SI-RS transmitted by the IAB-MT and the DL SI-RS transmitted by the IAB-DU use the CP-OFDM and the DFT-OFDM respectively, the DL SI-RS will perform one more DFT operation than the UL SI-RS, and accordingly in the time-domain, the energy of the least squares channel estimation result obtained by the DL SI-RS will be dispersed throughout the time-domain, and the channels cannot be separated.

(2) Use the Comb-Shaped Frequency-Domain Resource Structure to Enhance the Orthogonality Between the UL SI-RS and the DL SI-RS In the same IAB node, when the information on the comb-shaped frequency-domain resource structure of the UL SI-RS in the uplink physical signal parameters obtained by the IAB-MT may indicate that the UL SI-RS performs resource mapping on odd-numbered (or, even-numbered) subcarriers and the information on the comb-shaped frequency-domain resource structure of the DL SI-RS in the downlink physical signal parameters obtained by the IAB-DU may indicate that the DL SI-RS performs resource mapping on even-numbered (or, odd-numbered) subcarriers, and switching periods indicated by the information on the switching period of the comb-shaped frequency-domain resource structure of the IAB-MT and the IAB-DU may be the same, the orthogonality between the UL SI-RS and the DL SI-RS may be enhanced.

As previously mentioned, the delay spread of the self-interfering channel may be small. Since a coherent bandwidth of a channel is inversely proportional to the delay spread of the channel, the coherent bandwidth of the self-interfering channel may be large, and the SI-RS can be transferred at a lower frequency-domain density without affecting the accuracy of channel estimation. Therefore, in an example in which the switching period of the comb-shaped frequency-domain resource structure is a subframe, a manner shown in FIG. 54 may be used for the UL SI-RS and the DL SI-RS to perform comb-shaped-pattern-transmission.

FIG. 54 illustrates a schematic diagram of a mapping pattern in a comb-shaped structure of a self-interference reference signal in an IAB node in an IAB scene according to an exemplary embodiment of the present disclosure.

As shown in FIG. 54, if there are multiple segments of time-domain resource for transmitting reference signals in a subframe, the comb-shaped structure of the time-domain resources of the multiple segments of reference signals may be in an alternated manner to ensure the accuracy of self-interfering channel interpolation (time-domain interpolation is required in obtaining channels on data symbols from channels on pilot symbols).

Similar to the case of using the cyclic shift to enhance the orthogonality between the UL SI-RS and the DL SI-RS, if the comb-shaped structure is used to enhance the orthogonality between the UL SI-RS and the DL SI-RS, the waveforms of the UL SI-RS and the DL SI-RS must be the same, otherwise the channel separation cannot be performed.

(3) Use the Frequency-Hopping to Enhance the Orthogonality Between the UL SI-RS and the DL SI-RS In the same IAB node, if the frequency-hopping pattern obtained by the IAB-MT is different from the frequency-hopping pattern obtained by the IAB-DU, and the frequency-hopping pattern switching interval obtained by the IAB-MT is the same with the frequency-hopping pattern switching interval obtained by the IAB-DU, the orthogonality between the UL SI-RS and the DL SI-RS may be enhanced.

If the time variability of the self-interfering channel is relatively weak, the UL SI-RS and the DL SI-RS may also cover the bandwidth in a frequency-hopping manner.

FIG. 55 illustrates a schematic diagram of a frequency-hopping pattern of a self-interference reference signal within an IAB node in an IAB scenario according to an exemplary embodiment of the present disclosure.

As shown in FIG. 55, in an odd-numbered subframe or slot, the IAB-MT may transmit the UL SI-RS on a half bandwidth frequency resource with a lower frequency, the IAB-DU may transmit the DL SI-RS on a half-bandwidth frequency resource with a higher frequency, and then the locations of the resource mapping may be exchanged in an even-numbered subframe or slot.

When the time variability of the self-interfering channel is relatively strong, the frequency-hopping cannot be used to enhance the orthogonality between the UL SI-RS and the DL SI-RS, otherwise the estimation accuracy of the self-interfering channel will be affected.

(4) Use the Time-Domain OCC Sequence or the Frequency-Domain OCC Sequence or the Time-Frequency-Domain Two-Dimensional OCC Sequence to Enhance the Orthogonality Between the UL SI-RS and the DL SI-RS In the same IAB node, if the frequency-domain OCC sequence obtained by the IAB-MT is different from the frequency-domain OCC sequence acquired by the IAB-DU, or the time-domain OCC sequence obtained by the IAB-MT is different from the time-domain OCC sequence obtained by the IAB-DU, the orthogonality between the UL SI-RS and the DL SI-RS may be enhanced.

When the time-domain or frequency-domain of the channels does not change significantly, the OCC sequence may also be used to provide orthogonality. However, when the self-interfering channel has significant time variability or frequency fading, the orthogonality provided by using the OCC sequence will be reduced, and in severe cases the channel separation and the accuracy of channel estimation will be significantly affected. In addition, when using the time-domain OCC sequence or the frequency-domain OCC sequence or the time-frequency-domain two-dimensional OCC sequence to enhance the orthogonality between the UL SI-RS and the DL SI-RS, it is also required that the UL SI-RS and the DL SI-RS use the same waveform.

The TAB link may be a link that starts from the IAB-donor and passes through several IAB nodes and finally reaches the terminal. There may be multiple IAB nodes on the IAB link. How to reasonably allocate SI-RS resources between the IAB nodes is a key issue for each IAB node on the link to perform full-duplex transmission.

Herein, the method for allocating the SI-RS resources within an IAB node is not limited, and either the method for resource allocation in the IAB node given in the first embodiment may be used, or other methods for resource allocation in the IAB node may be used. In an exemplary embodiment of the present disclosure, when performing resource allocation of physical signals between IAB nodes, all resources occupied by the UL SI-RS resources and the DL SI-RS resources of one IAB node in one transmission cycle may be regarded as an entirety that can not be subdivided, which is called the SI-RS resources of the IAB node. In a transmission cycle, it is assumed that each IAB node uses M OFDM symbols for self-interference channel estimation. Within the M OFDM symbols, the UL SI-RS transmitted by the terminal or the IAB-MT and the DL SI-RS transmitted by the IAB-donor or the IAB-DU may be on the same symbol or on different symbols. In an exemplary embodiment of the present disclosure, orthogonal resources may be allocated to each IAB node, so that the reference signal resource (i.e., the UL SI-RS resource) used by the terminal or the IAB-MT of each IAB node for self-interference channel estimation and the reference signal resource (i.e., the DL SI-RS resource) used by the IAB-donor or the IAB-DU of each IAB node for self-interference channel estimation does not interfere with each other.

FIG. 56 illustrates a flowchart of a resource allocation method for physical signals between IAB nodes according to an exemplary embodiment of the present disclosure.

FIG. 57 illustrates a schematic diagram of an example of resource allocation of physical signals between time division multiplexing IAB nodes according to an exemplary embodiment of the present disclosure.

FIG. 58 illustrates a schematic diagram of an example of resource allocation of physical signals between frequency division multiplexing (frequency-hopping) IAB nodes according to an exemplary embodiment of the present disclosure.

Referring to FIG. 56, in step S5601, all IAB nodes may be divided into groups, and resources of the physical signals of the IAB nodes in each group may be set to be all time division multiplexing or all frequency division multiplexing. Herein the physical signals may include at least an uplink physical signal.

As shown in FIG. 57, when the resources of the physical signals of all the IAB nodes are all time-division multiplexing, a first number of time-domain resources that are different from other IAB nodes to each IAB node, that is, a first number of OFDM symbols that are different from other nodes may be allocated to each IAB node for self-interference channel estimation.

It is assumed that there are K IAB nodes for full-duplex transmission. The SI-RS resources of the K IAB nodes may be on the same time-domain resource, but may be orthogonally divided by the frequency division multiplexing. That is, on the time-domain resource at which the SI-RS resource is located, the bandwidth may be divided into K segments of frequency-domain resource that do not overlap with each other. Each IAB node may transmit the self-interference reference signal (the UL SI-RS and/or the DL SI-RS) for self-interference channel estimation on one of the K segments of frequency-domain resource. In order to ensure that each IAB node can obtain self-interference channel characteristics in the entire bandwidth, frequency-hopping should be used.

As shown in FIG. 58, when the resources of the physical signals of all the IAB nodes are all frequency division multiplexing, the bandwidth may be divided into a second number of frequency-domains that do not overlap with each other on the time-domain resource where the resources of the physical signals are located, and one of the second number of segments of the frequency-domain resource may be allocated to each IAB node.

In the frequency-hopping pattern shown in FIG. 58, the bandwidth may be divided into K subbands that do not overlap with each other. Within each subframe, each IAB node may transmit the UL SI-RS and/or the DL SI-RS on only one of the subbands. Then within each subframe, each IAB node may transmit the UL SI-RS and/or the DL SI-RS on a subband that is not used previously. In this way, after K subframes, the SI-RS resource of each IAB node can traverse the entire bandwidth. In the $K+1^{th}$ subframe, the frequency-domain location of the SI-RS resource of each TAB node may be the same as that in the first subframe, and move in cycles in this way. The number of the subband resource used by the $i^{th}$ IAB node on the $j^{th}$ subframe can be calculated in an equation $S_{i,j}=\mathrm{mod}(i+j,K)$, wherein $0 \leq i < K$, $j \geq 0$, the mod (•) represents the modulo operation.

In an exemplary embodiment of the present disclosure, the time-domain resources of the uplink physical signal may be in a form of an absolute frame number, an absolute subframe number, an absolute slot number, and an absolute OFDM symbol number of the uplink physical signal resources, or in the form of a repetition period of the uplink physical signal resource and a relative frame number, a relative subframe number, a relative slot number, and a relative OFDM symbol number in the repetition period.

In an exemplary embodiment of the present disclosure, the frequency-domain resource of the uplink physical signal may be in a form of at least one of all Physical Resource Block (PRB) numbers of the uplink physical signal resource for each frequency-hopping or equivalent parameters that are able to uniquely calculate all the PRB numbers, all PRB numbers of the uplink physical signal resource for an initial frequency-hopping or equivalent parameters that are able to uniquely calculate all the PRB numbers, wherein the initial frequency-hopping refers to a starting point of a frequency-hopping within one frequency-hopping cycle.

In step S5602, resources of the physical signals of the IAB nodes between the groups may be set to be frequency division multiplexing, for all groups within which resources of the physical signals of the IAB nodes are all time division multiplexing.

In step S5603, resources of the physical signals of the IAB nodes between the groups may be set to be time division multiplexing, for all groups within which the resources of the physical signals of the IAB nodes are all frequency division multiplexing.

After the terminal or the IAB-MT accesses the IAB-donor or the IAB-DU of the parent node, the terminal or the IAB-MT may obtain the frequency-domain location of the resource (i.e., the UL SI-RS resource) for performing self-interference channel estimation from the IAB-donor or the IAB-DU of the parent node, and transmit the reference signal UL SI-RS for self-interfering channel estimation on these resources.

Specifically, the form of the UL SI-RS time-domain resource obtained by the terminal or IAB-MT from the IAB-donor or the IAB-DU of the parent node may be at least one of the following forms. The first form may be the absolute frame number, the absolute subframe number, the absolute slot number, or the absolute OFDM symbol number of the UL SI-RS resource. The second form may be the repetition period of the UL SI-RS resource and the relative frame number, the relative subframe number, the relative slot number, or the relative OFDM symbol number in the repetition period. The form of the UL SI-RS frequency-domain resource obtained by the terminal or the IAB-MT from the IAB-donor or the IAB-DU of the parent node may be at least one of the following forms. The first form may be all PRB numbers of the UL SI-RS frequency-domain resource for each frequency-hopping or equivalent parameters that are able to uniquely calculate all the PRB numbers, for example, the first PRB number and the number of the PRB of the UL SI-RS resource, or the subband number in a certain preset subband division manner, etc. The second form may be all PRB numbers of the UL SI-RS resource for an initial frequency-hopping or equivalent parameters that are able to uniquely calculate all the PRB numbers, for example, the first PRB number and the number of the PRBs, or the subband number, etc. It should be noted that, first of all, the initial frequency-hopping herein may refer to a starting point of frequency-hopping within one frequency-hopping cycle. Secondly, when the second form is used, the frequency-hopping pattern must be additionally notified or a preset frequency-hopping pattern is used.

Specifically, the UL SI-RS resource obtained by the terminal or the IAB-MT from the IAB-donor or the IAB-DU of the parent node may be either explicit or implicit. There are several ways to obtain the UL SI-RS resource explicitly. The first way may be to obtain from the higher-level signaling in establishing an RRC connection, and an Information Element (IE) that informs the location of the UL SI-RS resource needs to be added to the higher-level signaling. A second way may be to obtain from the downlink control information. An uplink self-interference reference signal indication field may be added to the downlink control information, and the value of the uplink self-interference reference signal indication field may indicate the time-domain location and the frequency-domain location of the UL SI-RS resource of the terminal or the IAB-MT for self-interference channel estimation. There are several ways to obtain the UL SI-RS resource implicitly. The first way may be to calculate the time-domain location and the frequency-domain location of the UL SI-RS resource of the IAB-MT by using the UL SI-RS resource location of the IAB-MT of the parent node and/or the time-domain location of the DL SI-RS resource of the IAB-DU of the parent node according to a preset correlation function. For example, if the starting OFDM symbol number of the UL SI-RS resource of the IAB-MT of the parent node is n and the SI-RS resource of each IAB node occupies M OFDM symbols, the starting OFDM symbol number of the UL SI-RS resource of the terminal or IAB-MT may be n+M. If the starting PRB number of the UL SI-RS resource of the IAB-MT of the parent node is 1, and the UI SI-RS resource occupies L PRBs, then the PRB number of the UL SI-RS resource of the terminal or the IAB-MT may be mod (1+L, $N_{PRB}$), wherein the $N_{PRB}$ is the number of PRBs within the bandwidth. The calculation method of the correlation function is not limited to the above calculation method. The second way may be to determine the location according to a preset SI-RS resource allocation pattern between the IAB nodes. The preset SI-RS resource allocation pattern between the IAB nodes should indicate the time-domain location and frequency-domain location of the UL SI-RS resource of each terminal or TAB-MT on the link, and when accessing the IAB-donor, the terminal or the IAB-MT may obtain an unique identification $N_{ID}^{node}$ from the high-level signaling or the downlink control information, which indicates the relative location of the terminal or the IAB-MT on the data link that starts from the IAB-donor. For example, $N_{ID}^{node}=0$ may indicate the IAB-donor, $N_{ID}^{node}=1$ may indicate the IAB-MT that accesses IAB-donor, and so on. The preset SI-RS resource allocation pattern between the IAB nodes may specify the time-frequency location of the SI-RS resource (the UL SI-RS resource and the DL SI-RS resource) of each IAB node. The terminal or the IAB-MT may obtain the time-domain location and frequency-domain location of the UL SI-RS resource directly from the pattern after the unique identification $N_{ID}^{node}$ is obtained.

The IAB-DU may firstly obtain the locations of the DL SI-RS resources, and then allocate UL SI-RS resources to the terminal or IAB-MT that accesses the IAB-DU.

The manner for the IAB-DU to obtain the DL SI-RS resources may be explicit or implicit. There are two manners to explicitly obtain the DL SI-RS resources. The first manner may be to perform configuration by the IAB-donor through high-level signaling, and the second manner may be to perform notification by the IAB-MT of the same IAB node. There are two manners to implicitly obtain the DL SI-RS resources. The first manner may be to calculate the time-frequency-domain locations of the UL SI-RS resources according to the time-frequency-domain locations of the DL SI-RS of the IAB-MT of the same IAB node and the SI-RS resource allocation manner in the IAB node. For example, for the time-domain locations of the DL SI-RS, if the SI-RS resource allocation manner in the IAB node is that the OFDM symbols of the UL SI-RS and the OFDM symbols of the DL SI-RS are adjacent and the UL SI-RS is ahead, the IAB-DU can determine that the OFDM symbol of the DL SI-RS resource is n+1 according to the OFDM symbol number n of the UL SI-RS. If the SI-RS resource allocation manner in the IAB node is not time division multiplexing, the IAB-DU may determine that the DL SI-RS and the UL SI-RS of the IAB-MT of the same IAB node are located in the same OFDM symbol. For the frequency-domain locations of the DL SI-RS, if the SI-RS resource allocation manner in the IAB node is that the UL SI-RS and the DL SI-RS are frequency division multiplexing, then the DL SI-RS resource of IAB-DU may be at the frequency-domain resources not used by the UL SI-RS within the bandwidth used by the SI-RS resources of the local IAB node. If the SI-RS resource allocation manner in the IAB node is neither time division multiplexing nor frequency division multiplexing, the time-frequency locations of the DL SI-RS resources of the IAB-DU and the UL SI-RS resources of the IAB-MT may be the same.

The IAB-DU of the IAB node may estimate the interference strength between the IAB-MT of the parent node and the terminal or the IAB-MT of the child node that accesses the IAB-DU, and allocate the UL SI-RS resources to the terminal or the IAB-MT of the child node. If the interference intensity exceeds an interference intensity threshold, the IAB-DU may allocate time-frequency-domain resources, which are different from the UL SI-RS resources of the IAB-MT of the parent node and the UL SI-RS resources of the IAB-MT of the IAB node, to the terminal or the IAB-MT of the child node that accesses the IAB-DU. If the interference strength does not exceed the interference strength threshold, the IAB-DU can allocate resources in the same time-frequency-domain locations as those of the UL SI-RS resources of the parent node IAB-MT to the terminal or the IAB-MT of the child node that accesses the IAB-DU, as the UL SI-RS resources of the terminal or the IAB-MT of the child node.

After the terminal or the IAB-MT of the child node accesses the IAB-DU, the IAB-DU may estimate the distance and angle of arrival between the terminal or the IAB-MT of the child node and the IAB-DU, and then calculate the three-dimensional coordinates of the terminal or the IAB-MT of the child node (xp, yp, zp). After the IAB-MT of the same IAB node accesses the IAB-DU of the parent node or the IAB-donor, the TAB (Time Advancing) transmitted by the IAB-DU of the parent node or the IAB-donor may be used to calculate the distance between the IAB-MT and the IAB-DU of the parent node or the IAB-donor, and the azimuth between the IAB-MT and the IAB-DU of the parent node or the IAB-donor is estimated from a beam direction of the IAB-MT or a precoding matrix, and then the coordinate ($x_c$, $y_c$, $z_c$) of the IAB-DU of the parent node or the IAB-donor relative to the IAB-MT is calculated. Through the two coordinates, the IAB-DU can calculate the $$d = \sqrt{(x_p - x_c)^2 + (y_p - y_c)^2 + (z_p - z_c)^2}$$

distance between the IAB-MT of the parent node and the IAB-MT of the child node, and then estimate the interference strength $$\gamma = A \times 20\log_{10}\left(\frac{\lambda}{4\pi d}\right)$$

between the IAB-MT of the parent node and the IAB-MT of the child node, wherein, the $\lambda$ is a carrier frequency wavelength and the A is a correction factor.

Since the self-interference elimination technology is a technology for enabling of full-duplex technology, that is, the full-duplex transmission cannot be achieved without self-interference elimination, the performance of self-interference elimination may strongly affect the throughput of a full-duplex system. Therefore, the quality of self-interference elimination depends on the accuracy of self-interference channel estimation and ensuring the accuracy of self-interference channel estimation may be the key to the full-duplex technology. As previously mentioned, since there may be multiple IAB nodes in the IAB scenario simultaneously, the reference signals used by each IAB node for self-interference channel estimation may also be subjected to more complex interference.

As shown in FIG. 52, when the IAB-MT and the IAB-DU of the parent node or the IAB-donor perform full-duplex transmission, the IAB-DU of the parent node or the IAB-donor will not transmit the downlink signals on the SI-RS resources (the time-frequency-domain resources for self-interference channel estimation), and the IAB-MT will not transmit the uplink signals on the SI-RS resource of the IAB-DU of the parent node or the IAB-donor to ensure both of the IAB-MT and the IAB-DU of the parent node or the IAB-donor can perform self-interference channel estimation without interference. In the same way, this configuration may be also applicable to the case where the IAB-DU and the IAB-MT of the child node perform full-duplex transmission and the DL2/UL2 and the DL1/UL1 do not perform 4-link full-duplex transmission in the same frequency band. However, when at least one of the uplink UL2 of the child node and the downlink DL2 of the IAB-DU perform full-duplex transmission with the uplink UL1 of the IAB-MT, the IAB-MT of the child node and the IAB-DU of the IAB node will be interfered when performing data transmission on the SI-RS resources of the IAB-MT of the IAB node. Similarly, when the downlink DL2 from the IAB-DU of the IAB node to the IAB-MT of the child node and the downlink DL1 from the IAB-DU of the parent node (or IAB-donor) to the IAB-MT of the IAB node perform full-duplex transmission, the IAB-DU of the parent node will also be interfered when performing data transmission on the SI-RS resources of the IAB-DU of the IAB node.

FIG. 59 illustrates a flowchart of a physical signal transmission method for a terminal functional entity of an IAB node according to an exemplary embodiment of the present disclosure.

As shown in FIG. 59, the method may be applicable to the resource avoidance of the IAB, that is, the TAB node cannot transmit non-SI-RS signals on its own SI-RS resources, and meanwhile the IAB node also cannot transmit any uplink or downlink signals on the SI-RS resources of other IAB nodes that may be interfered.

Referring to FIG. 59, in step S5901, resources that are needed to be avoided in receiving downlink signals and transmitting uplink signals may be determined.

In an exemplary embodiment of the present disclosure, the determined resources that are needed to be avoided may include uplink physical signal resources of a terminal functional entity of a parent node and downlink physical signal resources of a base station functional entity of the parent node, or the determined resources that are needed to be avoided may include the uplink physical signal resources of the terminal functional entity of the parent node and the downlink physical signal resources of the base station functional entity of the parent node, and downlink physical signal resources of a base station functional entity of the IAB node.

In one embodiment, the determined resources that are needed to be avoided may include uplink physical signal resources of a terminal functional entity of a parent node and downlink physical signal resources of a base station functional entity of the parent node. After the terminal or the IAB-MT accesses the IAB-donor or the IAB-DU of the parent node, the terminal or the IAB-MT may obtain the locations of the time-frequency resources that need to be avoided in receiving the downlink signals or transmitting the uplink signals, and avoid these resources when receiving the downlink signals or transmitting the uplink signals. The resources that should be avoided should include the resources of the IAB-DU of the parent node for self-interference channel estimation (i.e., the DL SI-RS resources). Unlike the prior art, the resources that should be avoided should also include resources used by the IAB-MT of the parent node for self-interference channel estimation (i.e., the UL SI-RS resources), herein, the UL SI-RS resources may be the same as the DL SI-RS resources of the parent node. The terminal or the IAB-MT may avoid the UL SI-RS resources of the parent node when transmitting the uplink data, so that it can be ensured that the IAB-MT of the parent node is not interfered by the uplink signals from the terminal or the IAB-MT when performing the self-interference channel estimation, and the accuracy of self-interference channel estimation of the IAB-MT of the parent node may be guaranteed, whereby system throughput is ensured.

In another embodiment, the determined resources that are needed to be avoided may include the uplink physical signal resources of the terminal functional entity of the parent node and the downlink physical signal resources of the base station functional entity of the parent node, and the downlink physical signal resources of a base station functional entity of the IAB node. When the terminal or the IAB-MT accesses the IAB-Donor or the IAB-DU of the parent node, the terminal or the IAB-MT may report the full-duplex capability of the present node to the IAB-Donor or the IAB-DU of the parent node, to indicate whether the IAB-DU of the same node as the IAB-MT can perform the full-duplex transmission with the uplink/downlink of the IAB-MT. Then the terminal or the IAB-MT may obtain the locations of the time-frequency resources that need to be avoided in receiving the downlink signals or transmitting the uplink signals, and avoid these resources when receiving the downlink signals or transmitting the uplink signals. The resources that should be avoided should include the resources of the IAB-DU of the parent node or the IAB-Donor for self-interference channel estimation (i.e., the SI-RS resources). If the accessed base station is the IAB-DU of the parent node, which can perform full-duplex transmission with the uplink or the downlink of the IAB-MT of the parent node, then the resources to be avoided should also include the resources of the IAB-MT of the parent node for performing self-interference channel estimation (i.e., the UL SI-RS resources), wherein, the UL SI-RS resources may be the same as the DL SI-RS resources of the parent node. When the IAB-DU of the same node is capable of performing full-duplex transmission with the uplink/downlink of the IAB-MT, the resources to be avoided should also include the resources the IAB-DU of the same node for performing self-interference channel estimation (i.e. the DL SI-RS resources), the UL SI-RS resources may be the same as the DL SI-RS resources of the present node. The IAB-MT may avoid the UL SI-RS resources of the parent node and the DL SI-RS resources of the IAB-DU of the same node when transmitting the uplink signals, so that it can be ensured that the IAB-MT of the parent node and the IAB-DU of the same node are not interfered by the uplink signals from the IAB-MT when performing the self-interference channel estimation, and the accuracy of self-interference channel estimation of the IAB-MT of the parent node and the IAB-DU of the present node is guaranteed, whereby the system throughput is ensured. The IAB-MT may avoid the DL SI-RS resources of the same node when receiving the downlink signals, that is, the IAB-DU of the parent node may not transmit the downlink signals on the DL SI-RS resources of the IAB-DU of the same node, so that it can be ensured that the accuracy of self-interference channel estimation of the IAB-DU of the same node is guaranteed, whereby the system throughput is ensured.

The terminal or the IAB-MT may obtain resource avoidance indication information either explicitly or implicitly. There are two manners to explicitly obtain the locations of the resources to be avoided. The first manner may be to add an Information Element (IE) for resource avoidance indication in high-level signaling transmitted by the IAB-donor or the IAB-DU of the parent node to the terminal or the IAB-MT, and the terminal or the IAB-MT may obtain the resource avoidance indication information from the Information Element (IE) for resource avoidance indication when obtaining the high-level signaling. The second manner may be to add a resource avoidance instruction field to the downlink control information transmitted by the IAB-donor or the IAB-DU of the parent node to the terminal or the IAB-MT, and the terminal or the IAB-MT may obtain the resource avoidance instruction information from the resource avoidance instruction field when receiving the downlink control information. Regardless of which way is adopted, the content of the obtained resource avoidance indication information may include the time-domain locations and the frequency-domain locations of the resources to be avoided, wherein the time-domain locations are the frame, subframe, slot, OFDM symbol in which the resources to be avoided are located, which can either indicate discretely or indicate the location of the starting OFDM symbol and the number of the OFDM symbols simultaneously. The frequency-domain locations may be the physical resource block (PRB) numbers of the resource to be avoided, which can either indicate discretely or indicate the starting PRB number and the number of the OFDM symbols simultaneously. There are two manners to implicitly obtain the locations of the resources to be avoided. The first manner may be to obtain the avoidance pattern according to a preset fixed resource. The resource avoidance pattern may indicate the resource location that each terminal or IAB-MT needs to avoid when receiving or transmitting data. The second manner may be to obtain the locations of the resources to be avoided according to the preset association method, based on the SI-RS resources (the DL ST-RS resources and/or the UL SI-RS resources) of itself used for self-interference channel estimation. After the terminal or the IAB-MT obtains the SI-RS resources of itself used for self-interference channel estimation, the terminal or the IAB-MT may determine the resources to be avoided according to a preset association mode. For example, if the SI-RS resources between the IAB nodes are time-division multiplexing, the terminal or the TAB-MT may avoid several OFDM symbols adjacent to the OFDM symbol where the SI-RS resource is located. If the SI-RS resources between the IAB nodes are frequency-division multiplexing, the terminal or the IAB-MT may avoid several PRBs adjacent to its own SI-RS resources on the OFDM symbol where its SI-RS resource is located.

In step S5902, reception of a downlink physical signal and transmission of an uplink physical signal may be performed on resources other than the determined resources that are needed to be avoided.

In an exemplary embodiment of the present disclosure, the resources that are needed to be avoided may include at least time-domain resources or frequency-domain resources. The time-domain resources may include at least one of a frame number, a subframe number, a slot number, an OFDM symbol number, a location of the starting OFDM symbol, or a number of OFDM symbols. The frequency-domain resources may include at least one of a Physical Resource Block (PRB) number, a starting PRB number, or a number of PRBs of a resource.

In addition, in an exemplary embodiment of the present disclosure, the resources of the downlink physical signal of the terminal functional entity of the IAB node may further be fedback to the parent node. Specifically, the IAB-MT may transmit downlink resource avoidance information to the IAB-DU of the parent node or the IAB-donor, indicating the resources that need to be avoided by the IAB-donor or the IAB-DU of the parent node when transmitting downlink data, wherein the resources that need to be avoided should include the resources the IAB-DU of the same IAB node as the IAB-MT for self-interference channel estimation, that is, the DL SI-RS resources of the IAB-DU of the present IAB node. After receiving the downlink resource avoidance information, the IAB-DU of the parent node or the IAB-donor will avoid the resource indicated by downlink resource avoidance instruction information when transmitting downlink data to the IAB-MT.

The content of the downlink resource avoidance information indicating the DL SI-RS resource of the IAB-DU of the same IAB node may be the downlink resource avoidance instruction information, and may further include the downlink resource avoidance location information.

The downlink resource avoidance location information may indicate the time-frequency locations of the resources to be avoided by the IDB-donor or the IAB-DU of the parent node when transmitting downlink data to the IAB-MT. The time-domain locations may either be the frame numbers and subframe number, slot number, OFDM symbol number of the DL SI-RS resources, or be the repetition periods of the DL SI-RS resources and a specific frame number, subframe number, slot number or the OFDM number in one repetition period. The frequency-domain locations may be the PRB number of the DL SI-RS resources, or the starting PRB numbers and the numbers of the PRBs of the DL SI-RS resources.

The downlink resource avoidance location information may be explicitly transmitted to the IAB-donor or the IAB-DU of the parent node by the IAB-MT, or may be implicitly obtained by the IAB-donor or the IAB-DU of the parent node without being transmitted. The explicitly transmitting of the downlink avoidance resource location information may be performed in one of the following manners. The first manner may be to transmit the information as the uplink control information on a Physical Uplink Control Channel (PUCCH) or a Physical Uplink Shared Channel (PUSCH). The second manner may be to transmit the information through a newly added physical channel or physical signal that is only used to transmit the downlink resource avoidance location information. The IAB-donor or the IAB-DU of the parent node may implicitly obtain the downlink resource avoidance location information, which is not transmitted by the IAB-MT but may be obtained by one of the following manners. The first manner may be to determine the DL SI-RS resource location of the IAB-DU of the same IAB node as the IAB-MT according to a preset DL SI-RS resource pattern. The second manner may be to determine the DL SI-RS resource location of the IAB-DU in the same IAB node as the IAB-MT in association based on the UL SI-RS resource location of the IAB-MT. If the UL SI-RS resources and DL SI-RS resources inside each IAB node are time-division multiplexing, then the IAB-donor or the IAB-DU of the parent node can obtain the same TAB node according to the UL SI-RS time-domain location of the IAB-MT, for example, an OFDM symbol whose DL SI-RS resource is located after the OFDM symbol where the UL SI-RS resource is located. If the UL SI-RS resources and DL SI-RS resources in each IAB node are frequency-division multiplexing, the IAB-donor or the parent IAB-DU may acquire the PRB number of the DL SI-RS of the IAB-DU of the same IAB node according to the PRB number of the UL SI-RS of the IAB-MT, for example, the PRB where the DL SI-RS resource is located is the PRB in the IAB-MT scheduling bandwidth that is not used by the UL SI-RS resource. If the UL SI-RS resources and the DL SI-RS resources within each IAB node are at the same time and at the same frequency, the IAB-donor or the IAB-DU of the parent node may determine that the UL SI-RS resources of the IAB-MT are the same as the DL SI-RS resources of the IAB-DU.

The downlink resource avoidance instruction information may indicate that the IAB-donor or the IAB-DU of the parent node needs to avoid the resources indicated by the downlink resource avoidance location information when transmitting downlink data, or may not avoid the resources indicated by the downlink resource avoidance location information.

The IAB-MT may explicitly transmit the downlink resource avoidance indication information, or may implicitly transmit the downlink resource avoidance information. The explicitly transmitting of the downlink resource avoidance indication information may be performed in one of the following manners. The first manner may be to transmit the downlink resource avoidance indication information in the uplink control information. For example, a 1-bit length of uplink control information may be added for transmitting the downlink resource avoidance indication information. Whether the IAB-donor or the IAB-DU of the parent node needs to avoid the resources indicated by the downlink resources avoidance indication information may be determined by the value of the uplink control information. For example, a field value of 1 may indicate that avoidance is needed, and a field value of 0 may indicate that avoidance is not needed. The second manner may be to transmit the downlink resource avoidance indication information by using a dedicated physical channel or physical signal. The third manner may be to design two different transmission methods for a certain uplink physical channel or the uplink physical signal depending on whether the IAB-DU of the parent node or the IAB-donor needs to avoid the resources indicated by the downlink resource avoidance indication information, such that one of the two transmission methods is used when avoidance is needed, and the other transmission method is used when avoidance is not needed. When the IAB-DU of the parent node or the IAB-donor receives the uplink signals, blind detection may be performed on the two transmission methods to obtain the downlink resource avoidance indication information. For example, the two transmission methods may use different scrambling sequences, or use different interleavers, and so on. The manner of implicitly transmitting the downlink resource avoidance indication information may not require the IAB-MT to transmit the downlink resource avoidance indication information. After the IAB-DU of the parent node or the IAB-donor obtains the locations of the resources that need to be avoided when transmitting the downlink data, it can avoid these resources by default. The way to obtain the locations of the resources that need to be avoided when transmitting downlink data may be a way that the IAB-MT explicitly transmits the locations of the resources that need to be avoided, or the locations of the resources that need to be avoided may be determined by a preset fixed pattern.

FIG. 60 illustrates a flowchart of a physical signal transmission method for abase station functional entity of an IAB node according to an exemplary embodiment of the present disclosure.

Referring to FIG. 60, in step S6001, downlink physical signal resources of a base station functional entity of a child node may be obtained.

In step S6002, a downlink physical signal may be transmitted on resources other than the obtained downlink physical signal resources of the base station functional entity of the child node.

In an exemplary embodiment of the present disclosure, the base station functional entity of the IAB node may determine the downlink physical signal resources of the base station functional entity of the child node feedback by the child node as resources that are needed to be avoided in transmitting downlink physical signals.

The physical signal transmission method for the IAB node, the resource allocation method for physical signals between the IAB nodes, the physical signal transmission method for the terminal functional entity of the IAB node, and the physical signal transmission method for the base station functional entity of the IAB node according to exemplary embodiments of the present disclosure have been described in conjunction with FIGS. 52-60. Hereinafter, a physical signal transmission device for an IAB node, a resource allocation device for physical signals between IAB nodes, a physical signal transmission device for a terminal functional entity of an IAB node, and a physical signal transmission device for a base station functional entity of an IAB node and units thereof according to an exemplary embodiment of the present disclosure will be described with reference to FIGS. 61-64.

FIG. 61 illustrates a block diagram of a physical signal transmission device for an IAB node according to an exemplary embodiment of the present disclosure.

Referring to FIG. 61, the physical signal transmission device for an IAB node may include a parameter acquiring unit 611, and a signal transmitting unit 612.

The parameter acquiring unit 611 may be configured to acquire configuration parameters for transmitting a physical signal.

The signal transmitting unit 612 may be configured to transmit a uplink physical signal transmitted by a terminal functional entity of the IAB node and a downlink physical signal transmitted by a base station functional entity of the IAB node on the same time-domain resource, according to the acquired configuration parameters, when a full-duplex transmission is performed on a transmission uplink of the terminal functional entity, a reception downlink of the terminal functional entity, a transmission downlink of the base station functional entity and a reception uplink of the base station functional entity of the IAB node at the same frequency and at the same time.

In an exemplary embodiment of the present disclosure, the physical signal may include at least one of a reference signal for self-interference channel estimation (SI-RS), a demodulation reference signal, a phase tracking reference signal, and a sounding reference signal.

In an exemplary embodiment of the present disclosure, the configuration parameters for transmitting the physical signal may include uplink physical signal parameters and downlink physical signal parameters.

In an exemplary embodiment of the present disclosure, the uplink physical signal parameters may include at least one of information on cyclic shift of the uplink physical signal, information on comb-shaped frequency-domain resource structure and information on switching period of the comb-shaped frequency-domain resource structure of the uplink physical signal, information on frequency-hopping pattern and information on frequency-hopping switching interval of the uplink physical signal, and information on frequency-domain and time-domain orthogonal cover code of the uplink physical signal.

In an exemplary embodiment of the present disclosure, the downlink physical signal parameters may include at least one of information on cyclic shift of the downlink physical signal, information on comb-shaped frequency-domain resource structure and information on switching period of the comb-shaped frequency-domain resource structure of the downlink physical signal, information on frequency-hopping pattern and information on frequency-hopping switching interval of the downlink physical signal, and information on frequency-domain and time-domain orthogonal cover code of the downlink physical signal.

In an exemplary embodiment of the present disclosure, the downlink physical signal parameters may further include a physical root number of the uplink physical signal transmitted by the terminal functional entity of the IAB node.

In an exemplary embodiment of the present disclosure, the signal transmitting unit 612 may be configured to configure different cyclic shifts for the uplink physical signal and the downlink physical signal according to the acquired configuration parameters, when waveforms of the uplink physical signal and the downlink physical signal are the same, and to transmit the uplink physical signal and the downlink physical signal that are configured with different cyclic shifts on the same time-domain resource.

In an exemplary embodiment of the present disclosure, the signal transmitting unit 612 may be configured to configure comb-shaped frequency-domain resource structures for the uplink physical signal and the downlink physical signal according to the acquired configuration parameters, when waveforms of the uplink physical signal and the downlink physical signal are the same, and to transmit the uplink physical signal and the downlink physical signal that are configured with different comb-shaped frequency-domain resource structures on the same time-domain resource.

In an exemplary embodiment of the present disclosure, the signal transmitting unit 612 may be configured to configure frequency-hopping patterns for the uplink physical signal and the downlink physical signal according to the acquired configuration parameters, and to transmit the uplink physical signal and the downlink physical signal that are configured with different frequency-hopping patterns on the same time-domain resource.

In an exemplary embodiment of the present disclosure, the signal transmitting unit 612 may be configured to configure frequency-domain and time-domain orthogonal cover codes for the uplink physical signal and the downlink physical signal according to the acquired configuration parameters, when waveforms of the uplink physical signal and the downlink physical signal are the same, and to transmit the uplink physical signal and the downlink physical signal that are configured with different frequency-domain and time-domain orthogonal cover codes on the same time-domain resource.

FIG. 62 illustrates a block diagram of a resource allocation device for physical signals between IAB nodes according to an exemplary embodiment of the present disclosure.

Referring to FIG. 62, the physical signal transmission device for the TAB node may include a first allocation unit 621, a second allocation unit 622 and a third allocation unit 623.

The first allocation unit 621 may be configured to divide all IAB nodes into groups, and to set resources of the physical signals of the IAB nodes in each group to be all time division multiplexing or all frequency division multiplexing. Herein, the physical signals may include at least an uplink physical signal.

The second allocation unit 622 may be configured to set resources of the physical signals of the IAB nodes between the groups to be frequency division multiplexing, for all groups within which resources of the physical signals of the TAB nodes are all time division multiplexing.

The third allocation unit 623 may be configured to set the resources of the physical signals of the IAB nodes between the groups to be time division multiplexing, for all groups within which resources of the physical signals of the IAB nodes are all frequency division multiplexing.

In an exemplary embodiment of the present disclosure, the first allocation unit 621 may be configured to allocate a first number of time-domain resources that are different from other IAB nodes for each IAB node when the resources of the physical signals of the IAB nodes within a group are set to be all time division multiplexing, and to divide a bandwidth into a second number of segments of frequency-domain resources that do not overlap with each other on a time-domain resource where the resources of the physical signals are located, and allocate one of the second number of segments of frequency-domain resources to each IAB node, when the resources of the physical signals of the IAB nodes within a group are set to be all frequency division multiplexing.

In an exemplary embodiment of the present disclosure, the time-domain resources of the uplink physical signal may be in a form of an absolute frame number, an absolute subframe number, an absolute slot number, and an absolute OFDM symbol number of the uplink physical signal resources, or in the form of a repetition period of the uplink physical signal resource and a relative frame number, a relative subframe number, a relative slot number, and a relative OFDM symbol number in the repetition period.

In an exemplary embodiment of the present disclosure, the frequency-domain resource of the uplink physical signal may be in a form of at least one of all physical resource block numbers of the uplink physical signal resource for each frequency-hopping or equivalent parameters that are able to uniquely calculate all the physical resource block numbers, all physical resource block numbers of the uplink physical signal resource for an initial frequency-hopping or equivalent parameters that are able to uniquely calculate all the physical resource block numbers, herein the initial frequency-hopping refers to a starting point of a frequency-hopping within one frequency-hopping cycle.

FIG. 63 illustrates a block diagram of a physical signal transmission device for a terminal functional entity of an IAB node according to an exemplary embodiment of the present disclosure.

Referring to FIG. 63, the physical signal transmission device for the IAB node may include a resource determining unit 631 and a transmission and reception unit 632.

The resource determining unit 631 may be configured to determine resources that are needed to be avoided in receiving downlink signals and transmitting uplink signals.

In an exemplary embodiment of the present disclosure, the determined resources that are needed to be avoided may include uplink physical signal resources of a terminal functional entity of a parent node and downlink physical signal resources of a base station functional entity of the parent node, or the determined resources that are needed to be avoided may include the uplink physical signal resources of the terminal functional entity of the parent node and the downlink physical signal resources of the base station functional entity of the parent node, and downlink physical signal resources of a base station functional entity of the IAB node.

The transmission and reception unit 632 may be configured to perform reception of a downlink physical signal and transmission of an uplink physical signal on resources other than the acquired resources that are needed to be avoided.

In an exemplary embodiment of the present disclosure, the resources that are needed to be avoided may include at least time-domain resources or frequency-domain resources. The time-domain resources may include at least one of a frame number, a subframe number, a slot number, an OFDM symbol number, a location of a starting OFDM symbol, or a number of OFDM symbols, and the frequency-domain resources may include at least one of a physical resource block number, a starting physical resource block number, or a number of physical resource blocks of a resource.

In an exemplary embodiment of the present disclosure, the physical signal transmission device for the terminal functional entity of the IAB node may further include a resources feedback unit (not shown) configured to feed the resources of the downlink physical signal of the terminal functional entity of the IAB node back to parent node.

FIG. 64 illustrates a block diagram of a physical signal transmission device for a base station functional entity of an IAB node according to an exemplary embodiment of the present disclosure.

Referring to FIG. 64, the physical signal transmission device for the base station functional entity of the IAB node may include a resource acquiring unit 641 and a transmission unit 642.

The resource acquiring unit 641 may be configured to acquire downlink physical signal resources of a base station functional entity of a child node.

The transmission unit 642 may be configured to transmit downlink physical signals on resources other than the acquired downlink physical signal resources of the base station functional entity of the child node.

In addition, according to an exemplary embodiment of the present disclosure, there is further provided a computer-readable storage medium storing a computer program thereon, when the computer program is executed, the physical signal transmission method for the IAB node, the resource allocation method for physical signals between the IAB nodes, the physical signal transmission method for the terminal functional entity of the IAB node or the physical signal transmission method for the base station functional entity of the IAB node according to the exemplary embodiment of the present disclosure is implemented.

In an exemplary embodiment of the present disclosure, the computer-readable storage medium may carry one or more programs, and when the computer program is executed, the following steps may be implemented: acquiring configuration parameters for transmitting a physical signal; and transmitting a uplink physical signal transmitted by a terminal functional entity of the IAB node and a downlink physical signal transmitted by a base station functional entity of the IAB node on the same time-domain resource according to the acquired configuration parameters, when a full-duplex transmission is performed on a transmission uplink of the terminal functional entity, a reception downlink of the terminal functional entity, a transmission downlink of the base station functional entity and a reception uplink of the base station functional entity of the IAB node at the same frequency and at the same time.

In an exemplary embodiment of the present disclosure, the computer-readable storage medium may carry one or more programs, and when the computer program is executed, the following steps may be implemented: allocating a first number of time-domain resources that are different from other IAB nodes for each IAB node when the resources of the physical signals of the IAB nodes within a group are set to be all time division multiplexing, dividing a bandwidth into a second number of segments of frequency-domain resources that do not overlap with each other on a time-domain resource where the resources of the physical signals are located, and allocating one of the second number of segments of frequency-domain resources to each IAB node, when the resources of the physical signals of the IAB nodes within a group are set to be all frequency division multiplexing.

In an exemplary embodiment of the present disclosure, the computer-readable storage medium may carry one or more programs, and when the computer program is executed, the following steps may be implemented: determining resources that are needed to avoid in receiving downlink signals and transmitting uplink signals; and performing reception of a downlink physical signal and transmission of an uplink physical signal on resources other than the determined resources that are needed to be avoided.

In an exemplary embodiment of the present disclosure, the computer-readable storage medium may carry one or more programs, and when the computer program is executed, the following steps may be implemented: acquiring downlink physical signal resources of a base station functional entity of a child node; and transmitting a downlink physical signal on resources other than the acquired downlink physical signal resources of the base station functional entity of the child node.

The computer-readable storage medium may be, for example, but is not limited to, an electronic, magnetic, optical, electromagnetic, infrared, or semiconductor system, apparatus, or device, or any combination of the above-mentioned. More specific examples of the computer-readable storage medium may include, for example, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above-mentioned. In an embodiment of the present disclosure, the computer-readable storage medium may be any tangible medium containing or storing a computer program, and the computer program may be used by an instruction execution system, an apparatus or a device or a combination thereof. Computer programs contained in the computer-readable storage medium may be transmitted by any appropriate medium, including but not limited to: electrical wires, fiber optic cables, RF (radio frequency), etc., or any suitable combination of the above-mentioned. The computer-readable storage medium may be contained in any device; and may also exist alone without being assembled in the device.

The physical signal transmission device for the IAB node, the resource allocation device for physical signals between the IAB nodes, the physical signal transmission device for the terminal functional entity of the IAB node, and the physical signal transmission device for the base station functional entity of the IAB node according to exemplary embodiments of the present disclosure has been described in conjunction with FIGS. 61-64. In the next, an electronic apparatus according to an exemplary embodiment of the present disclosure may be described in conjunction with FIG. 65.

FIG. 65 illustrates a schematic diagram of a computing device according to an exemplary embodiment of the present disclosure.

Referring to FIG. 65, the computing device 65 according to an exemplary embodiment of the present disclosure includes a storage 651 and a processor 652. The storage 651 may store a computer program thereon, and when the computer program is executed by the processor 652. The physical signal transmission method for the IAB node, the resource allocation method for physical signals between the IAB nodes, the physical signal transmission method for the terminal functional entity of the IAB node, or the physical signal transmission method for the base station functional entity of the TAB node according to the exemplary embodiment of the present disclosure is implemented.

In an exemplary embodiment of the present disclosure, when the computer program is executed by the processor 652, the following steps may be implemented: obtaining configuration parameters for transmitting a physical signal; and transmitting a uplink physical signal transmitted by a terminal functional entity of the IAB node and a downlink physical signal transmitted by a base station functional entity of the IAB node on the same time-domain resource according to the obtained configuration parameters, when a full-duplex transmission is performed on a transmission uplink of the terminal functional entity, a reception downlink of the terminal functional entity, a transmission downlink of the base station functional entity and a reception uplink of the base station functional entity of the IAB node at the same frequency and at the same time.

In an exemplary embodiment of the present disclosure, when the computer program is executed by the processor 652, the following steps may be implemented: allocating a first number of time-domain resources that are different from other IAB nodes for each IAB node when the resources of the physical signals of the IAB nodes within a group are set to be all time division multiplexing, dividing a bandwidth into a second number of segments of frequency-domain resources that do not overlap with each other on a time-domain resource where the resources of the physical signals are located, and allocating one of the second number of segments of frequency-domain resources to each IAB node, when the resources of the physical signals of the IAB nodes within a group are set to be all frequency division multiplexing.

In an exemplary embodiment of the present disclosure, when the computer program is executed by the processor 652, the following steps may be implemented: determining resources that are needed to be avoided in receiving downlink signals and transmitting uplink signals; and performing reception of a downlink physical signal and transmission of an uplink physical signal on resources other than the determined resources that are needed to be avoided.

In an exemplary embodiment of the present disclosure, when the computer program is executed by the processor 652, the following steps may be implemented: acquiring downlink physical signal resources of a base station functional entity of a child node; and transmitting a downlink physical signal on resources other than the acquired downlink physical signal resources of the base station functional entity of the child node.

The computing device shown in FIG. 65 is only an example, which should not bring any limitation to the function and the range of application of the embodiments of the present disclosure.

The physical signal transmission method and device for the IAB node, the resource allocation method and device for physical signals between the IAB nodes, the physical signal transmission method and device for the terminal functional entity of the IAB node, and the physical signal transmission method and device for the base station functional entity of the IAB node according to the exemplary embodiments of the present disclosure have been described by referring to FIGS. 52-65. However, it should be understood that the physical signal transmission device for the IAB node, the resource allocation device for physical signals between the IAB nodes, the physical signal transmission device for the terminal functional entity of the IAB node, or the physical signal transmission device for the base station functional entity of the IAB node and units thereof shown in FIGS. 61-64 may be respectively configured as software, hardware, firmware, or any combination of the above mentioned items performing specific functions, and the electronic apparatus shown in FIG. 65 is not limited to including the components shown above, but some components that may be added or deleted as needed, and the above components may also be combined.

The physical signal transmission method and device for the IAB node according to the exemplary embodiment of the present disclosure, by orthogonal resource division, it is achieved that the uplink physical signal transmitted by the terminal functional entity of the IAB node and the downlink physical signal transmitted by the base station functional entity of the IAB node are transmitted on the same time-domain resource according to the acquired configuration parameters, when the full-duplex transmission is performed on the transmission uplink of the terminal functional entity, the reception downlink of the terminal functional entity, the transmission downlink of the base station functional entity and the reception uplink of the base station functional entity of the IAB node at the same frequency and at the same time. Thus, time-domain resources are saved and it is beneficial to improve the throughput of the IAB system.

The resource allocation method and device for physical signals between IAB nodes according to the exemplary embodiment of the present disclosure, orthogonal resources allocation to each IAB node is achieved by dividing all IAB nodes into groups, setting resources of the physical signals of the IAB nodes in each group to be all time division multiplexing or all frequency division multiplexing, setting resources of the physical signals of the IAB nodes between the groups to be frequency division multiplexing, for all groups within which resources of the physical signals of the IAB nodes are all time division multiplexing, setting resources of the physical signals of the IAB nodes between the groups to be time division multiplexing, for all groups within which the resources of the physical signals of the IAB nodes are all frequency division multiplexing. Accordingly signal interference is avoided.

The physical signal transmission method for a terminal functional entity of an IAB node according to the exemplary embodiment of the present disclosure may perform resource avoidance and achieve self-interference elimination by acquiring uplink physical signal resources and downlink physical signal resources of a parent node, and performing reception of a downlink physical signal and transmission of an uplink physical signal on resources other than the acquired uplink physical signal resources and downlink physical signal resources of the parent node.

The physical signal transmission method for a base station functional entity of an IAB node according to the exemplary embodiment of the present disclosure may perform resource avoidance and achieve self-interference elimination by acquiring downlink physical signal resources of a base station functional entity of a child node and transmitting downlink physical signals on resources other than the acquired downlink physical signal resources of the base station functional entity of the child node.

The full-duplex communication involved in the present application may include at least the following situations. 1. A base station may schedule and transmit uplink physical channels/physical signals and downlink physical channels/physical signals on the same time-frequency resources, herein the uplink physical channels/physical signals and the downlink physical channels/physical signals can be respectively scheduled to different terminals or to the same terminal, or a terminal may transmit uplink physical channels/physical signals and downlink physical channels/physical signals on the same time-frequency resources based on a scheduling of a base station. Here, the meaning of the terminal may include at least terminal equipment, and may also include an integrated access and backhaul-mobile terminal (referred to as IAB-MT). The meaning of a base station may include at least an evolved NodeB (referred to as eNB) and a next generation NodeB (referred to as gNB), and may also include an integrated access and backhaul-distribute unit (referred to as IAB-DU). 2. An integrated access and backhaul (referred to as IAB) node may transmit downlink physical channels/physical signals of its parent link and downlink physical channels/physical signals of its child link on the same time-frequency resources. 3. An IAB node may transmit uplink physical channels/physical signals of its parent link and uplink physical channels/physical signals of its child link on the same time-frequency resources. The transmission of the physical channels/physical signals of the parent link may mean that an IAB-MT in an IAB node receives scheduling information and transmits uplink or downlink physical channels/physical signals according to the scheduling information. The transmission of the physical channels/physical signals of the child link may mean that an IAB-DU in an IAB node transmits scheduling information and transmits uplink or downlink physical channels/physical signals according to the scheduling information. In summary, full-duplex communication may mean that the same communication node can transmit at least two physical channels/physical signals on the same time-frequency resources. The at least two physical channels/physical signals may be physical channels/physical signals with different transmission directions (i.e., uplink or downlink) in the same cell, or may be physical channels/physical signals with the same transmission direction (i.e., uplink or downlink) on the parent link and the child link of the same communication node, and the "same communication node" here is the IAB node described above.

The analog cancelation module can use an analog circuit to achieve the purpose of cancelling self-interference signals in full-duplex communication. Generally, the analog cancelation module may cancel self-interference by: obtaining different delayed copies of the transmit signal through one or more analog delay circuits; iteratively adjusting the gain coefficients of these different delayed copies through a control circuit to make a superimposed signal of these different delayed copies approximate a self-interference signal; and subtracting the superimposed signal from the receive signal. Each delay circuit includes a delay component and an attenuator to match the multipath delay and gain of each multipath of the self-interference channel, therefore the analog cancelation is essentially a process in the time-domain. This means that when a frequency band of a transmit signal in full-duplex communication is larger than a frequency band for full-duplex transmission, the analog cancelation can not separate transmit signals of full-duplex from transmit signals of non-full-duplex, and transmit signals of the entire frequency band need to be processed as self-interference signals.

FIG. 66 a schematic diagram illustrating a relationship among a frequency band of self-interference signals which need to be processed in analog cancelation, a frequency band of transmit signals, a frequency band of receive signals, and a frequency band for full-duplex transmission according to an exemplary embodiment of the present disclosure.

As shown in FIG. 66, the frequency band of a transmit signal may be larger than the frequency band of a receive signal. In addition, the frequency band for full-duplex transmission may be the portion where the frequency band of the receive signal overlaps with the frequency band of the transmit signal, and the frequency band of a self-interference signal which need to be processed in analog cancelation may be the frequency band of the transmit signal, which may be much larger than the frequency band of the receive signal, that is, the frequency band for full-duplex transmission. This situation of asymmetry between the frequency band of the transmit signal and the frequency band of the receive signal may be very common in actual systems. Different uplink and downlink traffic and different user traffic may cause this situation.

In addition, the analog cancelation may have certain limitations on the bandwidth of self-interfering signals to be processed. The reasons are as follows. First, the analog cancelation circuit may be implemented by RF components, and the active operating bandwidth of the RF components may be often limited. The larger the bandwidth is, the easier it is to produce problems such as distortion of output signals, which affects the performance of analog cancelation. Furthermore, the larger the bandwidth of self-interference signals is, the higher the resolution of the experienced self-interference channel is and the more resolvable multipaths there will be, and the number of resolvable multipaths determines the number of analog delay circuits. This means that the larger the bandwidth of self-interference signals is, the more complicated the analog cancelation circuit will be, the higher the cost will be, and the larger the size of the analog cancelation circuit will be. According to current research, the processing bandwidth for self-interference cancelation of a full-duplex equipment may be less than 100 MHz, but the maximum bandwidth of an existing 5G NR (New Radio) system can reach 400 MHz, which is much greater than the bandwidth ability for self-interference cancelation of the full-duplex equipment. In order to solve this problem, introduction of a bandpass RF filter at the transmission end or the reception end may be considered, so as to filter out the self-interference signals outside the frequency band for full-duplex transmission and ensure that the bandwidth of the self-interference signals inputted to the analog cancelation module is within the range that the analog cancelation module can process.

However, the design and/or configuration of the bandpass RF filter may be related to the frequency band used for full-duplex communication. In view of this, the present disclosure may propose to implement a transmission method that facilitates the use of a bandpass RF filter to promote self-interference cancelation by dividing and configuring a frequency band for full-duplex communication. In particular, considering that the full-duplex technology may be applied to a system with a high frequency band and a large bandwidth (for example, the FR2 frequency band of 5G NR) in the future, the transmission method which configures frequency-domain resources for full-duplex of the present disclosure is more advantageous. At present, the division of frequency-domain resources for full-duplex and non-full-duplex has not been implemented at the protocol level.

Further, the bandwidth of frequency band for full-duplex communication determined by the processable bandwidth of the analog cancelation module is mainly determined by the circuit characteristics of the analog cancelation module, and can be considered as a fixed value. This means that the bandwidth(s) of the bandpass filter(s) should be one or more fixed values to support devices with one or more analog cancelation modules. The bandpass RF filter used can be active or passive. Devices using active filters can support adjustable center frequency points, that is, support a frequency band for full-duplex communication with unfixed frequency positions within the system bandwidth; while devices using passive filters only support fixed center frequency points, that is, support a frequency band for full-duplex communication with fixed frequency positions within the system bandwidth. Generally, it is considered that the realization of the active filter is relatively expensive, the energy consumption is large, and the design is difficult. When full-duplex devices with high cost requirements tend to use passive filters but still expect to support multiple frequency bands for full-duplex communication, multiple frequency bands for full-duplex communication with different center frequency points within the system bandwidth can be supported by setting a filter bank including multiple passive RF filters, herein each frequency band for full-duplex communication has a fixed center frequency point and a fixed bandwidth.

In view of the above, the present disclosure aims to design a method for transmitting a physical channel, a terminal for full-duplex communication, a base station for full-duplex communication, and an integrated access and backhaul node for full-duplex communication, which facilitate the cancelation of self-interference signals through bandpass filtering for full-duplex communication by bandpass RF filters. Specifically, according to the embodiments of the present disclosure, by dividing subbands that can be used for full-duplex transmission in a system bandwidth or a bandwidth part (BWP), bandwidth requirements for bandpass filters can be reduced, it is easier to use bandpass filtering to make the self-interference signals within the range that can be processed by self-interference cancelation modules, the mutual interference between full-duplex transmission and non-full-duplex transmission in the same system bandwidth can be reduced, and system throughput can be improved. Further, subbands with at least fixed bandwidths that can be used for full-duplex transmission can be pre-divided within the system bandwidth or bandwidth parts, so that circuit design of full-duplex devices can design corresponding analog bandpass filters according to the pre-divided subbands, and the self-interference signals are ensured to be within the range that can be processed by the self-interference cancelation module through an analog bandpass filter.

FIG. 67 is a schematic diagram illustrating an application scenario 6700 according to an embodiment of the present disclosure.

As shown in 67, the application scenario 6700 may include a terminal 6710, abase station 6720, an IAB node 6730, and a parent IAB node or an IAB donor node 240. The terminal 6710 here may be any device having a wireless communication function, such as a mobile phone, a PDA, a mobile internet device (MID), a set-top box, and the like. The terminal 6710 may be portable, transportable, installed in a vehicle (for air, sea, and/or land), or suitable and/or configured to operate locally and/or in distributed form, to operate on Earth and/or operate anywhere in the space. The base station 6720 may include an evolved Node B (referred to as eNB), a next generation Node B (referred to as gNB), and the like. The IAB node here may include at least an IAB-DU and an IAB-MT. It can be understood that the types of the terminal 6710, the base station 6720, the IAB node 6730, the parent IAB node or IAB donor node 6740 do not constitute a limitation on the embodiment of the present disclosure.

In the application scenario 6700, taking the terminal side as an example, first, the terminal 210 may obtain configuration information indicating a subband for transmitting a physical channel from the base station 6720, or the IAB node 6730 may obtain configuration information indicating a subband for transmitting a physical channel from the parent IAB node or IAB donor node 6740. Next, the terminal 6710 or the IAB node 6730 may transmit at least a portion of the physical channel in the subband indicated by the configuration information.

The physical channel may be a physical channel for full-duplex transmission, that is, at least one of at least two physical channels transmitted and received by the same communication node at the same time and at the same frequency in full-duplex transmission. The physical channel may be a physical channel in a specific transmission direction (for example, an uplink physical channel or a downlink physical channel), or may be a physical channel of a specific type (for example, a shared channel or a data channel). Each subband may be continuous frequency-domain resources with a fixed bandwidth within the system bandwidth or bandwidth parts (referred to as BWPs). The start position of the subband in the frequency-domain may be fixed or not fixed. The subband can be used for full-duplex communication, and other frequency-domain resources within the system bandwidth or bandwidth parts and outside the subband are used for non-full-duplex communication.

One of the advantages of the above communication method is that once the terminal obtains the configuration information on the subband, it only performs full-duplex transmission in the subband indicated by the configuration information, that is, fixed frequency-domain resources are used for full-duplex transmission. Therefore, it can be ensured that a full-duplex device can configure a bandpass RF filter with respect to the subband, so that a signal inputted to a RF self-interference cancelation module of the full-duplex device has a proper bandwidth. The second advantage of this method is that it is convenient to perform resource planning for full-duplex communication and non-full-duplex communication between cells on the network side to reduce inter-cell interference caused by full-duplex communication, for example, adjacent cells can be made to perform full-duplex communication on different subbands to reduce mutual interference when adjacent cells perform full-duplex communication on the same frequency band. In addition, the subbands that can be allocated for full-duplex communication may be fixed, thereby saving signaling overhead for coordinating full-duplex communication resources between different cells in the network.

Several specific examples are given below. It should be noted that the various methods for transmitting physical channels disclosed herein are also applicable for transmitting physical signals.

FIG. 68 illustrates a method 6800 for transmitting a physical channel according to an embodiment of the present disclosure. The method 6800 may be applied to a terminal or an IAB node.

As shown in FIG. 68, the method 6800 may include: at S6810, obtaining configuration information indicating a subband for transmitting a first physical channel, herein the first physical channel is at least one of at least two physical channels transmitted and received by the same communication node at the same time and at the same frequency in full-duplex transmission; and at S6820, transmitting at least a portion of the first physical channel within the subband indicated by the configuration information. It can be understood that the communication node here may be an IAB node, an IAB-DU, an IAB-MT, a base station, or a terminal.

As an example, the obtaining configuration information in S6810 may be a terminal obtaining configuration information transmitted by a base station, or an IAB-MT in an IAB node obtaining configuration information transmitted by a parent IAB node or an IAB donor node, or an IAB-DU in an IAB node obtaining configuration information transmitted by a parent IAB node or an IAB donor node, or an IAB-DU obtaining configuration information based on configuration information which is from a parent IAB node or an IAB donor node and received by an IAB-MT belonging to the same IAB node.

As another example, a terminal or an IAB node may have configuration information on a default subband. In a case where configuration information is not obtained from a base station, a parent IAB node or an IAB donor node, a terminal or an IAB node may obtain configuration information on a subband from itself, and perform full-duplex transmission on a default subband indicated by the configuration information.

In an exemplary embodiment, the at least two physical channels may be physical channels in different transmission directions in the same cell, or physical channels in the same transmission direction on an parent link and a child link of the same communication node, and the transmission direction may include uplink and/or downlink. The same communication node here may be an IAB node.

In an exemplary embodiment, the configuration information obtained at S6810 may indicate at least one of the following: the transmission direction of the first physical channel is uplink and/or downlink, the type of the first physical channel and whether the subband is enabled to be used for full-duplex transmission. In other words, the configuration information obtained by the terminal or the TAB node may indicate the transmission direction and/or type of the first physical channel targeted by the subband and/or whether the subband is enabled for full-duplex communication. Physical channels that are not in the transmission direction and/or type indicated by the configuration information are not transmitted in full-duplex manner in the subband, and subbands that are not indicated by the configuration information as enabled for full-duplex communication are not used for full-duplex communication.

As an example, the transmission direction of the first physical channel may be uplink or downlink, that is, the first physical channel may be an uplink physical channel, or a downlink physical channel. The type of the first physical channel may be, for example, a physical shared channel or a physical control channel.

As an example, after the terminal or the IAB node obtains the configuration information, it can perform full-duplex transmission of the physical channel in the subband indicated by the configuration information and in the indicated transmission direction; otherwise, if the terminal or the IAB node does not obtain the configuration information, only non-full-duplex communication is performed.

As an example, for an IAB node that performs multi-hop transmission, after obtaining configuration information indicating a subband used for full-duplex transmission of the parent link and the child link of the IAB node, assuming that the indicated transmission direction is uplink, and the full-duplex communication manner between the parent link and the child link may be that the parent link and the child link perform uplink transmission in the same slot or subframe or mini slot or OFDM symbol in the subband. As another example, after the terminal or the IAB node obtains the configuration information, it can perform full-duplex transmission with respect to the type of the physical channel indicated by the configuration information. For example, if the type of the physical channel indicated by the configuration information is a shared channel, only full-duplex transmission of the uplink shared channel and/or the downlink shared channel is performed in the subband.

In an exemplary embodiment, the method 6800 may further include obtaining frequency-domain resource allocation information of the first physical channel, and S6820 may be transmitting the first physical channel on frequency-domain resources allocated by the frequency-domain resource allocation information, herein the allocated frequency-domain resources are within the subband. As an example, a terminal may receive frequency-domain resource allocation information of a first physical channel from a base station, or an TAB node may receive frequency-domain resource allocation information of a first physical channel from a parent IAB node, the frequency-domain resources allocated by the frequency-domain resource allocation information are within the subband. Therefore, the terminal or the IAB node transmits the first physical channel on the allocated frequency-domain resources. As another example, after the IAB-DU in the IAB node obtains the configuration information, the IAB-DU may determine, for the first physical channel, frequency-domain resource allocation information, and transmit the frequency-domain resource allocation information of the first physical channel and transmit the first physical channel on frequency-domain resources allocated by the frequency-domain resource allocation information.

FIG. 69 s a schematic diagram illustrating a relationship among a system bandwidth, a subband, predefined subbands, and bandwidth parts according to an embodiment of the present disclosure.

FIG. 70 is a schematic diagram illustrating a relationship among a system bandwidth, a subband, predefined subbands, and bandwidth parts according to an embodiment of the present disclosure.

As shown in FIG. 69, in an exemplary embodiment, one or more predefined subbands each with a fixed bandwidth respectively, that is, predefined subband #0 to predefined subband #N, can be set in the system bandwidth, herein N is a positive integer greater than or equal to 1. The subband indicated by the configuration information is one selected from the one or more predefined subbands each with the fixed bandwidth respectively in the system bandwidth. For example, the subband indicated by the configuration information may be a predefined subband #1.

In an exemplary embodiment, a first guard band may be set between at least two adjacent predefined subbands. The first guard band may be not used for transmission of the first physical channel. For example, the first guard band may be set between the predefined subband #0 and the predefined subband #1, and the first guard band may also be set between the predefined subband #1 and the predefined subband #2, etc. The set of the first guard band can reduce adjacent-band-leakage interference from adjacent predefined subbands when the adjacent predefined subbands are used by the same cell or adjacent cells to perform full-duplex transmission simultaneously.

As shown in FIG. 69, in an exemplary embodiment, each of the predefined subbands may only be within a frequency range of one bandwidth part (BWP). This design can avoid the situation where the predefined subband cannot be used normally due to the division of the bandwidth parts (BWPs) by the base station, for example, avoiding that physical resource blocks within a predefined subband belong to at least two bandwidth parts.

As shown in FIG. 70, in an exemplary embodiment, another implementation of the foregoing design is that, if a physical resource block in one predefined subband belongs to two or more bandwidth parts (BWPs), the one predefined subband is not used for full-duplex transmission. For example, in FIG. 70, the physical resource blocks in the predefined subband #1 belong to the bandwidth part #0 and the bandwidth part #1, respectively, and then the predefined subband #1 is not used for full-duplex transmission.

In an exemplary embodiment, the configuration information may be obtained via high-layer signaling or downlink control information (referred to as DCI), and the high-layer signaling or the DCI may indicate an index of the subband. For example, the terminal may obtain the configuration information from the base station via high-layer signaling or DCI, and the IAB node may obtain the configuration information from a parent IAB node or an IAB donor node via high-layer signaling or DCI. The high-layer signaling may be, for example, a system message block, or a user/user group specific signaling.

As an example, an index of the predefined subband may be an index with which the frequency-domain position of the predefined subband is sorted from high to low within the system bandwidth, or an index with which the frequency-domain position of the predefined subband is sorted from low to high within the system bandwidth. Therefore, the terminal or the IAB node can determine the frequency-domain position of the used subband, according to the index of the predefined subband and the frequency-domain position of the predefined subband in the system bandwidth.

As another example, an index of the predefined subband may also bean index with which the frequency-domain position of the predefined subband is sorted from high to low within a bandwidth part (BWP), or an index with which the frequency-domain position of the predefined subband is sorted from low to high within a bandwidth part (BWP). The index of the predefined subband in the bandwidth part (BWP) may be a relative index, that is, there may be only a portion of the predefined subbands in the bandwidth part (BWP) located in the system bandwidth, and the indicated index of the predefined subband is the index of the frequency-domain position of the predefined subband sorted from high to low or from low to high in the bandwidth part (BWP). At this point, the terminal or the IAB node may determine the frequency-domain position of the used subband according to the index of the predefined subband, the frequency-domain position of the bandwidth part (BWP), and the frequency-domain position of the predefined subband within the system bandwidth. The advantage of this design may be that the number of bits required to configure the index of the predefined subband can be reduced.

In an exemplary embodiment, the subband indicated by the configuration information may be determined based on a frequency-domain relationship between an active bandwidth part and one or more predefined subbands each with a fixed bandwidth respectively in a system bandwidth. For example, the terminal or the IAB node may determine a predefined subband located in the active bandwidth part as the subband configured for the terminal or the IAB node for performing full-duplex transmission of at least a portion of the first physical channel according to the frequency-domain positions of the active bandwidth parts and the predefined subbands.

In an exemplary embodiment, if the configuration information includes configuration information of a subband(s) for an parent link and/or a child link of the same communication node (for example, an IAB node), then the subband for transmitting the first physical channel on the corresponding link can be selected based on the configuration information of a subband(s) for an parent link and/or a child link. For example, in the case where the IAB node obtains configuration information, the IAB node may obtain configuration information set by the IAB donor node for the parent link and/or the child link of the IAB node, herein the subband indicated by the configuration information for the parent link may be the same as or different from the subband indicated by the configuration information for the child link. Further, the subband indicated by the configuration information for the parent link or the subband indicated by the configuration information for the child link may include one or more predefined subbands, herein when the subband includes one predefined subband, the one predefined subband is the subband used by the IAB node for full-duplex transmission on the parent link or the child link, and when the subband includes multiple predefined subbands, the IAB node may select one from the multiple predefined subbands as the subband used for full-duplex transmission on the parent link or the child link. Still further, the IAB node may select the subband used by the child link according to the subband used by the parent link. For example, the IAB node may select the same subband used by the parent link as the subband used by the child link, and perform full-duplex transmission of physical channels in the same transmission direction on the parent and child links in the selected subband.

In an exemplary embodiment, a frequency band of the first physical channel may be within the subband. After the terminal or the IAB node obtains the configuration information, the frequency band (frequency-domain resources) of the first physical channel transmitted on the subband indicated by the configuration information may be within the subband. This design can avoid the adjacent-band-leakage self-interference between the transmission of physical channels in the subband and the transmission of other physical channels outside the subband, and avoid changes of user behaviors such as resource mapping caused by the introduction of a guard band in the frequency band of the first physical channel.

FIG. 71 illustrates a method 7100 for transmitting a physical channel according to an embodiment of the present disclosure.

Referring to FIG. 71, the method 7100 may be applied to a terminal or an IAB node. As shown in FIG. 71, steps S7110 and S7120 of the method 7100 respectively correspond to steps S6810 and S6820 of FIG. 68, and for the sake of brevity, details are not described herein again. The difference between the method 7100 and the method 6800 is that the method 7100 further includes steps S7130-S7150. Step S7130 may involve digital filtering at a transmitter. Steps S7140-S7150 may involve determining a guard band in the frequency band of the transmitted first physical channel. In the following, details will be made with respect to steps S7130-S7150.

As shown in FIG. 71, in an exemplary embodiment, the method 7100 may include: at S7130, performing digital filtering at a transmitter for physical channels or portions of physical channels which am transmitted outside the subband. A physical channel transmitted outside the subband means that the entire physical channel is transmitted outside the subband, and a portion of a physical channel transmitted outside the subband means that a part of the physical channel is transmitted outside the subband. The meaning of step S7130 is that, if a frequency band of a specific physical channel is outside the subband, or a portion of a frequency band of a specific physical channel is outside the subband, and then digital filtering at the transmitter is performed for the frequency band of the specific physical channel that is outside the subband. The beneficial effect of this step is that, by using the digital filtering at the transmitter, the adjacent-band-leakage self-interference caused by data transmission outside the subband to data reception inside the subband can be reduced.

As an example, the process of digital filtering at the transmitter may be a convolution operation at the transmitter with respect to a time-domain signal of a physical channel transmitted outside the subband and a digital filter, herein the passband of the digital filter is within the system bandwidth or the bandwidth part, but does not include the subband and the first guard band. More specifically, the digital filter may be a bandpass filter, and may be one or more. FIG. 72 is a schematic diagram illustrating a relationship among passbands of digital filters, a subband, first guard bands, and a system bandwidth/bandwidth part according to an embodiment of the present disclosure. When the subband and the first guard bands divide the system bandwidth/bandwidth part into discontinuous bandwidths, as shown in FIG. 72, the number of the digital filters is two, and the passband of each digital filter is a continuous bandwidth in the system bandwidth/bandwidth part that does not include the subband and the first guard bands. Otherwise, when the subband and the first guard bands do not divide the system bandwidth/bandwidth part into discontinuous bandwidths, the number of the digital filter is 1, and the passband of the 1 digital filter is the entire bandwidth of the system bandwidth/bandwidth excluding the bandwidth of the subband and the first guard bands.

Referring back to FIG. 71, in an exemplary embodiment, a frequency band of the first physical channel may include at least a portion outside the subband, and the method 7100 may further include: at S7140, obtaining configuration information on a second guard band, herein the second guard band is not used for transmitting the first physical channel, and the configuration information on the second guard band indicates at least one of the following: a bandwidth of the second guard band, whether the second guard band exists, and a start position of the second guard band in the frequency-domain; and at S7150, determining frequency-domain resources of the second guard band according to a frequency-domain relationship between the frequency band of the first physical channel and the subband, and the configuration information on the second guard band, or according to the configuration information on the second guard band. This design can reduce the adjacent-band-leakage self-interference between the transmission of the first physical channel outside the subband and the transmission inside the subband.

The configuration information on the second guard band may be obtained via high-layer signaling or DCI.

As an example, the frequency-domain resources of the second guard band may be determined as follows. First, based on the frequency-domain relationship between the frequency band of the first physical channel and the subband, a first portion of the frequency band of the first physical channel that is located within the subband and a second portion of the frequency band of the first physical channel that is located outside the subband may be determined; and then, based on the bandwidth of the second guard band indicated in the configuration information on the second guard band, frequency-domain resources of the second guard band with the bandwidth of the second guard band may be determined at a frequency-domain position between the first portion and the second portion.

As yet another example, the frequency-domain resources of the second guard band may be determined as follows. First, based on the frequency-domain relationship between the frequency band of the first physical channel and the subband, the start position of the subband in the frequency-domain can be used as the end position of the second guard band in the frequency-domain or the end position of the subband in the frequency-domain can be used as the start position of the second guard band in the frequency-domain. Then, based on the bandwidth of the second guard band indicated in the configuration information on the second guard band and the determined start position or end position of the second guard band in the frequency-domain, frequency-domain resources of the second guard band with the bandwidth of the second guard band may be determined.

As another example, the frequency-domain resources of the second guard band may be determined as follows. First, whether the second guard band exists may be determined with respect to the configuration information on the second guard band. If it is determined that the second guard band exists, then frequency-domain resources of the second guard band with the bandwidth of the second guard band may be determined based on the bandwidth of the second guard band indicated in the configuration information on the second guard band and the start position of the second guard band in the frequency-domain.

FIG. 73 is a schematic diagram illustrating full-duplex communication according to an embodiment of the present disclosure.

As shown in FIG. 73, an IAB node may perform full-duplex communication in an uplink transmission direction in a subband on a parent link and a child link. In the transmission of the parent link, the first physical channel for full-duplex communication, that is, the uplink physical channel, has a first part B1 located in the subband and a second part B2 located outside the subband. There is a second guard band in the frequency band of the uplink physical channel that is not used for transmission of the uplink physical channel. In the example of FIG. 73, the start position of the second guard band in the frequency-domain is aligned with the end position of the first part B1 in the frequency-domain and the second guard band has a certain bandwidth, thereby avoiding the adjacent-band-leakage self-interference caused by the transmission of the uplink physical channel on the second part B2 to the downlink reception in the subband.

FIG. 74 illustrates a method 7400 for transmitting a physical channel according to an embodiment of the present disclosure. The method 7400 is applied to a terminal or an IAB node.

As shown in FIG. 74, the method 7400 may include: at S7410, obtaining configuration information on a guard band of the physical channel, herein the guard band is located in a frequency band of the physical channel, and the configuration information on the guard band of the physical channel is indicated in high-layer signaling and/or downlink control information; and at S7420, transmitting the physical channel in a frequency band that is within the frequency band of the physical channel but does not include the guard band.

The method 7400 is based on a consideration that, for a terminal or an IAB node, it only knows frequency-domain resources of a subband allocated to itself (if the terminal or the IAB node performs full-duplex transmission), but does not know frequency-domain resources of subbands for full-duplex transmission allocated to other terminals or IAB nodes. In this case, in order to avoid the adjacent-band-leakage self-interference between the transmission of a first physical channel of a first terminal or a first IAB node in a subband allocated to a second terminal or a second IAB node and the transmission of a second physical channel of the second terminal or the second IAB node within its subband, a guard band not used for the transmission of the first physical channel within the frequency band of the first physical channel of the first terminal or the first IAB node needs to be determined.

According to the method 7400, the base station, the parent IAB node, or the IAB donor node may indicate information related to the guard band in high-layer signaling or DCI, so that the terminal or the IAB node can determine frequency-domain resources of the guard band, thereby not transmitting physical channels in the guard band.

In an exemplary embodiment, the configuration information on the guard band of the physical channel may include at least one of the following: whether the guard band exists, a start position or an end position of the guard band in the frequency-domain, and a bandwidth of the guard band (the number of subcarriers or physical resource blocks included in the guard band).

In an exemplary embodiment, the start position or the end position of the guard band in the frequency-domain may be aligned with a start position or an end position of a specific subband in the frequency-domain, and the specific subband may be one of the following:

a subband for full-duplex transmission configured for a terminal related to transmission of the physical channel or configured for one link of an integrated access and backhaul (IAB) node related to transmission of the physical channel;

a subband for full-duplex transmission configured for other links not used for transmitting the physical channel of an IAB node related to transmission of the physical channel, and a subband for full-duplex transmission configured for other terminals or other IAB nodes not related to transmission of the physical channel.

This design can reduce the adjacent-band-leakage self-interference caused by transmission within the subband to transmission outside the subband or the adjacent-band-leakage self-interference caused by transmission outside the subband to transmission within the subband between different links of the same IAB node or between different terminals or between IAB nodes.

FIG. 75 is a schematic diagram illustrating full-duplex communication according to an embodiment of the present disclosure.

As shown in FIG. 75, the first IAB node may perform full-duplex communication in an uplink transmission direction in a subband on the parent link and the child link. In the transmission on the parent link of the first IAB node, there may be an uplink physical channel transmitted by a second IAB node different from the first IAB node, and its frequency band may have a first portion B1' located in the subband and a second portion B2' located outside the subband, then a guard band not used for transmission of the uplink physical channel is set in the frequency band of the uplink physical channel. In the example of FIG. 75, the start position of the guard band in the frequency-domain may be aligned with the end position of the first portion B1' in the frequency-domain, thereby avoiding adjacent-band-leakage self-interference caused by transmission of the uplink physical channel in the second portion B2' by the second IAB node to the downlink reception in the subband.

In summary, the method for transmitting a physical channel according to an embodiment of the present disclosure can reduce the adjacent-band-leakage self-interference between transmissions within a subband and transmissions outside the subband on the same link through guard bands set between predefined subbands, and also reduce the adjacent-band-leakage self-interference between different links by setting a guard band in a frequency band of a physical channel.

Those skilled in the art would understand that the present disclosure may include apparatuses for performing the operations or steps of the methods described in the present disclosure.

FIG. 76 illustrates a method 7600 for transmitting a physical channel according to an embodiment of the present disclosure, and the method 7600 is applied to a base station or an IAB node.

As shown in FIG. 76, the method 7600 may include: at S7610, transmitting configuration information on a subband for transmitting a first physical channel, herein the first physical channel is at least one of at least two physical channels transmitted and received by the same communication node at the same time and at the same frequency in full-duplex transmission; and at S7620, transmitting at least a portion of the first physical channel within the subband indicated by the configuration information.

It can be understood that the communication node here may be an IAB node, an IAB-DU, an IAB-MT, a base station, or a terminal.

In an exemplary embodiment, as described above, the first physical channel may be a physical channel for full-duplex transmission, that is, the at least two physical channels are physical channels in different transmission directions in the same cell, or physical channels in the same transmission direction on an parent link and a child link of the same communication node, and the transmission direction may include uplink and/or downlink. The same communication node here may be an IAB node.

In an exemplary embodiment, the configuration information transmitted at S7610 may indicate at least one of the following: the transmission direction of the first physical channel is uplink and/or downlink, the type of the first physical channel and whether the subband is enabled to be used for full-duplex transmission.

In an exemplary embodiment, the method 7610 may further include transmitting frequency-domain resource allocation information of the first physical channel and then S7620 may include transmitting the first physical channel on frequency-domain resources allocated by the frequency-domain resource allocation information, herein the allocated frequency-domain resources are within the subband.

In an exemplary embodiment, the subband indicated by the configuration information may be one selected from one or more predefined subbands each with a fixed bandwidth respectively in a system bandwidth.

In an exemplary embodiment, a first guard band may be set between at least two adjacent predefined subbands.

In an exemplary embodiment, each of the predefined subbands may be only within a frequency range of one bandwidth part (BWP).

In an exemplary embodiment, if a physical resource block in one predefined subband belongs to two or more bandwidth parts (BWPs), the one predefined subband may be not used for full-duplex transmission.

In an exemplary embodiment, the configuration information may be transmitted via high-layer signaling or downlink control information, and the high-layer signaling or the downlink control information may indicate an index of the subband.

In an exemplary embodiment, the subband indicated by the configuration information may be determined based on a frequency-domain relationship between an active bandwidth part and one or more predefined subbands each with a fixed bandwidth respectively in a system bandwidth.

In an exemplary embodiment, the method may further include performing digital filtering at a transmitter for physical channels or physical signals, or portions of physical channels or physical signals which are transmitted outside the subband.

In an exemplary embodiment, a frequency band of the first physical channel may be within the subband.

FIG. 77 illustrates a method 7700 for transmitting a physical channel according to an embodiment of the present disclosure. The method 7700 is applied to a base station or an IAB node.

As shown in FIG. 77, steps S7710 and S7720 of the method 7700 may correspond to steps S7610 and S7620 of FIG. 76 respectively, and for the sake of brevity, details are not described herein again. The difference between the method 7700 and the method 7600 is that the method 7700 further includes steps S7730-S7750. Step S7730 may involve digital filtering at the transmitter. Steps S7740-S7750 may involve determining a guard band in the frequency band of the transmitted first physical channel. The following specifically describes steps S7730-S7750.

In an exemplary embodiment, the method 7700 may include, at S7730, performing digital filtering at a transmitter for physical channels or portions of physical channels which are transmitted outside the subband.

In an exemplary embodiment, a frequency band of the first physical channel may include at least a portion outside the subband, and the method 7700 may further include: at S7740, transmitting configuration information on a second guard band, herein the second guard band is not used for transmitting the first physical channel, the configuration information on the second guard band indicates at least one of the following: a bandwidth of the second guard band, whether the second guard band exists, a start position of the second guard band in the frequency-domain; and at S7750, determining frequency-domain resources of the second guard band according to a frequency-domain relationship between the frequency band of the first physical channel and the subband, and the configuration information on the second guard band, or according to the configuration information on the second guard band.

FIG. 78 illustrates a method for transmitting a physical channel according to an embodiment of the present disclosure 7800.

Referring to FIG. 78, a frequency band of the physical channel may include a first portion located in a subband used for full-duplex transmission and a second portion located outside the subband. The method 7800 may be applied to a base station or an IAB node. As shown in FIG. 78, the method may include: at S7810, transmitting configuration information on a guard band of the physical channel, the guard band being located in the frequency band of the physical channel; and at S7820, transmitting the physical channel in a frequency band within the frequency band of the physical channel but does not include the guard band; herein the configuration information on the guard band of the physical channel is transmitted in high-layer signaling and/or downlink control information.

In an exemplary embodiment, a start position or an end position of the guard band in the frequency-domain may be aligned with a start position or an end position of a specific subband in the frequency-domain, and the specific subband may be one of the following:

a subband for full-duplex transmission configured for a terminal related to transmission of the physical channel or configured for one link of an integrated access and backhaul (IAB) node related to transmission of the physical channel;

a subband for full-duplex transmission configured for other links not used for transmitting the physical channel of an IAB node related to transmission of the physical channel; and a subband for full-duplex transmission configured for other terminals or other IAB nodes not related to transmission of the physical channel.

FIG. 79 is a schematic block diagram illustrating a terminal 7900 for full-duplex communication according to an embodiment of the present disclosure. The terminal 7900 may include an obtaining unit 7910 and a transmission unit 7920.

Referring to FIG. 79, the obtaining unit 7910 may obtain configuration information indicating a subband for transmitting a first physical channel, herein the first physical channel is at least one of at least two physical channels transmitted and received by the same communication node at the same time and at the same frequency in full-duplex transmission; and the transmission unit may transmit at least a portion of the first physical channel within the subband indicated by the configuration information.

In an exemplary embodiment, the obtaining unit 7910 may obtain configuration information on a guard band of the physical channel, herein the guard band is located in a frequency band of the physical channel, and the configuration information on the guard band of the physical channel is indicated in high-layer signaling and/or downlink control information; and the transmission unit 7920 may transmit the physical channel in a frequency band that is within the frequency band of the physical channel but does not include the guard band.

The terminal 7900 is any terminal such as the terminal 6710 shown in FIG. 67. The type of the terminal 7900 does not constitute a limitation on the present disclosure. The terminal 7900 may also be used to perform other specific details in the operations of the methods 6800, 7100, and 7400 described above, and for the sake of brevity, details are not described herein again.

FIG. 80 is a schematic block diagram illustrating a base station 8000 for full-duplex communication according to an embodiment of the present disclosure. The base station 8000 may include a configuration information transmission unit 8010 and a transmission unit 8020.

In an exemplary embodiment, the configuration information transmission unit 8010 may transmit configuration information on a subband for transmitting a first physical channel, herein the first physical channel is at least one of at least two physical channels transmitted and received by the same communication node at the same time and at the same frequency in full-duplex transmission; and the transmission unit 8020 may transmit at least a portion of the first physical channel within the subband indicated by the configuration information.

In an exemplary embodiment, the configuration information transmission unit 8010 may transmit configuration information on a guard band of the physical channel, herein the guard band is located in a frequency band of the physical channel; and the transmission unit 8020 may transmit the physical channel in a frequency band that is within the frequency band of the physical channel but does not include the guard band, herein the configuration information on the guard band of the physical channel is indicated in high-layer signaling and/or downlink control information.

The base station 8000 may be any base station such as the base station 6720 shown in FIG. 67. The type of base station 8000 may not constitute a limitation on the present disclosure. The base station 8000 may also be used to perform other specific details in the operations of the methods 7600, 7700, and 7800 described above. For the sake of brevity, details are not described herein again.

FIG. 81 is a schematic block diagram illustrating an IAB node 8100 for full-duplex communication according to an embodiment of the present disclosure.

Referring to FIG. 81, the IAB node 8100 may include: an integrated access and backhaul-mobile terminal (IAB-MT) 8110 and an integrated access and backhaul-distribute unit (IAB-DU) 8120. The IAB-MT 8110 may obtain configuration information indicating a subband for transmitting a first physical channel and transmit at least a portion of the first physical channel within the subband indicated by the configuration information. The IAB-DU 8120 may transmit configuration information indicating a subband for transmitting a second physical channel and transmit at least a portion of the second physical channel within the subband indicated by the configuration information. The first physical channel and the second physical channel are respectively at least one of at least two physical channels transmitted and received by the same communication node at the same time and at the same frequency in full-duplex transmission. The IAB-MT 8110 can also be used to perform other specific details in the operations of the methods 6800, 7100, and 7400 described above, and the IAB-DU 8120 can also be used to perform other specific details in the operations of the methods 7600, 7700, and 7800 described above. For the sake of brevity, details are not described herein again.

It should be understood by those skilled in the art that the expression "a", "an", "the" and "said" used herein may also include plural forms, unless specifically stated. It should be further understood that the phrase "comprising/including" used in the specification of the present disclosure means the existence of the said features, integers, steps, operations, elements and/or components, but does not exclude the existence or addition of one or more other features, integers, steps, operations, elements, components and/or groups thereof. It should be understood that when a component is described as "connected" or "coupled" to another component, it can be directly connected or coupled to another component, or there may be intermediate elements. In addition, the "connection" or "coupling" used herein may include wireless connection or wireless coupling. The phrase "and/or" used herein includes all or any unit of one or more associated list items and all combinations.

It should be understood by those skilled in the art that all terms used herein (including technical terms and scientific terms) have the same meaning as those generally understood by one of ordinary skill in the art to which the disclosure belongs, unless otherwise defined. It should also be understood that terms such as those defined in a general dictionary should be understood to have meanings consistent with those in the context of the prior art, and will not be interpreted in idealized or over-formal terms unless specifically defined here.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific disclosure and design constraints of the solution. A person skilled in the art can use different methods to implement the described functions for each particular disclosure, but such implementation should not be considered to be beyond the scope of the present disclosure.

A person skilled in the art can clearly understand that, for the convenience and brevity of the description, the specific working process of the devices and the units described above may mean the corresponding process in the foregoing method embodiments, and details are not described herein.

In several embodiments provided by the present disclosure, it should be understood that the disclosed devices and methods may be implemented in other manners. For example, the device embodiments described above are merely illustrative. For example, the division of the unit is only a division of logical functions, and in actual implementation, there may be another division manner, for example, multiple units or components may be combined or integrated into another device, or some features can be ignored or not executed.

The units described as separate components may or may not be physically separate, and the components displayed as units may or may not be physical units. Some or all of the units may be selected according to actual needs to achieve the purpose of the solution of the embodiment.

The functions may be stored in a computer readable storage medium if implemented in the form of software functional units and sold or used as a standalone product. Based on such understanding, the technical solution of the present disclosure in essence or the portion of the technical solution that contributes to the prior art or a portion of the technical solution may be embodied in the form of a software product stored in a storage medium, including instructions used to cause a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a read only memory, a random access memory, a magnetic disk, or an optical disk.

Those skilled in the art will appreciate that the present invention includes devices related to performing one or more of the operations described herein. These devices may be specially designed and manufactured for required purposes, or may also include known devices in a general purpose computer. These devices have computer programs stored therein that are selectively activated or reconfigured. Such computer programs may be stored in a device (such as a computer) readable medium or in any type of medium suitable for storing electronic instructions and coupled to a bus, respectively, including but not limited to any types of disks (including floppy disks, hard disks, optical disks, CD-ROMs, and magneto-optical disks), ROM (Read-Only Memory), RAM (Random Access Memory), and EPROM (Erasable Programmable Read-Only Memory), EEPROM (Electrically Erasable Programmable Read-Only Memory), flash memory, magnetic card or light card. That is, a readable medium includes any medium that is stored or transmitted by a device (such as a computer) in a readable form.

Those skilled in the art will appreciate that each block of the structure diagrams and/or block diagrams and/or flowcharts and combinations of blocks in the structure diagrams and/or block diagrams and/or flowcharts can be implemented by computer program instructions. Those skilled in the art will appreciate that these computer program instructions can be implemented by a general purpose computer, a professional computer, or a processor of other programmable data processing methods, such that the solution specified in the various blocks in the structure diagrams and/or block diagrams and/or flowcharts in accordance with the present disclosure can be executed by the computer or the processor of other programmable data processing method.

Those skilled in the art will appreciate that the steps, measures, and solutions in the various operations, methods, and processes that have been discussed in the present disclosure may be alternated, changed, combined, or deleted. Further, other steps, measures, and solutions of the various operations, methods, and processes that have been discussed in the present disclosure may be alternated, modified, rearranged, decomposed, combined, or deleted. Further, the steps, measures, and solutions in the prior art having various operations, methods, and processes disclosed in the present disclosure may also be alternated, changed, rearranged, decomposed, combined, or deleted.

Although some exemplary embodiments of the present disclosure are expressed and described, those skilled in the art should understand that, modification may be made to these embodiments without departing from the principle and spirit of the present disclosure defined by the claims and the equivalents thereof.

The invention claimed is:

1. A method of a user equipment (UE) for duplex mode switching, the method comprising:
    receiving first configuration information;
    determining a measurement time-frequency resource for a residual self-interference measurement based on the first configuration information;
    performing the residual self-interference measurement on the measurement time-frequency resource to obtain a measurement result;
    transmitting feedback information determined based on the measurement result;
    receiving second configuration information based on the feedback information; and
    identifying a duplex mode of the UE based on the second configuration information.

2. The method of claim 1, wherein the first configuration information includes first indication information indicating the measurement time-frequency resource on a downlink channel for the residual self-interference measurement, and
    wherein the determining the measurement time-frequency resource for the residual self-interference measurement based on the first configuration information comprises:
        determining the measurement time-frequency resource based on the first indication information.

3. The method of claim 2, wherein the measurement time-frequency resource is a time-frequency resource with zero power, and it is assumed that a base station does not transmit a signal on the time-frequency resource with zero power.

4. The method of claim 1, wherein the first configuration information includes second indication information indicating the measurement time-frequency resource on an uplink channel for the residual self-interference measurement, and
    wherein the determining the measurement time-frequency resource for the residual self-interference measurement based on the first configuration information comprises:
        determining the measurement time-frequency resource based on the second indication information.

5. The method of claim 1, further comprising: transmitting UE capability information comprising an indication of a self-interference cancellation capability of the UE.

6. The method of claim 1,
    wherein the performing the residual self-interference measurement on the measurement time-frequency resource to obtain the measurement result comprises at least one of:
        measuring a strength of the residual self-interference; or
        measuring a signal-to-interference-and-noise ratio considering the residual self-interference, and
    wherein the transmitting the feedback information determined based on the measurement result comprises:
        determining at least one of the strength of the residual self-interference, the signal-to-interference-and-noise ratio considering the residual self-interference, or the signal-to-interference-and-noise ratio without considering the residual self-interference as the feedback information; and
        transmitting the feedback information.

7. The method of claim 1, wherein in a case where the current duplex mode of the UE is the full-duplex mode, the method further comprises:
    receiving third indication information for indicating a full-duplex resource for receiving downlink data having a higher priority than the currently transmitted data; and
    stopping a transmission of uplink data and receiving the downlink data having the higher priority, on the full-duplex resource.

8. The method of claim 1, wherein in a case where the current duplex mode of the UE is the full-duplex mode, the method further comprises:
    transmitting a request message for requesting to transmit uplink data having a higher priority than the currently transmitted data;
    receiving fourth indication information indicating a full-duplex resource for the UE to transmit the uplink data having the higher priority in response to the request message; and
    stopping the reception of downlink data and transmitting the uplink data having the higher priority, on the full-duplex resource.

9. A user equipment (UE), the UE comprising:
    a transceiver; and
    at least one processor configured to:
    receive first configuration information,
    determine a measurement time-frequency resource for a residual self-interference measurement based on the first configuration information,
    perform the residual self-interference measurement on the measurement time-frequency resource to obtain a measurement result,
    transmit feedback information determined based on the measurement result,
    receive second configuration information based on the feedback information, and
    identify the duplex mode of the UE based on the second configuration information.

10. A method of a base station (BS) for duplex mode switching, the method comprising:
    transmitting first configuration information, wherein the first configuration information is used to determine a measurement time-frequency resource for a residual self-interference measurement;
    receiving feedback information determined based on a measurement result, wherein the measurement result is obtained based on performing, by a user equipment (UE), the residual self-interference measurement on the measurement time-frequency resource;
    determining second configuration information for configuring a duplex mode of the UE based on the feedback information; and
    transmitting the second configuration information.

11. The method of claim 10, wherein the first configuration information includes first indication information indicating the measurement time-frequency resource on a downlink channel for the residual self-interference measurement, and
    wherein the measurement time-frequency resource is determined based on the first indication information.

12. The method of claim 10, wherein the first configuration information includes second indication information indicating the measurement time-frequency resource on an uplink channel for the residual self-interference measurement, and
    wherein the measurement time-frequency resource is determined based on the second indication information.

13. The method of claim 10, further comprising: receiving UE capability information comprising an indication of a self-interference cancellation capability of the UE,
    wherein the determining the second configuration information for configuring the duplex mode of the UE based on the feedback information comprises:
    determining the second configuration information based on at least one of the feedback information and the UE capability information.

14. The method of claim 10, wherein the determining the second configuration information for configuring the duplex mode of the UE based on the feedback information comprises at least one of:
    determining the second configuration information based on at least one of the strength of the residual self-interference or the signal-to-interference-and-noise ratio considering the residual self-interference;
    in a case where the feedback information includes a signal-to-interference-and-noise ratio without considering residual self-interference, determining the second configuration information based on at least one of the strength of the residual self-interference, the signal-to-interference-and-noise ratio considering residual self-interference, or the signal-to-interference-and-noise ratio without considering residual self-interference; and
    in a case where the feedback information does not include a signal-to-interference-and-noise ratio without considering residual self-interference, determining the second configuration information based on at least one of the strength of the residual self-interference, the signal-to-interference-and-noise ratio considering residual self-interference, or the latest signal-to-interference-and-noise ratio considering residual self-interference feedback by the UE.

15. A base station (BS), the BS comprising:
a transceiver; and
at least one processor configured to:
transmit first configuration information, wherein the first configuration information is used to determine a measurement time-frequency resource for a residual self-interference measurement;
receive feedback information determined based on a measurement result, wherein the measurement result is obtained based on performing, by a user equipment (UE), the residual self-interference measurement on the measurement time-frequency resource;
determine second configuration information based on the feedback information; and
transmit the second configuration information.

* * * * *